United States Patent [19]

Kojima et al.

[11] Patent Number: 5,561,474
[45] Date of Patent: Oct. 1, 1996

[54] SUPERIMPOSING CIRCUIT PERFORMING SUPERIMPOSING BASED ON A COLOR SATURATION LEVEL DETERMINED FROM COLOR DIFFERENCE SIGNALS

[75] Inventors: Kazuaki Kojima; Tetsuya Kuno; Hiroaki Sugiura; Takeshi Yamada, all of Nagaokakyo, Japan

[73] Assignee: Mitsubishi Denki Kabushiki Kaisha, Tokyo, Japan

[21] Appl. No.: 443,759

[22] Filed: May 18, 1995

Related U.S. Application Data

[62] Division of Ser. No. 999,741, Dec. 31, 1992, Pat. No. 5,488,429.

[30] Foreign Application Priority Data

| Jan. 13, 1992 | [JP] | Japan | 4-003917 |
| Jan. 14, 1992 | [JP] | Japan | 4-004453 |
| Mar. 2, 1992 | [JP] | Japan | 4-044581 |
| Apr. 27, 1992 | [JP] | Japan | 4-107451 |
| Jun. 19, 1992 | [JP] | Japan | 4-161057 |
| Jun. 19, 1992 | [JP] | Japan | 4-161058 |
| Aug. 5, 1992 | [JP] | Japan | 4-208929 |
| Aug. 5, 1992 | [JP] | Japan | 4-208930 |
| Aug. 21, 1992 | [JP] | Japan | 4-222698 |
| Aug. 21, 1992 | [JP] | Japan | 4-222699 |

[51] Int. Cl.⁶ ............................................. H04N 9/64
[52] U.S. Cl. .......................................... 348/653; 348/652
[58] Field of Search .......................... 348/586, 587, 348/598, 599, 601, 649, 652, 590, 591, 592

[56] References Cited

U.S. PATENT DOCUMENTS

| 3,873,760 | 3/1975 | Worden | 348/652 |
| 4,327,374 | 4/1982 | Matsuda et al. | 348/653 |
| 4,385,311 | 5/1983 | Harwood et al. | 348/653 |
| 4,394,680 | 7/1983 | Watanabe | 348/587 |

(List continued on next page.)

FOREIGN PATENT DOCUMENTS

| 3809967 | 10/1988 | Germany | H04N 9/64 |
| 56-104595 | 8/1981 | Japan | H04N 9/64 |
| 0060792 | 4/1982 | Japan | H04N 9/535 |
| 0080891 | 5/1982 | Japan | H04N 9/535 |
| 0013094 | 1/1983 | Japan | H04N 9/535 |
| 58-104588 | 6/1983 | Japan | H04N 9/64 |
| 0051387 | 5/1985 | Japan | H04N 9/67 |
| 2-214272 | 8/1990 | Japan . | |
| 239155 | 9/1990 | Japan | H04N 9/07 |

(List continued on next page.)

OTHER PUBLICATIONS

Patent Abstracts of Japan, vol. 15, No. 273, Jul. 11, 1991.
Patent Abstracts of Japan, vol. 7, No. 208, Sep. 14, 1983.
Patent Abstracts of Japan, vol. 5, No. 179, Nov. 17, 1981.
Patent Abstracts of Japan, vol. 14, No. 515, Nov. 13, 1990.
Patent Abstracts of Japan, vol. 15, No. 375, Sep. 20, 1991.
Record of the 1992 Kansai–Section Joint Convention of Institutes of Electrical Engineering, Japan, "A Study of a Method of Flesh–tone Color Correction for Digital Color Video Camera".
Patent Abstracts of Japan, vol. 13, No. 544 (E–855) Dec. 6, 1989.

*Primary Examiner*—Victor R. Kostak
*Assistant Examiner*—John W. Miller

[57] ABSTRACT

The color video camera has a processing circuit which converts electrical signals obtained from an imager into a luminance signal and color-difference signals. The color video camera further includes a memory which stores a table of values designating color saturation levels and corresponding to a specific hue of a background color. The memory outputs a color saturation level based on the color difference signals obtained by imaging an object on a background of the specific hue. This color saturation level is compared with the luminance signal, and based on the comparison results the luminance signal and color difference signals are separated into components corresponding to the background area and components corresponding to the object area.

8 Claims, 187 Drawing Sheets

U.S. PATENT DOCUMENTS

| | | | |
|---|---|---|---|
| 4,506,293 | 3/1985 | Hurst | 348/630 |
| 4,812,903 | 3/1989 | Wagensonner et al. | 348/645 X |
| 4,837,612 | 6/1989 | Miller | 348/645 |
| 5,070,397 | 12/1991 | Wedderburn-Bisshop | 348/591 |
| 5,089,882 | 2/1992 | Kaye et al. | 348/645 |

FOREIGN PATENT DOCUMENTS

| | | | |
|---|---|---|---|
| 2-287225 | 11/1990 | Japan . | |
| 35118 | 1/1991 | Japan . | |
| 3-92087 | 4/1991 | Japan . | |
| 3-148987 | 6/1991 | Japan | H04N 9/64 |
| 336151 | 7/1991 | Japan . | |
| 3-205991 | 9/1991 | Japan | H04N 9/64 |
| 3-285474 | 12/1991 | Japan . | |
| 4-150689 | 5/1992 | Japan | H04N 9/64 |
| 6-078324 | 3/1994 | Japan | H04N 9/68 |

Fig. 7
Prior Art
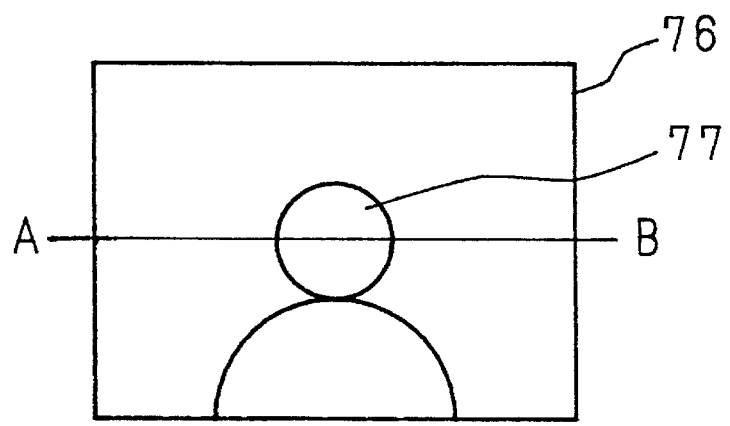
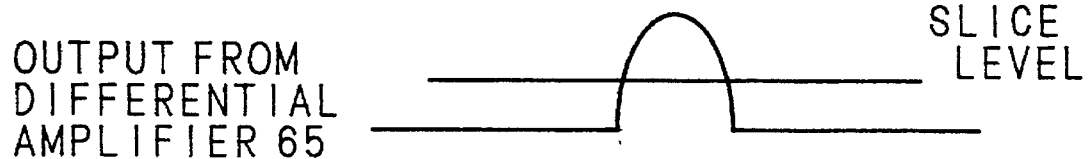
OUTPUT FROM
DIFFERENTIAL
AMPLIFIER 65
SLICE LEVEL
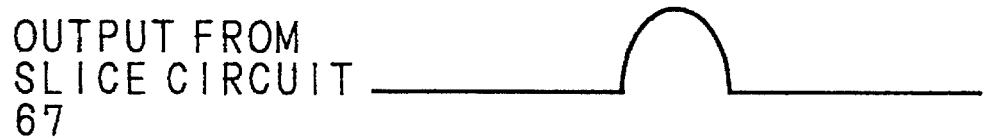
OUTPUT FROM
SLICE CIRCUIT
67
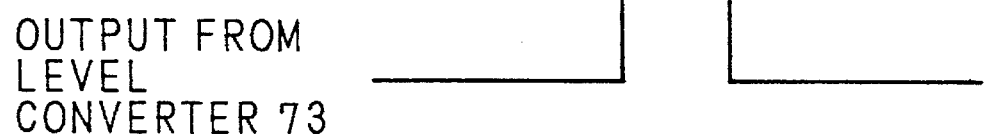
OUTPUT FROM
LEVEL
CONVERTER 73

Fig. 15

| R-Y= | | | | | | | | | | | | | | | | |
|---|---|---|---|---|---|---|---|---|---|---|---|---|---|---|---|---|
| 15 | 15 | 0 | 0 | 0 | 0 | 0 | 0 | 0 | 0 | 0 | 0 | 0 | 0 | 0 | 0 | 0 |
| 14 | 14 | 14 | 0 | 0 | 0 | 0 | 0 | 0 | 0 | 0 | 0 | 0 | 0 | 0 | 0 | 0 |
| 13 | 13 | 13 | 13 | 0 | 0 | 0 | 0 | 0 | 0 | 0 | 0 | 0 | 0 | 0 | 0 | 0 |
| 12 | 12 | 12 | 12 | 12 | 0 | 0 | 0 | 0 | 0 | 0 | 0 | 0 | 0 | 0 | 0 | 0 |
| 11 | 12 | 11 | 11 | 11 | 11 | 0 | 0 | 0 | 0 | 0 | 0 | 0 | 0 | 0 | 0 | 0 |
| 10 | 11 | 11 | 10 | 10 | 10 | 10 | 0 | 0 | 0 | 0 | 0 | 0 | 0 | 0 | 0 | 0 |
| 9 | 10 | 10 | 10 | 9 | 9 | 9 | 9 | 0 | 0 | 0 | 0 | 0 | 0 | 0 | 0 | 0 |
| 8 | 10 | 9 | 9 | 9 | 8 | 8 | 8 | 8 | 0 | 0 | 0 | 0 | 0 | 0 | 0 | 0 |
| 7 | 9 | 9 | 8 | 8 | 8 | 7 | 7 | 7 | 7 | 0 | 0 | 0 | 0 | 0 | 0 | 0 |
| 6 | 9 | 8 | 8 | 7 | 7 | 7 | 6 | 6 | 6 | 6 | 0 | 0 | 0 | 0 | 0 | 0 |
| 5 | 8 | 8 | 7 | 7 | 6 | 6 | 6 | 5 | 5 | 5 | 5 | 0 | 0 | 0 | 0 | 0 |
| 4 | 0 | 0 | 0 | 6 | 6 | 6 | 5 | 5 | 4 | 4 | 4 | 4 | 0 | 0 | 0 | 0 |
| 3 | 0 | 0 | 0 | 0 | 0 | 0 | 5 | 4 | 4 | 3 | 3 | 3 | 3 | 0 | 0 | 0 |
| 2 | 0 | 0 | 0 | 0 | 0 | 0 | 0 | 0 | 0 | 3 | 3 | 2 | 2 | 2 | 0 | 0 |
| 1 | 0 | 0 | 0 | 0 | 0 | 0 | 0 | 0 | 0 | 0 | 0 | 0 | 1 | 1 | 1 | 0 |
| 0 | 0 | 0 | 0 | 0 | 0 | 0 | 0 | 0 | 0 | 0 | 0 | 0 | 0 | 0 | 0 | 0 |
| -(B-Y)= | 15 | 14 | 13 | 12 | 11 | 10 | 9 | 8 | 7 | 6 | 5 | 4 | 3 | 2 | 1 | 0 |

Fig. 44(a)
Fig. 44(b)
Fig. 44(b')
Fig. 44(c)
Fig. 44(d)
Fig. 44(e)
Fig. 44(f)
Fig. 44(g)
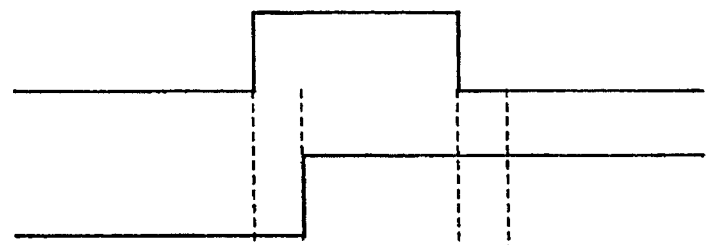
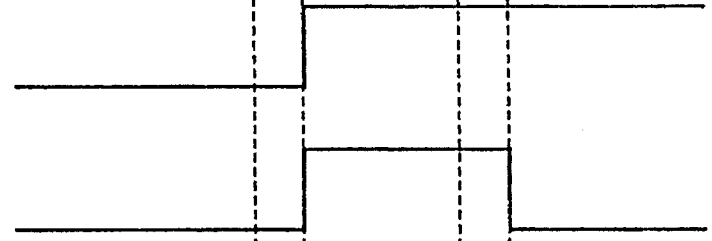
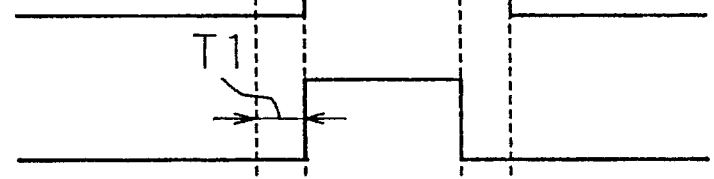
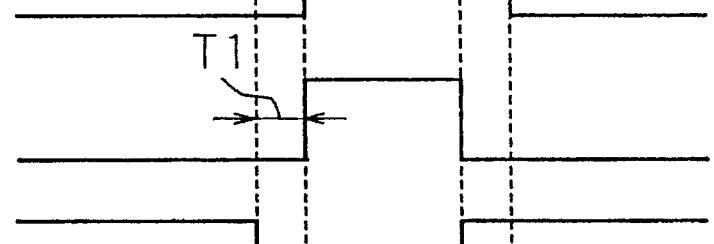
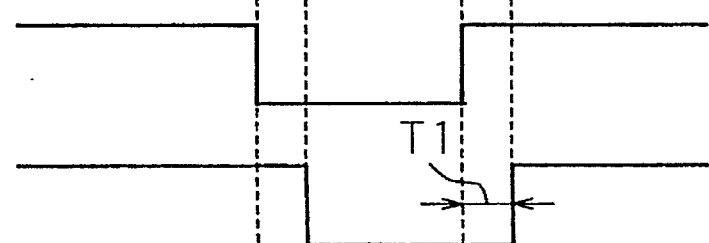
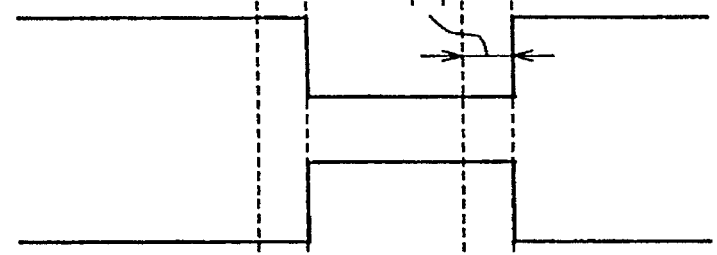
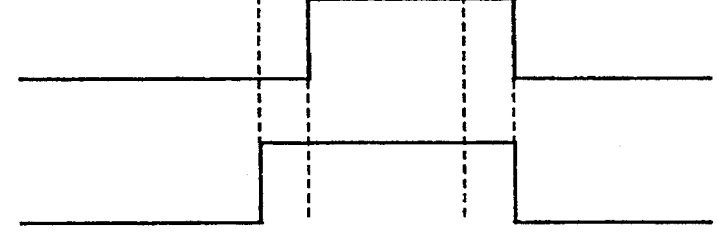

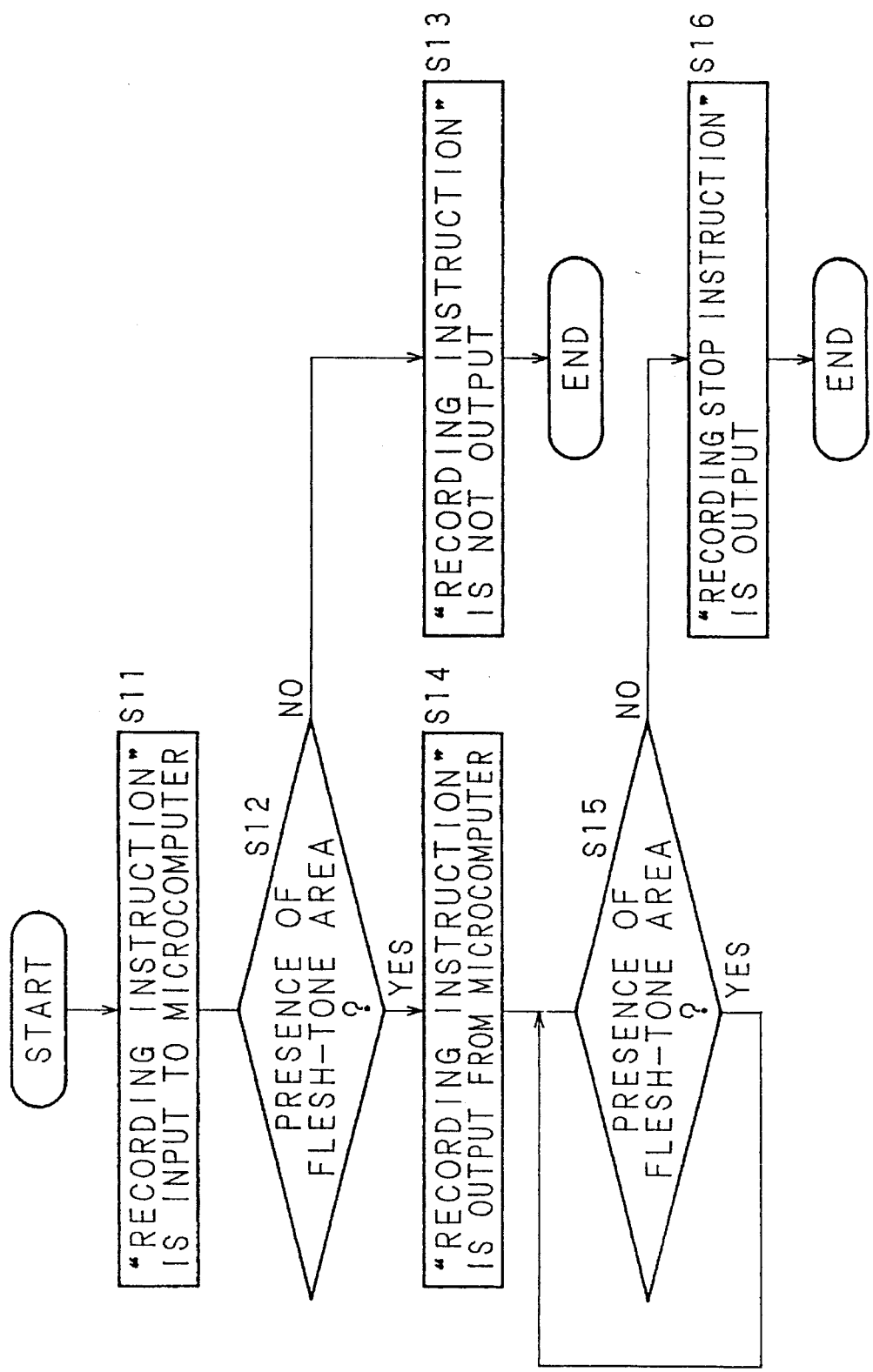

ONE PIXEL

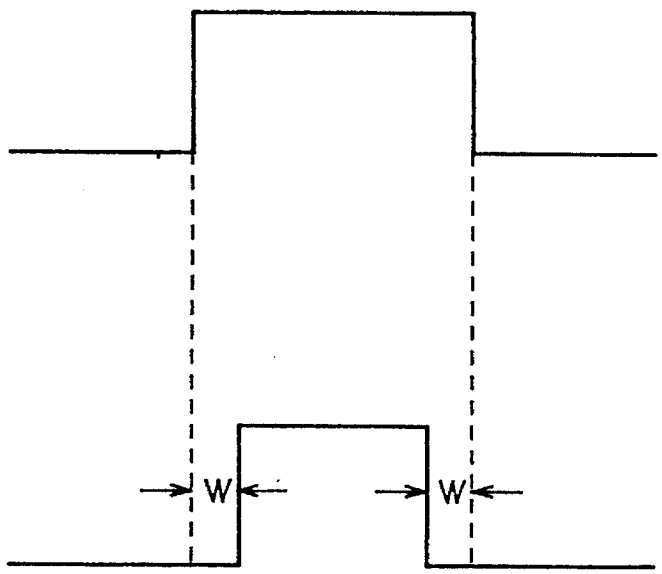

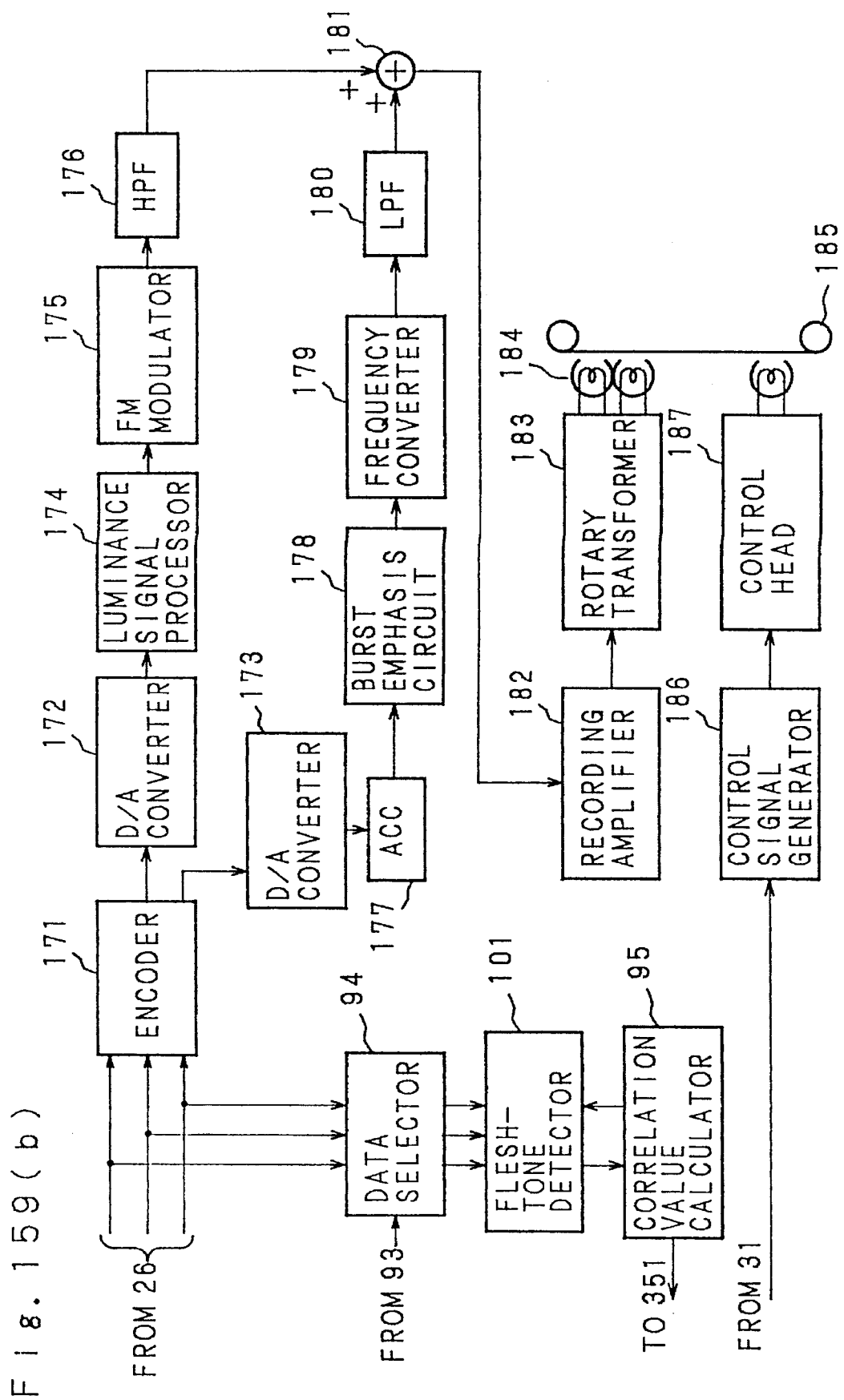

Fig. 161

| B-Y= | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| R-Y= | | | | | | | | | | | | | | | | |
| 0 | 0 | 0 | 0 | 0 | 0 | 0 | 0 | 0 | 0 | 0 | 0 | 0 | 0 | 0 | 0 | 0 |
| -1 | 0 | 1 | 0 | 0 | 0 | 0 | 0 | 0 | 0 | 0 | 0 | 0 | 0 | 0 | 0 | 0 |
| -2 | 0 | 1 | 2 | 0 | 0 | 0 | 0 | 0 | 0 | 0 | 0 | 0 | 0 | 0 | 0 | 0 |
| -3 | 0 | 1 | 2 | 3 | 0 | 0 | 0 | 0 | 0 | 0 | 0 | 0 | 0 | 0 | 0 | 0 |
| -4 | 0 | 0 | 2 | 3 | 4 | 0 | 0 | 0 | 0 | 0 | 0 | 0 | 0 | 0 | 0 | 0 |
| -5 | 0 | 0 | 3 | 3 | 4 | 5 | 0 | 0 | 0 | 0 | 0 | 0 | 0 | 0 | 0 | 0 |
| -6 | 0 | 0 | 3 | 3 | 4 | 5 | 6 | 0 | 0 | 0 | 0 | 0 | 0 | 0 | 0 | 0 |
| -7 | 0 | 0 | 0 | 4 | 4 | 5 | 6 | 7 | 0 | 0 | 0 | 0 | 0 | 0 | 0 | 0 |
| -8 | 0 | 0 | 0 | 4 | 5 | 5 | 6 | 7 | 8 | 0 | 0 | 0 | 0 | 0 | 0 | 0 |
| -9 | 0 | 0 | 0 | 5 | 5 | 6 | 6 | 7 | 8 | 9 | 0 | 0 | 0 | 0 | 0 | 0 |
| -10 | 0 | 0 | 0 | 0 | 6 | 6 | 7 | 7 | 8 | 9 | 10 | 0 | 0 | 0 | 0 | 0 |
| -11 | 0 | 0 | 0 | 0 | 6 | 6 | 7 | 8 | 8 | 9 | 10 | 11 | 0 | 0 | 0 | 0 |
| -12 | 0 | 0 | 0 | 0 | 6 | 7 | 7 | 8 | 9 | 9 | 10 | 11 | 12 | 0 | 0 | 0 |
| -13 | 0 | 0 | 0 | 0 | 0 | 7 | 8 | 8 | 9 | 10 | 10 | 11 | 12 | 13 | 0 | 0 |
| -14 | 0 | 0 | 0 | 0 | 0 | 8 | 8 | 9 | 9 | 10 | 11 | 11 | 12 | 13 | 14 | 0 |
| -15 | 0 | 0 | 0 | 0 | 0 | 8 | 9 | 10 | 10 | 10 | 11 | 12 | 12 | 13 | 14 | 15 |

SUPERIMPOSING CIRCUIT PERFORMING SUPERIMPOSING BASED ON A COLOR SATURATION LEVEL DETERMINED FROM COLOR DIFFERENCE SIGNALS

This application is a divisional of application Ser. No. 07/999,741, filed on Dec. 31, 1992 now U.S. Pat. No. 5,488,429, the entire contents of which are hereby incorporated by reference.

BACKGROUND OF THE INVENTION

1. Field of the Invention

The present invention relates to the processing of video signals for a color video camera.

2. Description of Related Art

FIG. 1 a block diagram of a prior art video signal processor. In FIG. 1, the reference numeral 1 designates an R-Y color-difference signal input terminal, 2 is a B-Y color-difference signal input terminal, 3 is a luminance signal input terminal, 4 is an aperture correction signal input terminal, 5 is an R-Y color-difference signal output terminal, 6 is a B-Y color-difference signal output terminal, 7 is a luminance signal output terminal, 8 is an aperture correction signal output terminal, 9 through 12 refer to control signal input terminals, and 13 through 16 denote gain controllers Next, the operation of the video signal processor will be described below. Color-difference signals applied to the R-Y color-difference signal input terminal 1 and the B-Y color-difference signal input terminal 2 are transferred to the gain controllers 13 and 14, respectively, where the gains of the signals are controlled in accordance with control signals D1 and D2 for proper color reproduction before being output at the R-Y color-difference signal output terminal 5 and the B-Y color-difference signal output terminal 6, respectively. On the other hand, the luminance signal applied to the luminance signal input terminal 3 is transferred to the gain controller 15, where the gain of the signal is controlled in accordance with a control signal D3 before being output at the luminance signal output terminal 7. The aperture correction signal applied to the aperture correction signal input terminal 4 is transferred to the gain controller 16, where the gain of the signal is controlled in accordance with a control signal D4 before being output at the aperture correction signal output terminal 8.

FIG. 2 is a block diagram showing another prior art video signal processor. In FIG. 2, the same reference numerals as those in FIG. 1 designate the same or corresponding parts, while the numerals 17 and 18 designate operational circuits.

Now, the operation of this video signal processor will be described below. An R-Y color-difference signal applied to the R-Y color-difference input terminal 1 is transferred to the operational circuit 17 as well as to the gain controller 14, and a B-Y color-difference signal applied to the B-Y color-difference signal input terminal 2 is transferred to the operational circuit 18 as well as to the gain controller 13. In the gain controllers 13 and 14, the gains of the color-difference signals are controlled in accordance with control signals D5 and D5 for proper color reproduction. The output of the gain controller 13 is supplied to the operational circuit 17, while the output of the gain controller 14 is supplied to the operational circuit 18. The operational circuits 17 and 18 add the two input signals and output the respective sum signals at the R-Y color-difference signal output terminal 5 and the B-Y color-difference output terminal 6.

One problem with the above configured prior art video signal processors has been that flesh tones cannot be corrected without affecting the tones of other colors, since the gains of the color-difference signals can only be varied in the directions along the R-Y and B-Y axes.

Another problem with the prior art has been that it is extremely difficult to vary the gain of the luminance signal and the gain and frequency characteristic of the aperture correction signal selectively for flesh-tone areas.

The prior art has a further problem that, when the lighting is not used and proper makeup is not done on the face of the object person, the luminance on the human face is not sufficient and wrinkles on the human face become emphasized because of camera signal processing such as γ-correction.

FIG. 3 is a block diagram of still another prior art signal processor for a color video camera. In FIG. 3, the reference numeral 21 is a focus lens, 22 is a solid state imager, 23 is a co-related double sampling (CDS) circuit, 24 is an automatic gain controller (AGC), 25 is an A/D converter, 26 is a signal processor, 27 is a window pulse generator, 28 is a data selector, 29 is a band-pass filter (BPF), 30 is an integrator, 31 is a microcomputer, 32 is a motor drive circuit for driving a motor 33, 33 is the motor for moving the focus lens 21, 34 is a luminanee signal output terminal, 35 is an R-Y color-difference signal output terminal, 36 is a B-Y color-difference signal output terminal, 37 is a data selector, 38 is an integrator, 39 is an iris, 40 is a motor for moving the iris 39, 41 is a motor drive circuit for driving the motor 40, 42 is a timing generator (TG) for driving the solid state imager, 43 is a solid state imager drive circuit, 44 is a zoom lens, 45 is a motor for moving the zoom lens 44, 46 is a motor drive circuit for driving the motor 45, 47 is a data selector, 48 is an integrator, and 380 is an A/D converter.

The operation of this video signal processor will be described below. An optical image, focused thorough the zoom lens 44 and focus lens 21, is converted by the solid state image 22 into an electrical signal. The TG 42 outputs imager reading pulses which are supplied to the solid state imager drive circuit 43 and in synchronism with which a video signal is output from the solid state imager 22. The CDS circuit 23 only extracts signal components from the output signal of the solid state imager 22 which is mixed with noises, and after the gain of the output signal of the CDS circuit 23 is controlled by the AGC 24, the signal processor 26 performs signal processing such as color separation and matrixing on the output signal to produce the luminance signal, R-Y color-difference signal, and B-Y color-difference signal.

The data selector 37 selects a part of the video signal which lies inside a picture frame determined by the window pulse generator 27. The video signal selected by the data selector 37 is integrated by the integrator 38 for every vertical scanning period. In accordance with an output signal supplied from the integrator 38, the motor drive circuit 41 controls the opening of the iris 39 by means of the motor 40.

The data selector 47 selects data that lie inside the picture frame determined by the window pulse generator 27. The video signal selected by the data selector 47 is integrated by the integrator 48 For every field period accordance with an output signal supplied from the integrator 48, the gain in the AGC 24 is controlled so that the output signal of the AGC 24 is maintained at a constant level. The output signal supplied from the integrator 38 is digitized by the A/D converter 380. Then, in accordance with an output digital signal supplied from the A/D converter 380, the microcomputer 31 outputs a control signal to the timing generator 42 to control the speed of an automatic electronic shutter.

The data selector 28 selects a part of the video signal which lies inside the picture frame determined by the window pulse generator 27. The video signal selected by the data selector 28 is passed through the band-pass filter 29 to extract the frequency components necessary for auto focusing, and the extracted frequency components are integrated by the integrator 30 for each vertical scanning period. The output signal of the integrator 30 is fed to the microcomputer 31 to control the motor drive circuit 32. That is, the microcomputer 31 supplies a control signal to the focus lens drive circuit 32 which controls the focus lens 21 by means of the motor 33. On the other hand, the motor drive circuit 46 controls the motor 45 to vary the magnifying ratio for the object.

The prior art video signal processor of the above construction has a problem that the light from a main object (person) cannot be accurately measured when the object is at backlight, thus causing a so-called phenomenon of "black compression", i.e., loss of grayscale in the low luminance portions of the video signal. It also has a problem that the light from a main object (person) cannot be accurately measured when the object is illuminated with excessive front lighting, thus causing a so-called phenomenon of "white saturation", i.e., saturation of the high luminance portions of the video signal. Furthermore, the prior art has a problem that, since the center of the video signal area is taken as the primary focus area, correct focusing cannot be achieved when a main object (person) is not positioned in the center area or is located outside the focus area. The prior art has a further problem that, since the center of the picture area is taken as the primary photometric area, iris control, automatic gain control, and automatic electronic shutter speed adjustment cannot be done properly for a main object (person).

FIG. 4 is a block diagram of a color video camera capable of videotaping the camera operator himself by remote control, and FIG. 5 is a schematic diagram showing the camera operator videotaping himself. In FIG. 4, like or corresponding parts to those in FIG. 3 are designated by like reference numerals. In FIG. 4, the reference numeral 49 designates a remote controller, and 50 a receiving circuit. In FIG. 5, 51 is the operator videotaping himself by remote control, 52 is a video camera, and 53 is a tripod for supporting the video camera 52 in position. The remote controller 49 transmits recording function control signals such as "recording instruction", "recording stop instruction", etc. Acoustic or electric waves, or light may be used to transmit such control signals from the remote controller 49 to the color video camera 52. In the example hereinafter described, light such as infrared light is used. The receiving circuit 50 receives a light pattern of an infrared signal transmitted from the remote controller 49 and transfers the received signal to the microcomputer 31. The microcomputer 31 outputs a control signal to initiate the recording of video signals when a "recording instruction" is given, and a control signal to stop the recording of video signals when a "recording stop instruction" is given.

The prior art color video camera of the above construction has a problem that, when videotaping himself by remote control, the operator needs to check through a monitor, such as a viewfinder of the video camera, to determine whether he is positioned inside the picture frame. There has also been a problem that, while the operator is being videotaped for recording by remote control, there is a possibility that the object (the operator) may move outside the picture angle of the video camera without the operator knowing of it. The prior art has a further problem that, while the operator is being videotaped for recording by remote control, the operator's face may not be held within the picture frame and the operator himself may not be positioned properly in the center unless he checks the monitor for the picture being recorded.

It is also known that an image superimposing device called a chromakey device is used when superimposing an object image taken by a color video camera on a prescribed background image such as a landscape picture. Using the chromakey device, an object image to be fitted in is recorded against a background of a specific hue; the resulting video signal is compared with this specific hue to distinguish the portions of the signal that do not coincide with the specific hue, and a keying signal is generated in order to output only those portions that do not coincide with the specific hue, i.e. the video signal portions that lie within the area of the object image.

FIG. 6 is a block diagram showing the constitution of a prior art image superimposing device, for example, described on pp. 116–119 in "Image Electronics Seminar 8, Image Software," Corona-Sha, pp. 116–119, Aug. 30, 1980. In FIG. 6, the reference numeral 54 is a lens, 55 is an image sensor, 56 is a processing circuit, 57 is an encoder circuit, 58 is a synchronizing circuit, 59 is a NOT circuit, 60 and 61 are gate circuits, 62 is a superimposing circuit, 63 and 64 are buffer amplifiers, 65 and 66 are differential amplifiers, 67 and 68 are slice circuits, 69 is a reference R-Y color-difference signal input terminal, 70 is a reference B-Y color-difference signal input terminal, 71 and 72 are variable resistances, 73 and 74 are level converters, and 75 is an AND circuit.

Next, the operation of this image superimposing device will be described below. First, an object image to be fitted in is recorded against a background of a specific hue. The optical image of the object is focused through the lens 54 onto the image sensor 55 for conversion into an electrical signal corresponding to the brightness of the optical image. The electrical signal is supplied to the processing circuit 56 which processes this signal to produce a Y signal, an R-Y color-difference signal, and a B-Y color-difference signal. These signals are converted by the encoder circuit 57 into a video signal for recording.

The R-Y color-difference signal and B-Y color-difference signal are also supplied to the buffer amplifiers 63 and 64, respectively, for impedance conversion. These signals are then fed to the differential amplifiers 65 and 66 where the levels of these signals are compared with the levels of the respective reference color-difference signals of the background color, the results then being supplied the slice circuits 67 and 68. In the slice circuits 67 and 68, the input signals are sliced at the slice levels set by the variable resistances 71 and 72. The specific hue of the background is set through the reference R-Y color-difference signal input terminal 69 and reference B-Y color-difference signal input terminal 70; since a man is usually selected as the object, blue, a complementary color of flesh color, is selected as the specific hue. When the obtained color-difference signals coincide with the specific hue, the outputs of the slice circuits 67 and 68 remain nearly unchanged, and when they differ from the specific hue, there occur significant variations in the outputs of the slice circuits 67 and 68. The level converters 73 and 74 output a binary logic level, either "0" or "1", to correspond to the outputs of the slice circuit 67 and 68. FIG. 7 is a diagram illustrating the operation described above, in which an output from the differential amplifier 65, an output from the slice circuit 67, and an output from the level converter 73 are shown by way of example when an object 77 in a picture 76 is taken along line A-B. The outputs of the level converters 73 and 74 are ANDed by the AND circuit 75 to produce a keying signal.

Synchronized with the video signal, a background image signal is supplied to the gate circuit 61 from the synchronizing circuit 58. In response to the keying signal supplied from the AND circuit 75, the gate circuit 60 extracts the components corresponding to the area of the object from the video signal supplied from the encoder circuit 57, and the extracted signal is fed to the superimposing circuit 62. On the other hand, the keying signal is inverted through the NOT circuit 59 and supplied to the gate circuit 61 which extracts the components corresponding to the background area from the background image signal supplied from the synchronizing circuit 58, and the extracted signal is fed to the superimposing circuit 62. The superimposing circuit 62 superimposes the outputs of the gate circuits 60 and 61 to produce a superimposed video image.

The prior art image superimposing device of the above construction has had the various problems described below. First, a color greatly different in hue from the color of the object has to be selected as the background color for distinct separation between the object and the background. For example, when the object is a human, a complementary color of flesh color, i.e. blue, is usually selected as the background color, which requires a blue background called a blue back. It is also required that the color of the object placed against the background should be greatly different in hue from the background color. Therefore, widen blue is selected as the background color, purple or greenish blue colors containing a high degree of blue components cannot be used as the color of the object because of their difficulty of separation from the background color. This has caused such a problem as limiting the selection of clothes that the human can wear. Furthermore, when a plain-colored curtain is selected as the background and the luminance of the background color varies because of variations in the luminance by the pleats in the curtain, separation between the background and the object placed against the background becomes unstable. Further, the reference blue back is not always available as the background. For example, in an ordinary home situation, a wall that is not blue in color may often be used as the background against which an object is recorded. In such a case, the wall color must be set as the background color, but changing the background color requires adjustment of the reference levels and slice levels and these levels must be individually adjusted for variations in the reference background color or camera characteristics. In an ordinary home, it is also difficult to prepare a background of uniform luminance and hue; for example, when setting the background color with a wall, curtain, etc. as the background, the adjustments become even more difficult as stains, creases, etc. on the background cause variation in the luminance and hue, which leads to unstable separation between the background and the object placed against the background. Furthermore, the image superimposing device generally requires using a camera for creating the keying signal and an external camera or a video tape recorder (VTR) for producing a background picture and also requires maintaining synchronization between these devices. The problem is that the construction of the device is made bulky as a result.

SUMMARY OF THE INVENTION

It is an object of the invention to provide a video signal processor capable of selectively detecting a specific color area (flesh-tone area) using simple circuitry.

It is another object of the invention to provide a video signal processor capable of selectively detecting a flesh-tone area or man-facial area, using simple circuitry, so that the area can be set as the auto focus area or the photometric area for iris control, automatic gain control, automatic shutter speed adjustment, etc.

It is a further object of the invention to provide a video signal processor capable of performing color correction selectively on the flesh-tone or man-facial area without affecting other colors.

It is another object of the invention to provide a video signal processor capable of varying the gain of the luminance signal, the gain of the aperture correction signal and the frequency characteristic of the aperture correction signal only for the flesh-tone area or man-facial area.

It is still another object of the invention to provide a video camera which is capable of preventing misrecording with the operator positioned outside the picture angle of the video camera and thus obtaining a proper picture with the main object positioned in the center when the operator is videotaping himself.

It is a further object of the invention to provide a color video camera capable of accurately separating the object area and background area from the video signal by using simple circuit.

According to the video signal processor of the invention, an area defined by the hue and the color signal saturation level is varied in accordance with the level of the luminance signal in order to detect flesh-tone areas. Furthermore, from the detected flesh-tone areas, a facial area is distinguished based on its size.

For the flesh-tone area or facial area, the gain of the R-Y color-difference signal is raised, the gain of the B-Y color-difference signal is lowered, and the gain of the luminance signal is raised, to make correction to produce flesh color close to the human sensation of the color. Further, for the flesh-tone area or facial area, the gain of the aperture correction signal is lowered so that the human face appears wrinkleless. Furthermore, for the flesh-tone area or facial area, the frequency characteristic of the aperture correction signal is varied to obtain natural-looking wrinkles. Moreover, based on the detected flesh-tone area or facial area, the auto focus area or the photometric area for iris control, automatic gain control, automatic shutter speed adjustment, etc. is set. Further, the video signal processor is constructed in such a way that recording is performed only when the flesh-tone area or the facial area is detected.

According to another video signal processor of the invention, an area defined by the hues of the R-Y and B-Y color-difference signals and the densities of colors varied in accordance with the level of the luminance signal in order to detect the background area. An image or a static image of desired hue is fitted in the extracted background area and superimposed on the image of an object. Furthermore, the video signal for the object area other than the background is passed through a low-pass filter or subjected to mosaic processing or defect processing for reducing luminance grayscale so that special effects can be achieved selectively in the object area.

The above and further objects and features of the invention will more fully be apparent from the following detailed description with accompanying drawings

BRIEF DESCRIPTION OF THE DRAWINGS

FIG. 7 is a diagram showing the explaining of the image superimposing device of FIG. 6;

FIG. 15 is a diagram showing a table for flesh-tone area detection;

FIGS. 44(a)–(g) is a diagram illustrating the process of shaping a flesh-tone detection signal through the data selector;

FIG. 81 is a flowchart illustrating the algorithm of a microcomputer;

FIG. 120 is a diagram showing horizontal values of detected flesh-tone areas;

FIG. 121 is a diagram showing a range for detection of a human face;

FIG. 122 is a diagram showing horizontal and vertical values of a flesh-tone area detected;

FIG. 123 is a block diagram showing the configuration of a video signal processor according to a further embodiment of the invention;

FIG. 124 is a diagram showing a picture frame defining an area to be detected as a human face;

FIG. 125 is a diagram showing an example of detection of a plurality of flesh-tone areas;

Figure 126A:
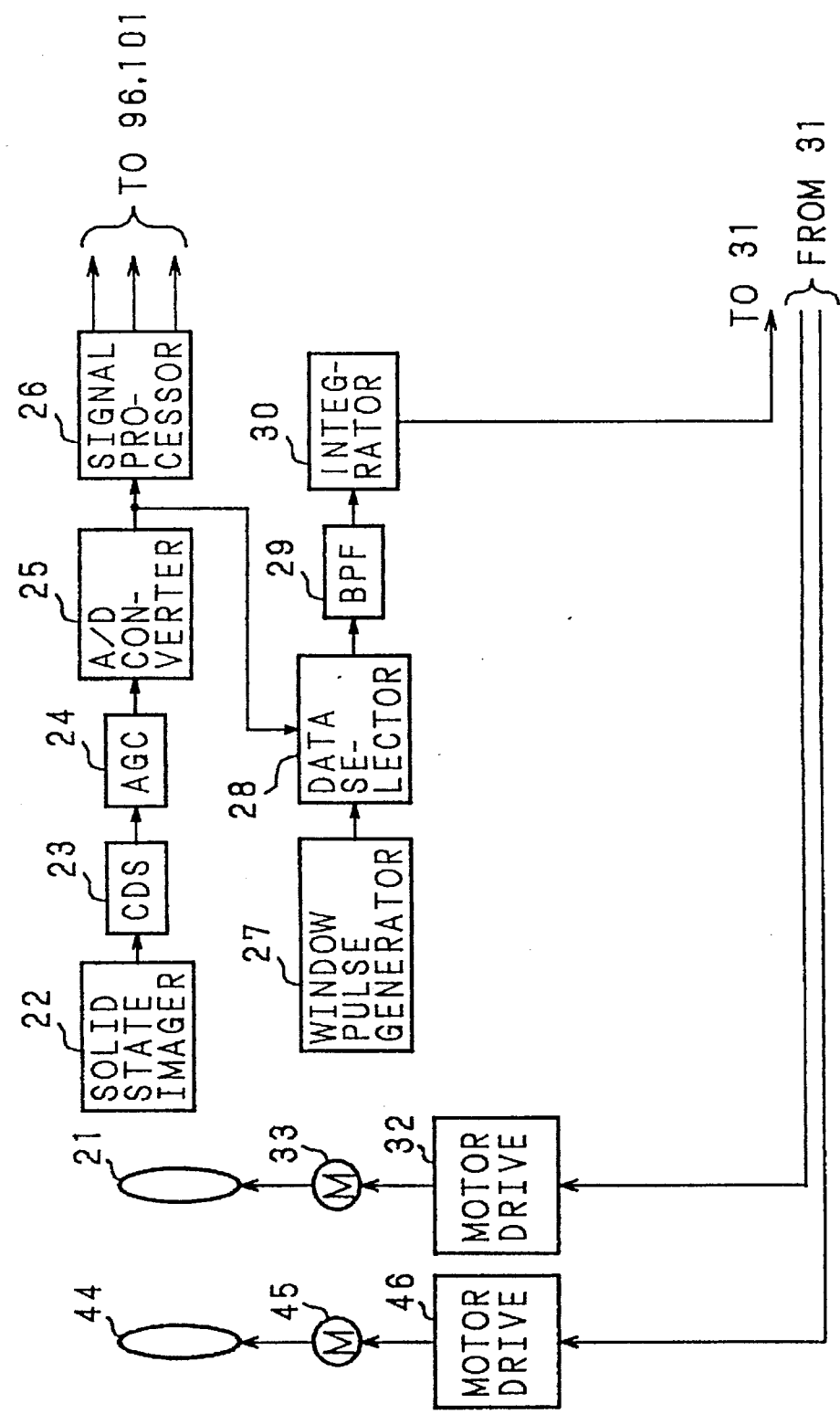
Figure 126B:
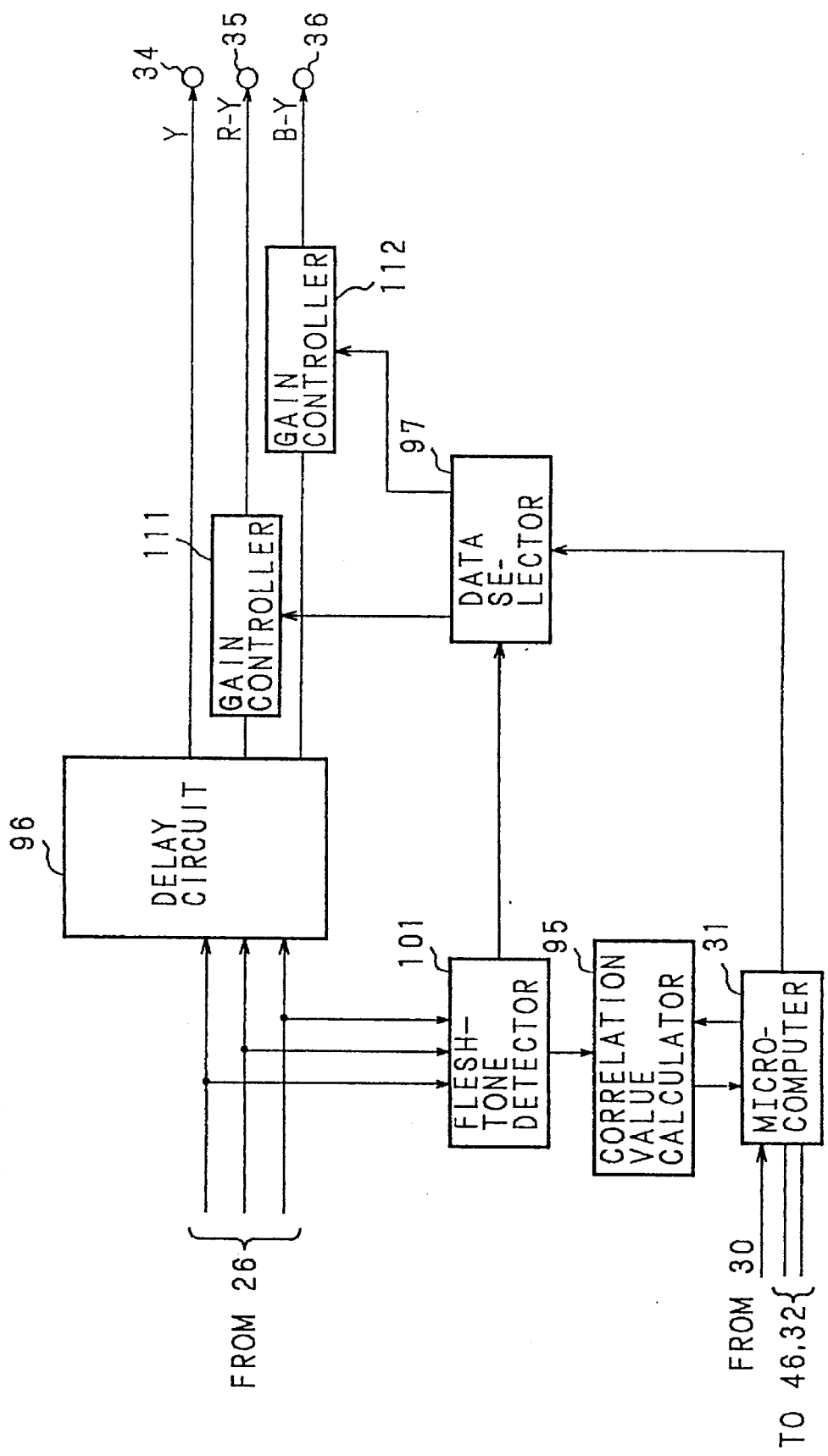
Figure 127A:
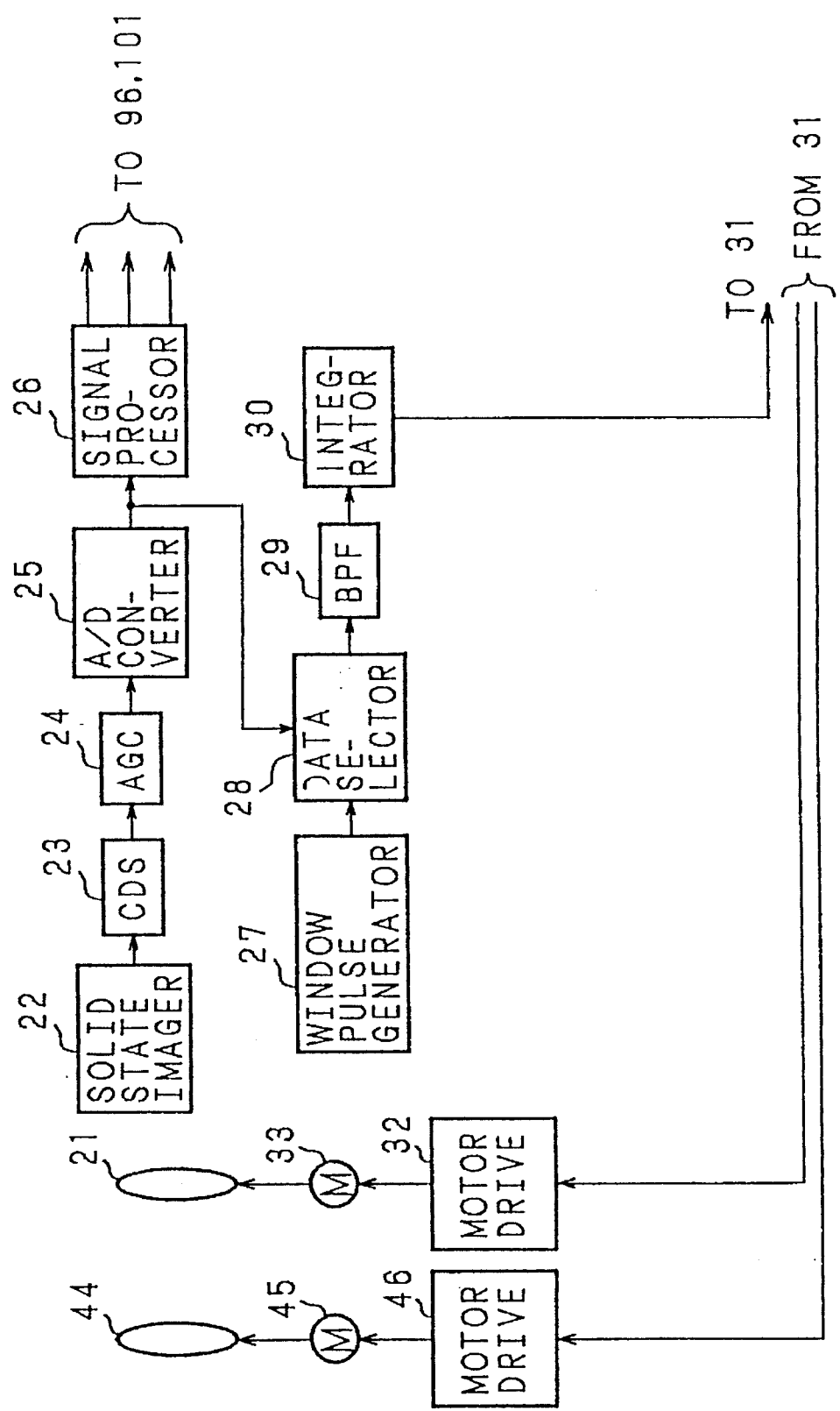
Figure 127B:
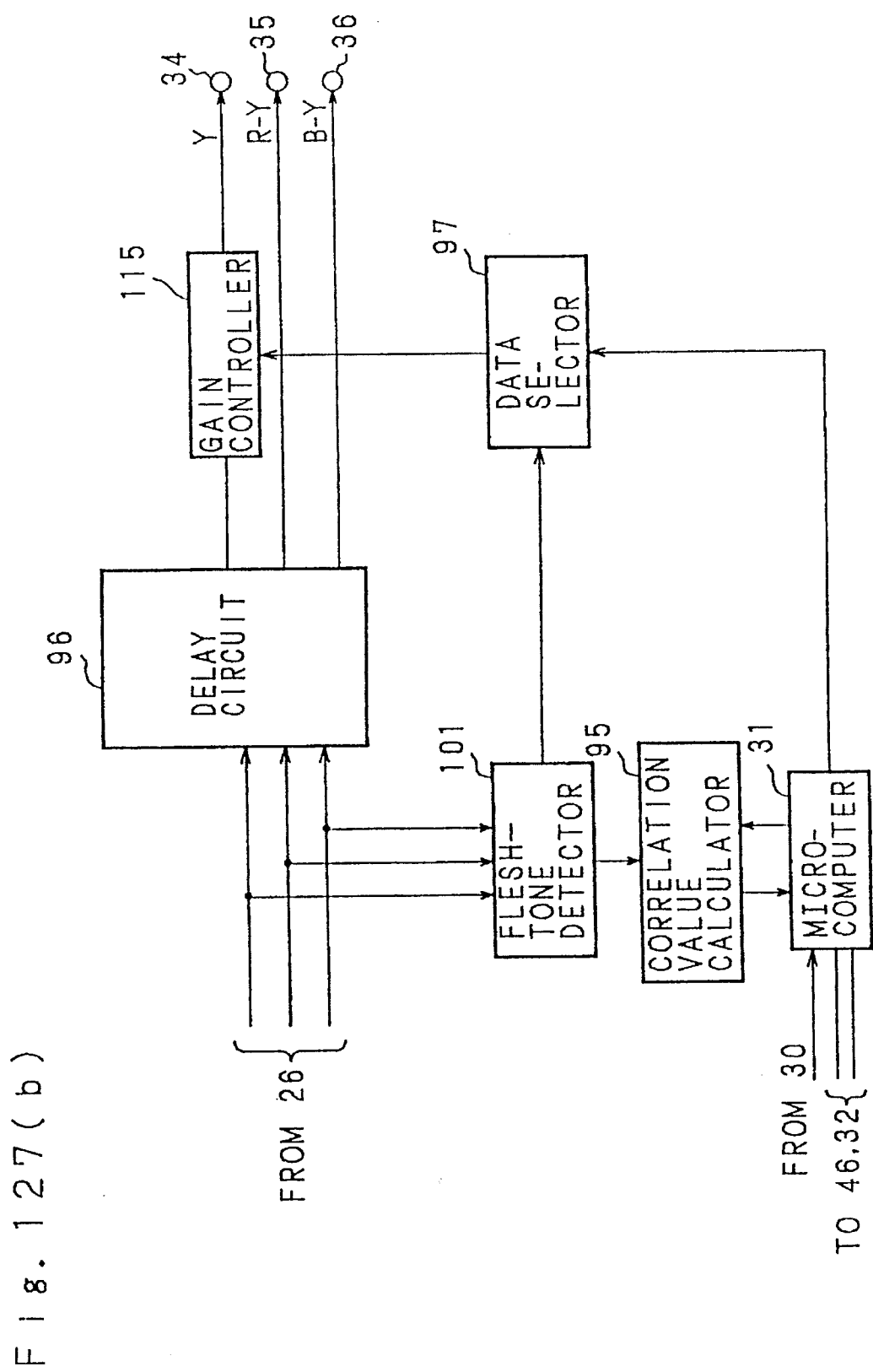
Figure 128A:
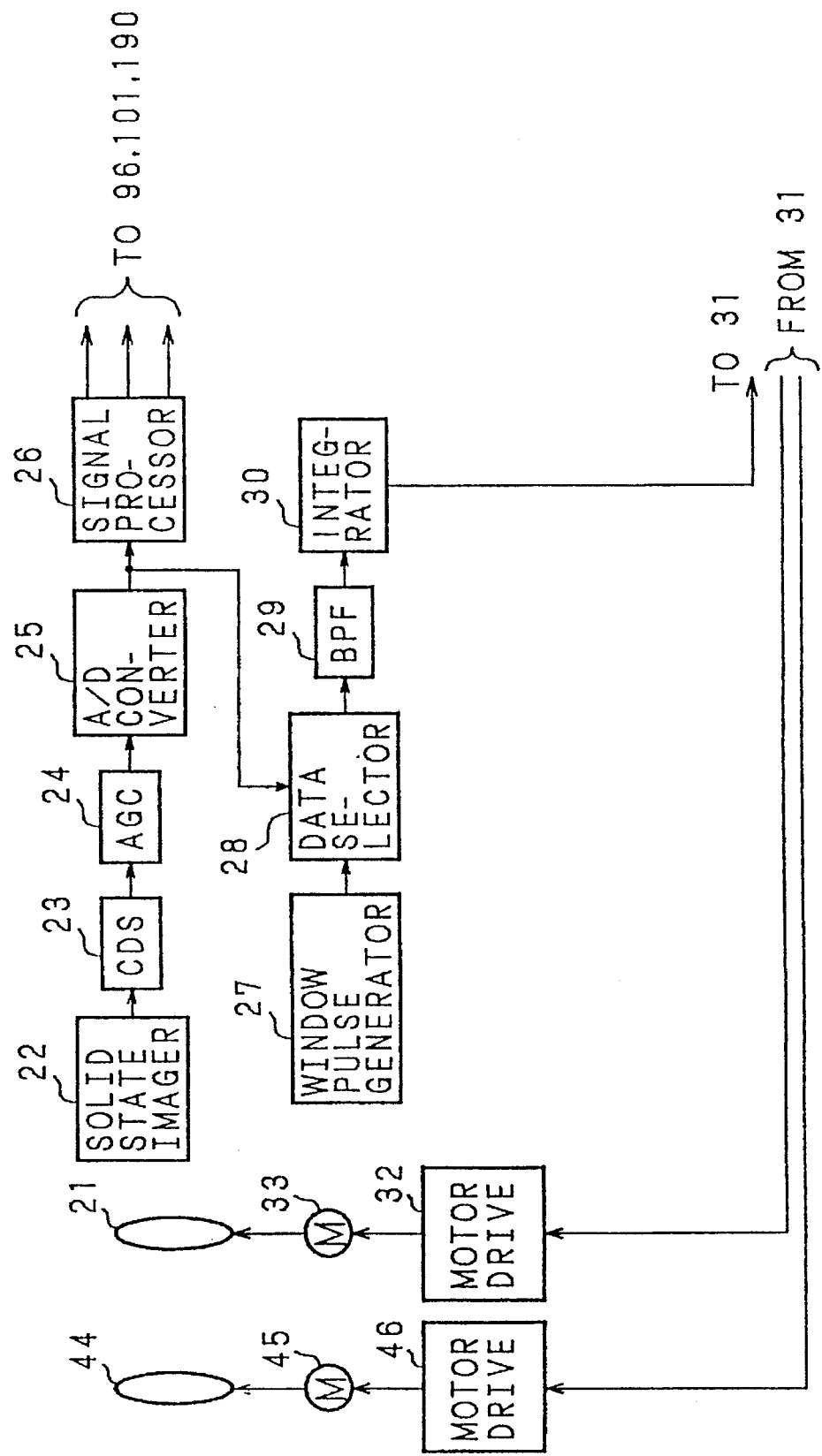
Figure 128B:
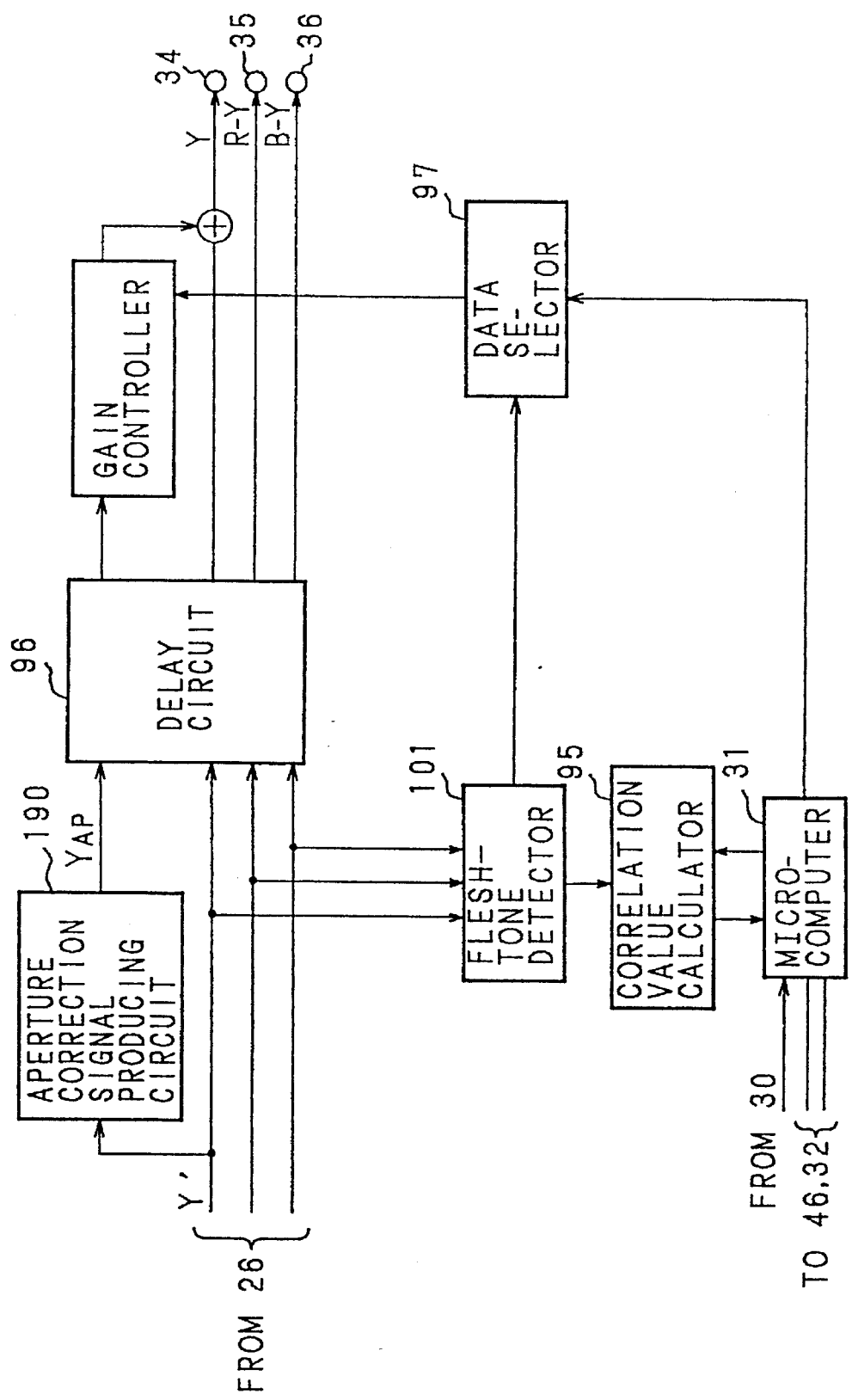
Figure 129:
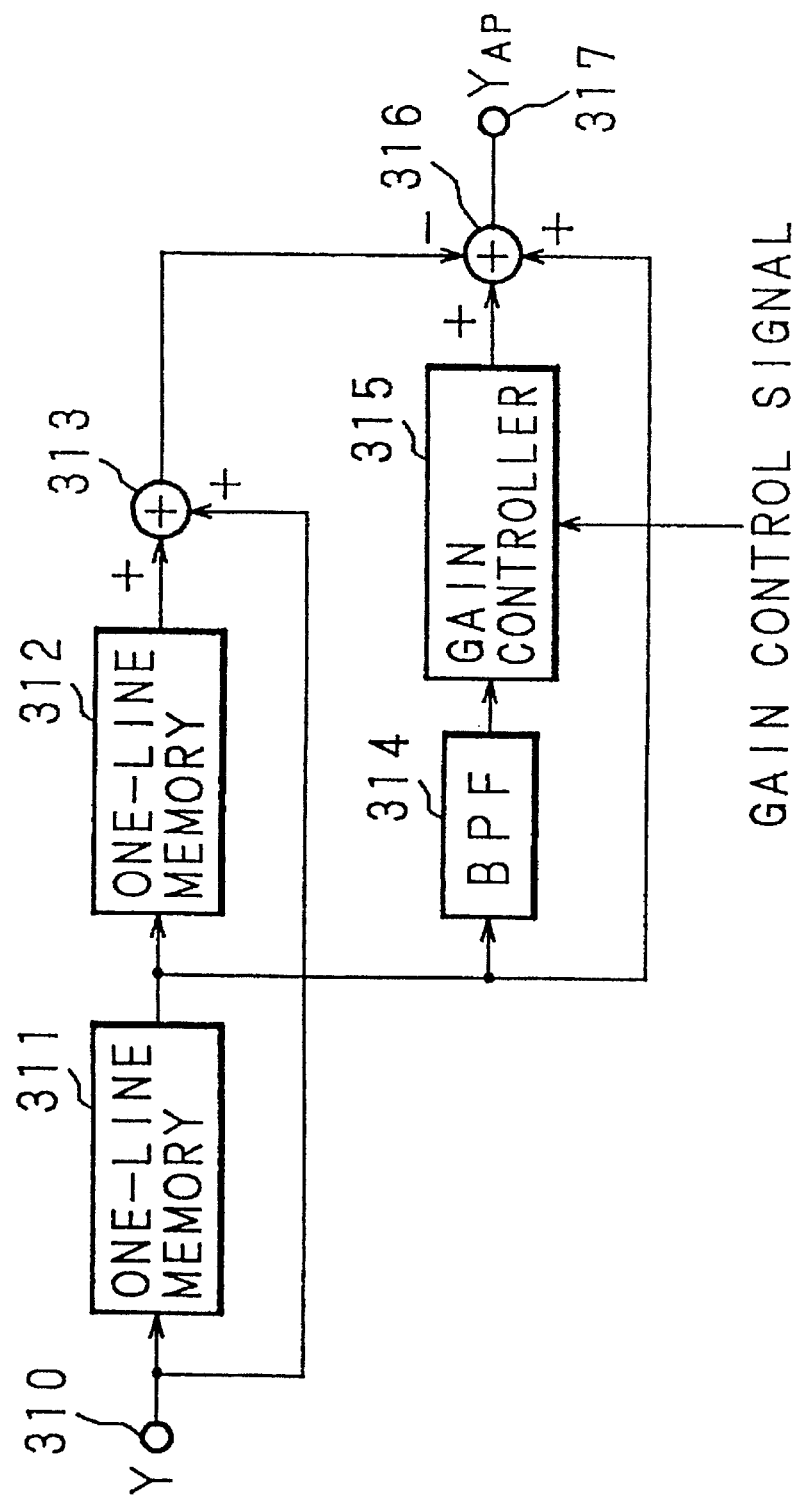
Figure 130A:
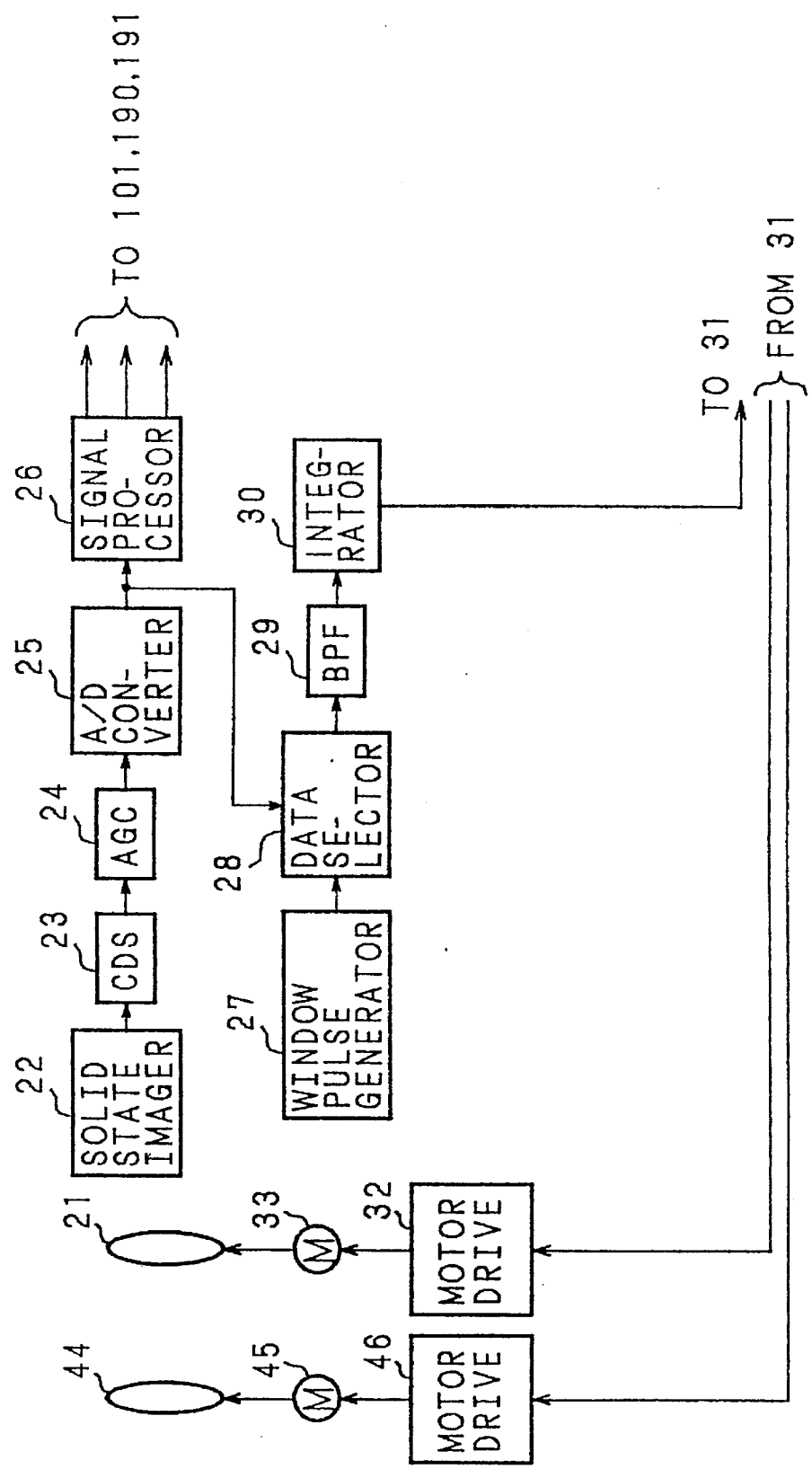
Figure 130B:
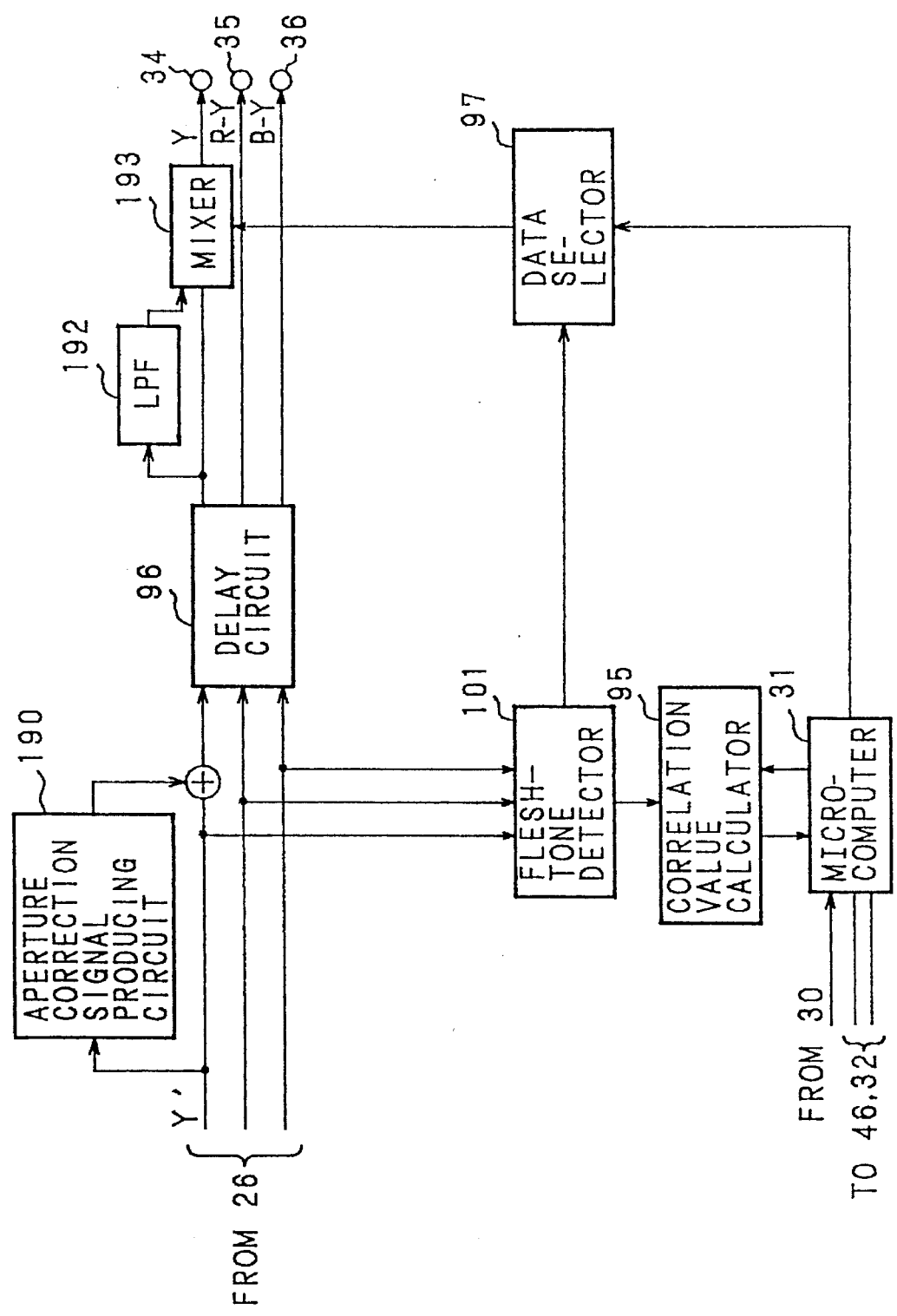
Figure 131A:
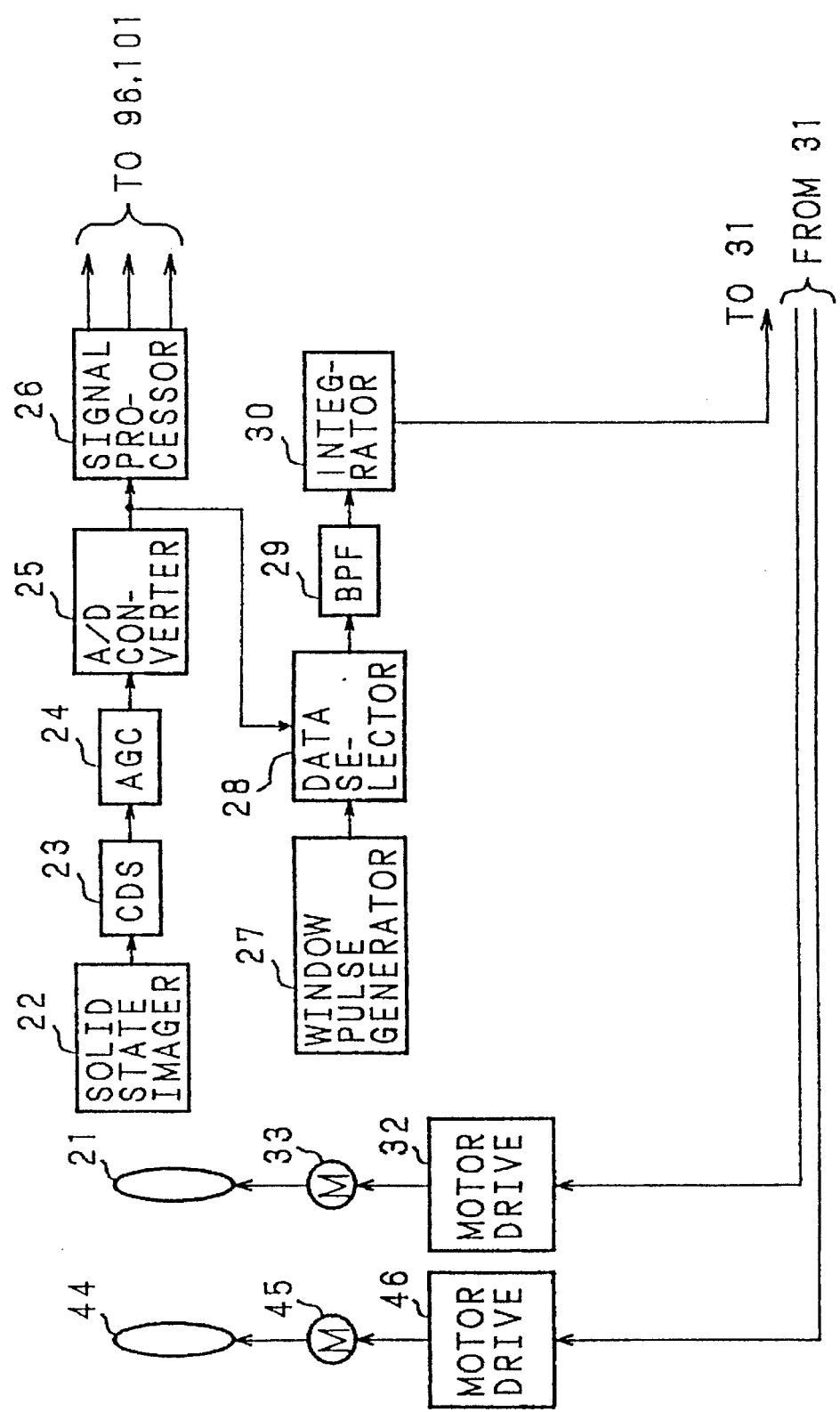
Figure 131B:
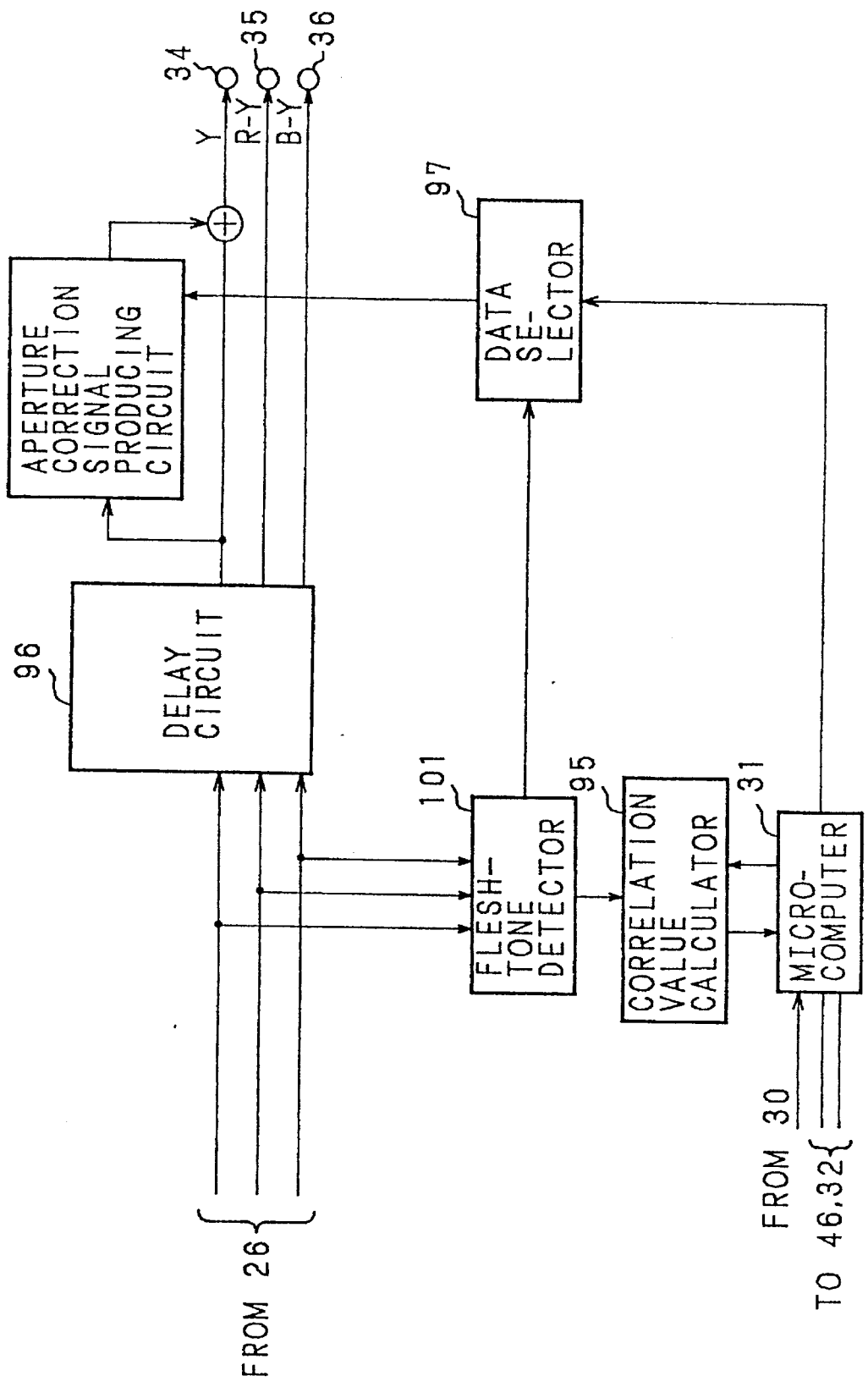
Figure 132:
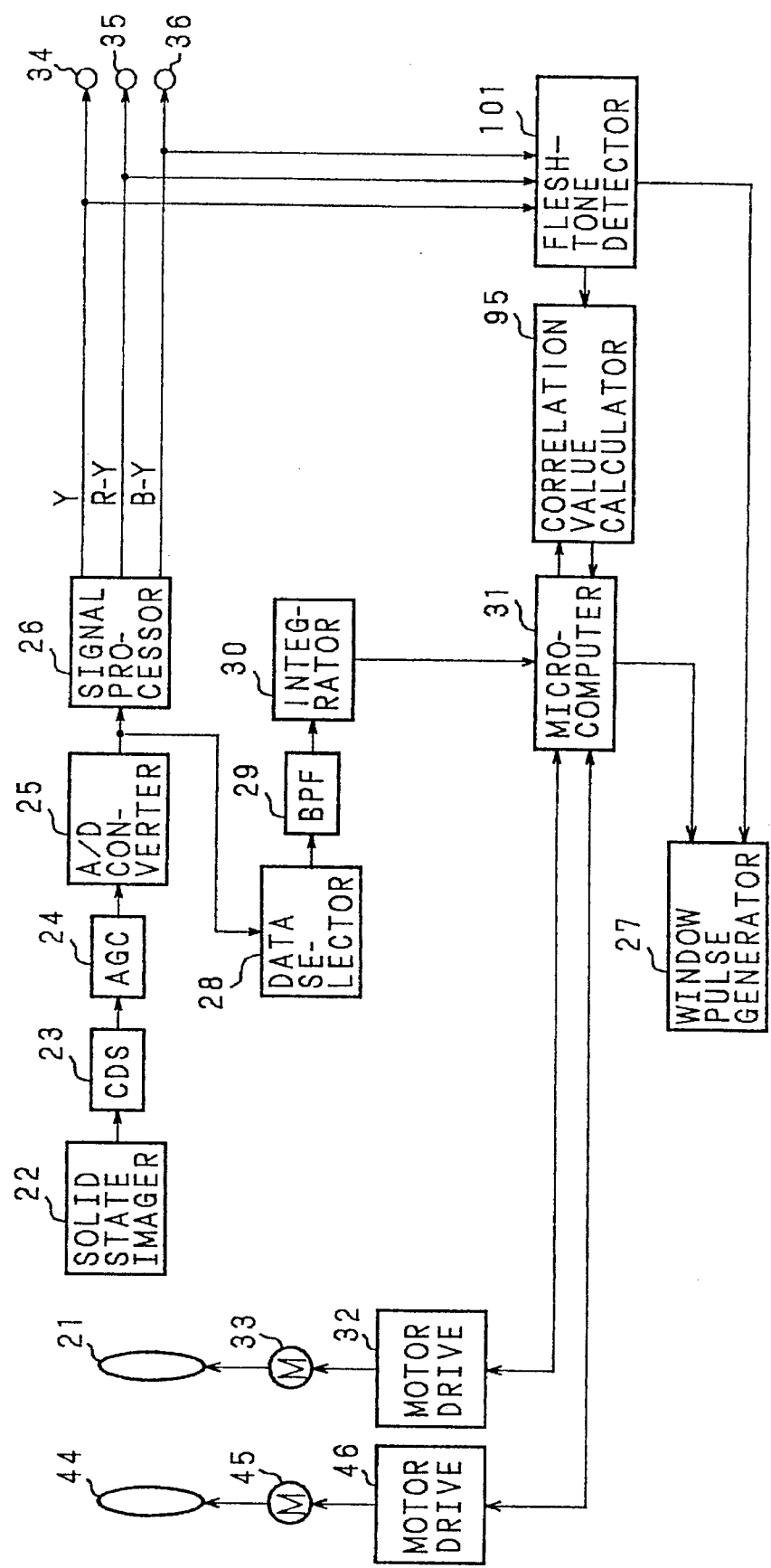
Figure 133:
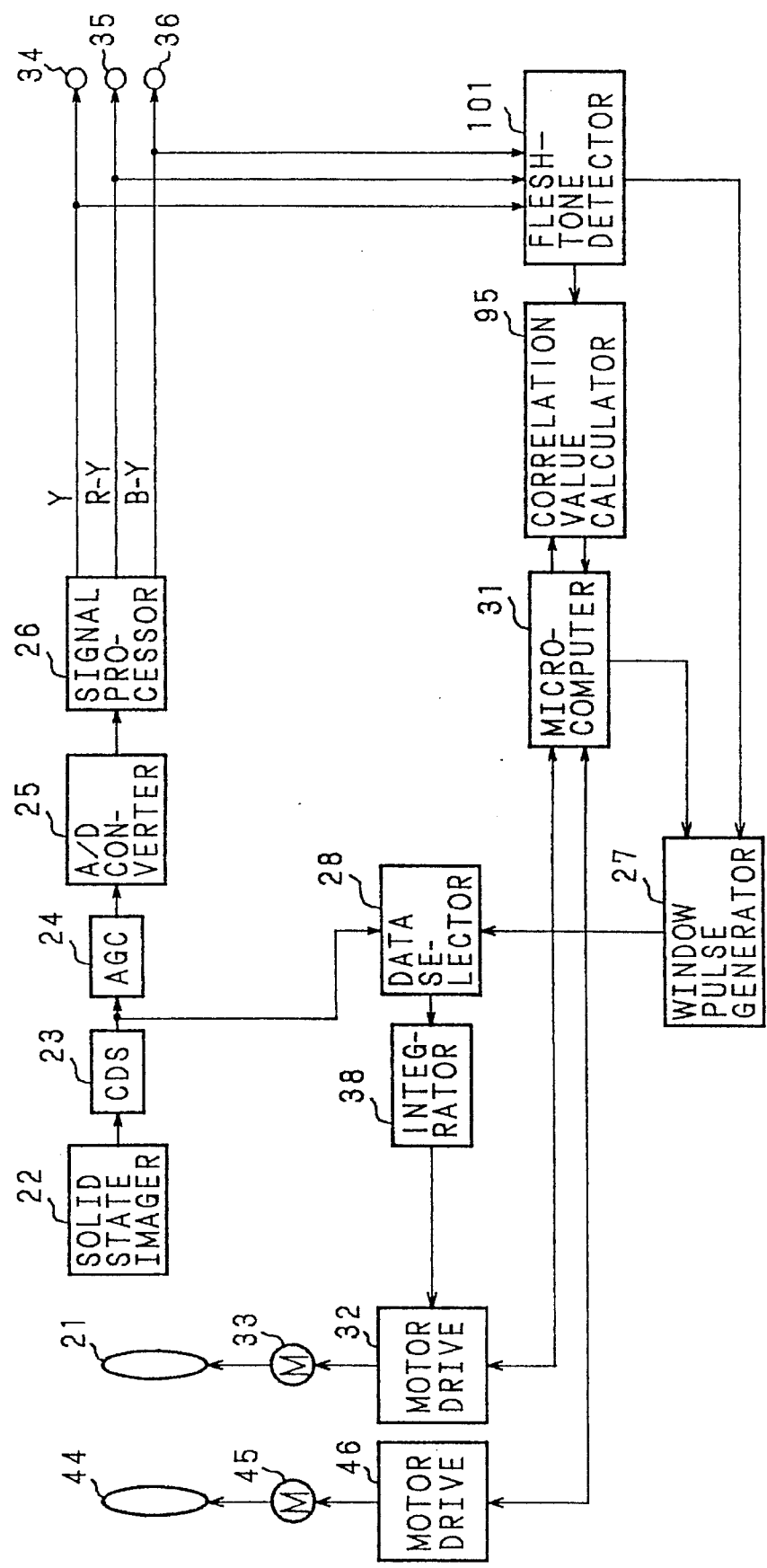
Figure 134:
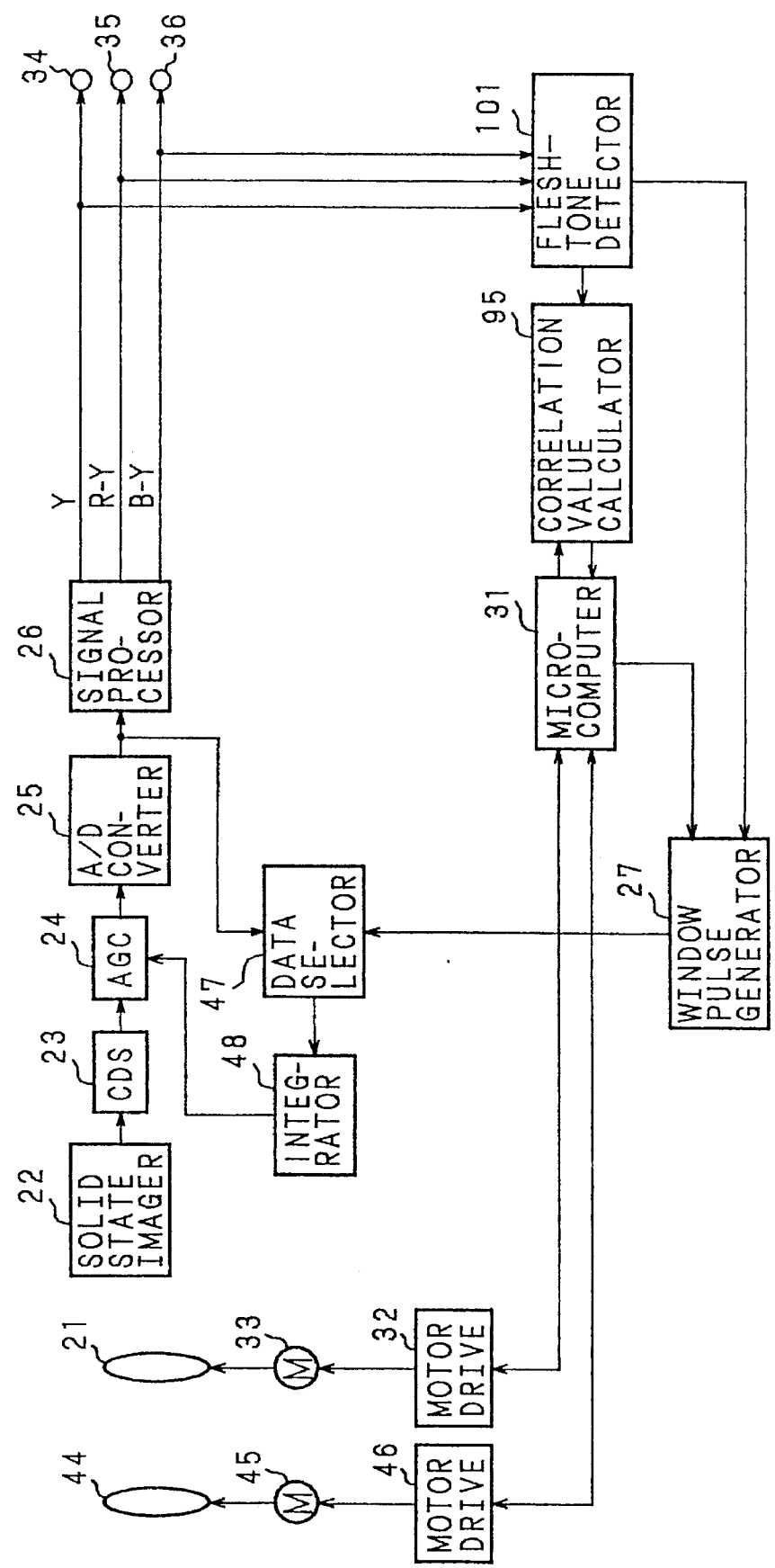
Figure 135:
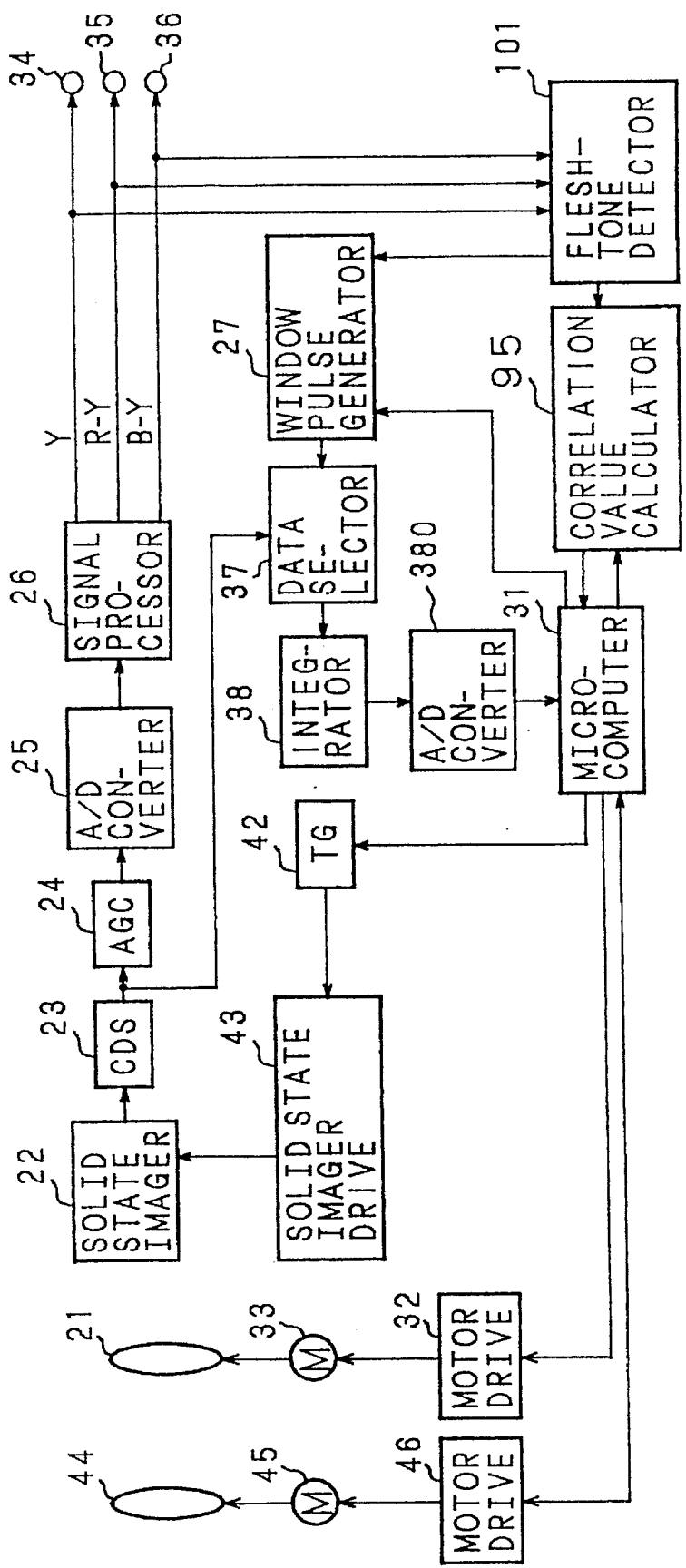
Figure 136:
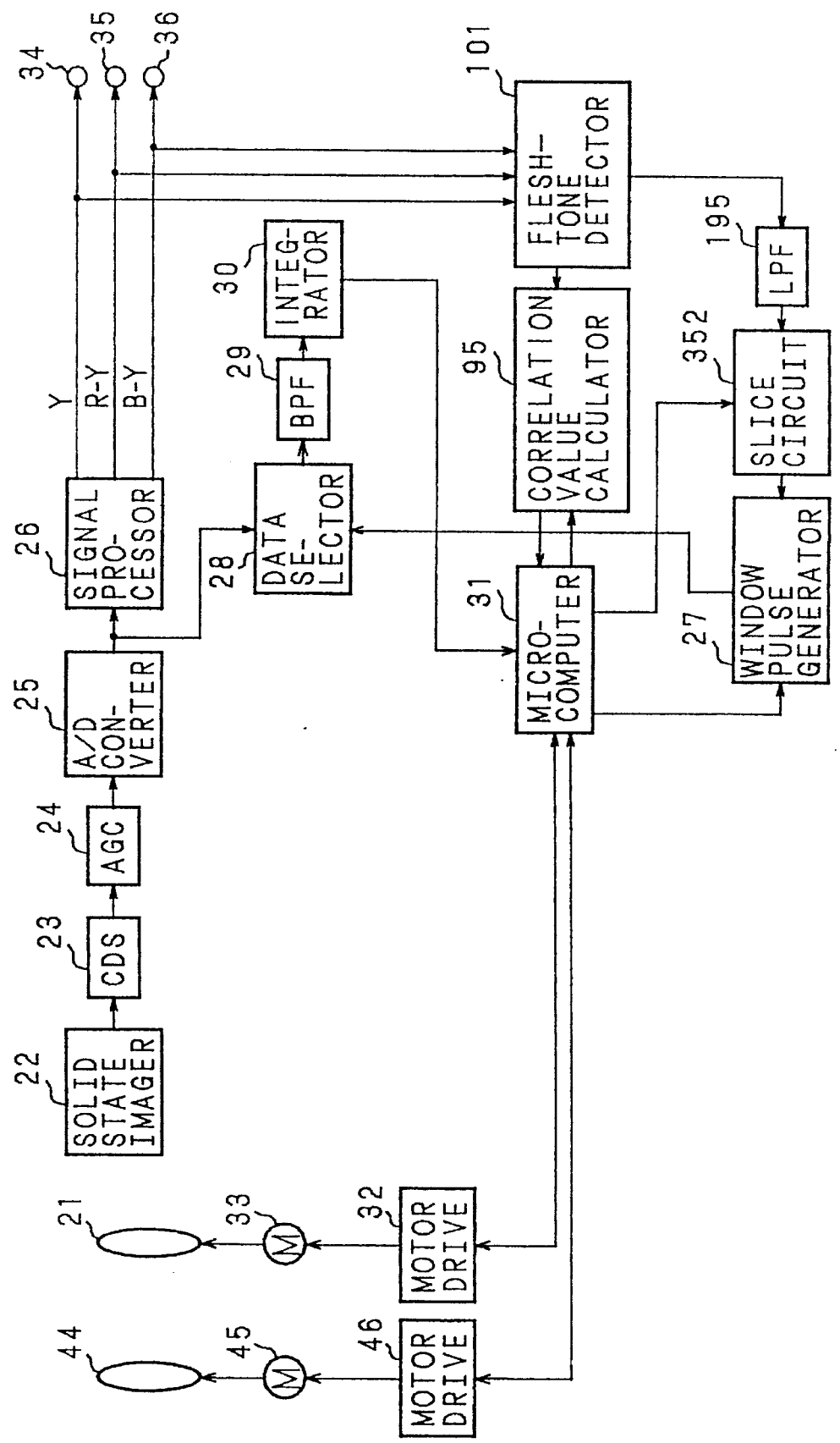
Figure 137A:
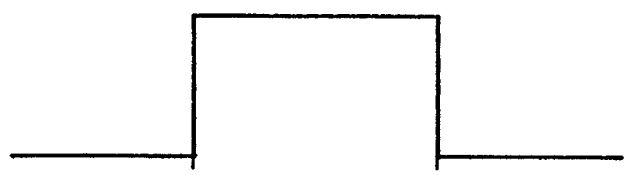
Figure 137B:
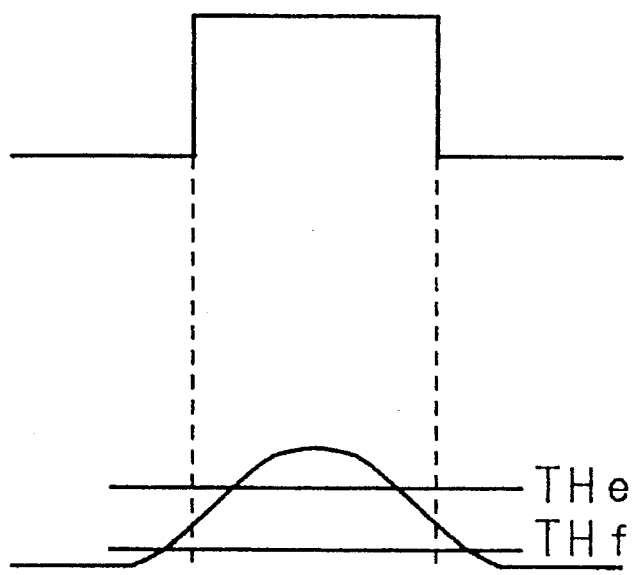
Figure 138:
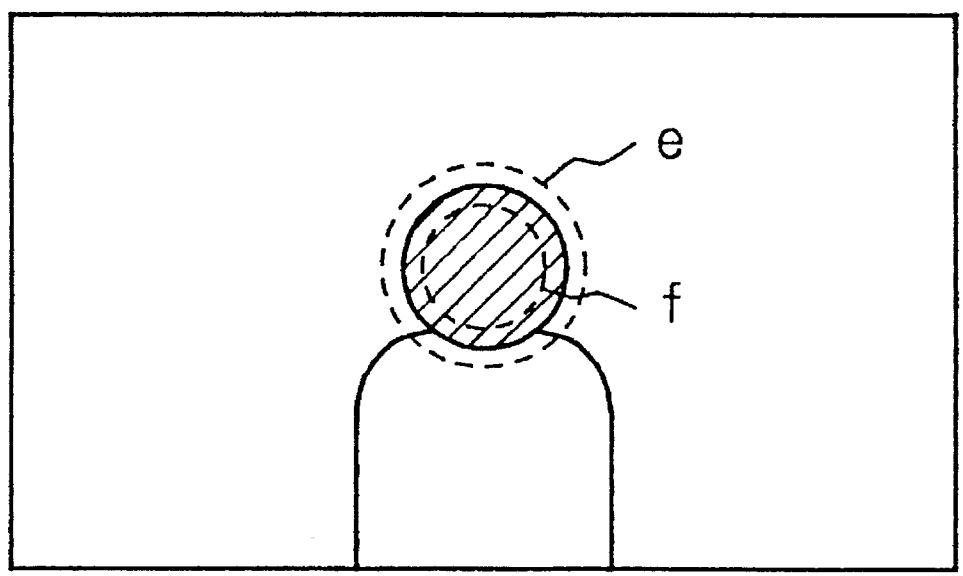
Figure 139:
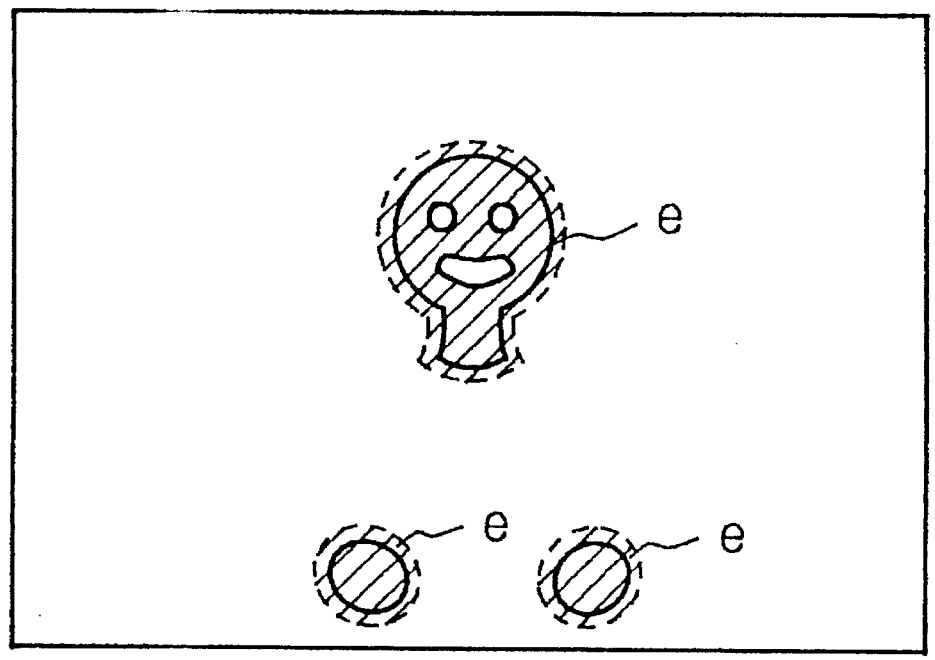
Figure 140:
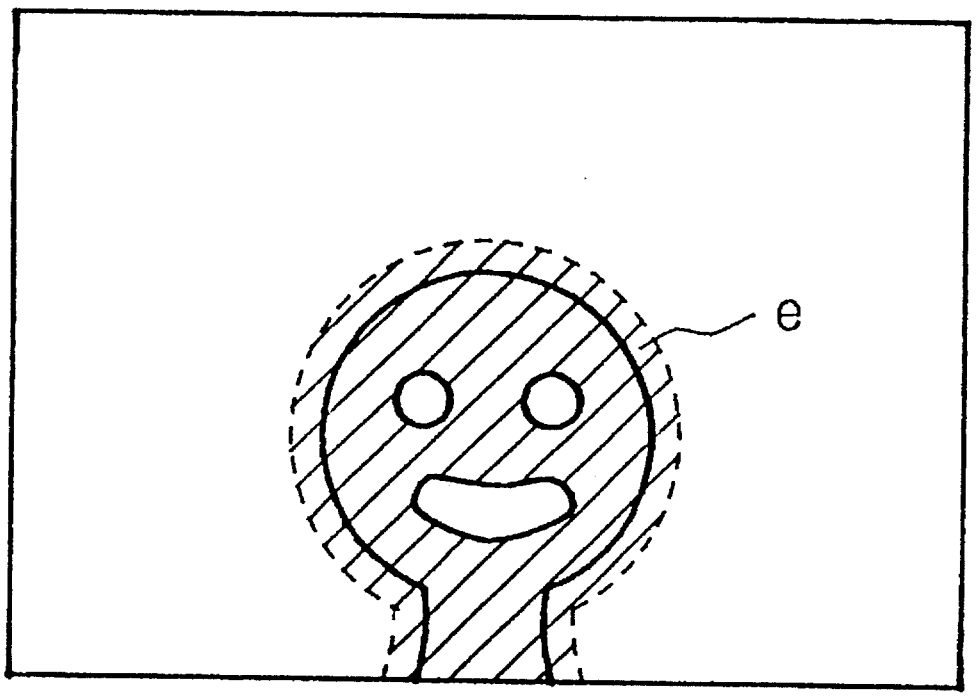
Figure 141:
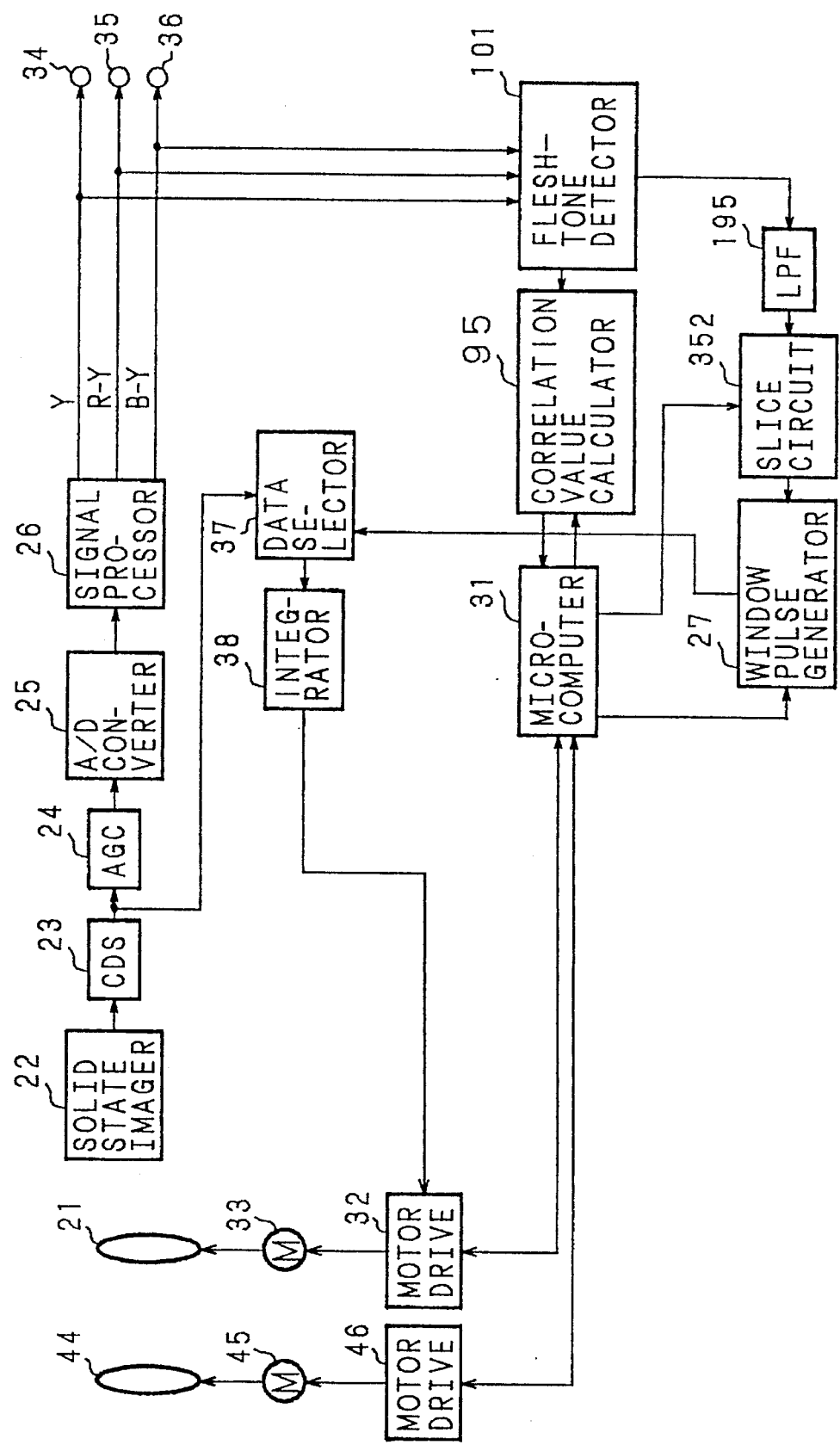
Figure 142:
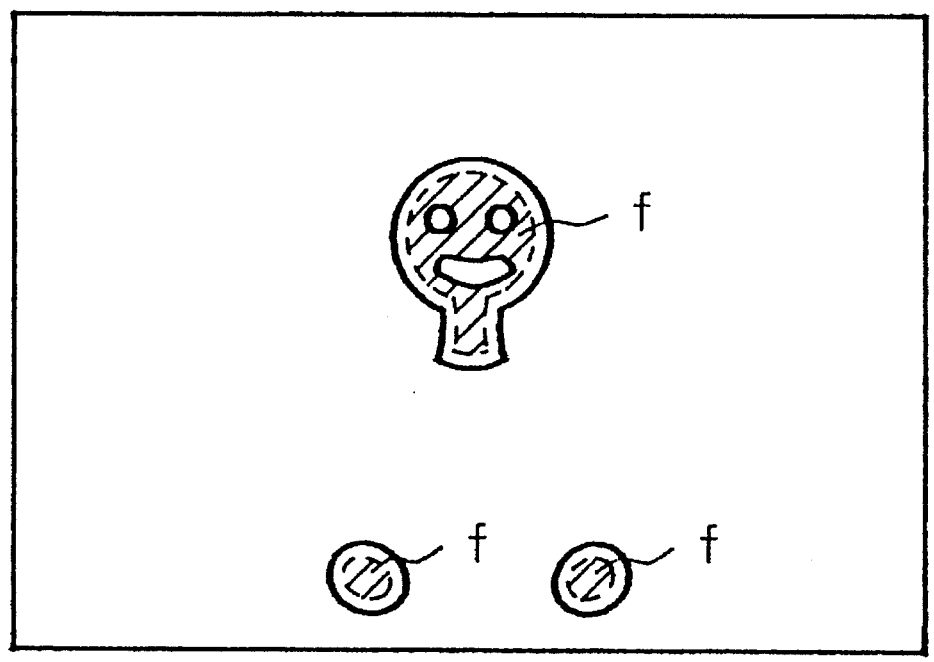
Figure 143:
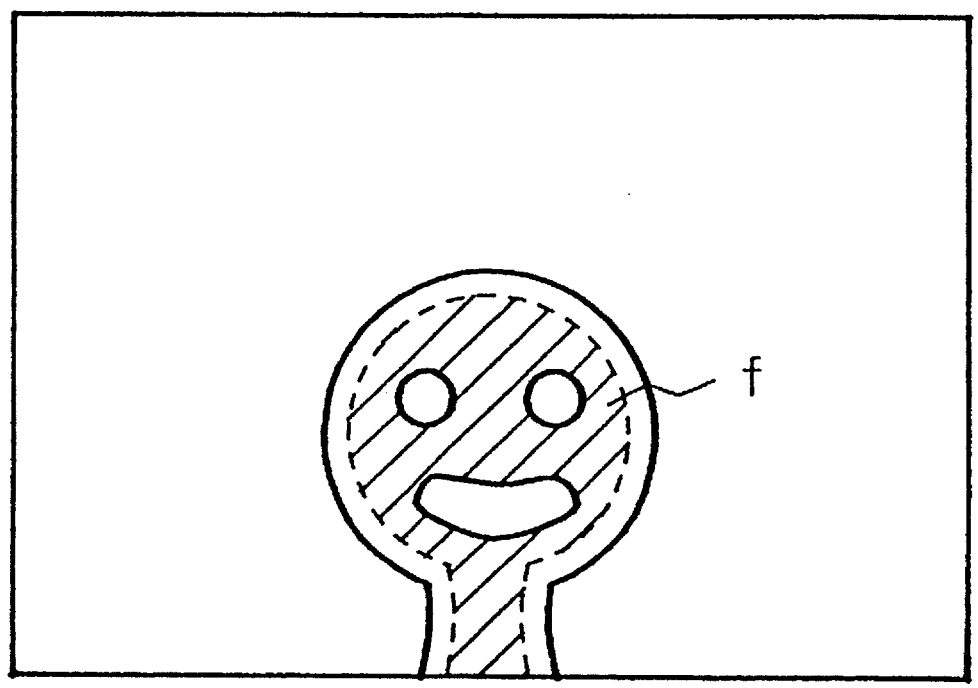
Figure 144:
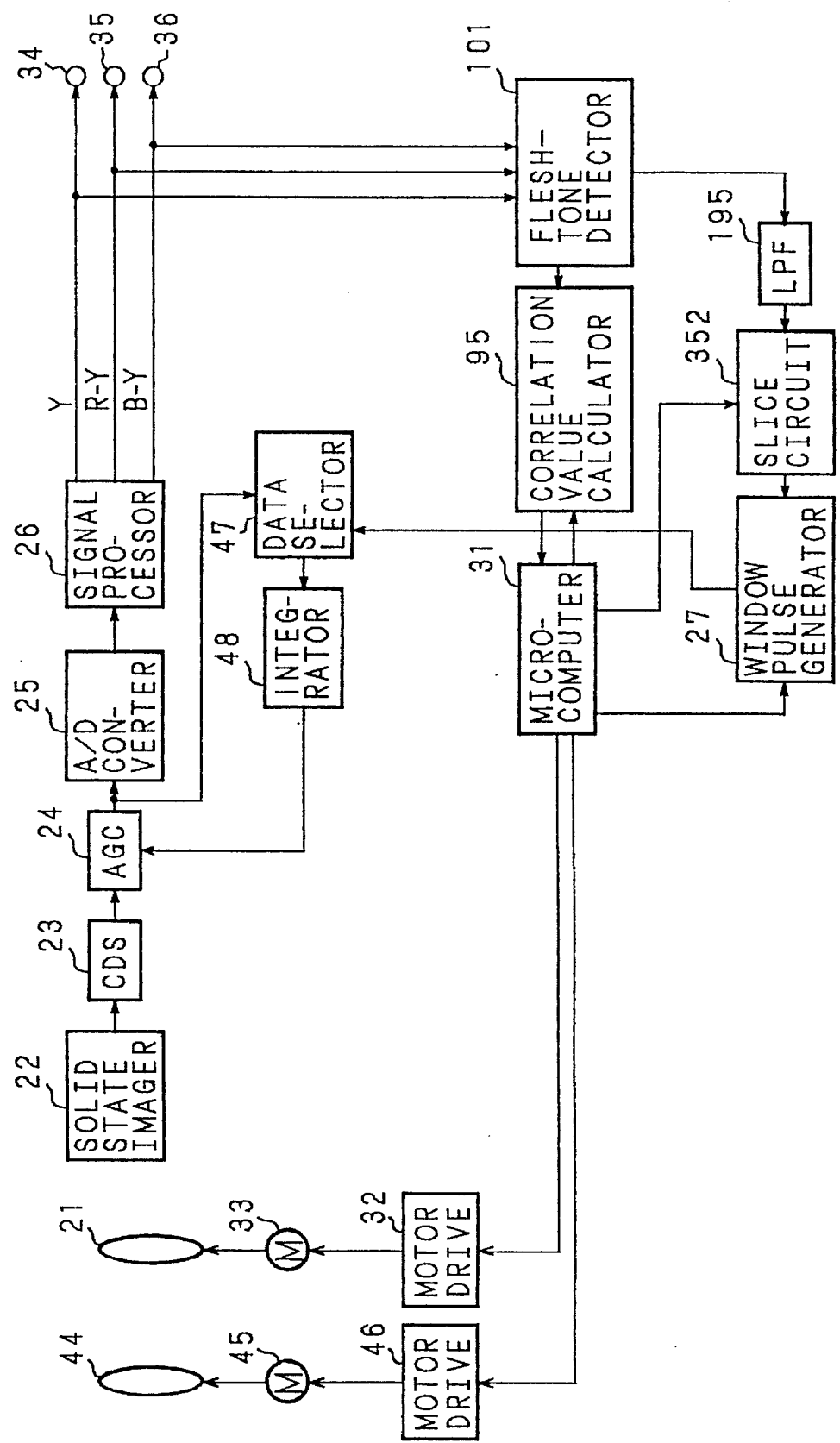
Figure 145:
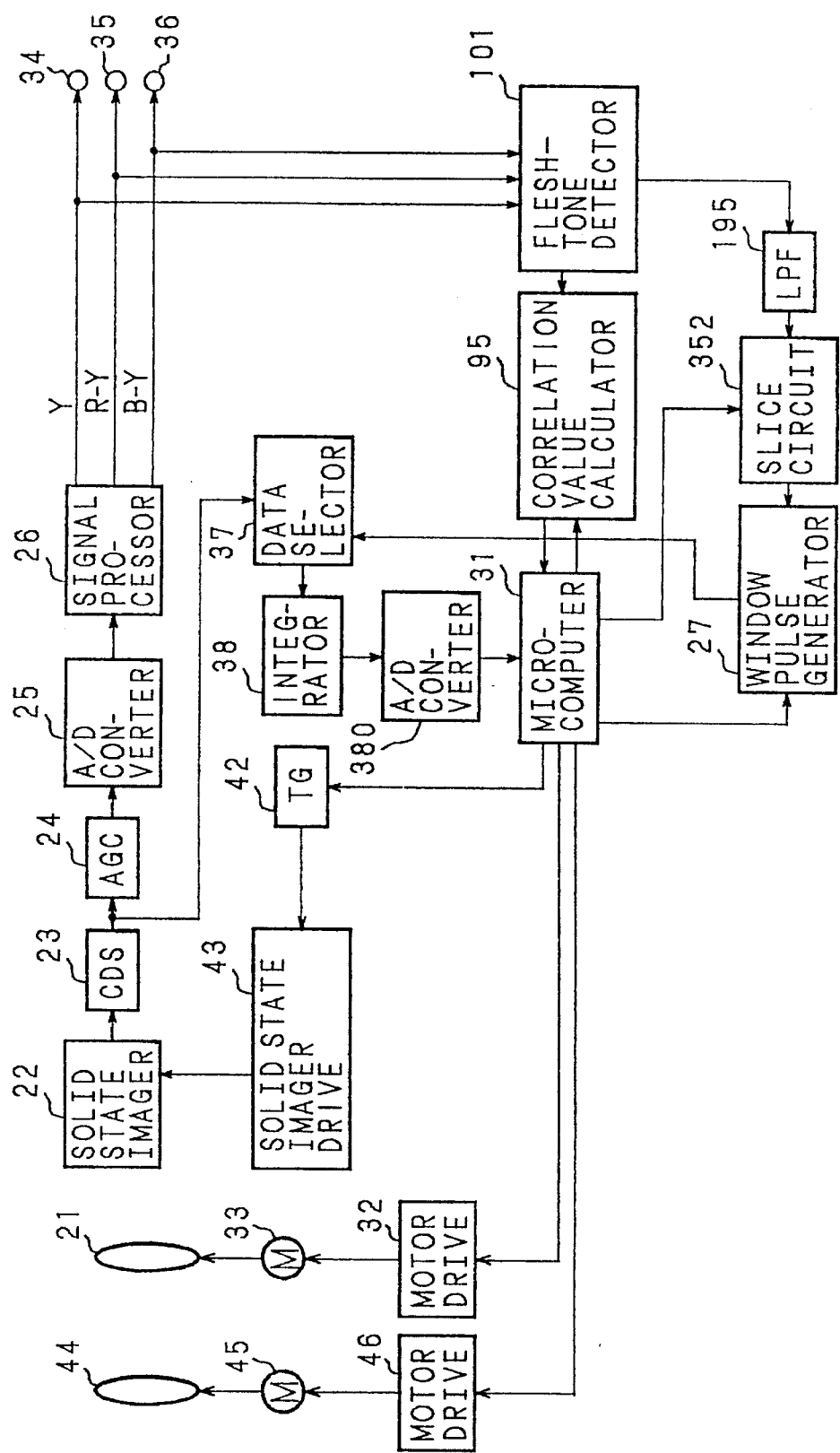
Figure 146A:
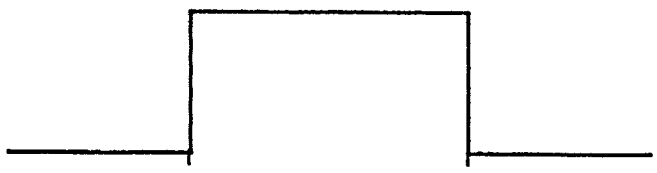
Figure 146B:
Figure 148:
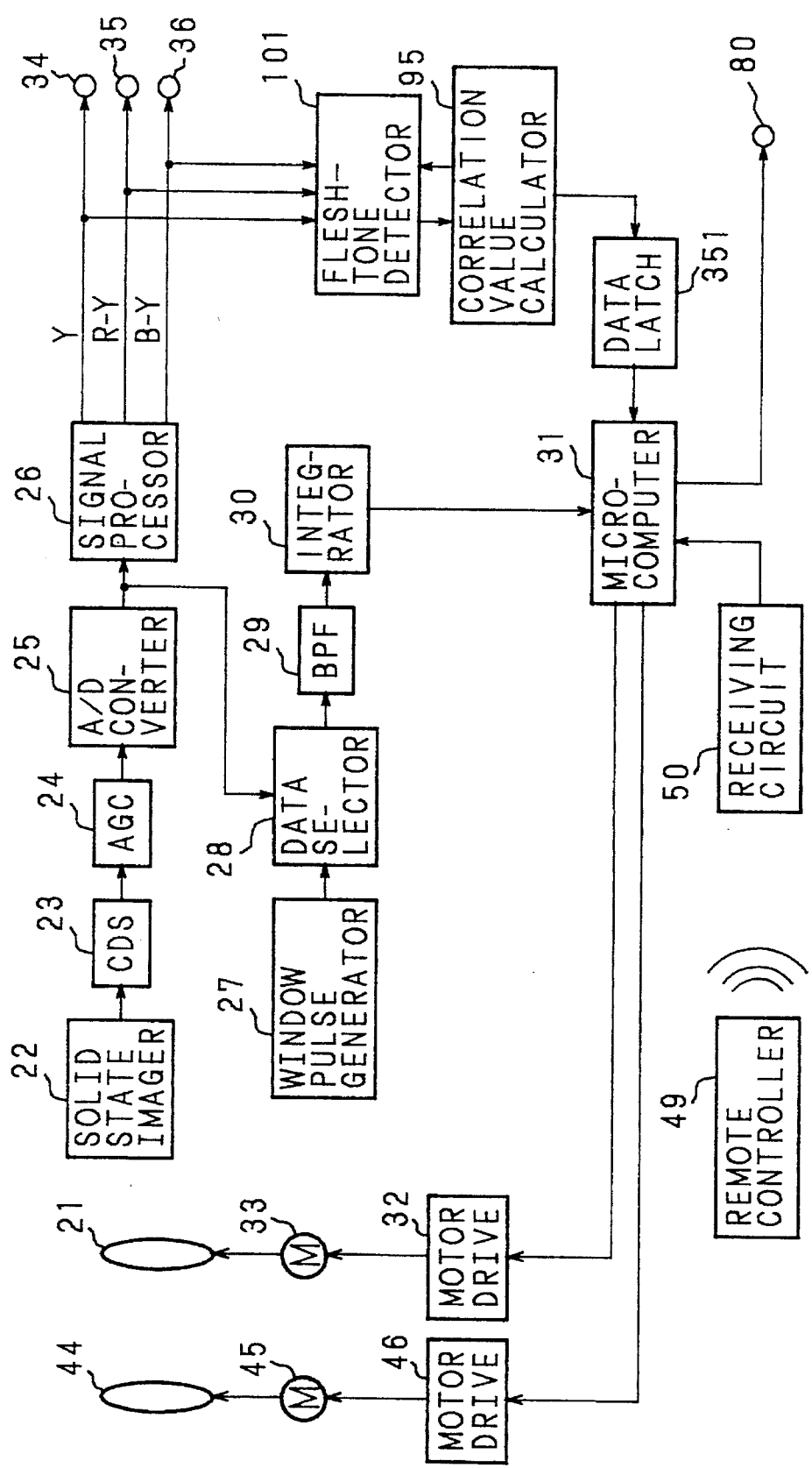
Figure 149:
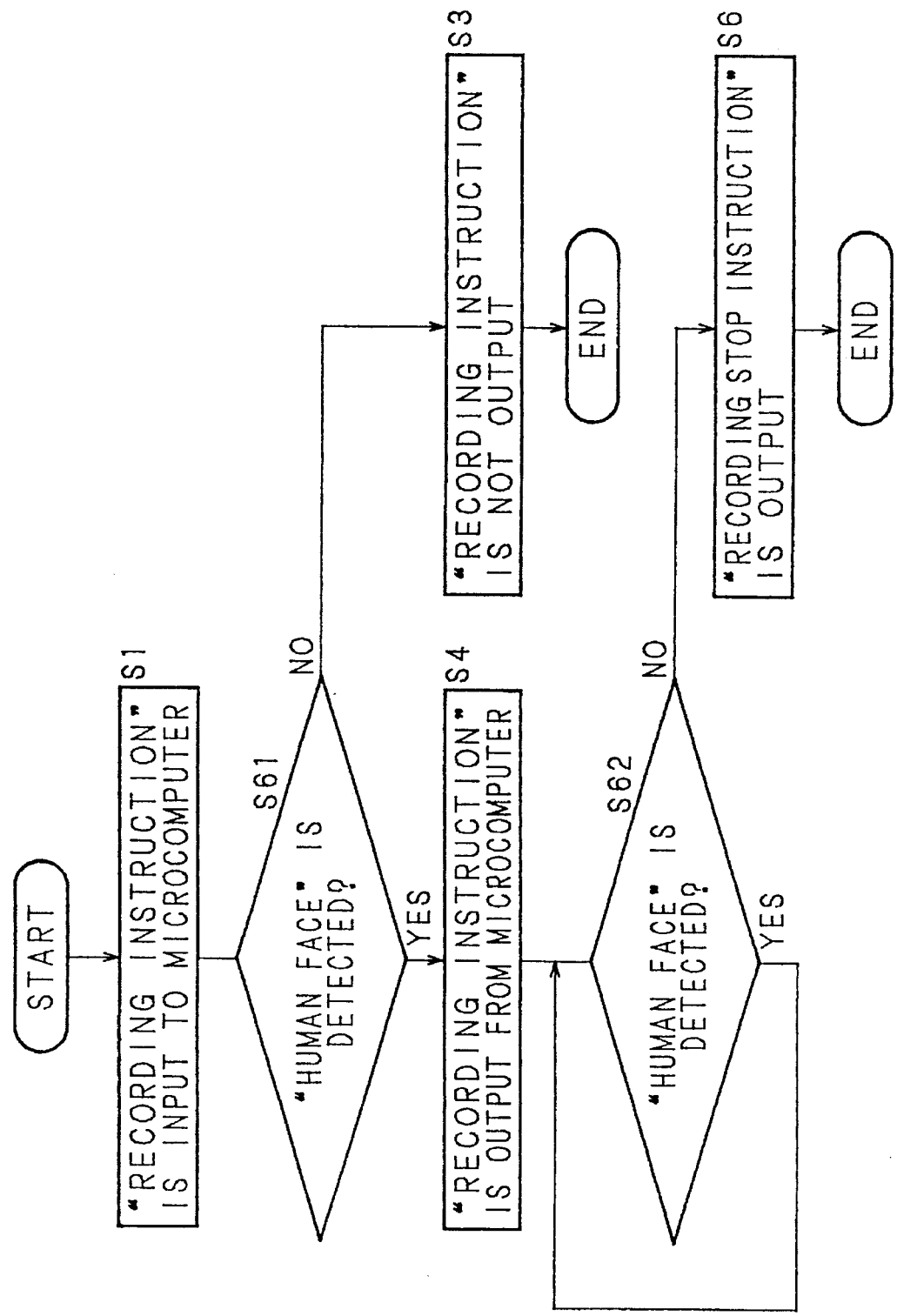
Figure 150:
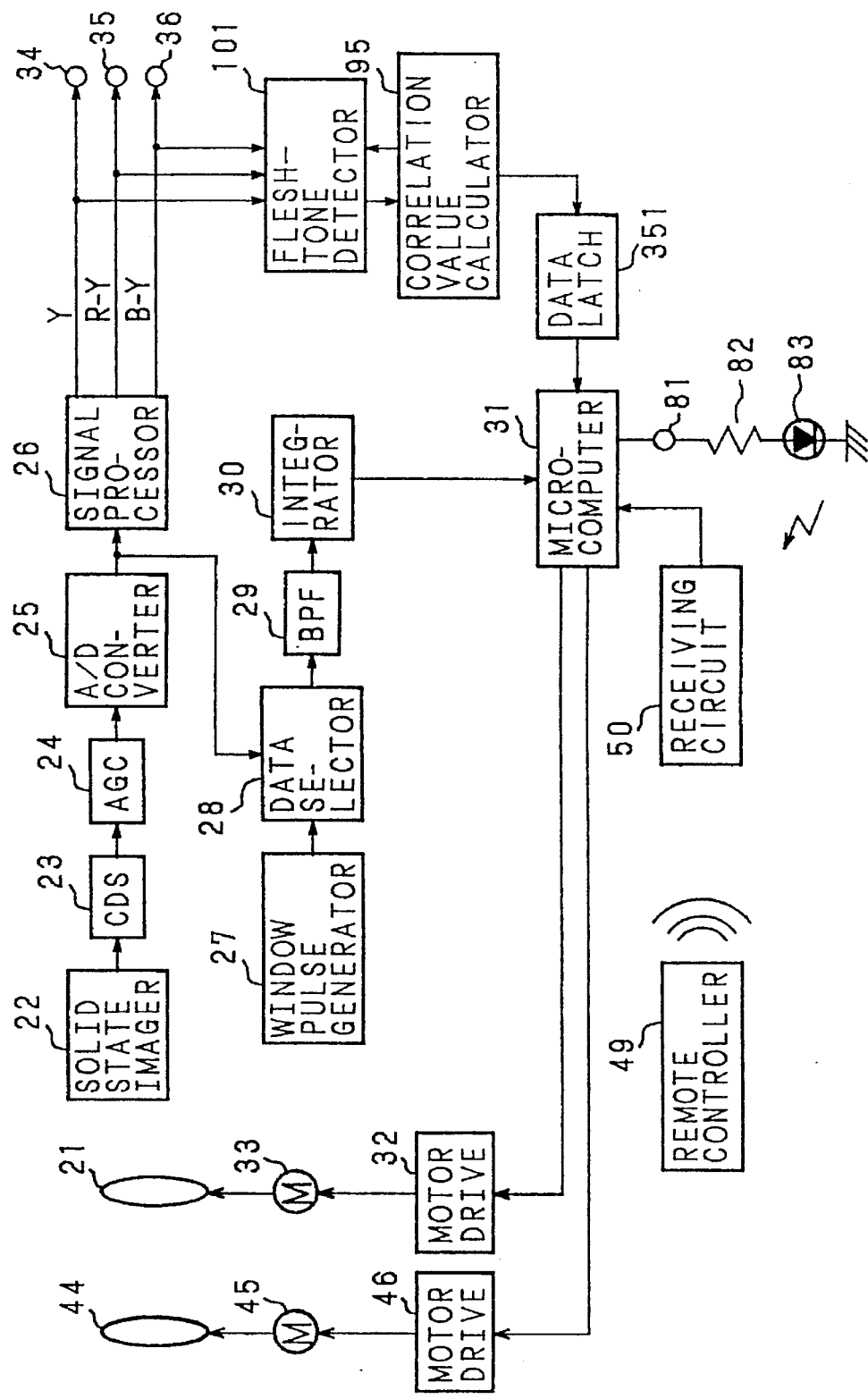
Figure 151:
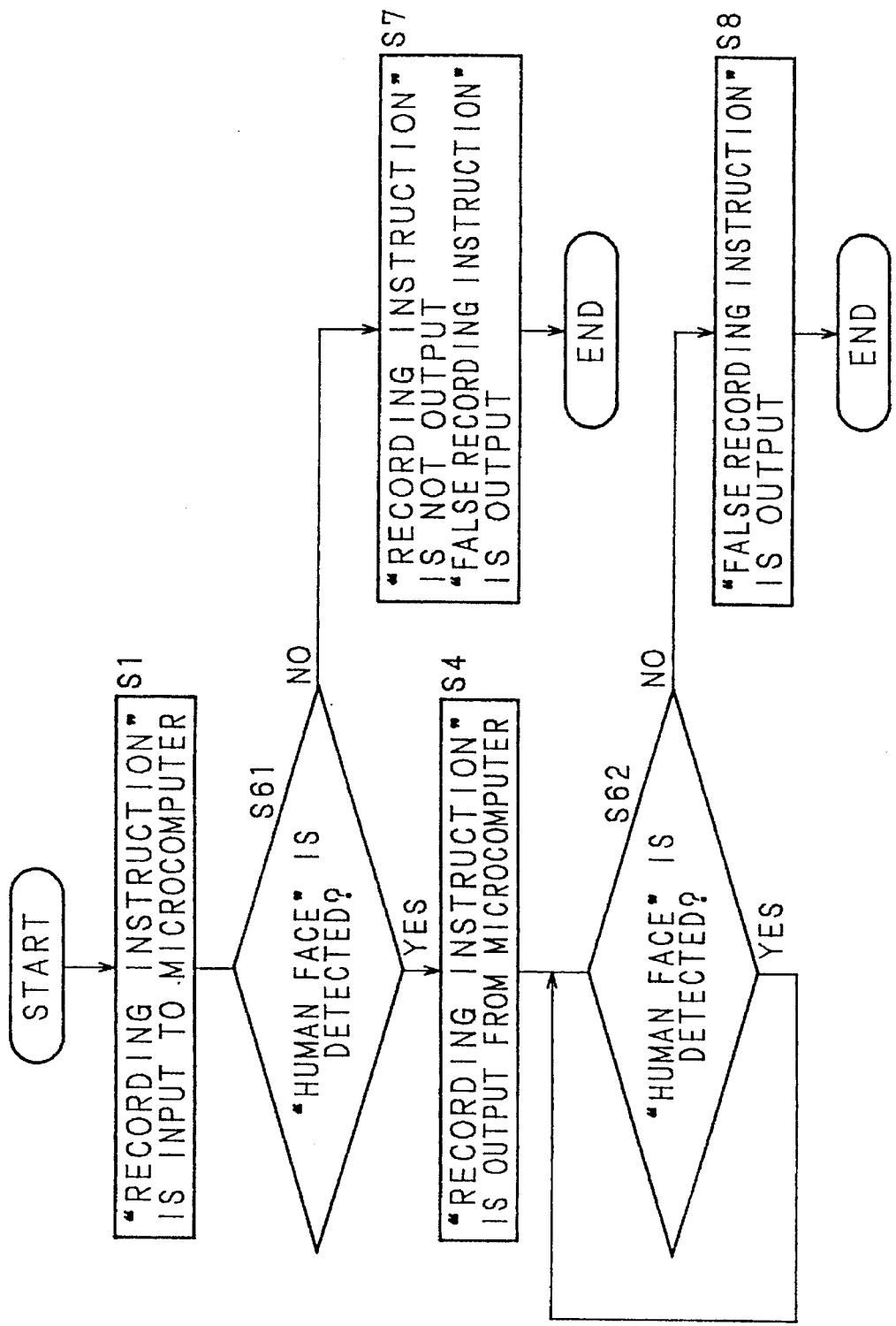
Figure 152:
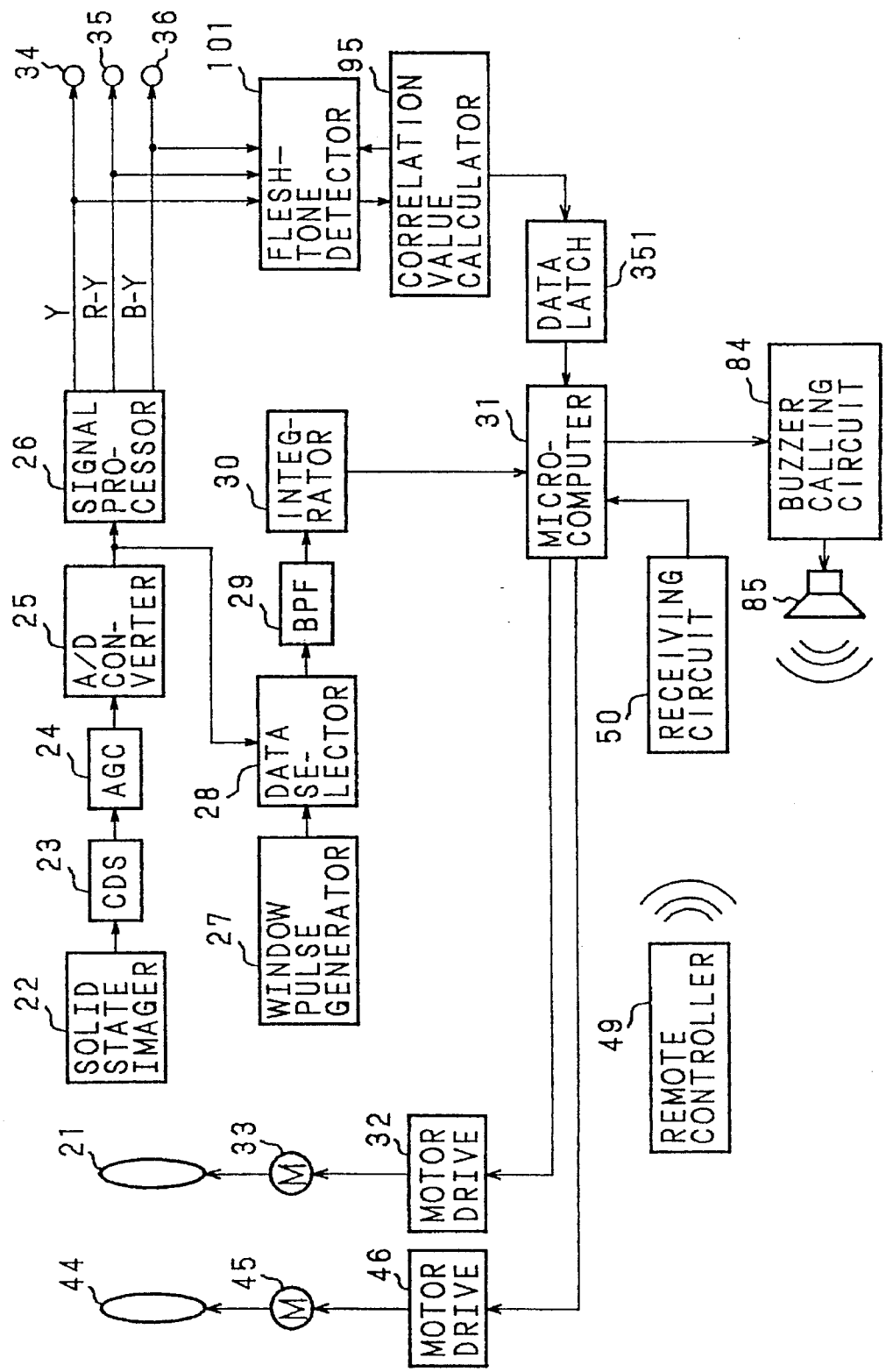
Figure 153:
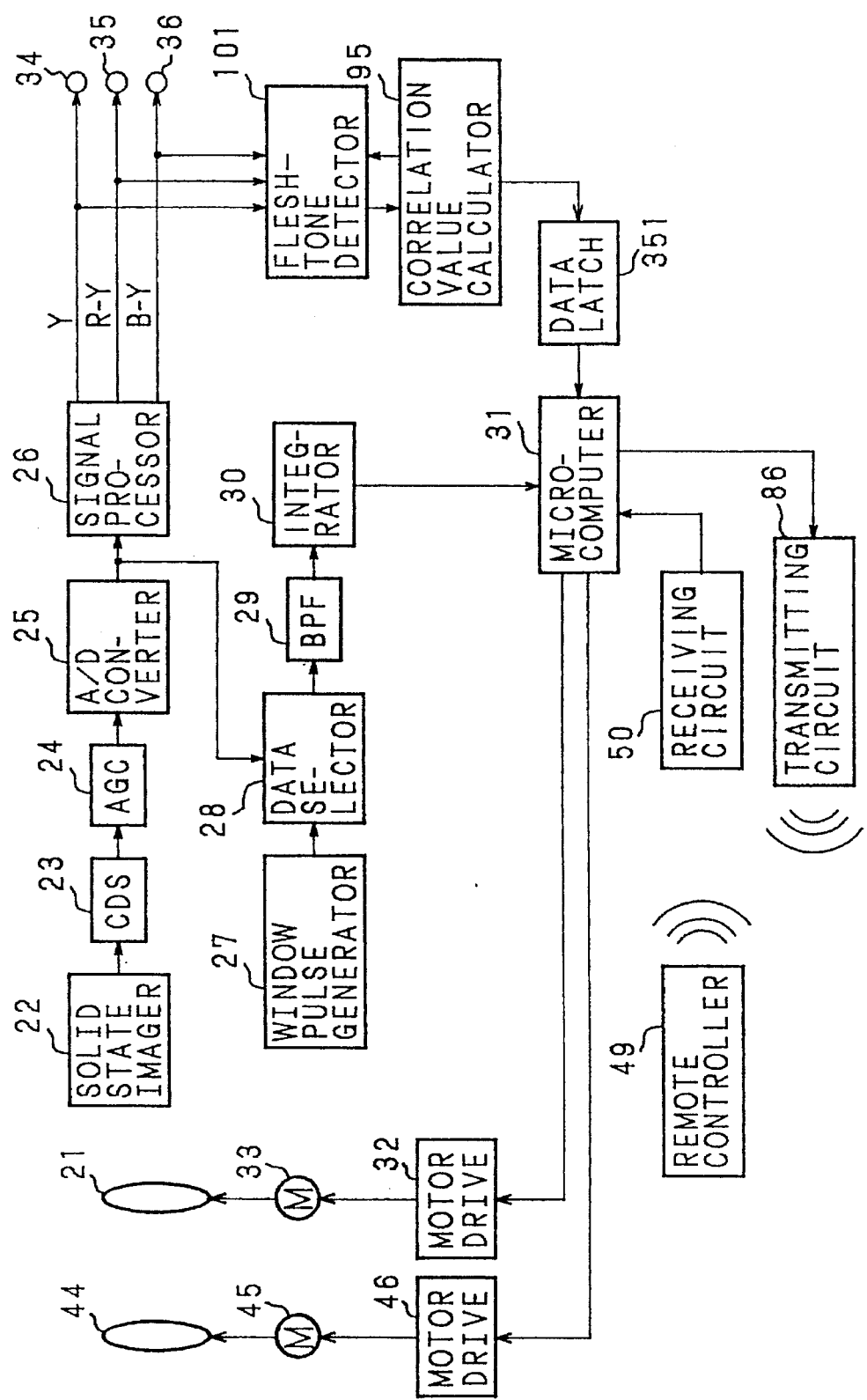
Figure 154A:
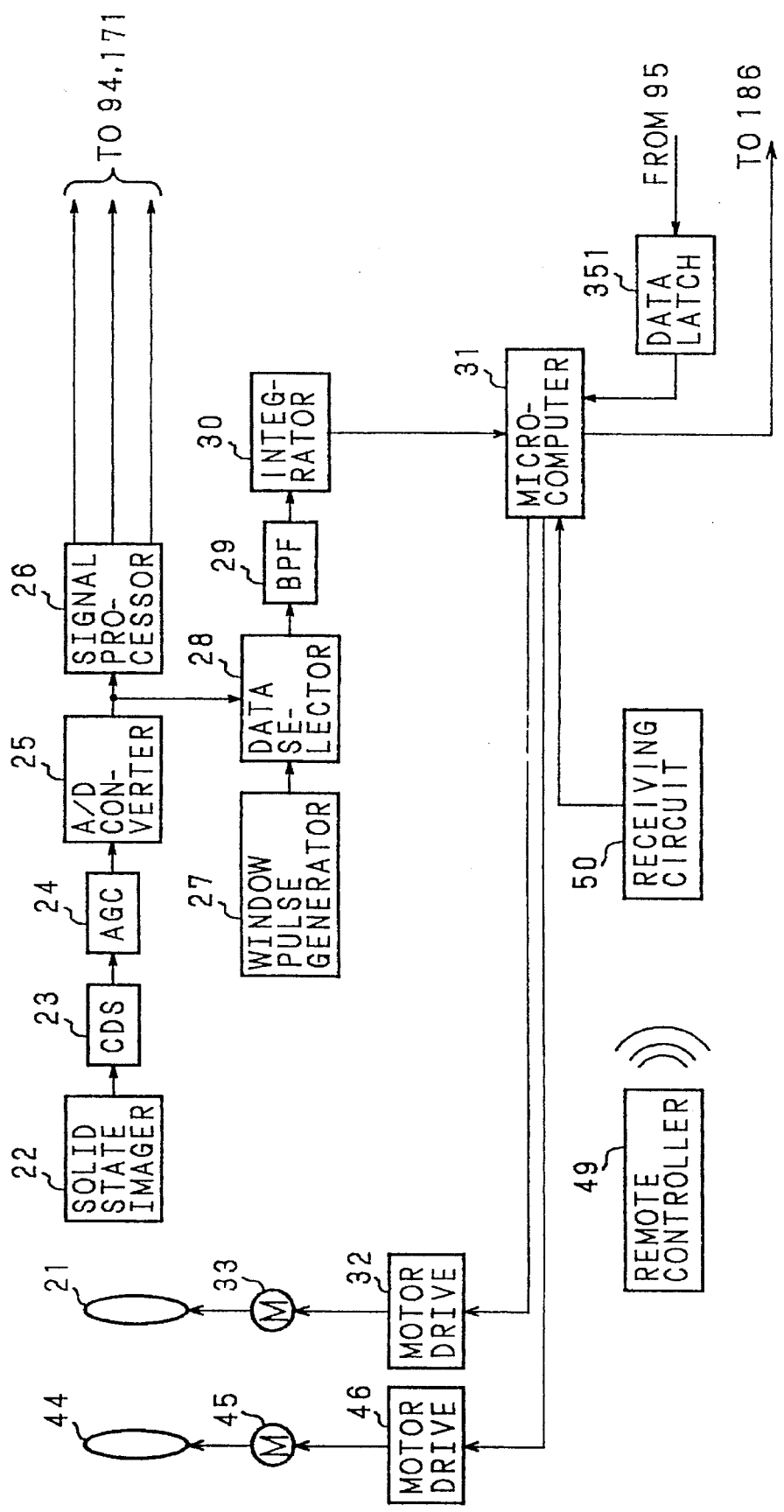
Figure 154B:
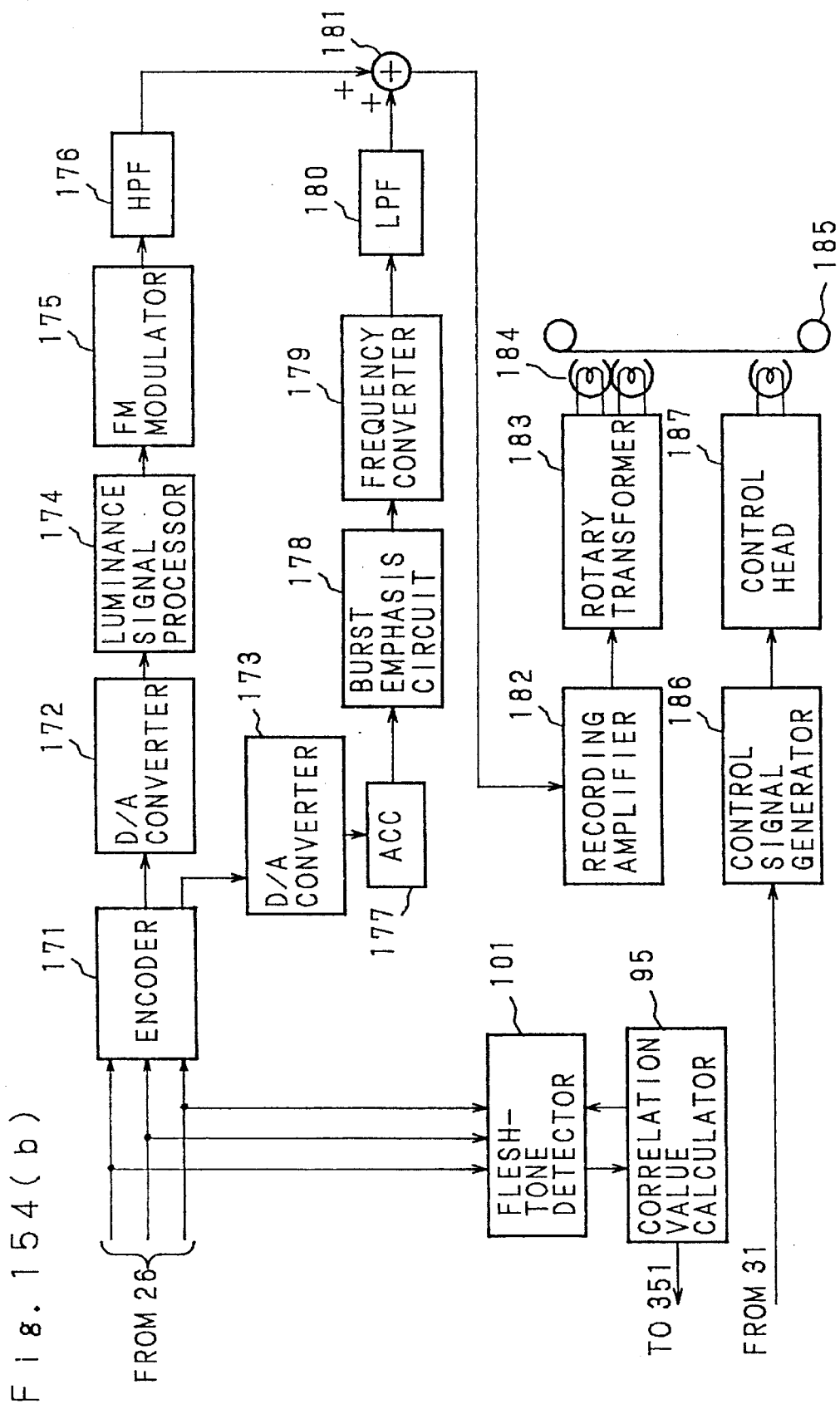
Figure 155:
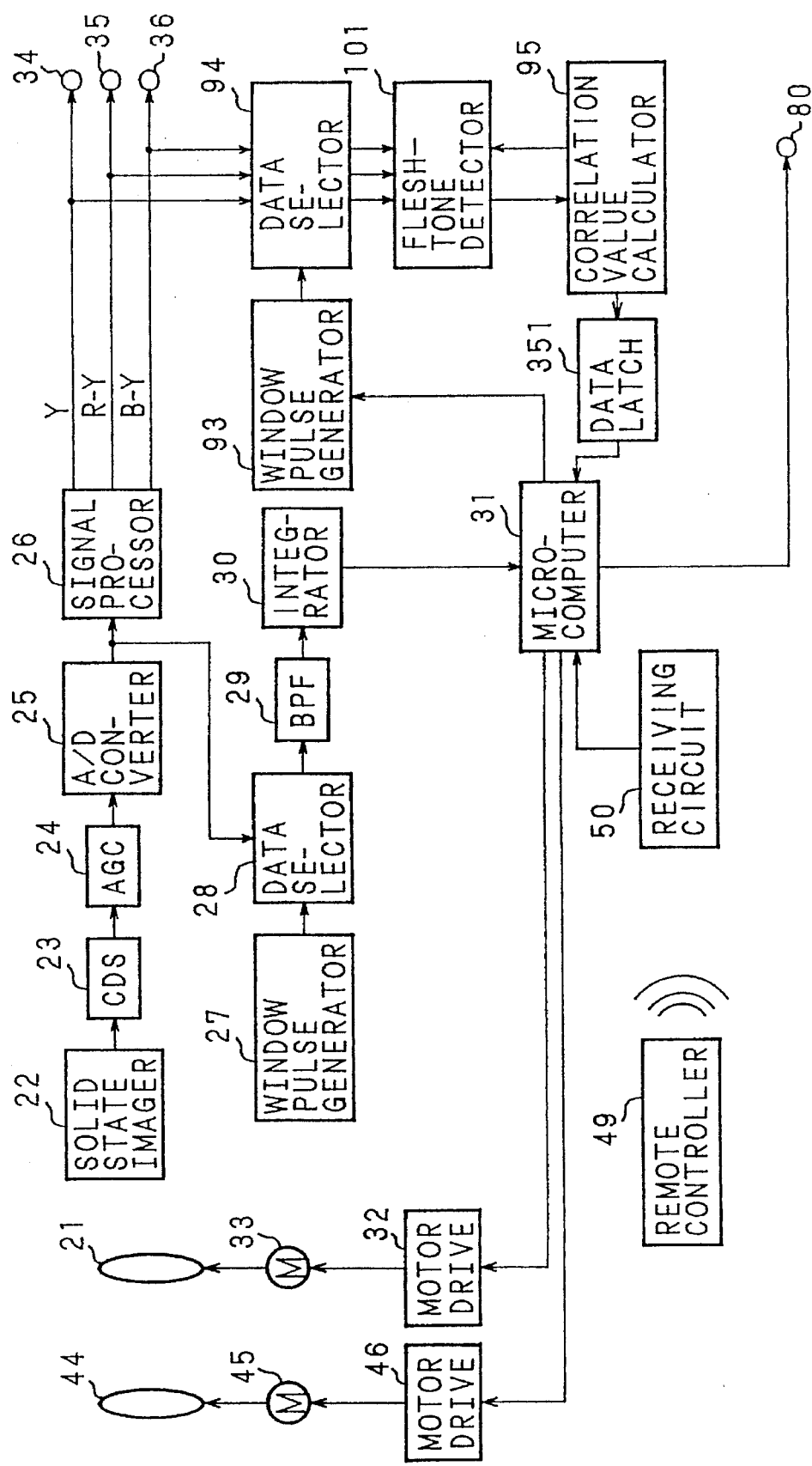
Figure 156:
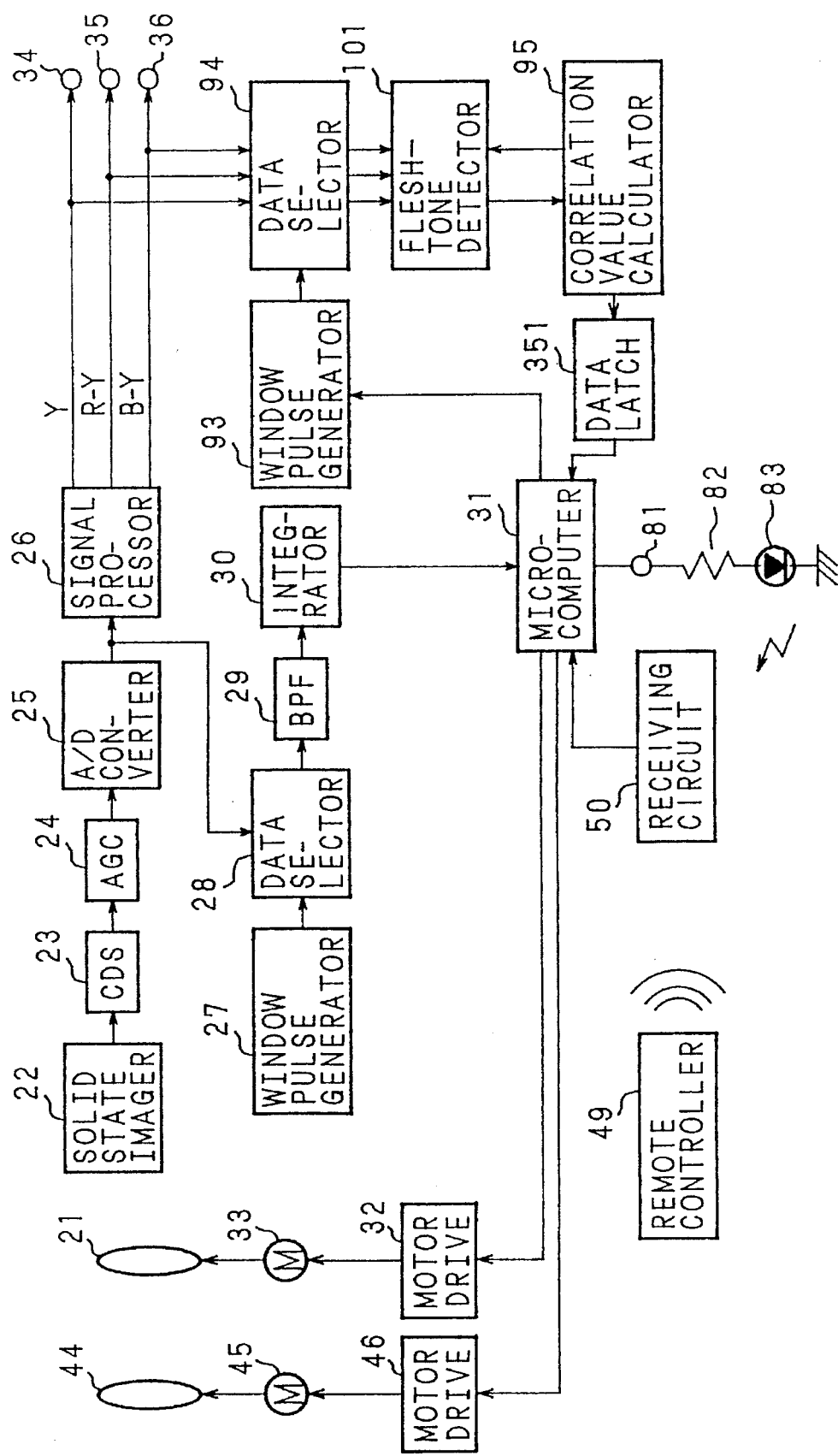
Figure 157:
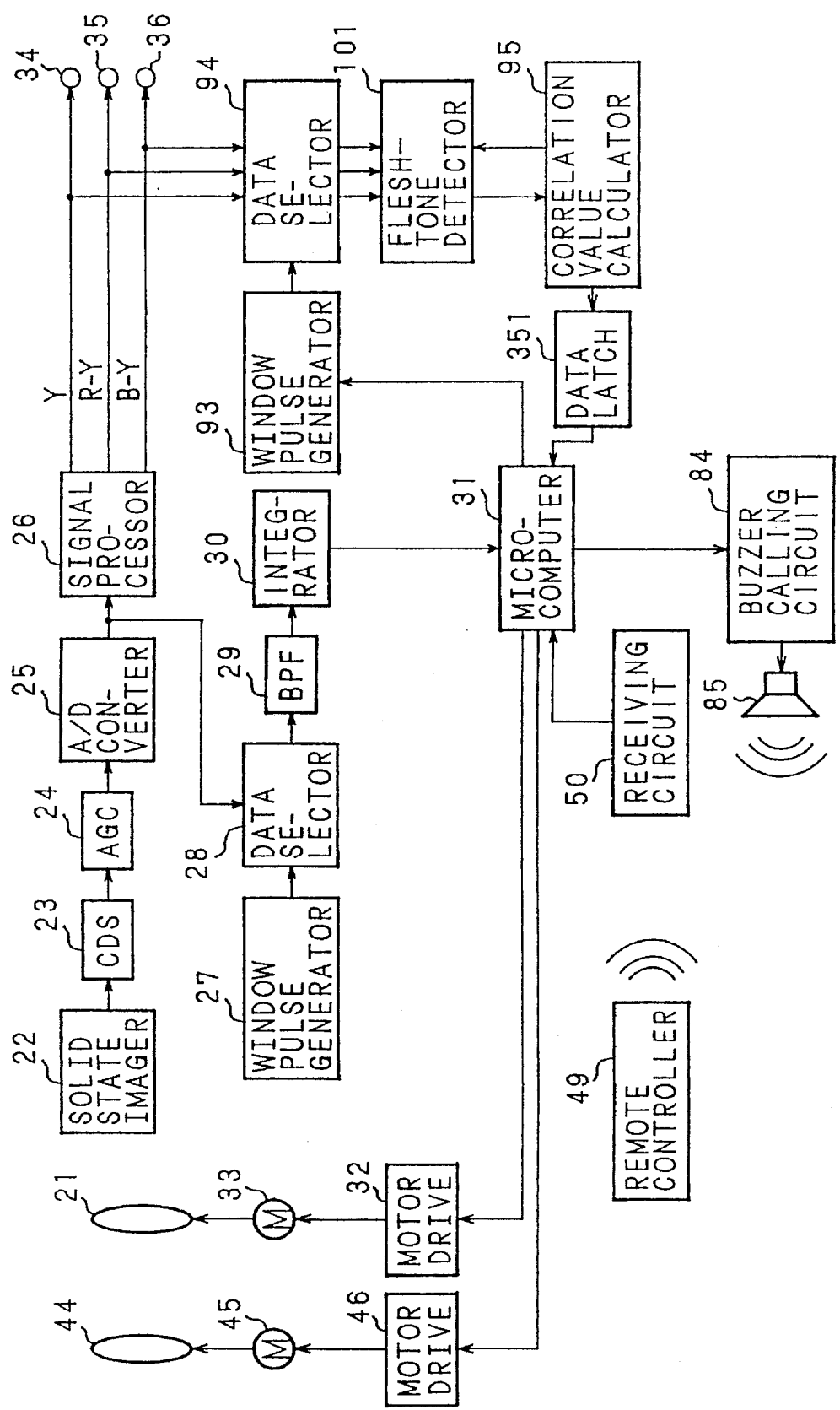
Figure 158:
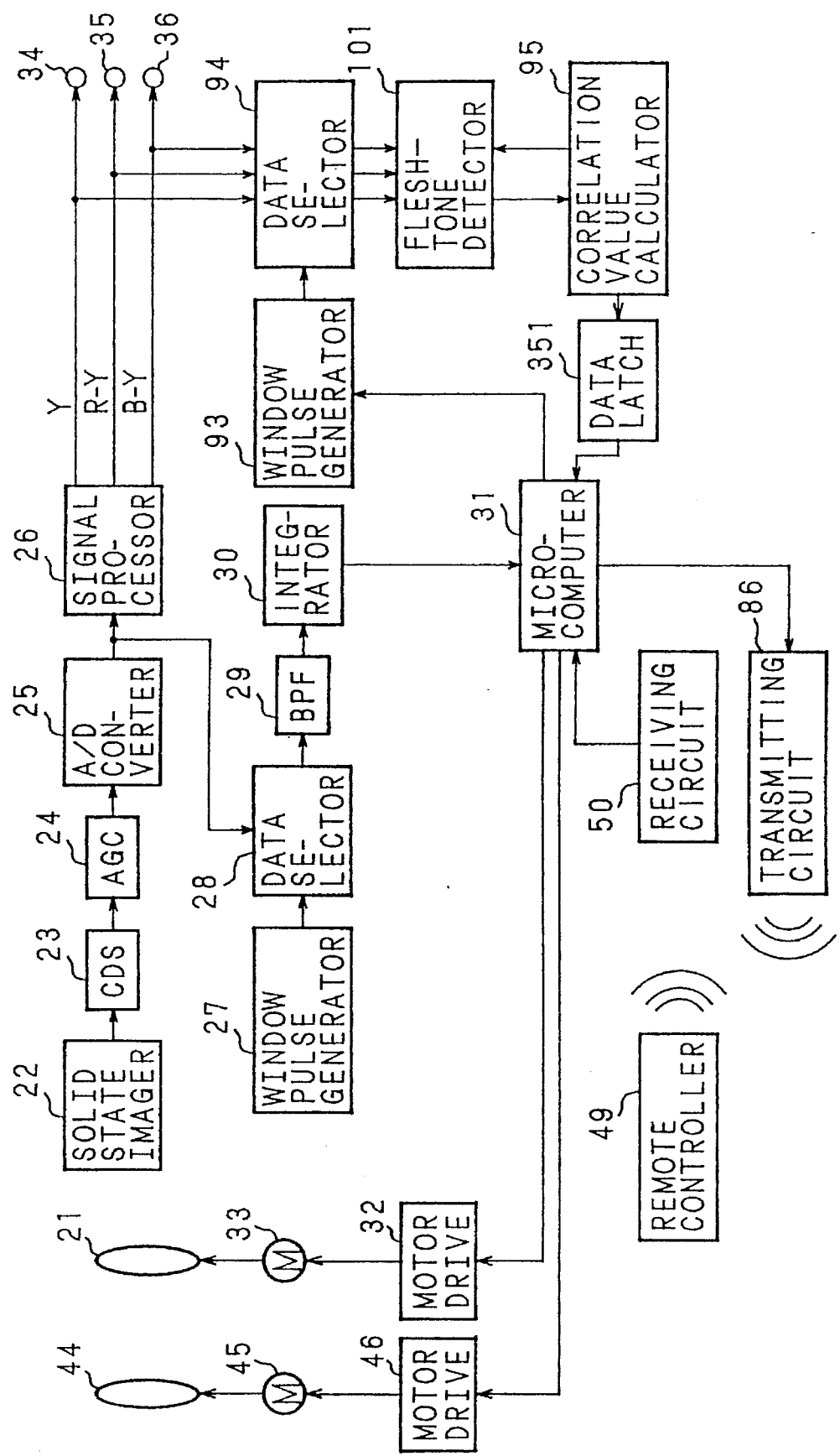
Figure 159A:
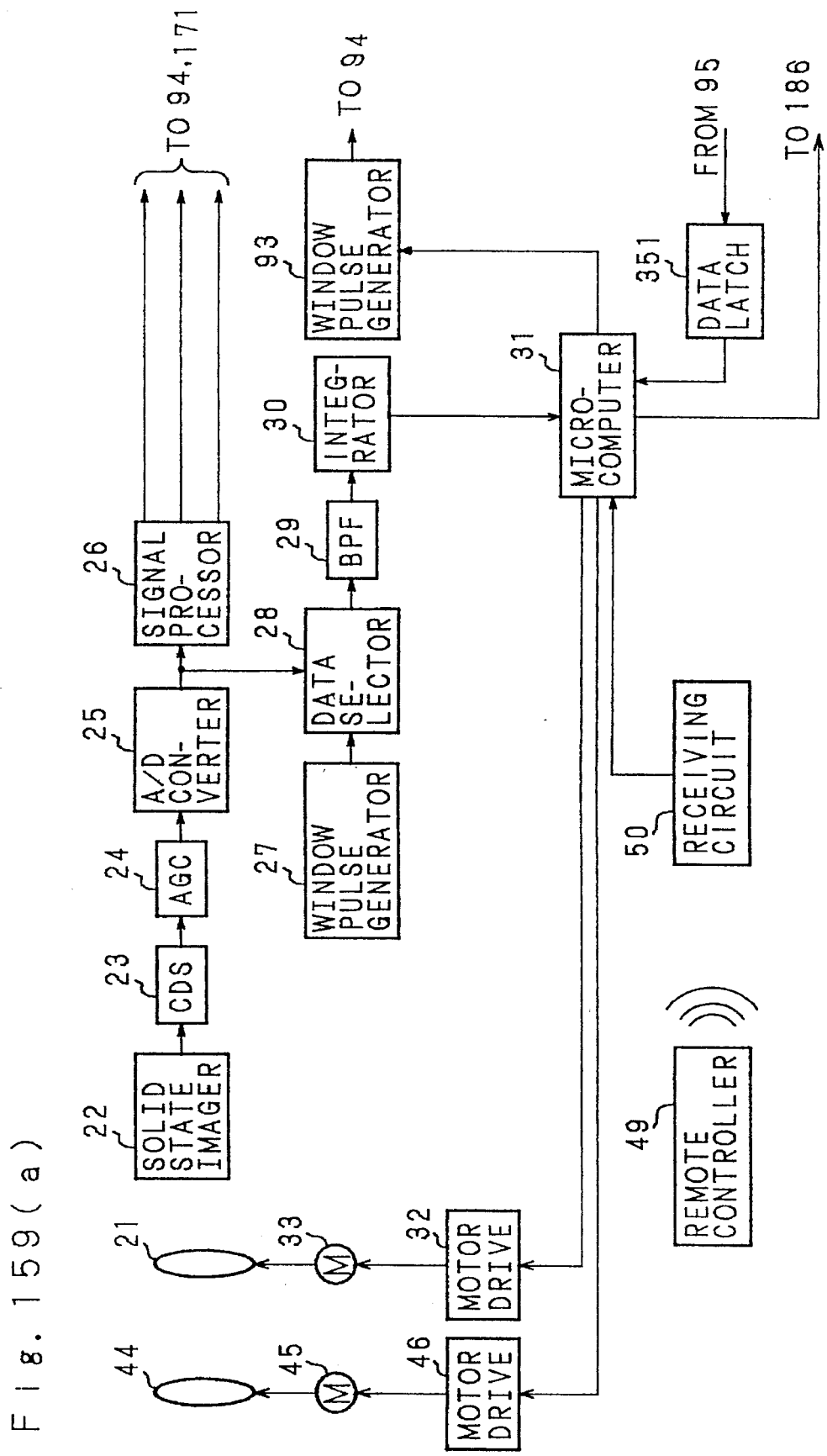
Figure 160:
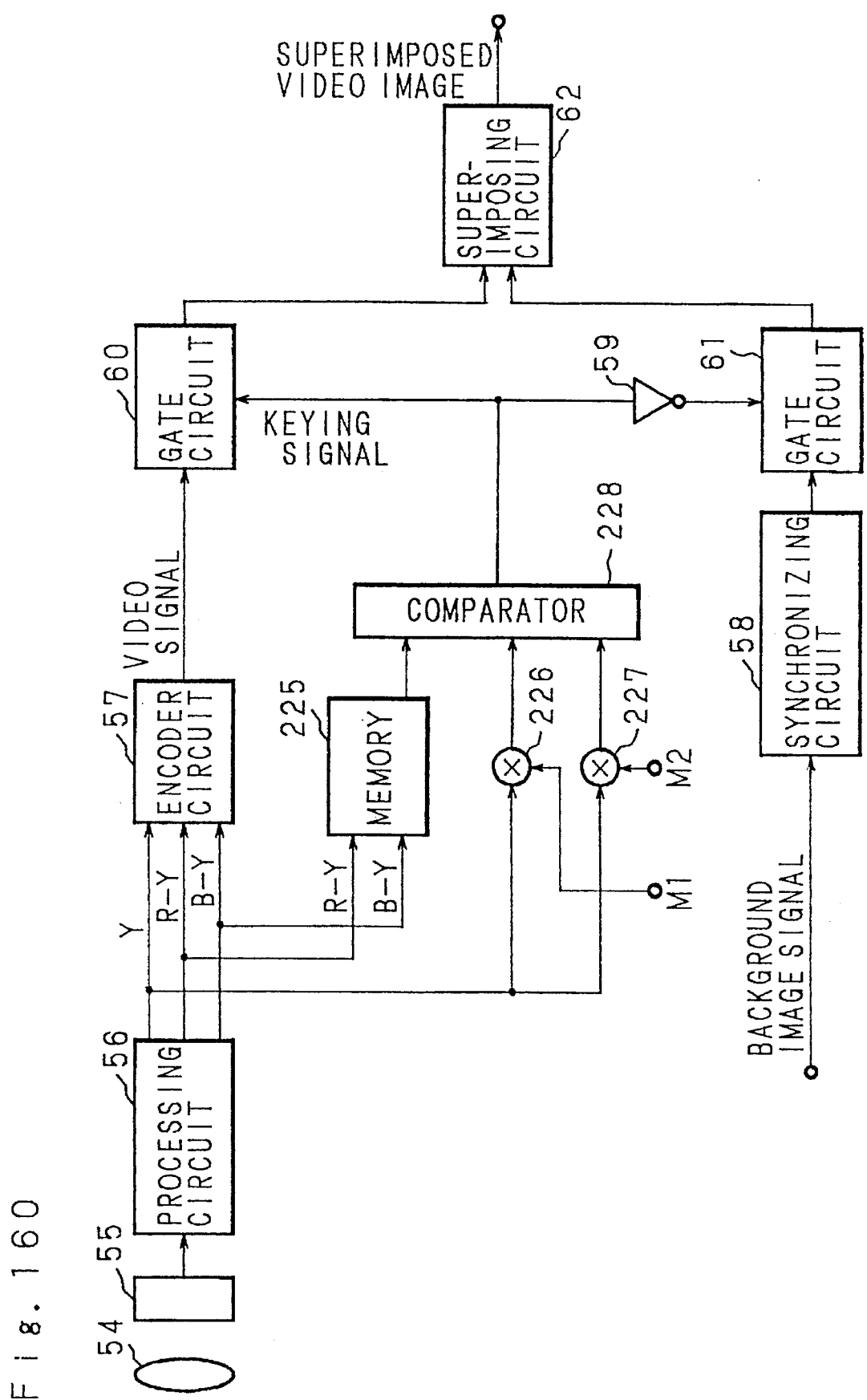
Figure 162:
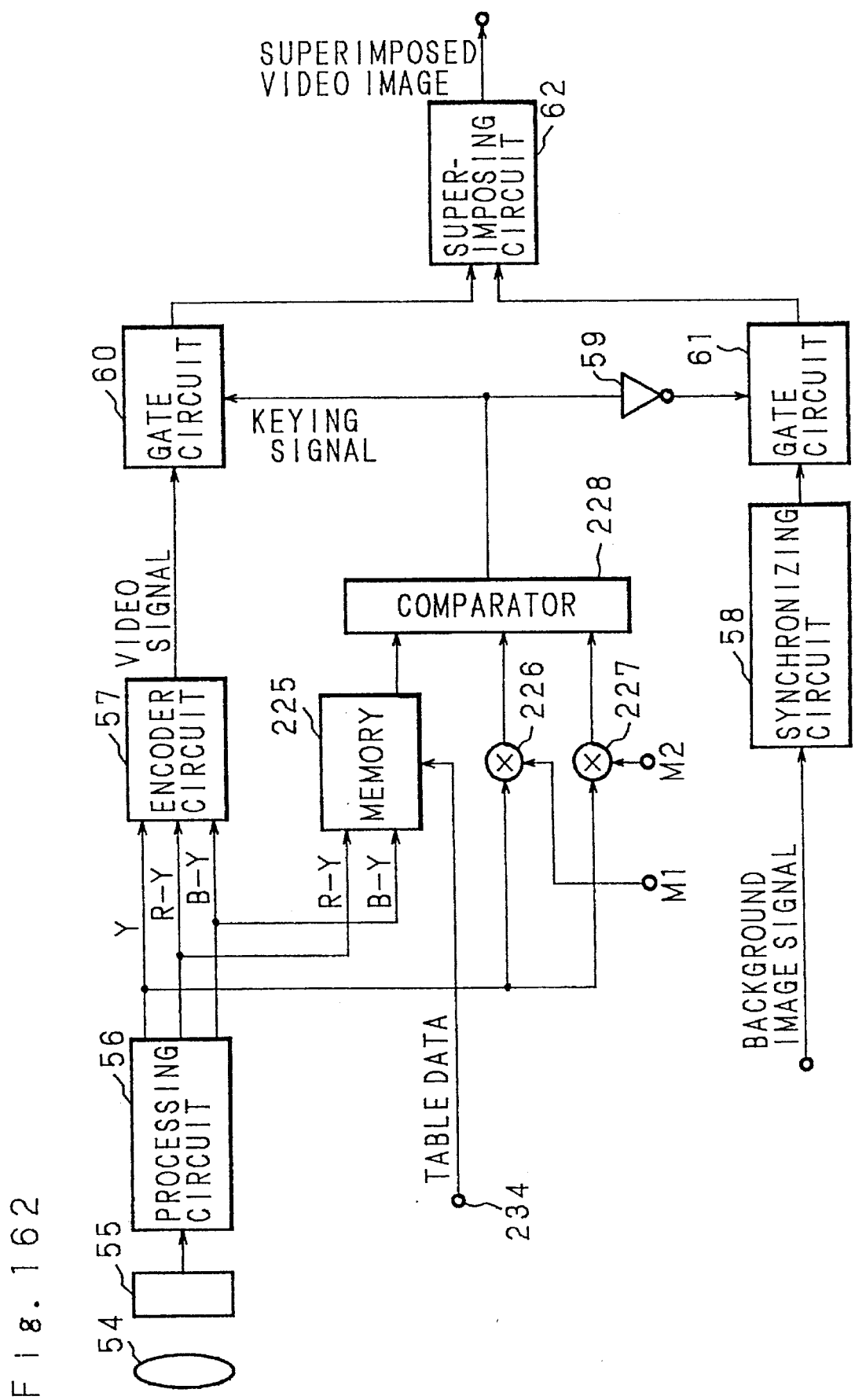
Figure 163:
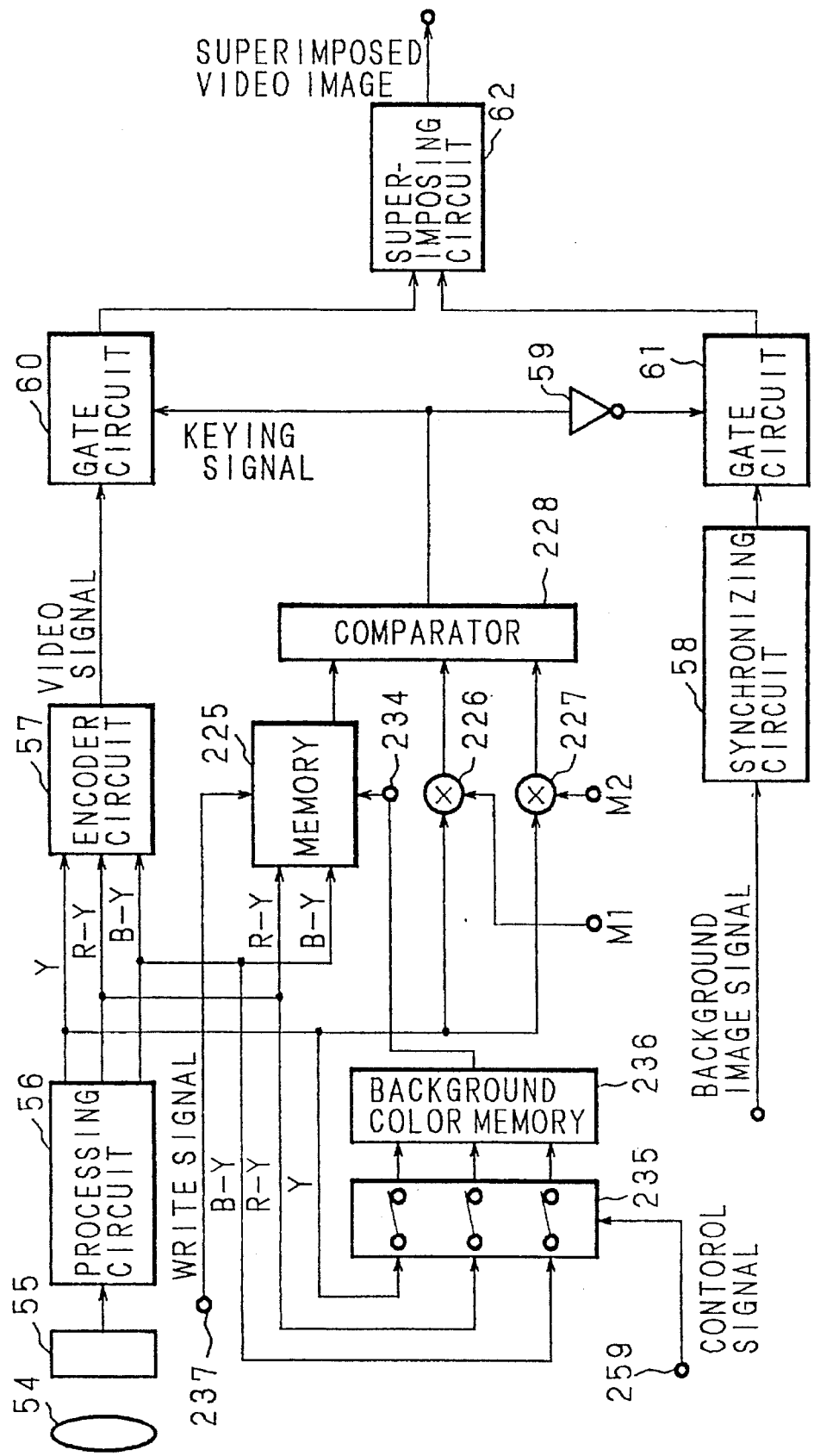
Figure 164:
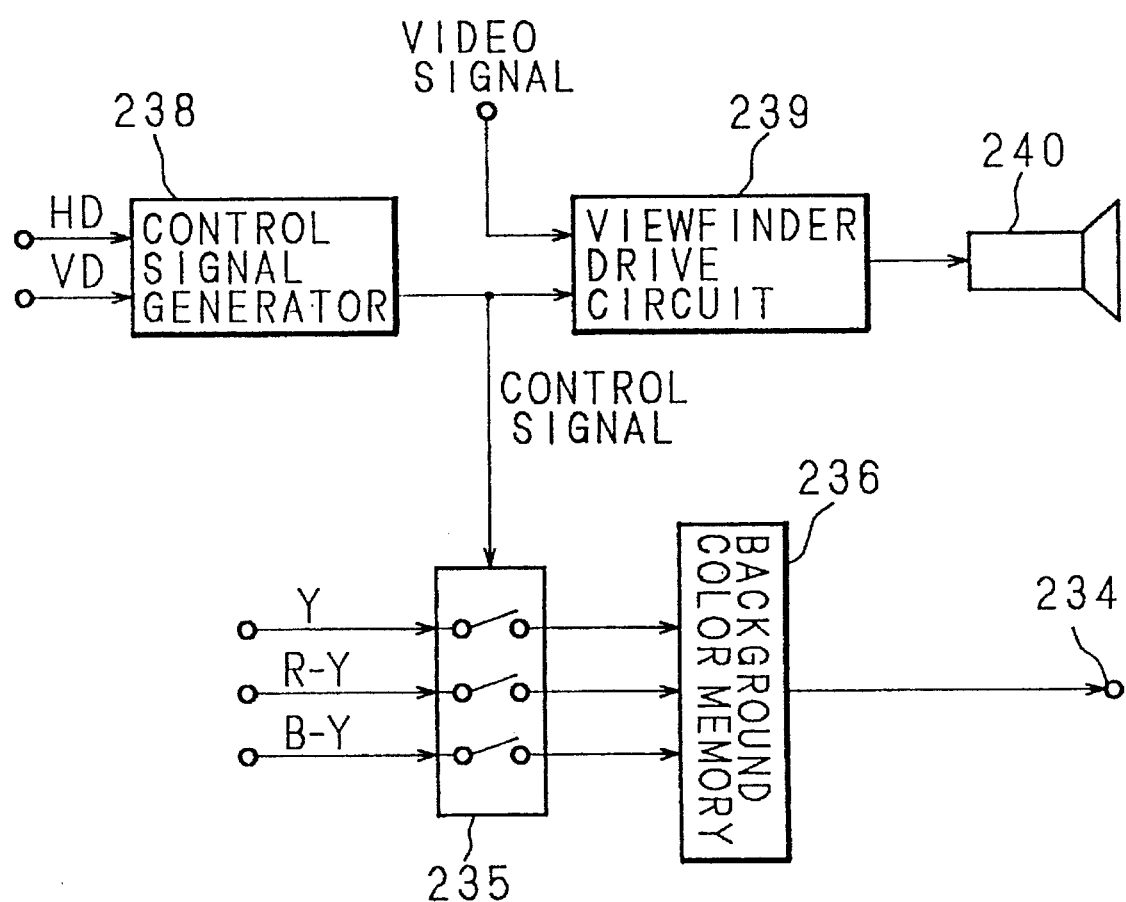
Figure 165:
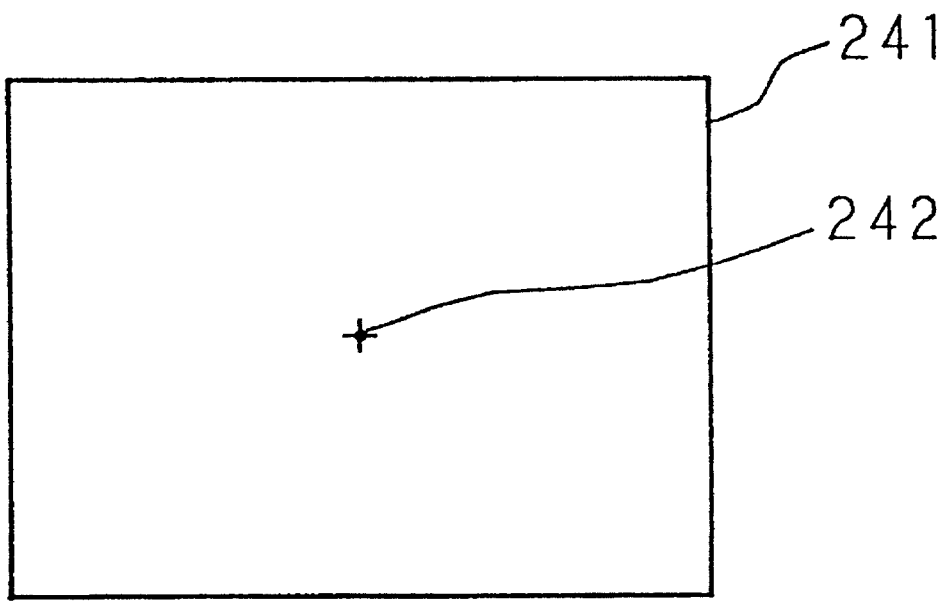
Figure 166:
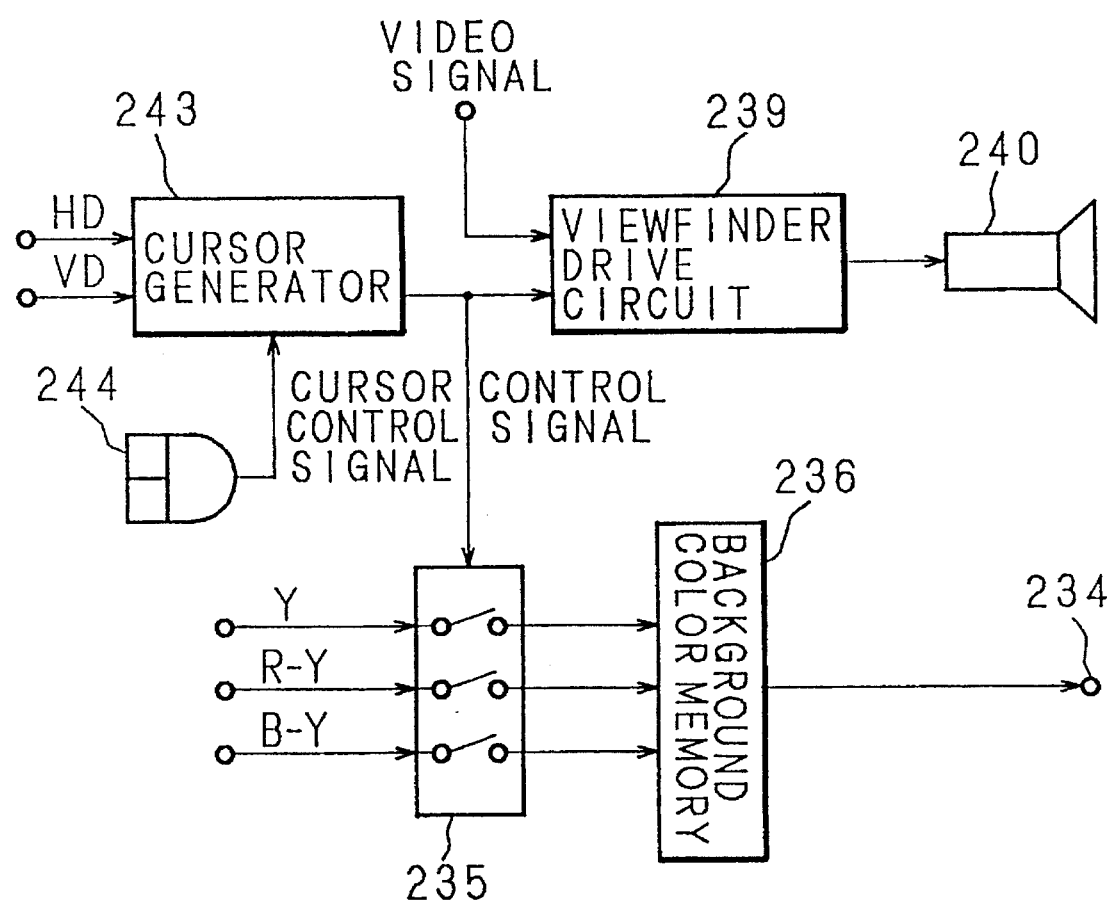
Figure 167:
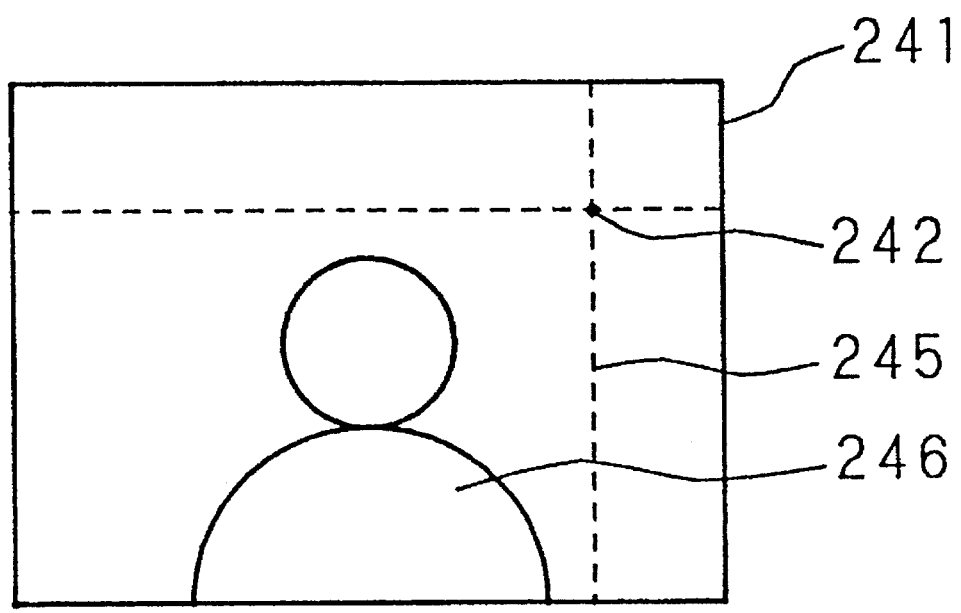
Figure 168:
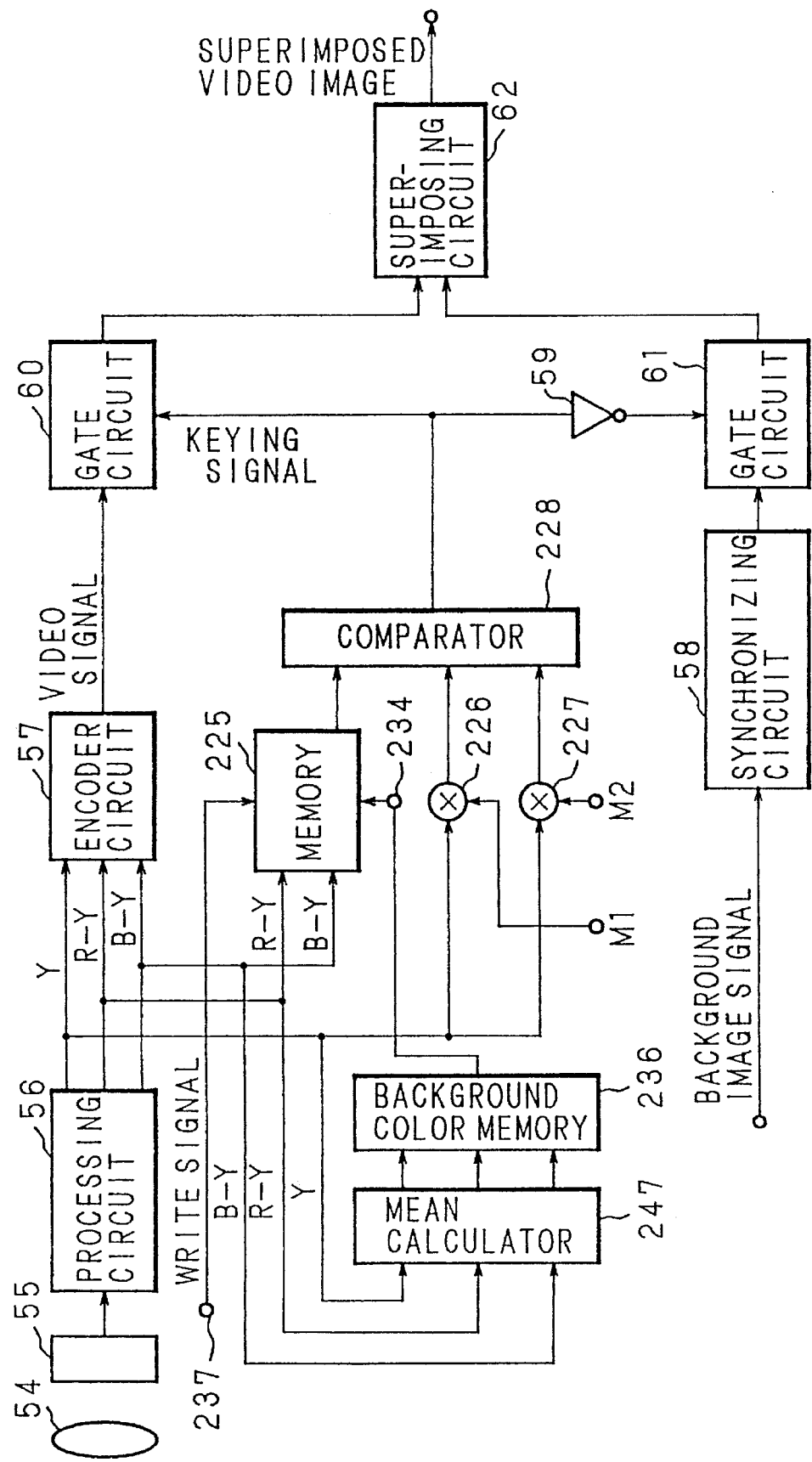
Figure 169:
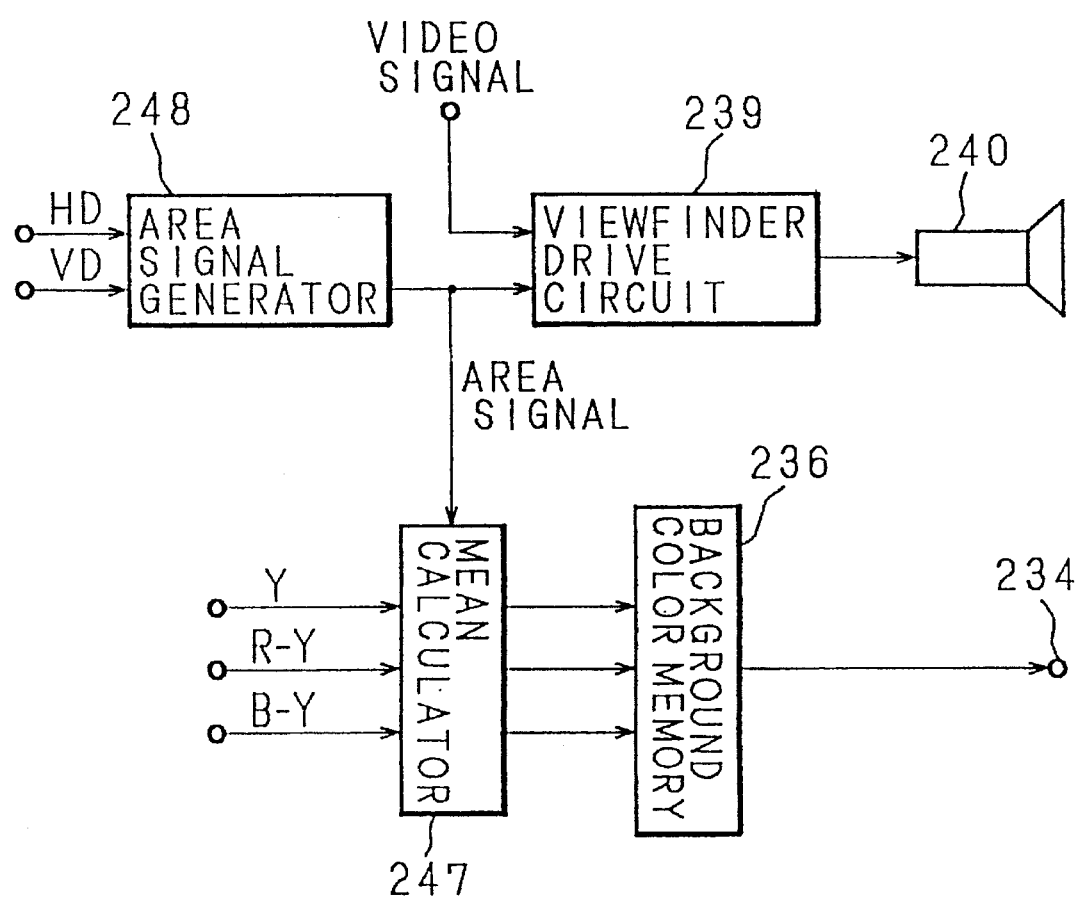
Figure 170:
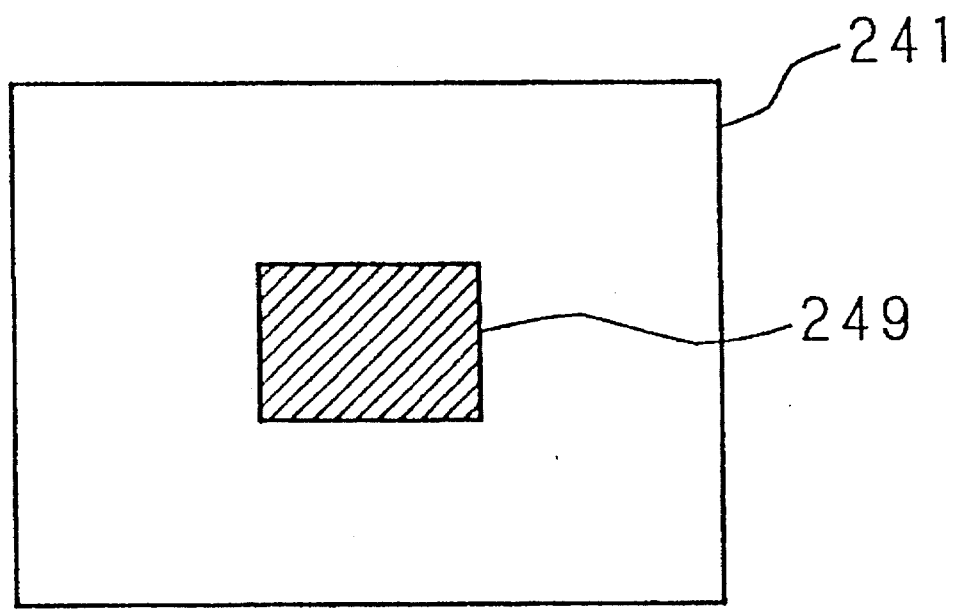
Figure 171:
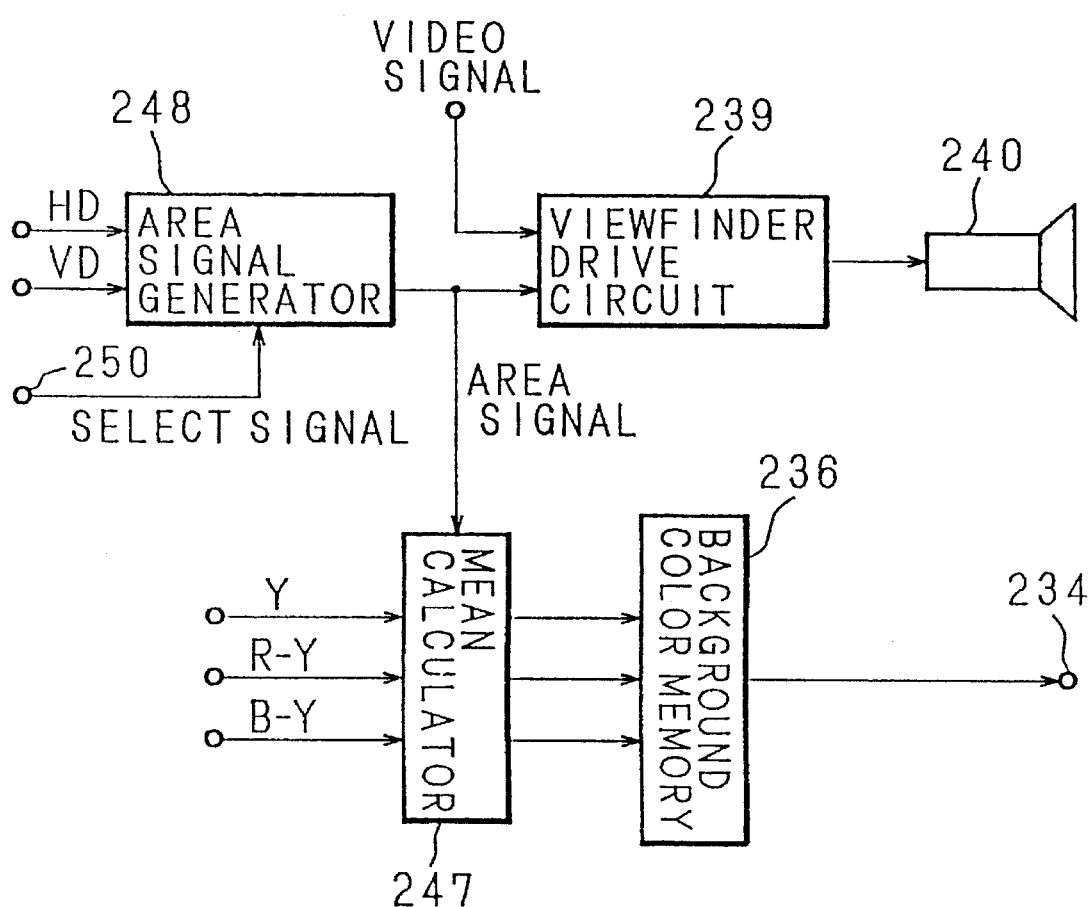
Figure 172:
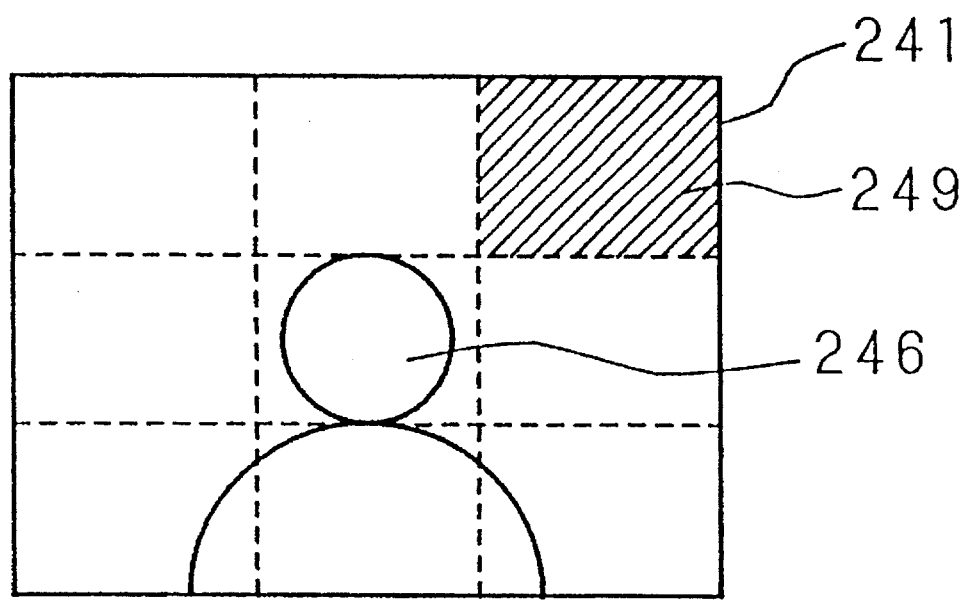
Figure 173:
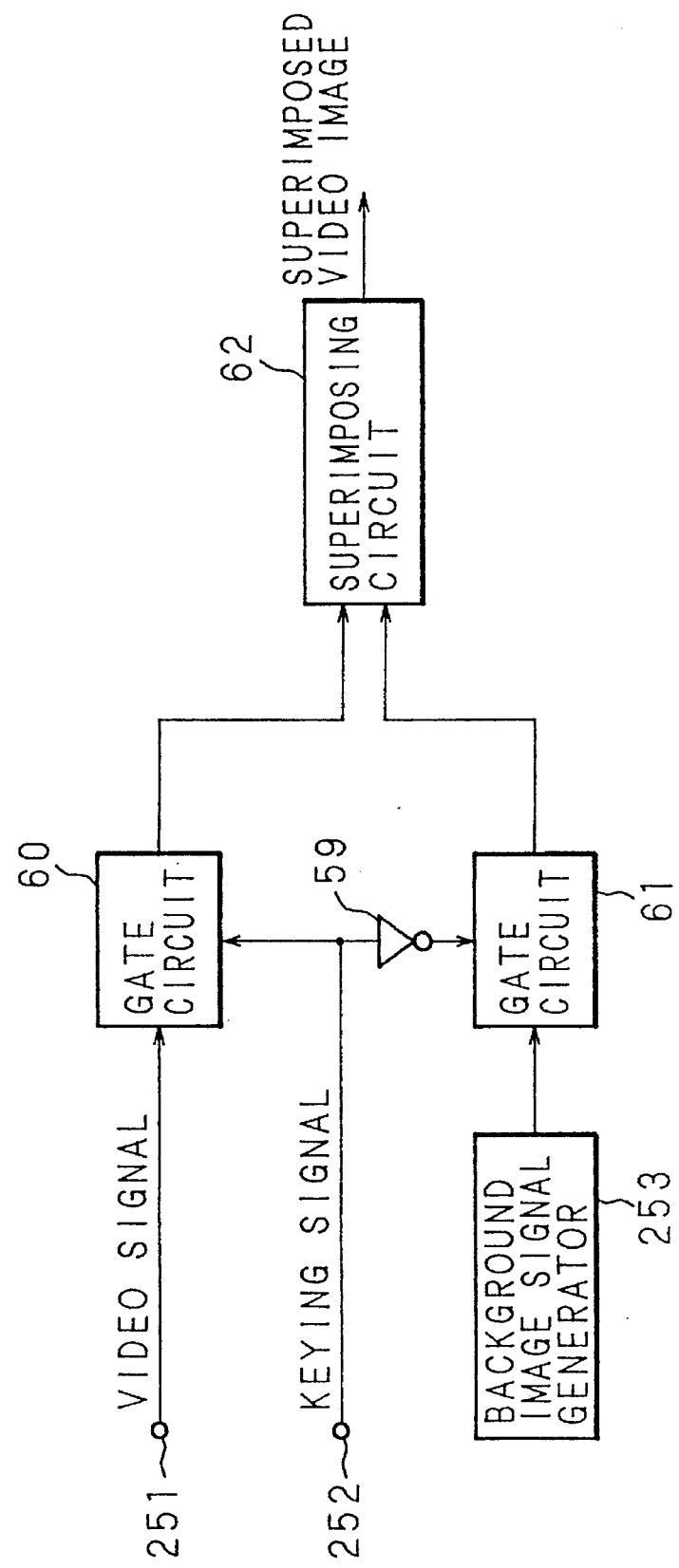
Figure 174:
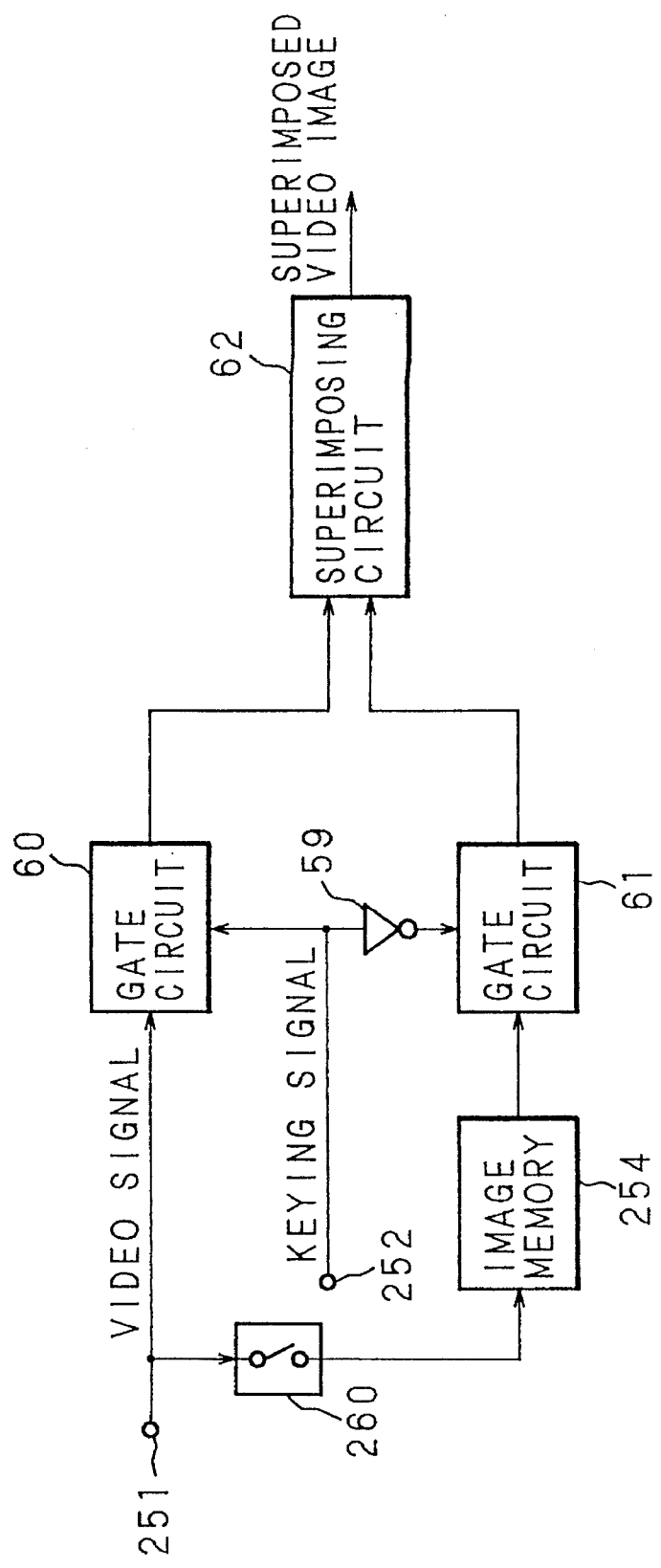
Figure 175:
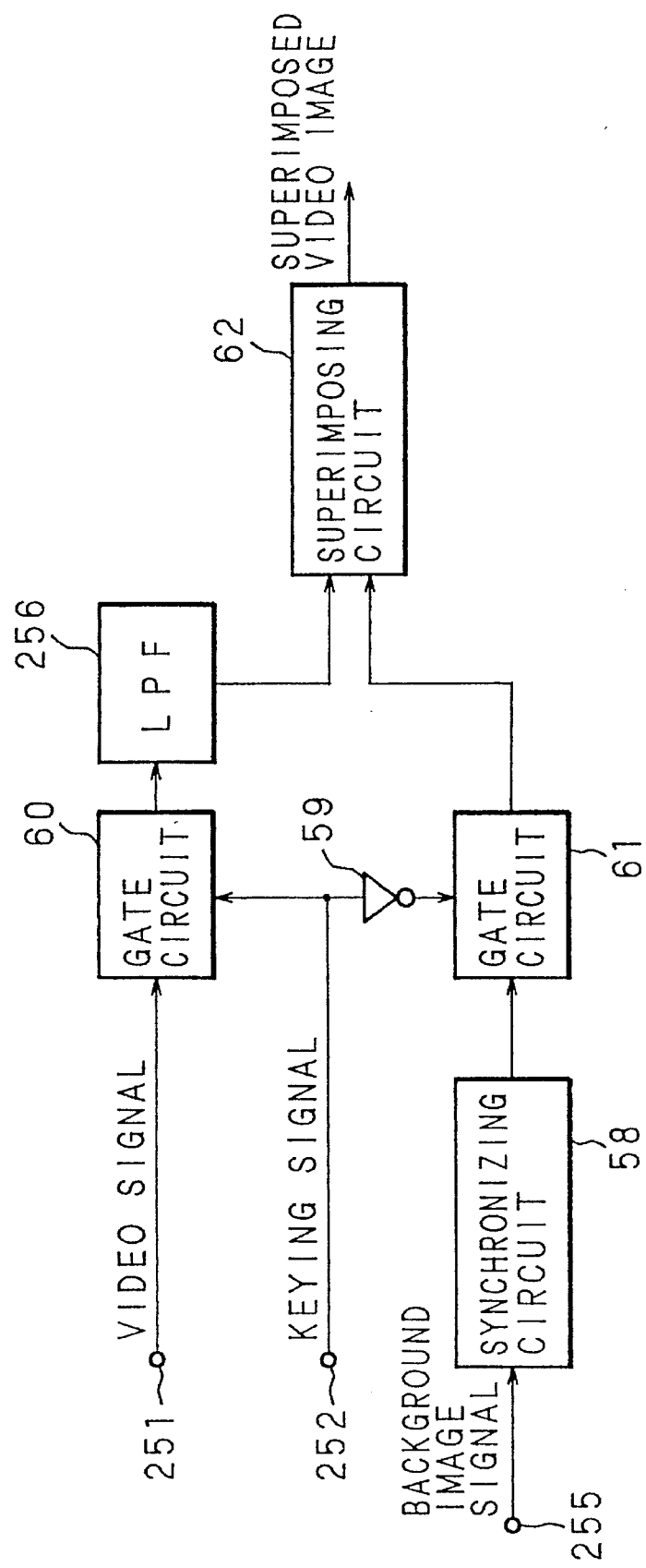
Figure 176:
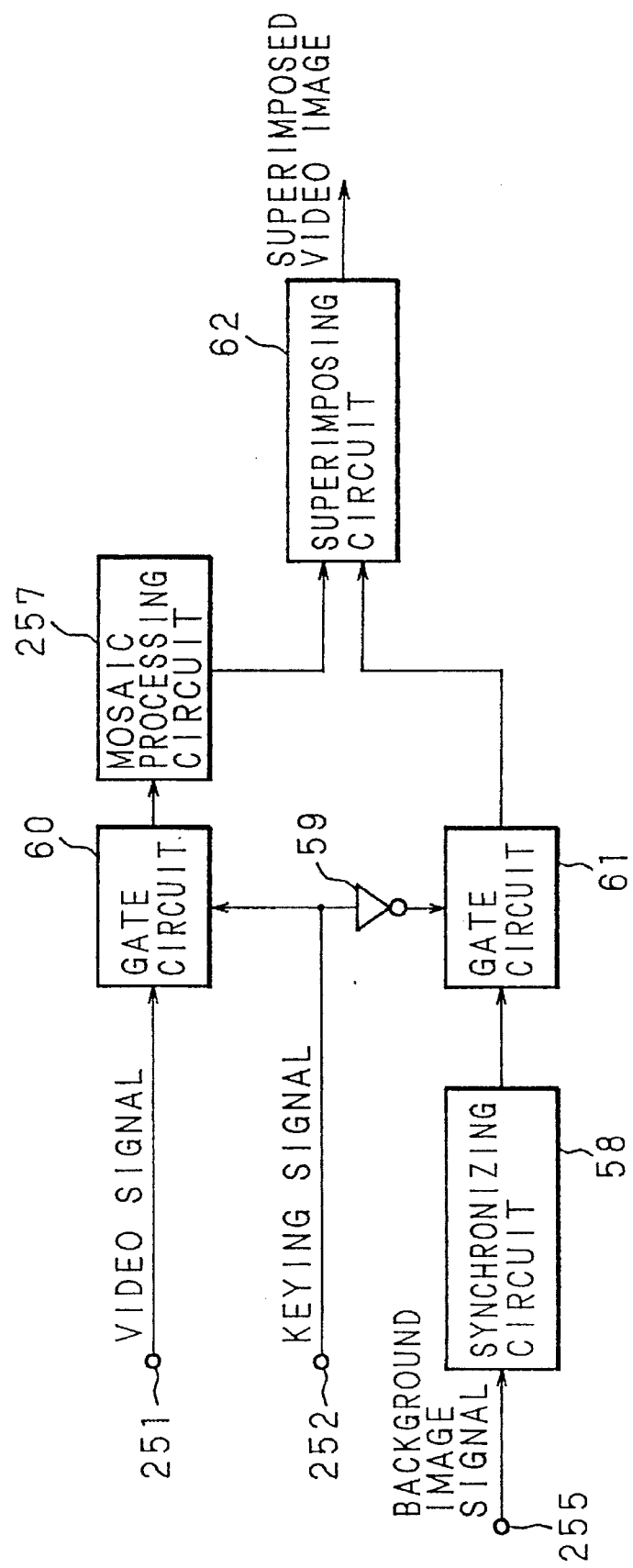
Figure 177:
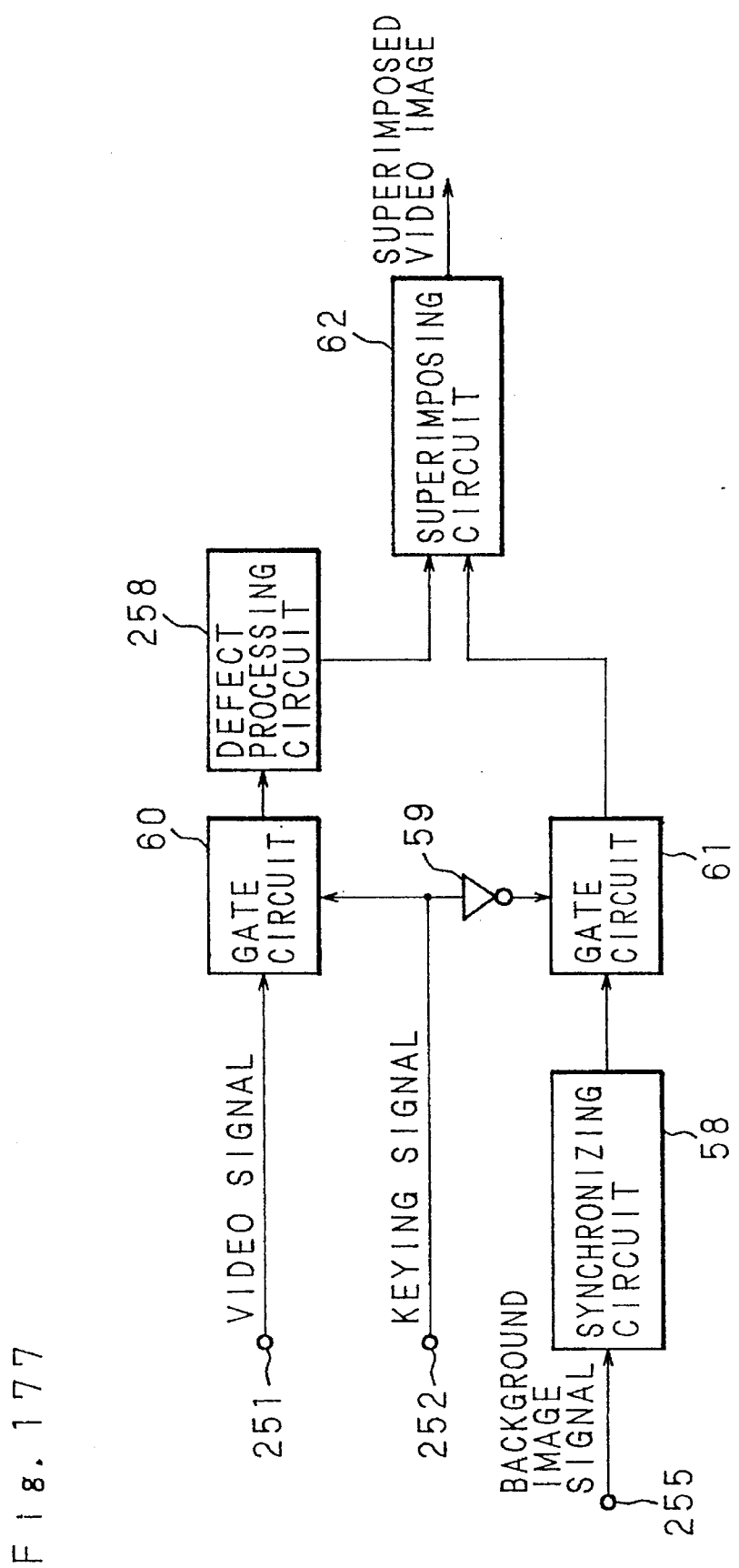

FIGS. 126(a)–(b) is a block diagram showing the configuration of a video signal processor according to a further embodiment of the invention;

FIGS. 127(a)–(b) is a block diagram showing the configuration of a video signal processor according to a further embodiment of the invention;

FIGS. 128(a)–(b) is a block diagram showing the configuration of a video signal processor according to a further embodiment of the invention;

FIG. 129 is a block diagram showing the internal configuration of an aperture correction signal producing circuit;

FIGS. 130(a)–(b) is a block diagram showing the configuration of a video signal processor according to a further embodiment of the invention;

FIGS. 131(a)–(b) is a block diagram showing the configuration of a video signal processor according to a further embodiment of the invention;

FIG. 132 is a block diagram showing the configuration of a video signal processor according to a further embodiment of the invention;

FIG. 133 is a block diagram showing the configuration of a video signal processor according to a further embodiment of the invention;

FIG. 134 is a block diagram showing the configuration of a video signal processor according to a further embodiment of the invention;

FIG. 135 is a block diagram showing the configuration of a video signal processor according to a further embodiment of the invention;

FIG. 136 is a block diagram showing the configuration of a video signal processor according to a further embodiment of the invention;

FIGS. 137(a)–(b) is a diagram showing an output waveform of a low-pass filter;

FIG. 138 is a schematic diagram showing a focus area and a photometric area;

FIG. 139 is a schematic diagram showing a focus area when the object is at a great distance;

FIG. 140 is a schematic diagram showing a focus area when the object is at a short distance;

FIG. 141 is a block diagram showing the configuration of a video signal processor according to a further embodiment of the invention;

FIG. 142 is a schematic diagram showing a photometric area when the object is at a great distance;

FIG. 143 is a schematic diagram showing a photometric area when the object is at a short distance;

FIG. 144 is a block diagram showing the configuration of a video signal processor according to a further embodiment of the invention;

FIG. 145 is a block diagram showing the configuration of a video signal processor according to a further embodiment of the invention;

FIGS. 146(a)–(b) is a schematic diagram showing a focus area in which the value of width w is added to a flesh-tone area;

FIGS. 147(a)–(b) is a schematic diagram showing a photometric area in which the value of width w is subtracted from a flesh-tone area;

FIG. 148 is a block diagram showing the configuration of a color video camera according to a further embodiment of the invention;

FIG. 149 is a flowchart illustrating the algorithm of a microcomputer;

FIG. 150 is a block diagram showing the configuration of a color video camera according to a further embodiment of the invention;

FIG. 151 is a flowchart illustrating the algorithm of a microcomputer;

FIG. 152 is a block diagram showing the configuration of a color video camera according to a further embodiment of the invention;

FIG. 153 is a block diagram showing the configuration of a color video camera according to a further embodiment of the invention;

FIG. 154(a)–(b) is a block diagram showing the configuration of a color video camera according to a further embodiment of the invention;

FIG. 155 is a block diagram showing the configuration of a color video camera according to a further embodiment of the invention;

FIG. 156 is a block diagram showing the configuration of a color video camera according to a further embodiment of the invention;

FIG. 157 is a block diagram showing the configuration of a color video camera according to a further embodiment of the invention;

FIG. 158 is a block diagram showing the configuration of a color video camera according to a further embodiment of the invention;

FIG. 159(a)–(b) is a block diagram showing the configuration of a color video camera according to a further embodiment of the invention;

FIG. 160 is a block diagram showing the configuration of an image superimposing apparatus for a color video camera according to the present invention;

FIG. 161 is a diagram showing table data in a memory;

FIG. 162 is a block diagram showing the configuration of an image superimposing apparatus for a color video camera according ho another embodiment of the invention;

FIG. 163 is a block diagram showing the configuration of an image superimposing apparatus for a color video camera according to a further embodiment of the invention;

FIG. 164 is a block diagram showing the configuration of a color video camera according to a further embodiment of the invention;

FIG. 165 is a diagram showing a chromakey sample point;

FIG. 166 is a block diagram showing the configuration of a color video camera according to a further embodiment of the invention;

FIG. 167 is a diagram showing a chromakey sample point;

FIG. 168 is a block diagram showing the configuration of an image superimposing apparatus for a color video camera according to a further embodiment of the invention;

FIG. 169 is a block diagram showing the configuration of a color video camera according to a further embodiment of the invention;

FIG. 170 is a diagram showing a chromakey area;

FIG. 171 is a block diagram showing the configuration of a color video camera according to a further embodiment of the invention;

FIG. 172 is a diagram showing a chromakey area;

FIG. 173 is a block diagram showing the configuration of an image superimposing apparatus for a color video camera according to a further embodiment of the invention;

FIG. 174 is a block diagram showing the configuration of an image superimposing apparatus for a color video camera according to a further embodiment of the invention;

FIG. 175 is a block diagram showing the configuration of an image superimposing apparatus for a color video camera according to a further embodiment of the invention;

FIG. 176 is a block diagram showing the configuration of an image superimposing apparatus for a color video camera according to a further embodiment of the invention; and FIG. 177 is a block diagram showing the configuration of an image superimposing apparatus for a color video camera according to a further embodiment of the invention.

DESCRIPTION OF THE PREFERRED EMBODIMENTS

The preferred embodiments of the present invention will now be described below with reference to the accompanying drawings.

(Embodiment 1)

Figure 8:
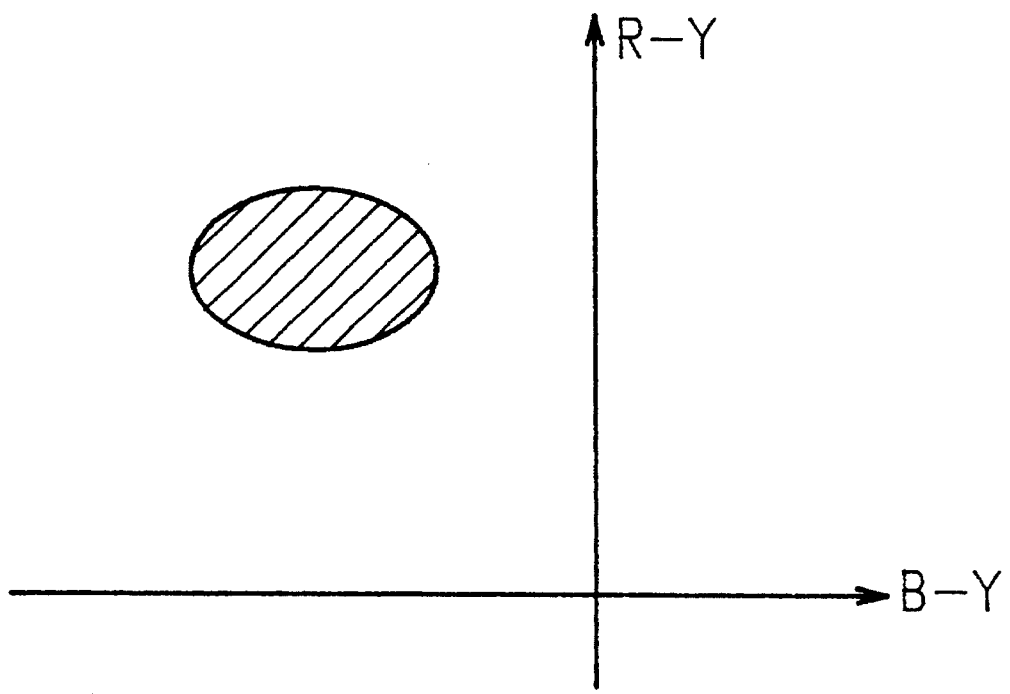
FIG. 8 is a diagram showing an example of flesh-tone area detection.
Figure 9:
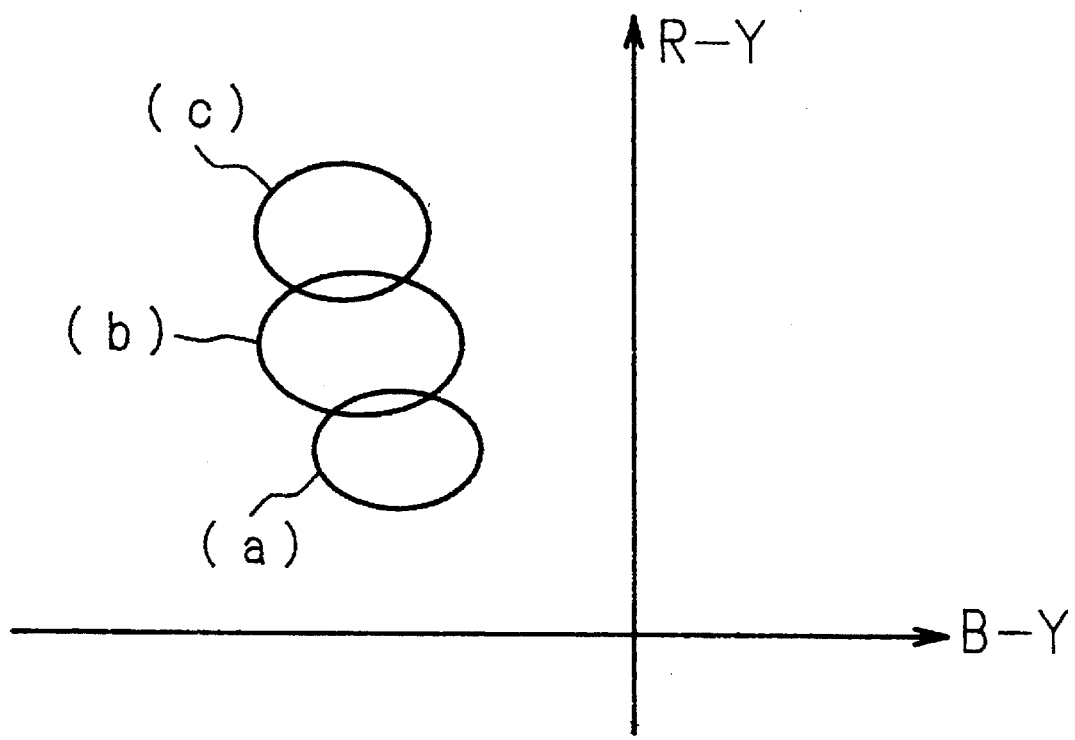
FIG. 9 is a diagram showing an example in which the flesh-tone area varies with the luminance signal level.

FIG. 8 is a diagram showing an example of flesh-tone area detection according to a first embodiment. As shown in FIG. 8, a closed area (indicated by oblique hatching) in a tow dimensional plane defined by R-Y and B-Y axes representing color-difference video signals is detected as a flesh-tone area. The flesh-tone area detected in this manner varies according to the level of the luminanee signal. That is, as the level of the luminance signal increases, the flesh-tone area is made to vary in size and position from (a) to (b) to (c) as shown in FIG. 9, thus enhancing the accuracy of flesh-tone area detection.

(Embodiment 2)

Figure 10:
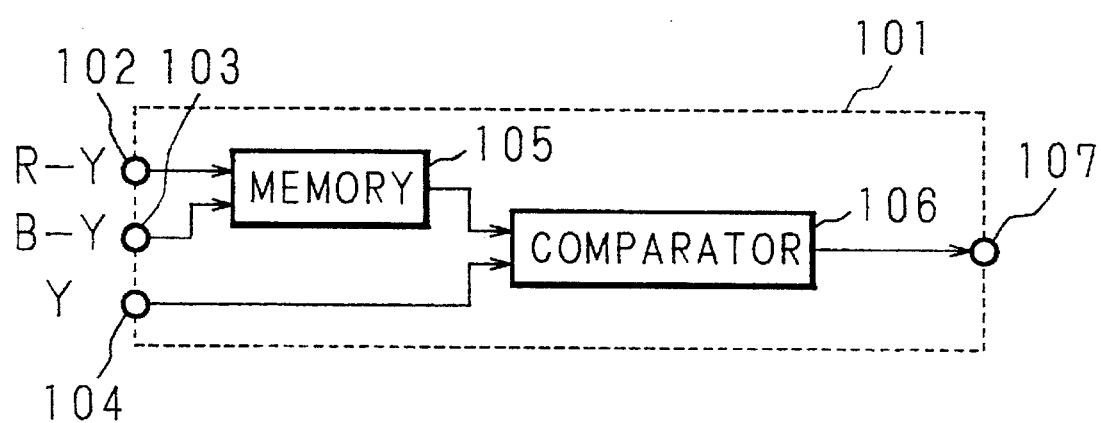
FIG. 10 is a block diagram showing the configuration of a flesh-tone detector.

FIG. 10 is a block diagram showing the configuration of a flesh-tone detector circuit 101 for detecting flesh-tone areas according to a second embodiment. The flesh-tone detector 101 is a circuit to which a digital luminance signal, B-Y color-difference signal, and R-Y color-difference signal are input for detection of flesh-tone areas from the video signals. The flesh-tone detector 101 comprises an R-Y color-difference signal input terminal 102, a B-Y color-difference signal input terminal 103, a luminance signal input terminal 104, a memory 105, a comparator 106, and a flesh-tone detection signal output terminal 107.

Figure 11:
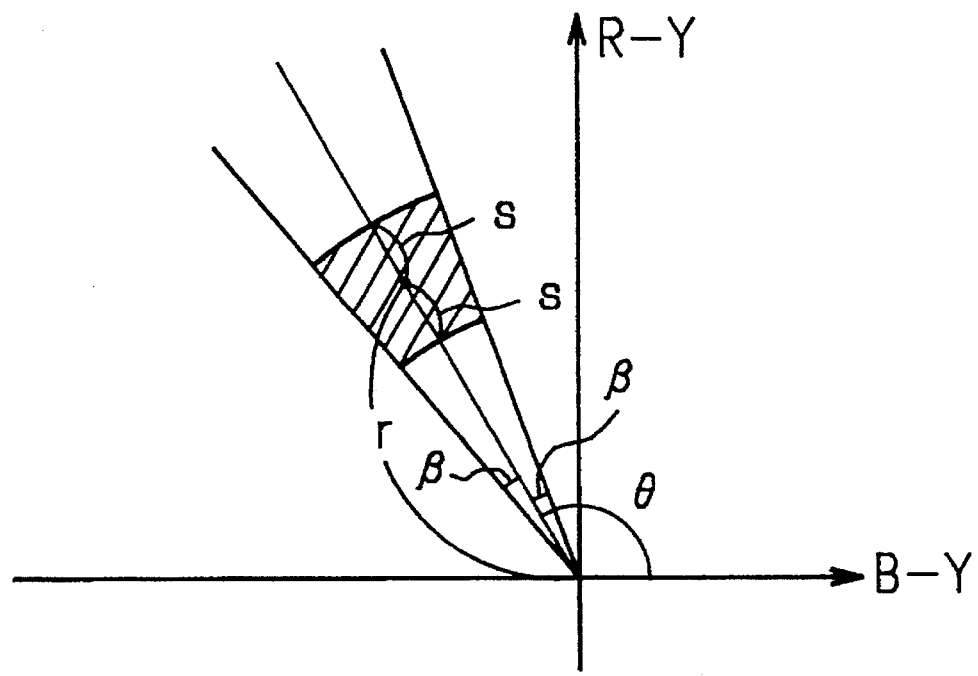
FIG. 11 is a diagram showing a flesh-tone area.
Figure 12:
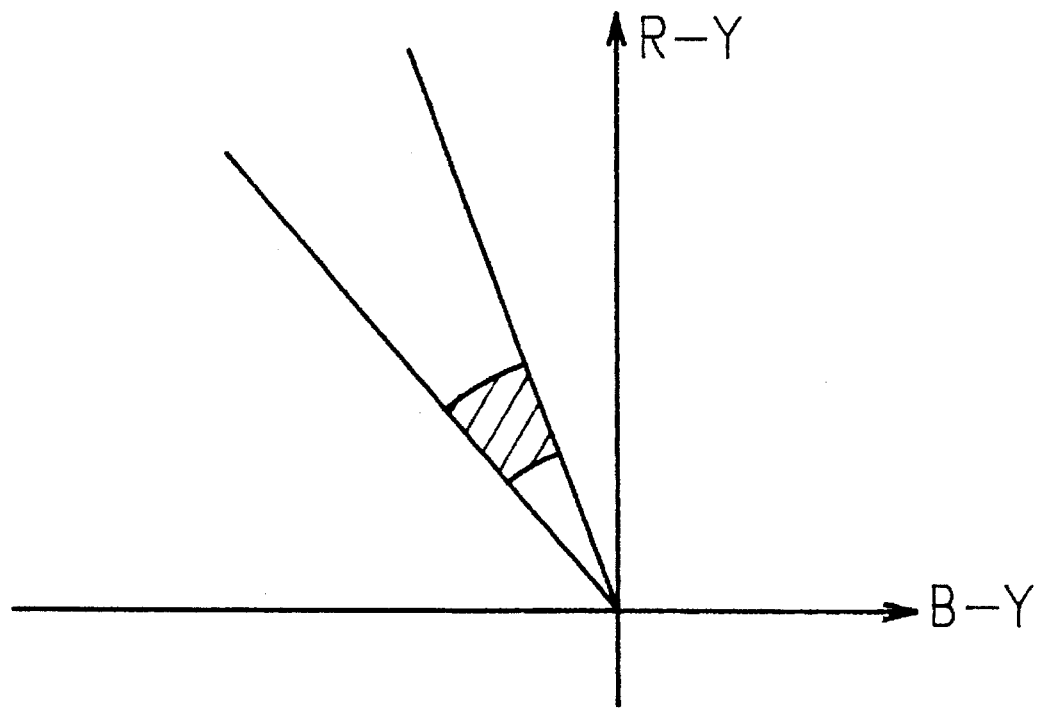
FIG. 12 is a diagram showing a flesh-tone area.
Figure 13:
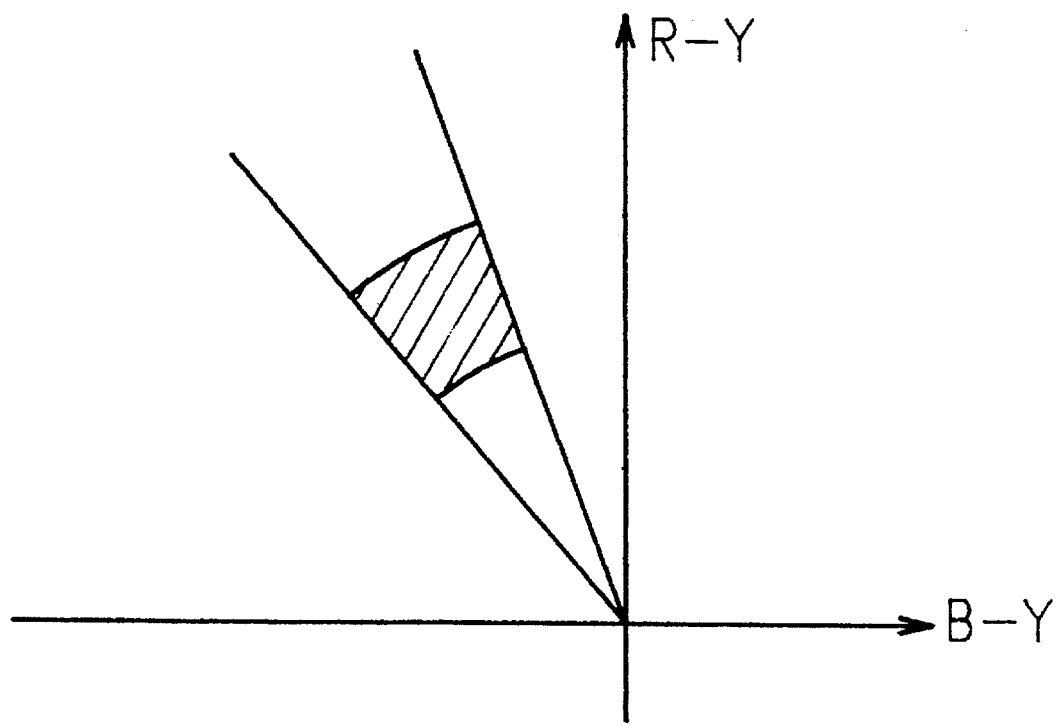
FIG. 13 is a diagram showing a flesh-tone area.
Figure 14:
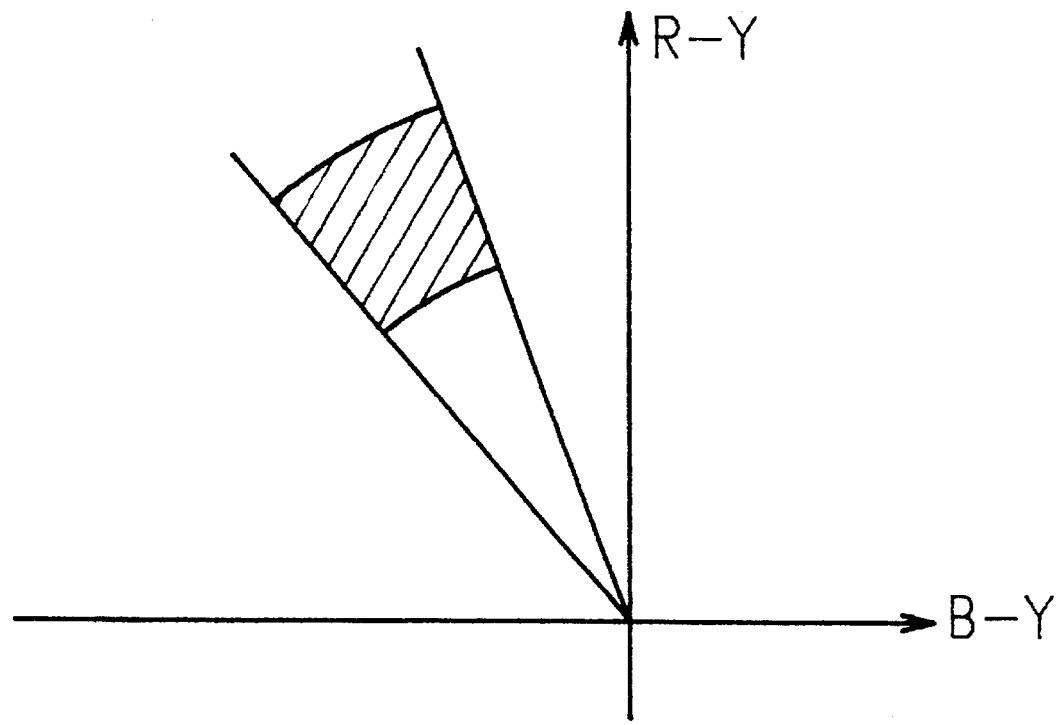
FIG. 14 is a diagram showing a flesh-tone area.

The flesh-tone area is an area defined by the hue and the color signal saturation level, as shown in FIG. 11, and represented by Expressions 1 and 2 below. The flesh-tone area, represented by Expressions 1 and 2, varies according to the level of the luminance signal, as shown by Expressions 3 and 4 below; with increasing level of the luminanee signal, the color signal saturation level of the flesh-tone area increases accordingly as shown in FIGS. 12, 13, and 14. The flesh-tone area is made to vary as shown in FIGS. 12, 13, and 14 according to the level of the luminance signal, so that the flesh-tone area can be detected accurately.

$$(B-Y)\cdot\tan(\theta+\beta) \leq (R-Y) \leq (B-Y)\cdot\tan(\theta-\beta) \qquad \text{(Expression 1)}$$

$$\text{(Expression 2)}$$
$$r-s \leq \sqrt{(R-Y)^2 + (B-Y)^2} \leq r+s$$

$$r = K1 \cdot Y \text{ where } K1 \geq 0, K1 \text{ is a constant} \qquad \text{(Expression 3)}$$

$$s = K2 \cdot Y \text{ where } K2 \geq 0, K2 \text{ is a constant} \qquad \text{(Expression 4)}$$

Figure 16:
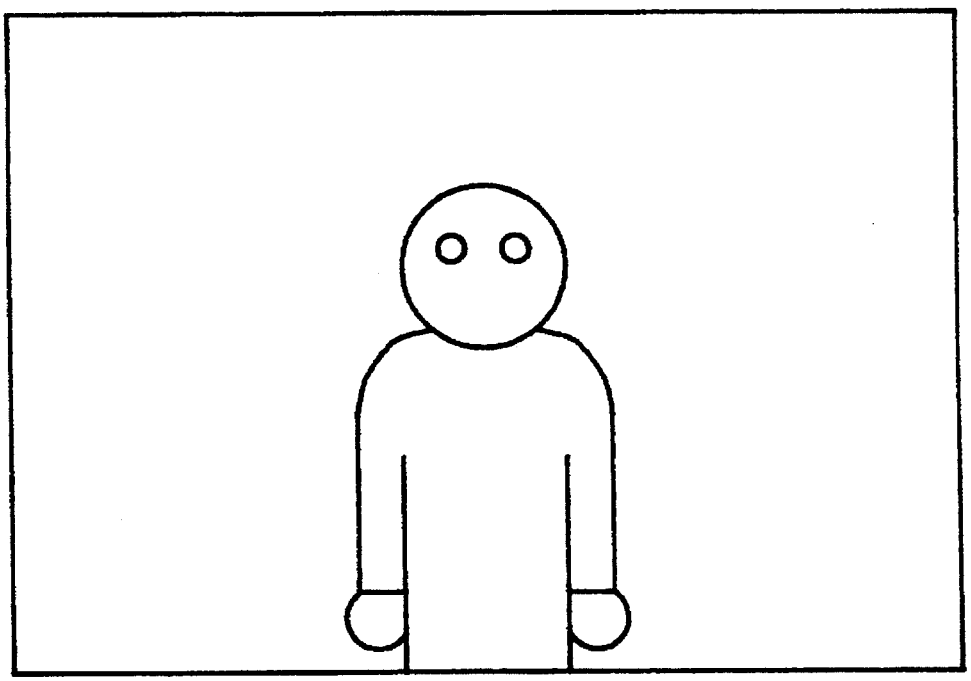
FIG. 16 is a diagram showing a main object to be picked up.
Figure 17A:
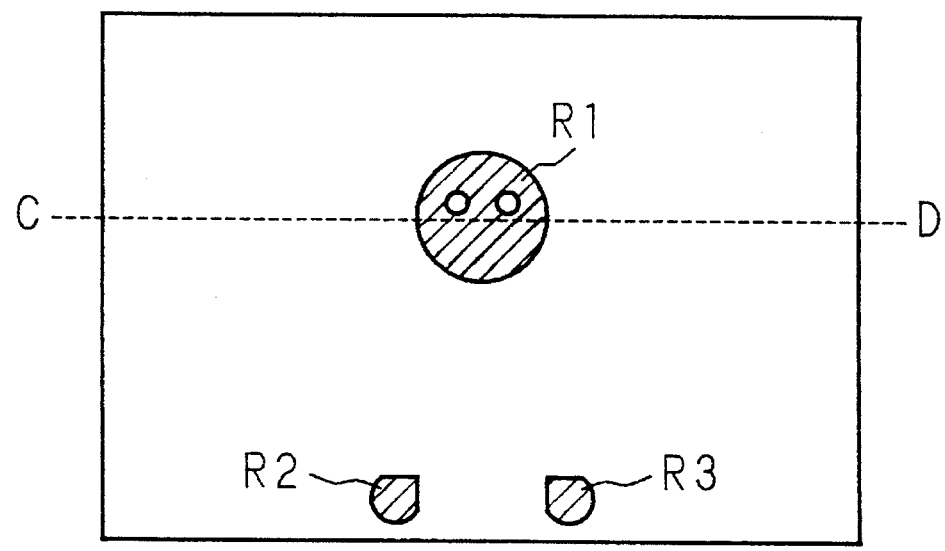
FIGS. 17(a)–(b) is a diagram showing flesh-tone areas when the object of FIG. 16 is picked up.
Figure 17B:

Next, the operation of the flesh-tone detector 101 of FIG. 10 will be described below. An R-Y color-difference signal is applied to the R-Y color-difference signal input terminal 102, and a B-Y color-difference signal is applied to the B-Y color-difference input terminal 103. These color-difference signals are input to the memory 105 as addresses. The memory 105 contains a table as shown in FIG. 15. In the table, natural numbers are written only in specific areas, and 0s are written in other areas than the specific areas The numbers designate the color signal saturation level. Turning back to FIG. 10, a luminance signal is applied to the luminance signal input terminal 104. The comparator 106 detects whether the value of an output, signal from the memory 105 lies within a certain range determined relative to the level of the luminance signal entered through the luminance signal input terminal 104. For example, in the table of FIG. 15, suppose that the output of the memory 105 is judged as representing flesh-tone color when it is within the range from ½ to ⅛ of the luminanee signal level. Then, when the level of the luminanee signal applied to the luminance signal input terminal 104 is 14, the output signal of the memory 15 that satisfies the above range is in the range from 7 to 1. Therefore, when the R-Y color-difference signal and B-Y color-difference signal that come inside the frame shown in FIG. 15 are entered, the R-Y and B-Y color-difference signals are judged as representing a flesh-tone area and the comparator 106 outputs a "High". The output signal of the comparator 106 is output at the flesh-tone detection signal output terminal 107 as a flesh-tone detection signal. With the above configuration, the flesh-tone area that satisfies Expressions 1, 2, 8, and 4 can be detected. When a human figure shown in FIG. 16 is picked up through the flesh-tone detector 101 of the above configuration, flesh-tone detection signals representing the areas (R1, R2, R3) indicated by oblique hatching in FIG. 17(a) are output at the flesh-tone detection signal output terminal 107, and a signal waveform as shown in FIG. 17(b) is obtained when the line C-D in FIG. 17(a) is scanned horizontally. Clearly, the same signal processing as described above can also be applied to the color-difference signals matrixed along the I and Q axes.

(Embodiment 3)

Figure 18:
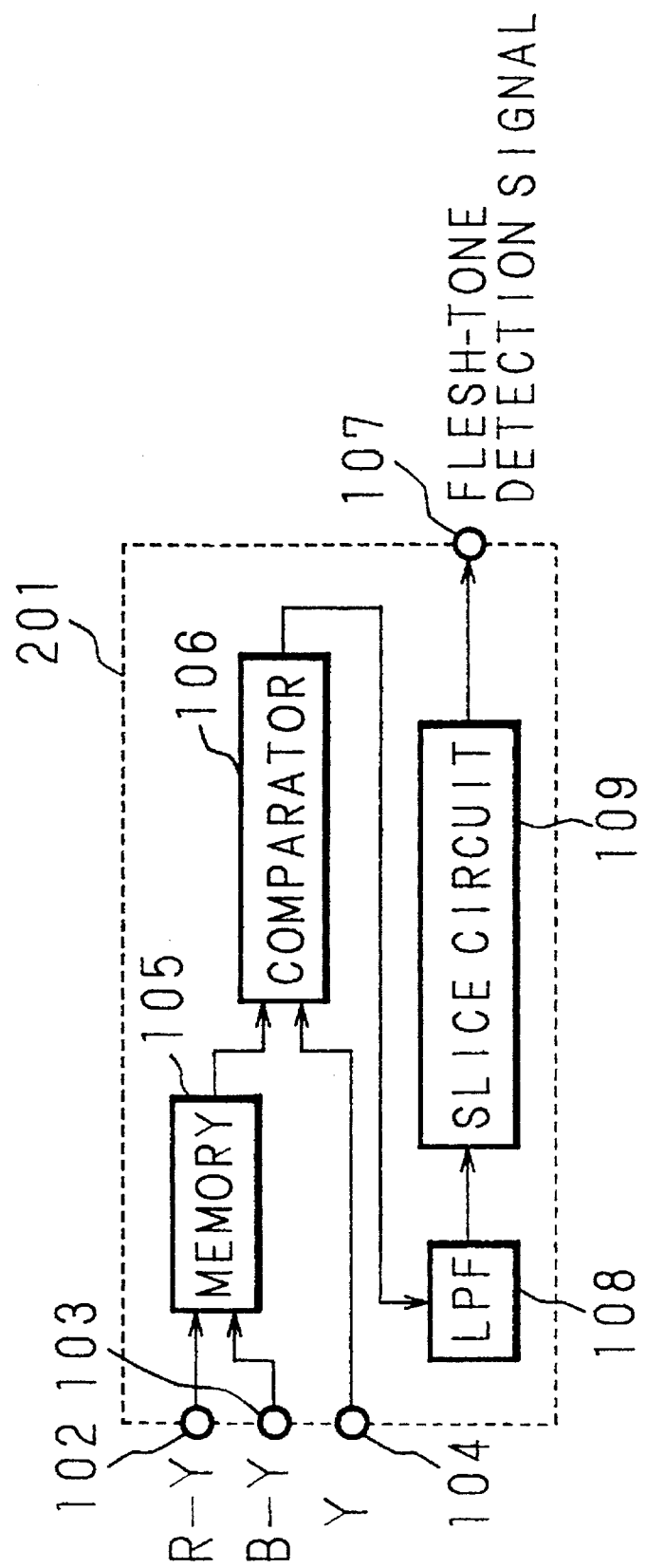
FIG. 18 is a block diagram showing the configuration of another flesh-tone detector.
Figure 20:
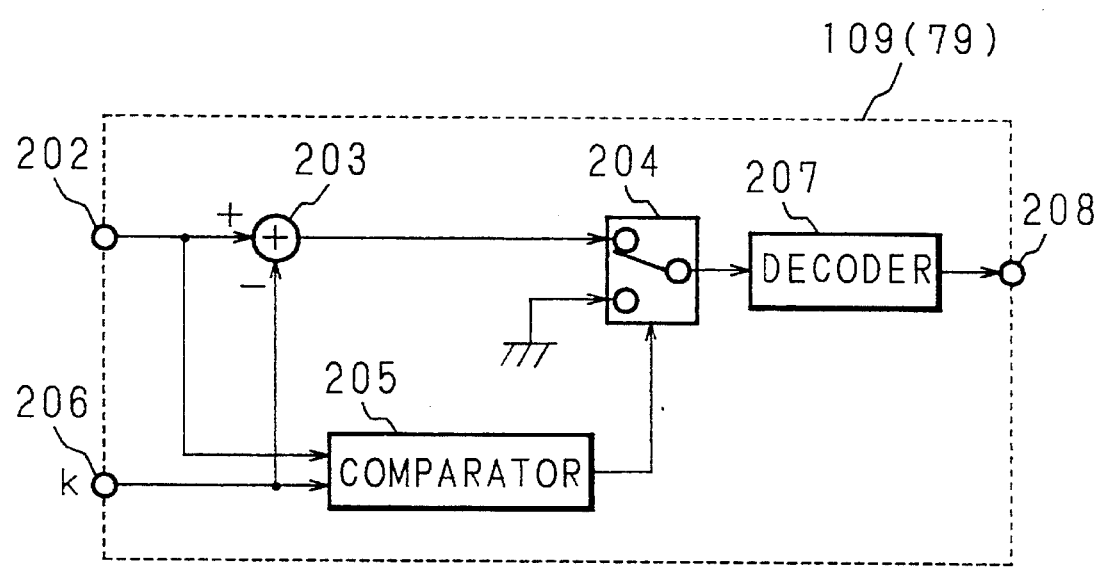
FIG. 20 is a block diagram showing the configuration of a slice circuit in FIG. 18.

FIG. 18 is a block diagram showing the configuration of a flesh-tone detector 201 For detecting flesh-tone areas according to a third embodiment. In FIG. 18, the same reference numerals as those in FIG. 10 designate the same or corresponding parts. Further in FIG. 18, the reference numeral 108 designates a low-pass filter (LPF), and 109 denotes a slice circuit. The slice circuit 109 is a circuit that slices an output signal from the LPF 108 by the value of a predetermined constant k. A detailed configuration of this circuit is shown in FIG. 20 wherein the reference numeral 202 is an input terminal to which an output signal from the LPF 108 is applied, 203 is an adder, 204 is a switch, 205 is a comparator, 206 is an input terminal at which the value of the constant k for slicing is input, 207 is a decoder, and 208 is an output terminal.

Figures 19A, 19B:
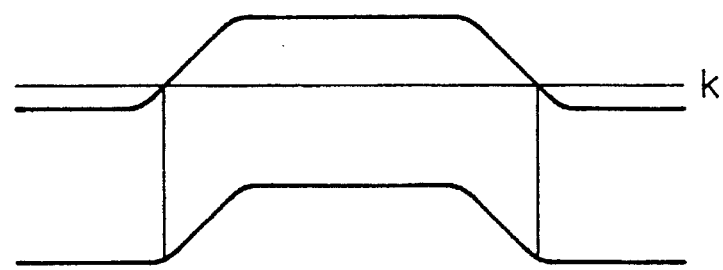
FIGS. 19(a)–(b) is a diagram showing an output waveform of the flesh-tone detector of FIG. 18.

Next, the operation in this embodiment will be described below. The operation in which the R-Y color-difference signal, B-Y color-difference signal, and luminance signal input at the respective input terminal 102, 103, and 104 are fed to the comparator 106, is the same as that the second embodiment, and therefore, is not described here. The output of the comparator 106 is passed through the LPF 108 to extract only low-frequency components. The resulting waveform is as shown by (a) in FIG. 19. This signal is sliced by the slice circuit 109. That is, every part below a predetermined value is made equal to the predetermined value, and the entire level is reduced so that the predetermined value of the signal becomes 0. The output signal of the LPF 108, entered via the input terminal 202, is reduced by the adder 203 by the value of the constant k. The comparator 205 compares the output signal of the LPF 108 with the constant k, and when the output signal is larger than the constant k, outputs a select signal to the switch 204 to select the output signal of the adder 203. The switch 204 selects a "Low" when the output signal of the LPF 108 is smaller than the constant k. The decoder 207 pass the signal output from the switch merely. As a result, the output signal of the decoder 207 that appears at the output terminal 208 has a waveform as shown by (b) in FIG. This signal is output at the flesh-tone detection signal output terminal 107 as a flesh-tone detection signal.

(Embodiment 4)

Figure 21:
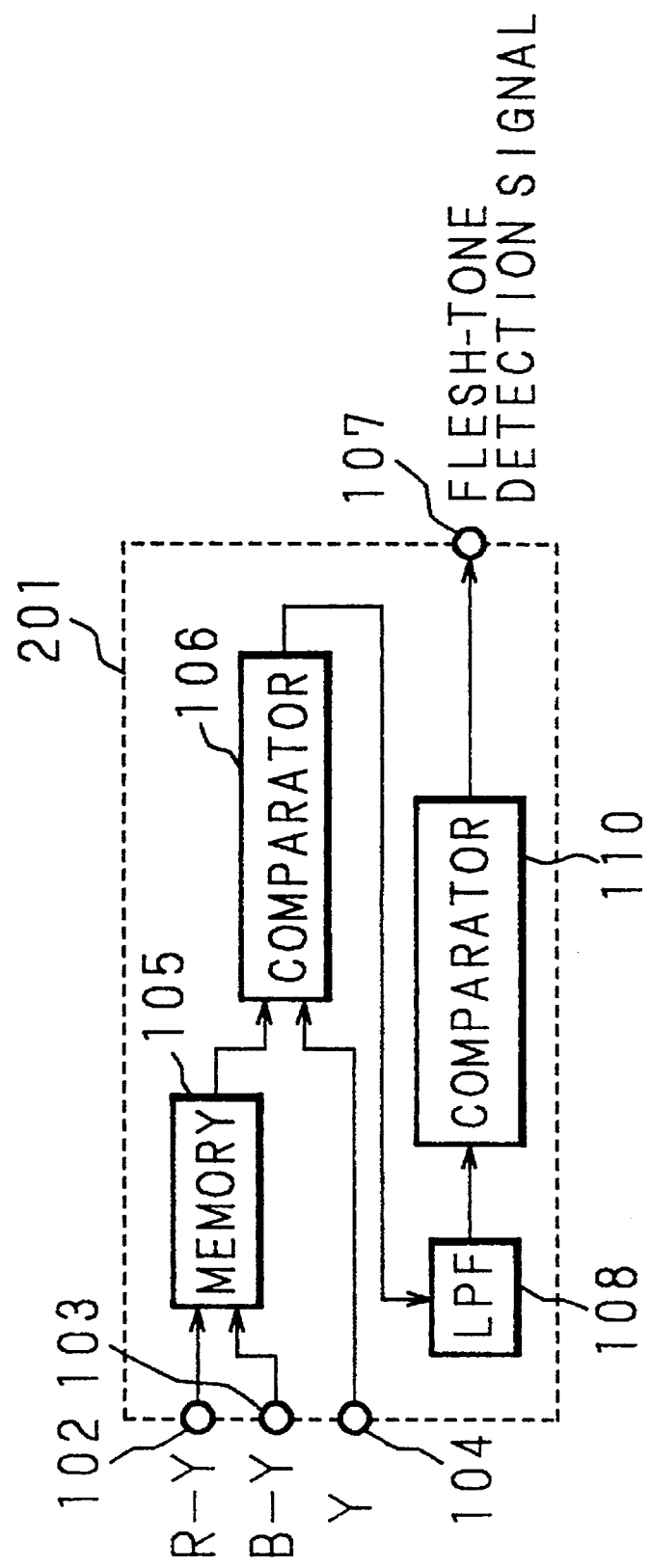
FIG. 21 is a block diagram showing the configuration of still another flesh-tone detector.
Figures 22A, 22B:
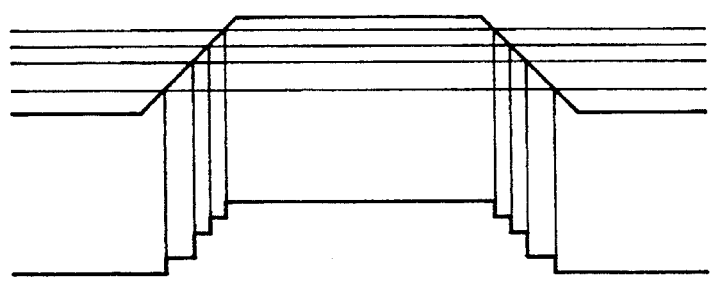
FIGS. 22(a)–(b) is a diagram showing an output waveform of the flesh-tone detector of FIG. 21.

FIG. 21 is a block diagram showing the configuration of a flesh-tone detector 301. For detecting flesh-tone areas in the fourth embodiment. In FIG. 21, the same reference numerals as those in FIG. 18 designate the same or corresponding parts. Further in FIG. 21, the reference numeral 110 designates a comparator. The comparator 110, as shown in FIG. 22 (a), compares some constants with the flesh-tone detection signal, thereby forming a waveform shown in FIG. FIG. 22 (b).

Next, the operation in this embodiment will be described below. The operation in which the R-Y color-difference signal, B-Y color-difference signal, and luminanee signal input at the respective input terminals 102, 103, and 104 are fed to the comparator 106, is the same as that in the second embodiment, and therefore, is not described here. The output of the comparator 106 is passed through the LPF 108 to extract only low-frequency components. The resulting waveform is as shown by (a) in FIG. 22. The comparator 110 then splits the signal into several levels according to the output. Such processed signal is output at the flesh-tone detection signal output terminal 107 as a flesh-tone detection signal. The flesh-tone detection signal has a waveform as shown by (b) in FIG. 22.

The above embodiments 2, 3, and 4, show how flesh-tone area can be detected, but the process can also be applied to detection of other designated color areas by rewriting the table in the memory 105.

(Embodiment 5)

Figure 23:
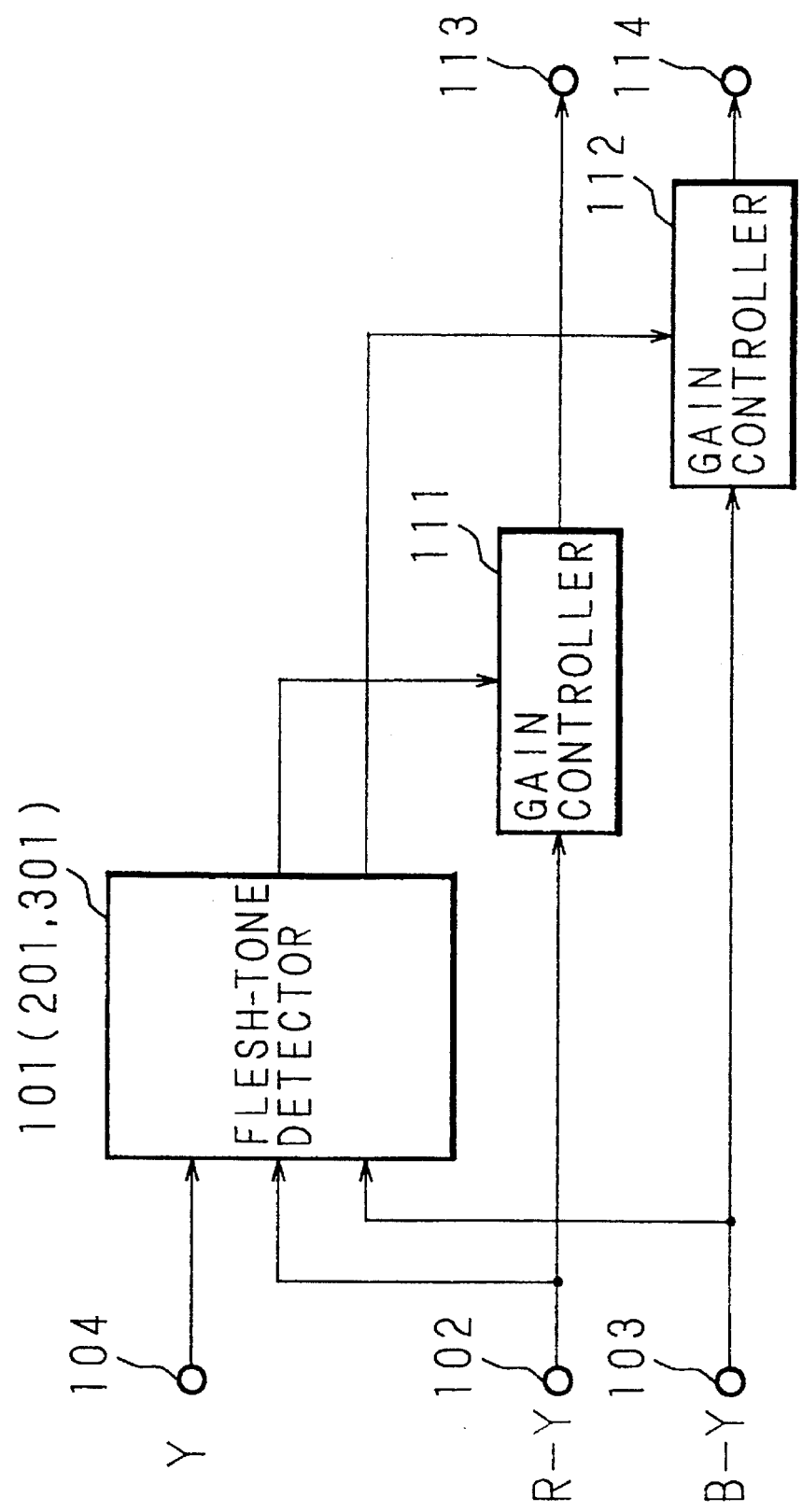
FIG. 23 is a block diagram showing the configuration of a video signal processor according to the present invention.

A fifth embodiment will be described below therein the gains of the color-difference signals axle controlled when a flesh-tone area is detected. FIG. 23 is a block diagram showing the configuration of the fifth embodiment. In FIG. 23, the same reference numerals as those in FIG. 10 designate the same or corresponding parts. Further in FIG. 23, the reference numerals 111 and 112 designate gain controllers, 113 refers to an R-Y color-difference signal output terminal, and 114 denotes a B-Y color-difference signal output terminal.

Figure 24:
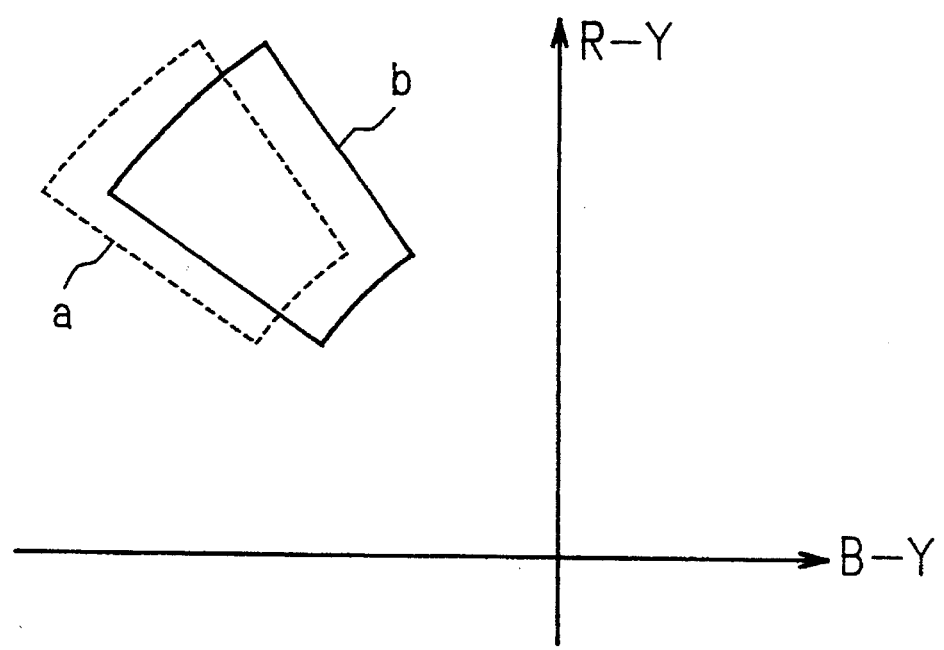
FIG. 24 is a diagram showing an example of color correction for the flesh-tone area.

Next, the operation in this embodiment will be described below. Color-difference signals applied to the R-Y color-difference signal input terminal 102 and B-Y color-difference signal input terminal 103 are transferred to the flesh-tone detector 101, as well as to the gain controllers 111 and 112, respectively. The flesh-tone detector 101, in accordance with the second embodiment, detects a flesh-tone area from the color-difference signals and the luminance signal fed through the luminance signal input terminal 104. When the video signals lie within the designated flesh-tone area, the flesh-tone detector 101 outputs control signals to the gain controllers 111 and 112. The R-Y color-difference signal, with its gain controlled by the gain controller 111, is output at the R-Y color-difference signal output terminal 113. On the other hand, the B-Y color-difference signal, with its gain controlled by the gain controller 112, is output at the B-Y color-difference signal output terminal 114. More specifically, when a flesh-tone area is detected, the gain of the R-Y color-difference signal is raised and the gain of the B-Y color-difference signal is lowered. In FIG. 24, "a" indicates the flesh-tone area detected by the flesh-tone detector 101, and by controlling the gains of the color-difference signals as described above, the flesh-tone area can be shifted to the area indicated by "b" in FIG. 24. This gives a reddish tone to the color of the flesh-tone area, thus achieving correction to produce flesh color close to the human sensation of the color.

(Embodiment 6)

Figure 25:
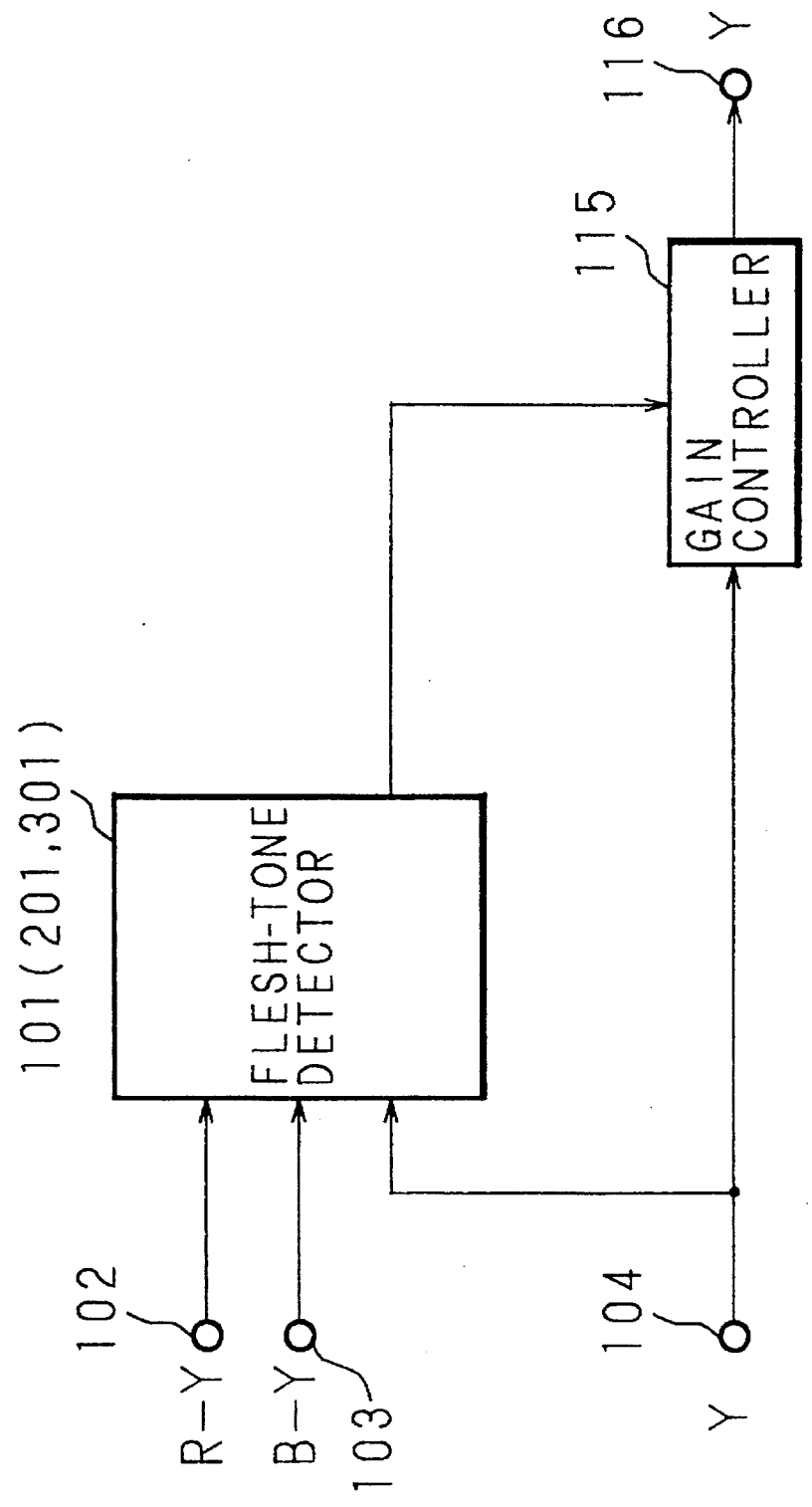
FIG. 25 is a block diagram showing the configuration of a video signal processor according to another embodiment of the invention.

A sixth embodiment will be described below wherein the gain of the luminance signal is controlled When a flesh-tone area is detected. FIG. 25 is a block diagram showing the configuration of the sixth embodiment. In FIG. 25, the same reference numerals as those in FIG. 10 designate the same or corresponding parts. Further in FIG. 25, the reference numeral 115 designates a gain controller, and 116 indicates a luminance signal output terminal.

Next, the operation in this embodiment will be described below. Color-difference signals applied to the R-Y color-difference signal input terminal 102 and B-Y color-difference signal input terminal 103 are transferred to the flesh-tone detector 101, A luminanee signal applied to the luminance signal input terminal 104 is fed to the flesh-tone detector 101, and also to the gain controller 115. The flesh-tone detector 101, in accordance with the second embodiment, detects a flesh-tone area from the luminance signal and the color-difference signals. When the video signals lie within the designated flesh-tone area, the flesh-tone detector 101 outputs a control signal to the gain controller 115. In accordance with the control signal, the gain controller 115 raises the gain of the luminance signal and outputs the luminance signal through the luminance signal output terminal 116. This increases the luminance of the flesh-tone area, achieving correction to produce flesh color close to the human sensation of the color.

(Embodiment 7)

Figure 26:
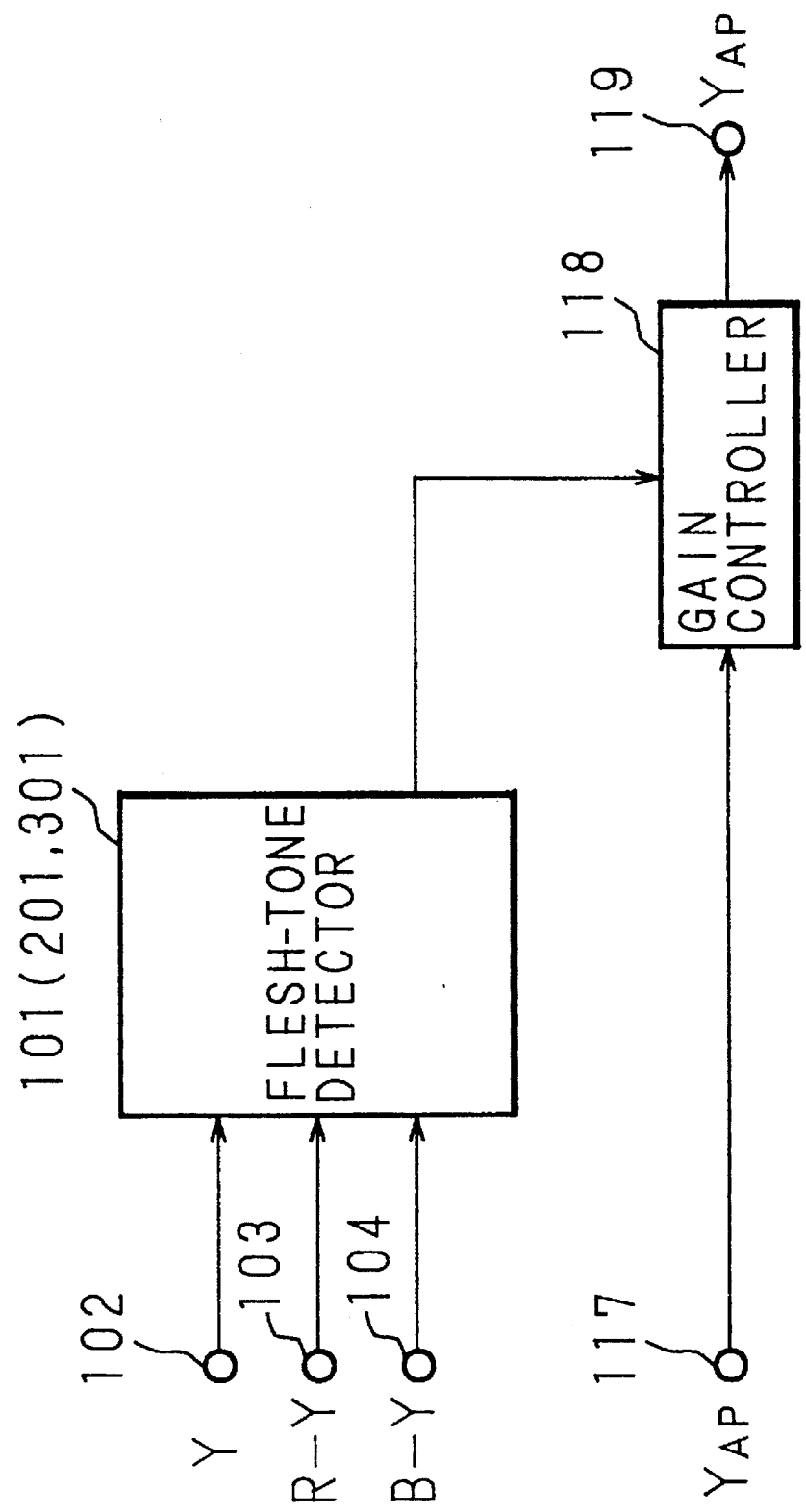
FIG. 26 is a block diagram showing the configuration of a video signal processor according to a further embodiment of the invention.

A seventh embodiment will be described below wherein the gain of an aperture correction signal is controlled when a flesh-tone area is detected. FIG. 26 is a block diagram showing the configuration of the seventh embodiment In FIG. 26, the same reference numerals as those in FIG. 10 designate the same or corresponding parts. Further in FIG. 26, the reference numeral 117 designates an aperture correction signal input terminal, 118 indicates a gain controller, and 119 denotes an aperture correction signal output terminal.

Next, the operation in this embodiment will be described below. Color-difference signals applied to the R-Y color-difference signal input terminal 102 and B-Y color-difference signal input terminal 103 and the luminance signal applied to the luminance signal input terminal 104 are fed to the flesh-tone detector 101. On the other hand, the aperture correction signal applied to the aperture correction signal input terminal 117 is fed to the gain controller 118. The flesh-tone detector 101, in accordance with the second embodiment, detects a flesh-tone area from the luminance signal and the color-difference signals. When the video signals lie within the designated flesh-tone area, the flesh-tone detector 101 outputs a control signal to the gain controller 118. In accordance with the control signal, the gain controller 118 lowers the gain of the aperture correction signal and outputs the aperture correction signal through the aperture correction signal output terminal 119. Thus, wrinkles in the human skin can be deemphasized.

(Embodiment 8)

Figure 27:
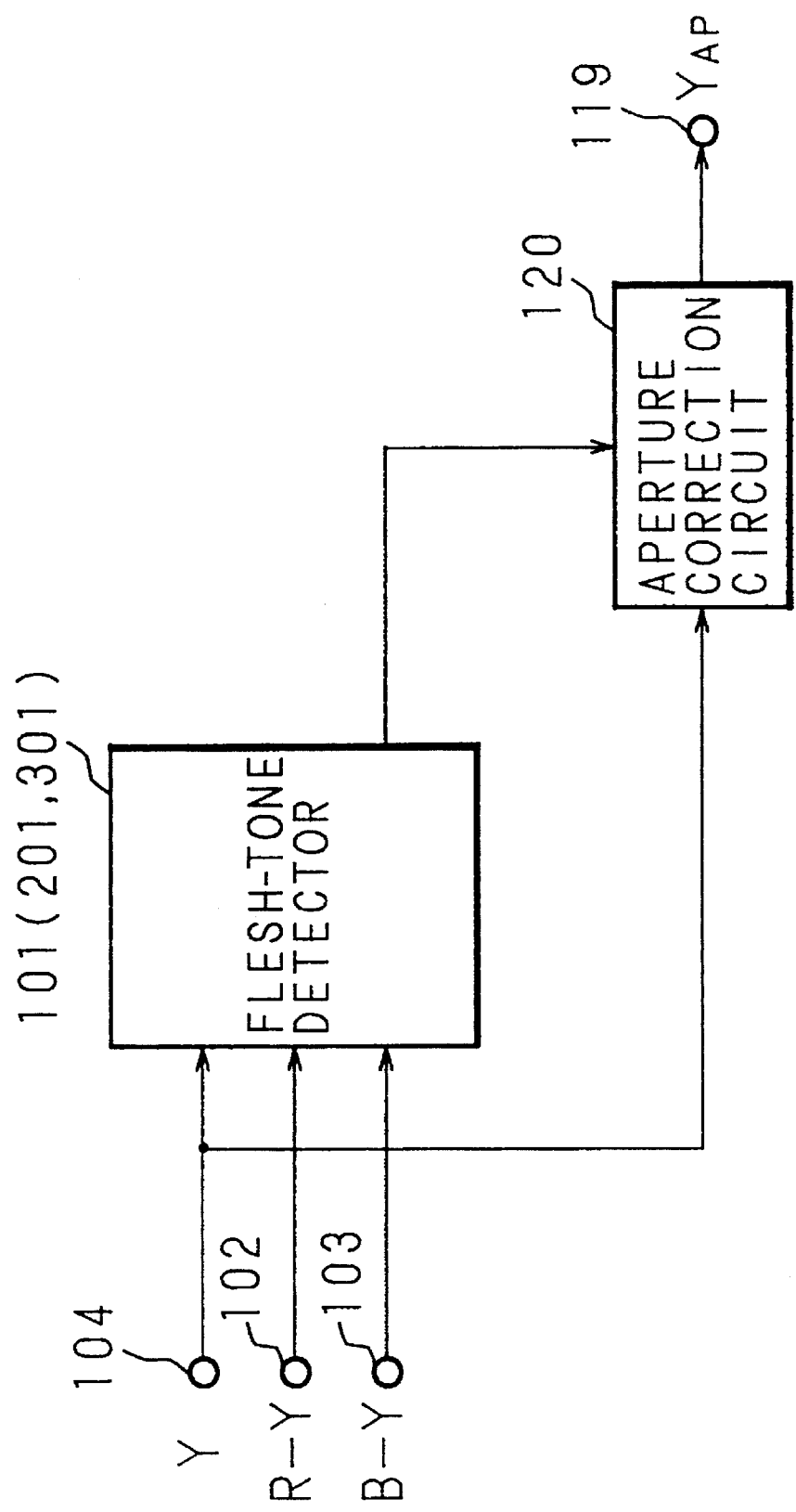
FIG. 27 is a block diagram showing the configuration of a video signal processor according to a further embodiment of the invention.

An eighth embodiment will be described below wherein the frequency characteristic of aperture correction signal is controlled when a flesh-tone area is detected. FIG. 27 is a block diagram showing the configuration of the sixth embodiment. In FIG. 27, the same reference numerals as those in FIG. 26 designate the same or corresponding parts. Further, in FIG. 27, the reference numeral 120 designates an aperture correction circuit that produces an aperture signal and that can vary the frequency characteristic thereof.

Next, the operation of this embodiment will be described below. Color-difference signals applied to the R-Y color-difference signal input terminal 102 and B-Y color-difference signal input terminal 103 and the luminance signal applied to the luminance signal input terminal 104 are fed to the flesh-tone detector 101. The flesh-tone detector 101, in accordance with the second embodiment, detects a flesh-tone area from the luminance signal and the color-difference signals. The luminance signal is also fed to the aperture correction circuit 120 for production of an aperture correction signal. When the video signals lie within the designated flesh-tone area, the flesh-tone detector 101 outputs control signals to the aperture correction circuit 120. In accordance with the control signals, the aperture correction circuit 120 varies the frequency characteristic of the aperture correction signal to be produced and outputs the aperture correction signal through the apexture correction signal output terminal 119. Thus natural-looking wrinkles can be reproduced.

Figure 28:
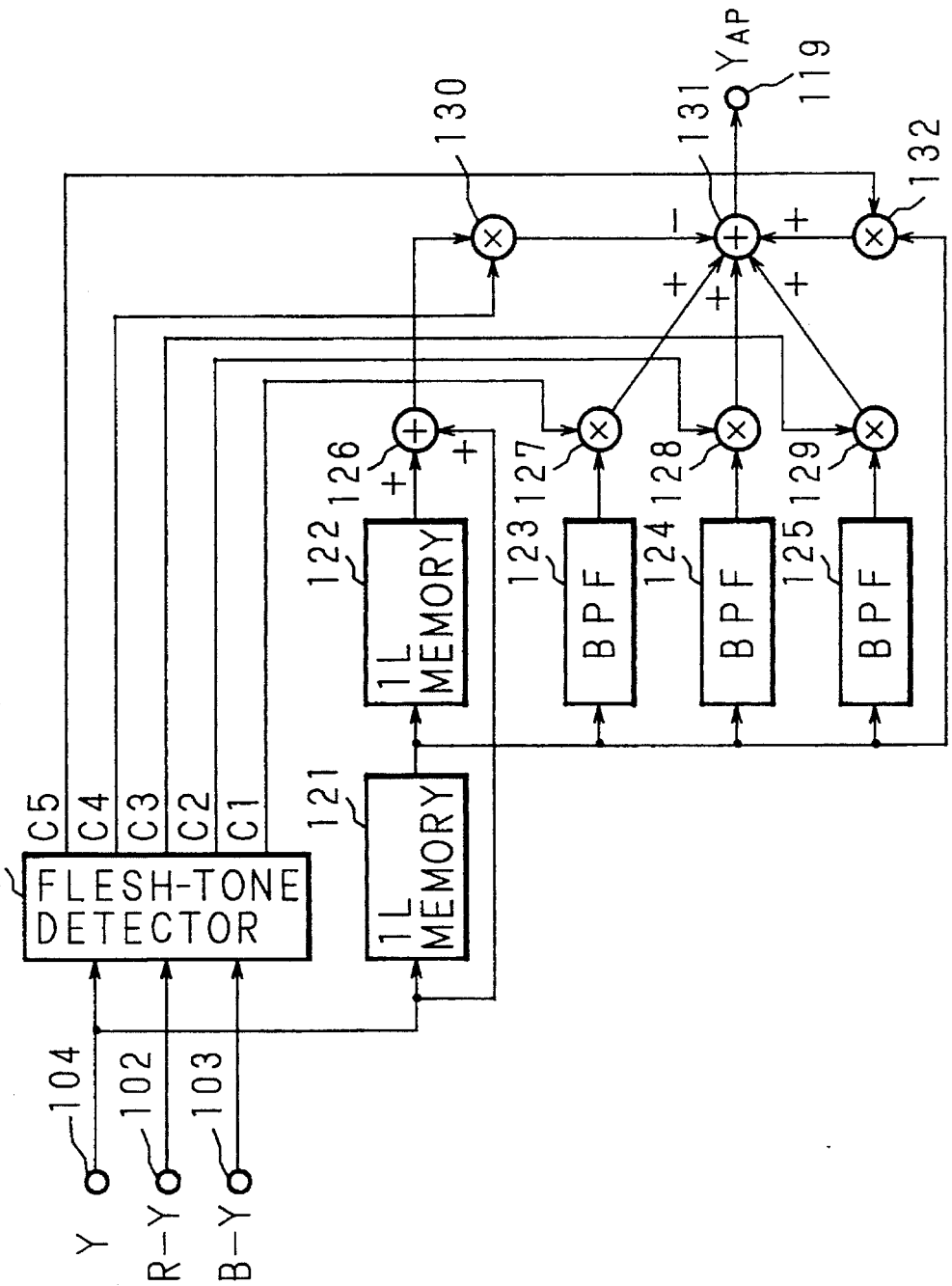
FIG. 28 is a diagram showing the configuration of an aperture correction circuit in FIG. 27.

FIG. 28 is a block diagram showing the internal configuration of the aperture correction circuit 120 of FIG. 27. In FIG. 28, the reference numerals 121 and 122 designate one-line memories, the numerals 123, 124, and 125 indicate band-pass filters (BPF) each of which has a different pass band characteristic, the numerals 126 and 131 denote adders, and the numerals 127, 128, 129, 130, and 132 designate multipliers.

Next, the operation in the aperture correction circuit 120 will be described below. The luminance signal applied to the luminance signal input terminal 104 is fed through the one-line memory 121 and input to the BPFs 123, 124, and 125. The BPFs which have different pass band characteristics produce horizontal aperture correction signals each of which have a different frequency characteristic. The signals output from the BPFs 123, 124, and 125 are fed to the multipliers 127, 128, and 129, respectively, where they are multiplied by respective constants C1, C2, and CS. Thus, by varying the gains of the horizontal aperture correction signals by the values of C1, C2, and CS, and by adding the output signals of the multipliers by the adder 131, aperture correction signals having different frequency characteristics can be produced. On the other hand, a vertical aperture correction signal is produced using the one-line memories 121 and 122, the adder 126, and the adder 131. The multipliers 130 and 132 change the gain of the vertical aperture correction signal. With the aperture correction circuit including a plurality of BPFs which have different pass band characteristics, as described above, the frequency characteristic of the aperture correction can be varied by the control signals C1, C2, and C3. When the video signals lie within the designated flesh-tone area, the flesh-tone detector 101 outputs control signals C1, C2, C3, C4 and C5. By these control signals, the characteristic of the aperture correction signal is varied, the aperture correction signal being output through the aperture correction signal output terminal 119.

(Embodiment 9)

A ninth embodiment concerns an example wherein configuration of the fifth embodiment is so adapted as to detect the flesh-tone area in accordance with the third embodiment. In this example, the gains of the R-Y and color-difference signals are varied by the gain controllers 111 and 112 to match the waveform of the flesh-tone detection signal. As a result, the gains of the color-difference signals gradually change near the boundaries between the flesh color and other colors without causing an unnatural change.

(Embodiment 10)

A 10th embodiment concerns an example wherein the configuration of the fifth embodiment is so adapted as to detect the flesh-tone area in accordance with the fourth embodiment. In this example also, the gaines of the R-Y and B-Y color-difference signals are varied by the gain controllers 111 and 112 to match the waveform of the flesh-tone detection signal. As a result, the gains of the color-difference signals gradually change near the boundaries between the flesh color and other colors without causing an unnatural change.

(Embodiment 11)

An 11th embodiment concerns an example wherein the configuration of the sixth embodiment is so adapted as to detect the flesh-tone area in accordance with the third embodiment. In this example, the gain of the luminance signal is varied by the gain controller 115 to match the waveform of the flesh-tone detection signal. As a result, the gain of the luminance signal gradually changes near the neighborhood of the boundaries between the flesh color and other colors without causing an unnatural change.

(Embodiment 12)

A 12th embodiment concerns an example wherein the configuration of the sixth embodiment is so adapted as to detect the flesh-tone area in accordance with the fourth embodiment. In this example also, the gain of the luminance signal is varied by the gain controller 115 to match the waveform of the flesh-tone detection signal. As a result, the gain of the luminance signal gradually changes near the boundaries between the flesh color and other colors without causing an unnatural change.

(Embodiment 13)

A 13th embodiment concerns an example wherein the configuration of the seventh embodiment is so adapted as to detect the flesh-tone area in accordance with the third embodiment. In this example, the gain of the aperture correction signal is varied by the gain controller 118 to match the waveform of the flesh-tone detection signal. As a result, the gain of the aperture correction signal gradually changes near the boundaries between the flesh color and other colors without causing an unnatural change.

(Embodiment 14)

A 14th embodiment concerns an example wherein the configuration of the seventh embodiment is so adapted as to detect the flesh-tone area in accordance with the fourth embodiment. In this example also, the gain of the aperture correction signal is varied by the gain controller 118 to match the waveform of the flesh-tone detection signal. As a result, the gain of the aperture correction signal gradually changes in near the neighborhood of the boundaries between the flesh color and other colors without causing an unnatural change.

(Embodiment 15)

Figure 29:
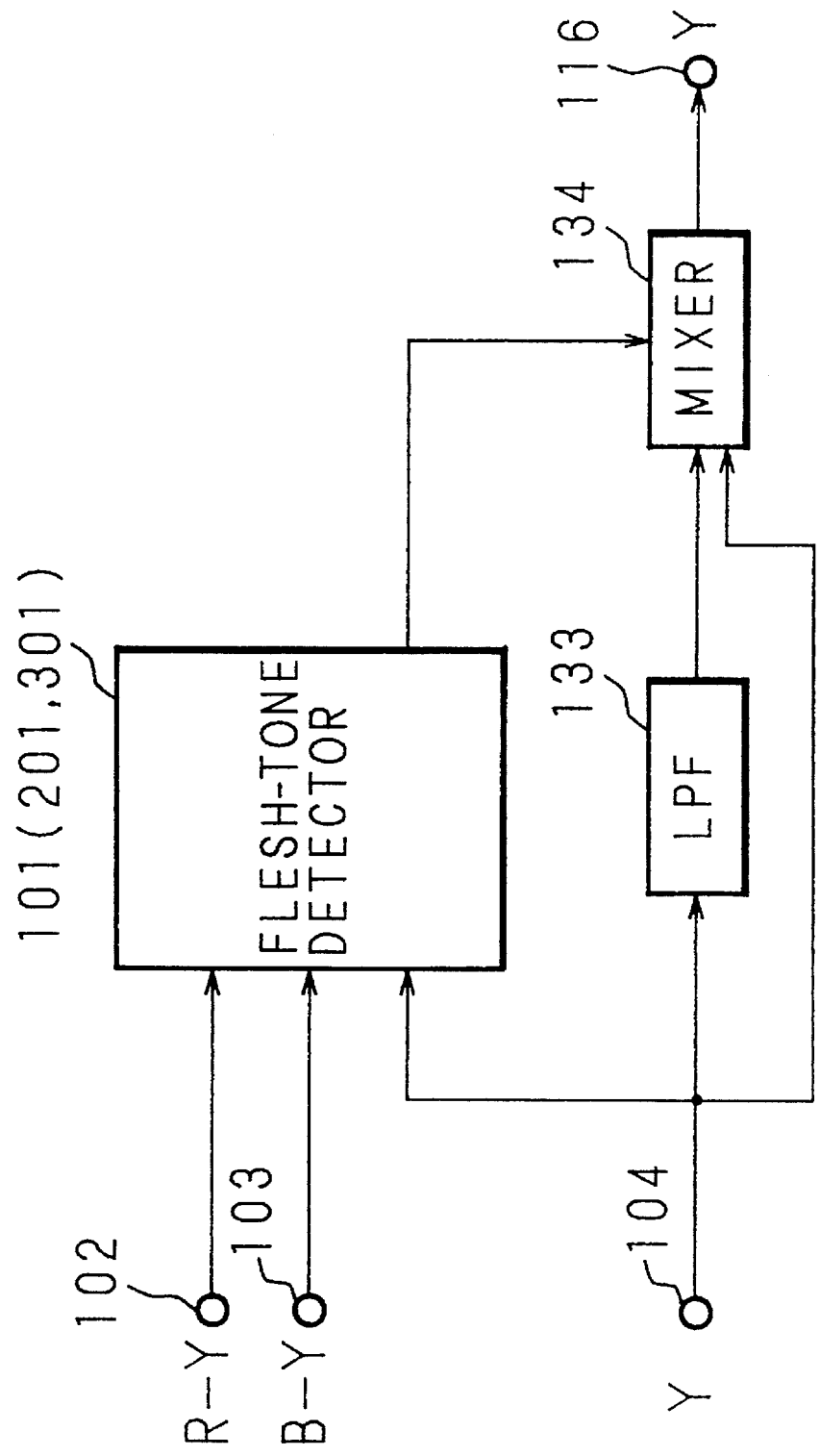
FIG. 29 is a block diagram showing the configuration of a video signal processor according to a further embodiment of the invention.

A 15th embodiment will be described below wherein the frequency characteristic of the luminance signal is control when a flesh-tone area is detected. FIG. 29 is a block diagram showing the configuration of the 15th embodiment. In FIG. 29, the same reference numerals as those in FIG. 10 designate the same or corresponding parts. Further in FIG. 29, the reference numeral 133 designates an LPF, and 134 denotes a mixer.

Next, the operation in this embodiment will be described below. Color-difference signals applied to the color-difference signal input terminal 102 and B-Y color-difference signal input terminal 103 and the luminance signal applied to the luminance signal input terminal 104 are fed to the flesh-tone detector 101. The flesh-tone detector 101, in accordance with the second embodiment, detects a flesh-tone area from the luminance signal and the color-difference signals. The luminance signal is also fed to the LPF 133 and the mixer 134. When the video signals lie within the designated flesh-tone area, the flesh-tone detector 101 outputs a control signal to the mixer 134. The control signal varies the mixing ratio in which the output of the LPF 133 is mixed with the original luminance signal, and then the thus processed luminance signal is output through the luminance signal output terminal 116. For the flesh-tone area, the proportion of the output of the LPF 133 to be mixed is increased. Thus, the high-frequency components in the flesh-tone area are surpressed thereby deemphasizing wrinkles in the human skin.

(Embodiment 16)

A 16th embodiment concerns an example wherein the configuration of the 15th embodiment is so adapted as to detect the flesh-tone area in accordance with the third embodiment. In this example, the mixing ratio in the mixer 134 is varied to match the waveform of the flesh-tone detection signal. As a result, the mixing ratio gradually changes near the boundaries between the flesh color and other colors without causing an unnatural change.

(Embodiment 17)

17th embodiment concerns an example wherein the configuration of the 15th embodiment is so adapted as to detect the flesh-tone area in accordance with the fourth embodiment. In this example also, the mixing ratio in the mixer 134 is varied to match the waveform of the flesh-tone detection signal. As a result, the mixing ratio gradually changes in near the boundaries between the flesh color and other colors without causing an unnatural change.

(Embodiment 18)

Figure 30:
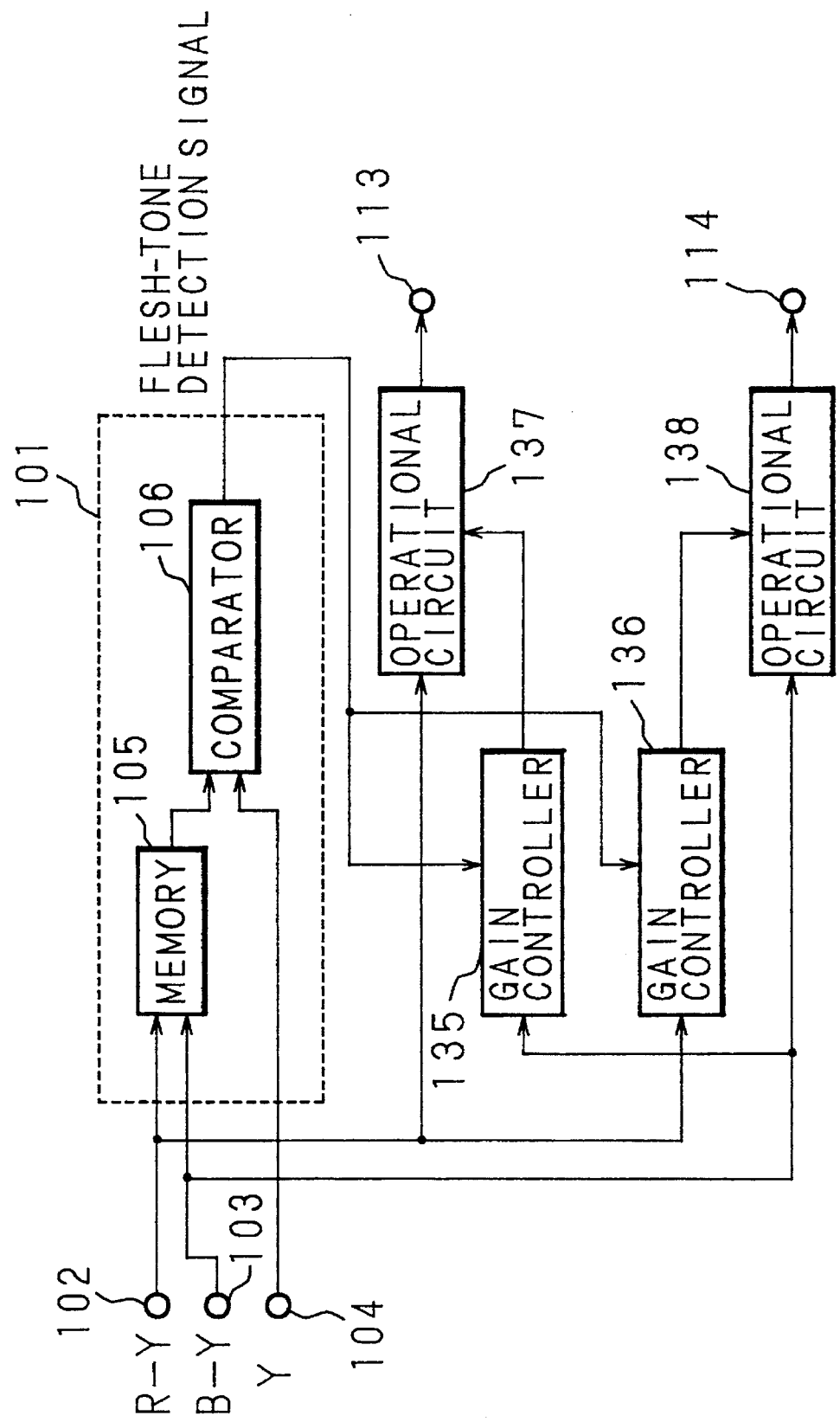
FIG. 30 is a block diagram showing the configuration of a video signal processor according to a further embodiment of the invention.

FIG. 30 is a block diagram showing the configuration of an 18th embodiment. In FIG. 30, the same reference numerals as those in FIGS. 10 and 23 designate the same or corresponding parts. Further in FIG. 30, the reference numerals 135 and 136 designate gain controllers, and 137 and 138 denote operational circuits.

Next, the operation in this embodiment will be described below. The R-Y color-difference signal and B-Y color-difference signal applied to the R-Y color-difference signal input terminal 102 and B-Y color-difference signal input terminal 103, respectively, are input into the memory 105 in the flesh-tone detector 101, while the luminance signal applied to the luminance signal input terminal 104 is supplied to the comparator 106 in the flesh-tone detector 101. In the flesh-tone detector 101, a flesh-tone area is detected, in accordance with the second embodiment, and the resulting flesh-tone detection signal is fed to the gain controllers 135 and 136. On the other hand, the R-Y color-difference signal is also fed to the gain controller 136 and operational circuit 137, and the B-Y color-difference signal is fed to the gain controller 135 and operational circuit 138.

In the gain controllers 135 and 136, gain control is performed based on the flesh-tone detection signal. The output of the gain controller 135 is supplied to the operational circuit 137, while the output of the gain controller 136 is supplied to the operational circuit 138. The operational circuits 137 and 138 perform addition or subtraction on the two input signals, and the resulting signals are output through the R-Y color-difference signal output terminal 113 and B-Y color-difference signal output terminal 114, respectively. For the flesh-tone area, control is performed so that the B-Y color-difference signal is subtracted from the R-Y color-difference signal and the R-Y color-difference signal is added to the B-Y color-difference signal. As a result, the hue is shifted from yellow toward red, thus, correction being achieved to produce flesh color close to the human sensation of the color.

(Embodiment 19)

Figure 31:
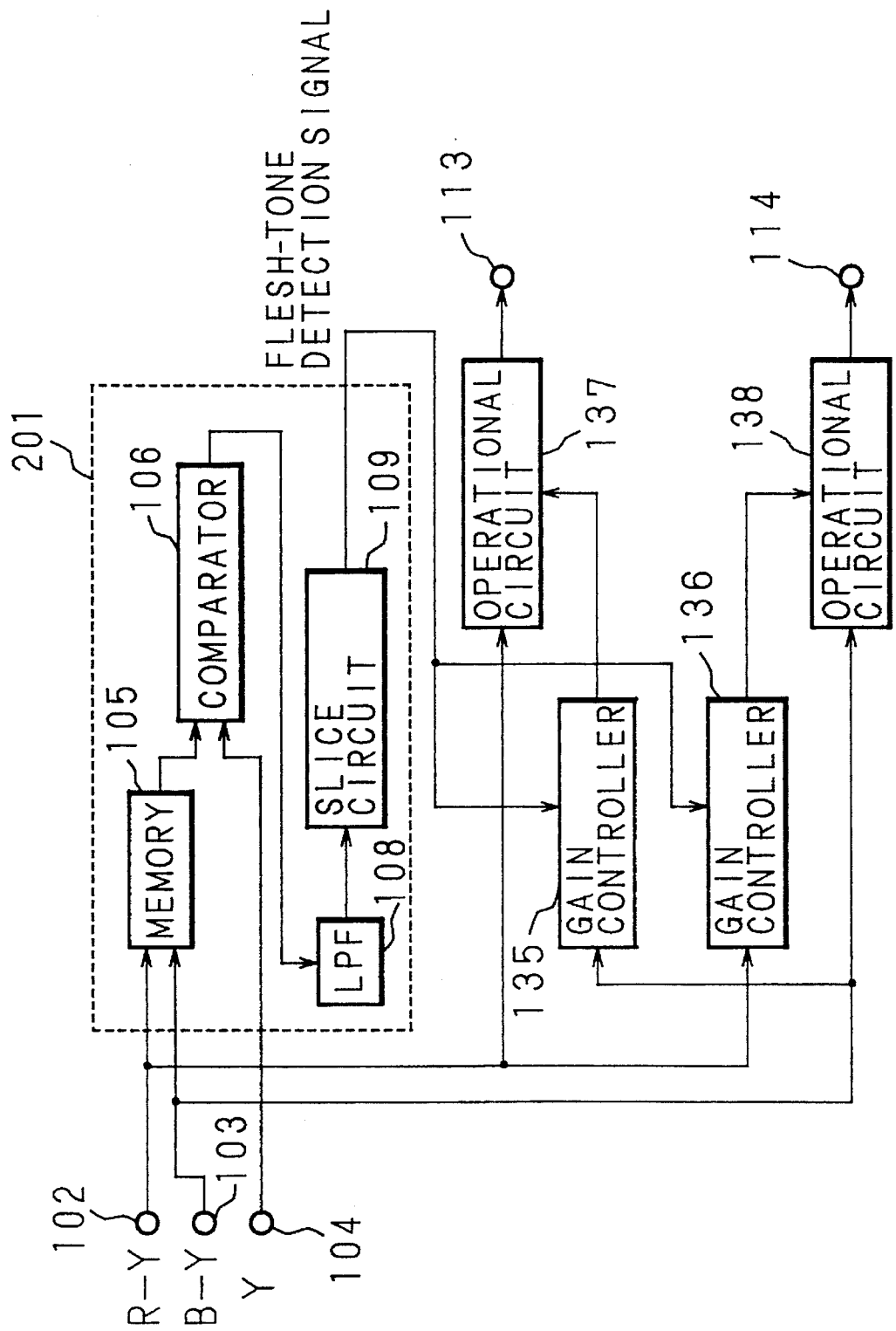
FIG. 31 is a block diagram showing the configuration of a video signal processor according to a further embodiment of the invention.

FIG. 31 is a block diagram showing the configuration of a 19th embodiment. In FIG. 31, the same reference numerals as those in FIGS. 18 and 30 designate the same or corresponding parts.

Next, the operation in this embodiment will be described below. Based on the input R-Y color-difference signal and B-Y color-difference signal, a flesh-tone area is detected in accordance with the third embodiment, and the resulting flesh-tone detection signal is output from the flesh-tone detector 201 (slice circuit 109) onto the gain controllers 135 and 136. The operation thereafter is the same as that in the above 18th embodiment, and therefore, is not described here. In this embodiment also, correction can be made to produce flesh color close to the human sensation of the color. Furthermore, since the amount of correction gradually varies near the boundaries between the flesh color and other colors, there occur no unnatural change in this area.

(Embodiment 20)

Figure 32:
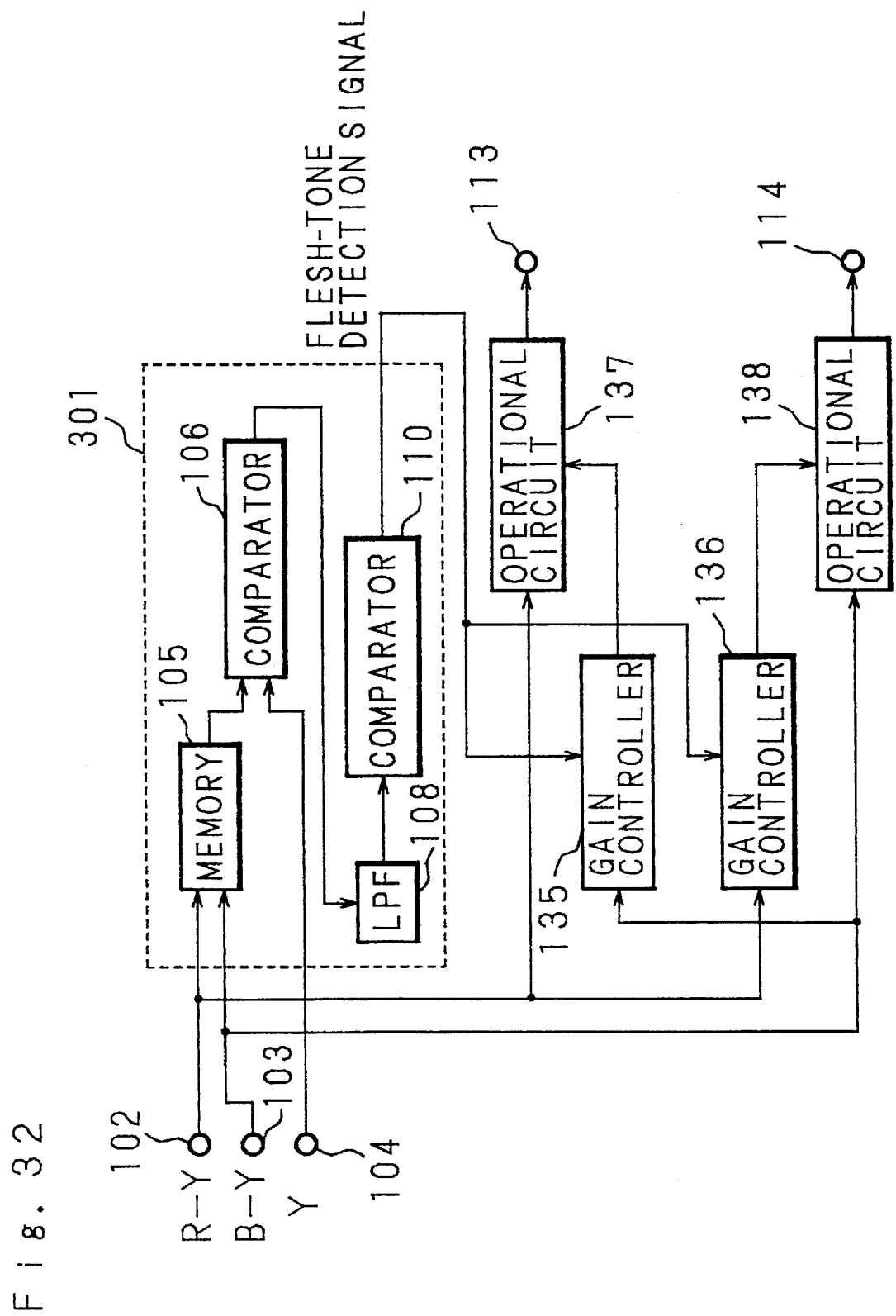
FIG. 32 is a block diagram showing the configuration of a video signal processor according to a further embodiment of the invention.

FIG. 32 is a block diagram showing the configuration of a 20th embodiment. In FIG. 32, the same reference numerals as those in FIGS. 21 and 30 designate the same or corresponding parts.

Next, the operation in this embodiment will be described below. Based on the input R-Y color-difference signal and B-Y color-difference signal, a flesh-tone area is detected in accordance with the fourth embodiment, and the resulting flesh-tone detection signal is output from the flesh-tone detector 301 (comparator 110) onto the gain controllers 135 and 136. The operation thereafter is the same as that in the 18th embodiment mentioned above, and therefore is not described here. In this embodiment also, correction can be made to produce flesh color close to the human sensation of the color. Furthermore, since the amount of correction gradually varies near the boundaries between the flesh color and other colors, there occur no unnatural changes in this area.

In the embodiments 18, 19, and 20, the addition or subtraction is performed in the operational circuits 137 and 138, but alternatively, control may be performed so that addition or subtraction is carried out on the gains in the gain controllers 135 and 136.

Further, description of the embodiments 5 to 20 has shown how the correction of the flesh-tone area color is performed, but the above embodiments can also be applied to correction of other specific-colored areas by rewriting the table in the memory 105.

(Embodiment 21)

Figure 33:
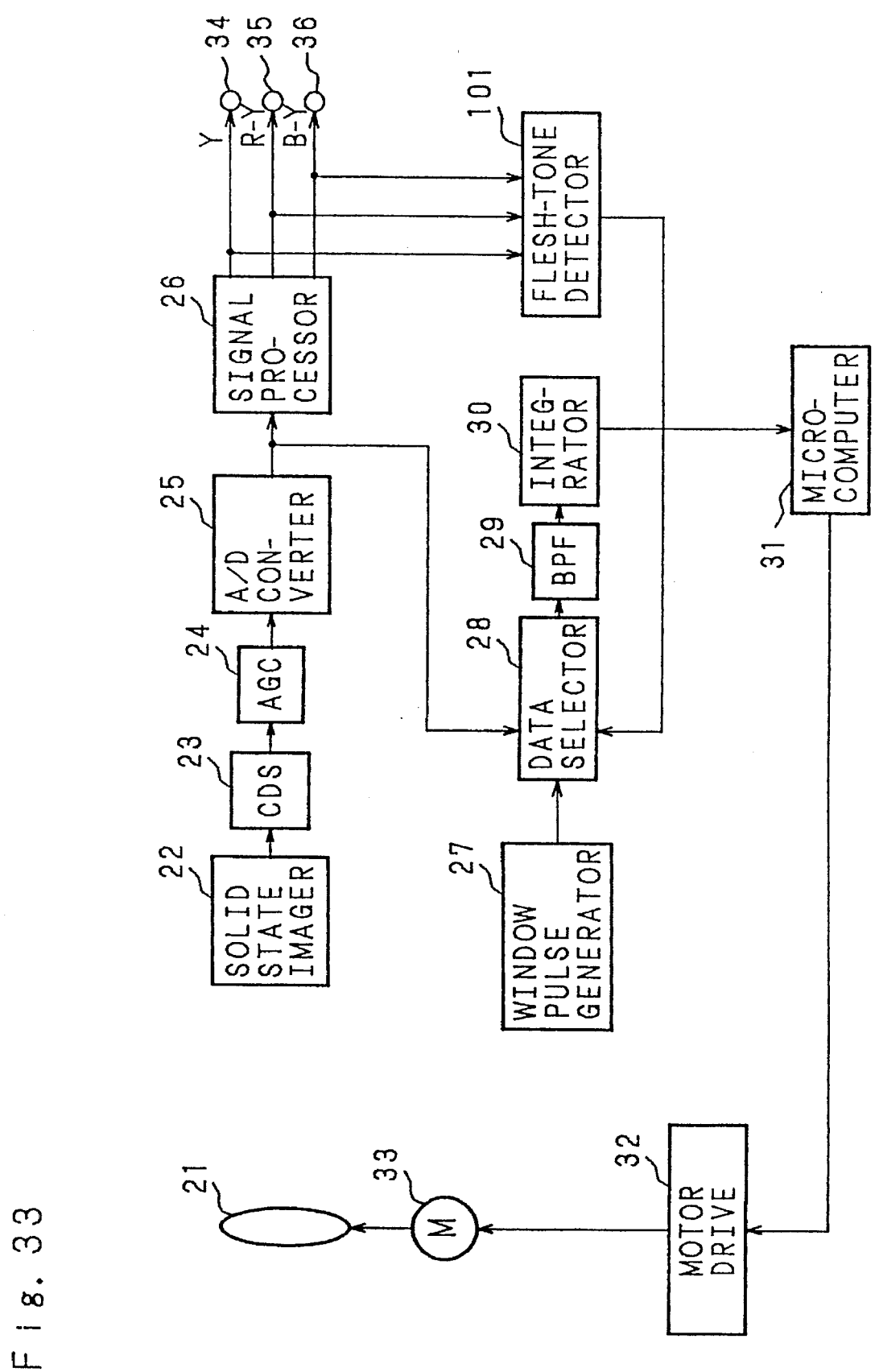
FIG. 33 is a block diagram showing the configuration of a video signal processor according to a further embodiment of the invention.

FIG. 33 is a block diagram showing the configuration of a video signal processor for a color video camera (the 21st embodiment). In FIG. 33, the reference numeral 21 is a focus lens, 22 is a solid state imager, 23 is a CDS circuit, 24 is an automatic gain controller (AGC), 25 is an A/D converter, 28 is a signal processor, 27 is a window pulse generator, 28 is a data selector, 29 is a band-pass filter (BPF), 30 is an integrator, 31 is a microcomputer, 32 is a motor drive circuit for dividing a motor 33, 33 is the motor for moving the focus lens 21, 34 is a luminance signal output terminal, 35 is an R-Y color-difference signal output terminal, 36 is a B-Y color-difference signal output terminal, and 101 is a flesh-tone detector having the internal configuration shown in FIG. 10.

Next, the operation of this embodiment will be described below. An optical image, focused through the focus lens 21, is converted by the solid state imager 22 into an electrical signal. The video signal output from the solid state imager 22 is fed to the CDS circuit 22 where only signal components are extracted and fed to the AGC 24. AGC 24 controls the gain of the video signal so that the video signal is maintained at a constant level. The video signal is then supplied to the A/D converter 25 where the video signal is converted into digital form. The video signal digitized by the A/D converter 25 is fed to the signal processor 26 as well as to the data selector 28. The signal processor 26 performs signal processing, such as color separation and matrixing, to produce the luminance signal, R-Y color-difference signal, and B-Y color-difference signal.

Figure 34:
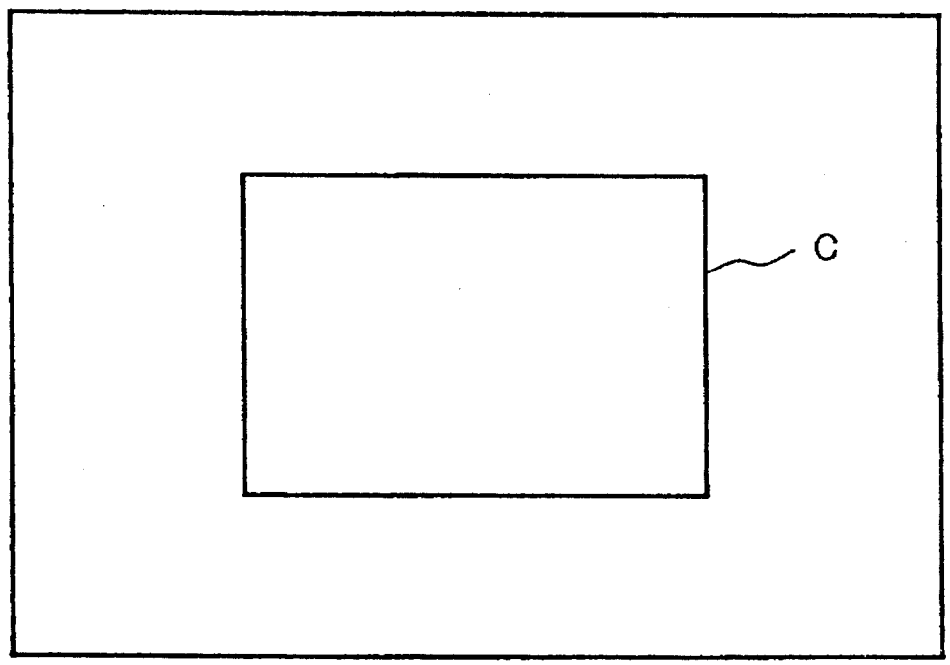
FIG. 34 is a diagram showing an area designating a picture frame.

The window pulse generator 27 supplies window pulses to the data selector 28 to determine a picture frame c as shown in FIG. 34. The data selector 28 extracts only data that lie inside the picture frame c, shown in FIG. 34, which is determined by the window pulse generator 27. The video signal output from the data selector 28 is fed to the BPF 29 through which frequency components necessary for auto focusing are passed, and then fed to the integrator 30. The integrator 30 integrates the thus input signal for each field and supplies the result to the microcomputer 31 as a focus evaluation value. The microcomputer 31 moves the focus lens 21 by means of the motor drive circuit 32 and motor 33 to a point where the focus evaluation value becomes the greatest, thereby bringing the focus onto the object inside the picture frame c.

The luminance signal, B-Y color-difference signal, and R-Y color-difference signal, output from the signal processor 26, are input into the flesh-tone detector 101 which detects a flesh-tone area from the input video signals. The procedure for detecting the flesh-tone area is the same as that described in the second embodiment, and therefore, is not described here.

The flesh-tone detector 101 supplies a flesh-tone detection signal to the data selector 28. Upon input of the flesh-tone detection signal from the flesh-tone detector 101, the data selector 28 stops receiving the window pulses output from the window pulse generator 27, and instead, accepts the flesh-tone detection signal as window pulse, so that, of the video signal input from the A/D converter 25, only the part that lies inside the flesh-tone area detected by the flesh-tone detector 101 is passed through and fed to the BPF 29. Thus, the flesh-tone area becomes the focus area.

Figure 35:
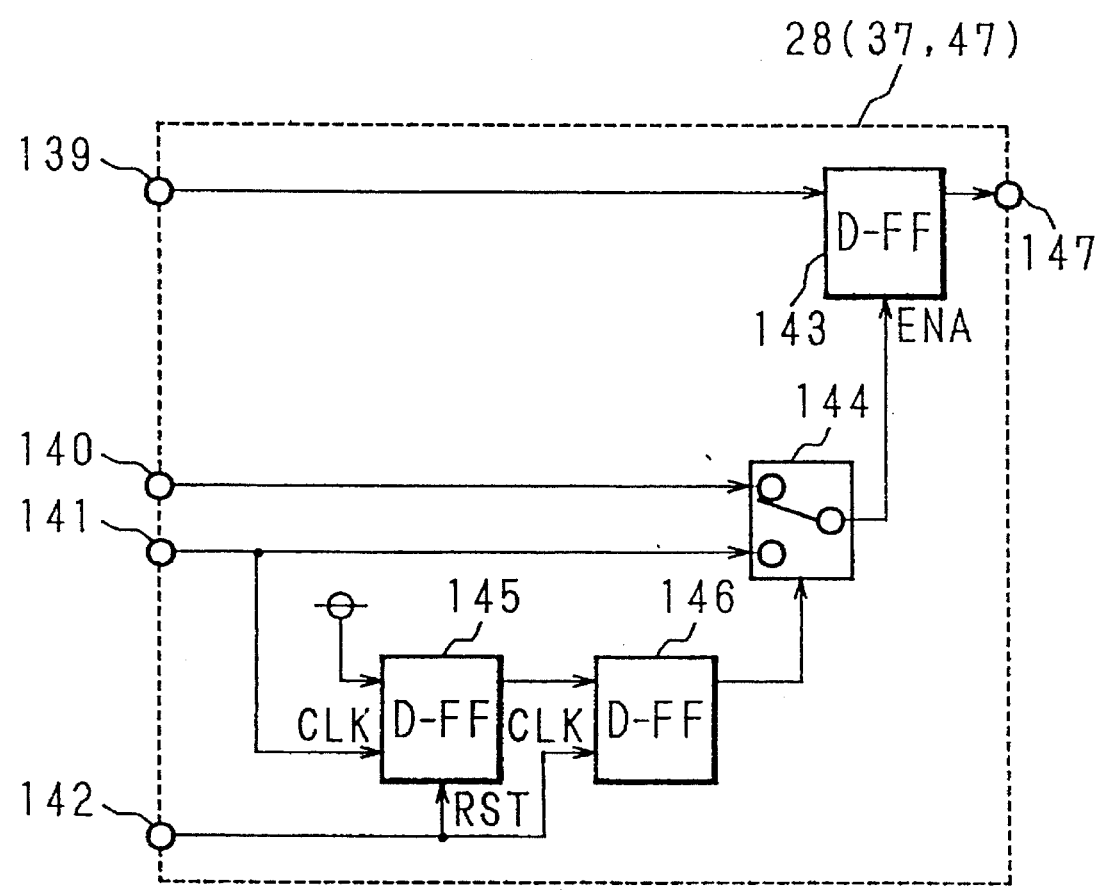
FIG. 35 is a diagram showing the configuration of a data selector.

The data selector 28 can be constructed, for example, according to the circuit configuration shown in FIG. 35. In FIG. 35, the reference numeral 139 is an input terminal at which the video signal is input, 140 is an input terminal at which window pulses from the window pulse generator 27 are input, 141 is an input terminal at which the fresh-tone detection signal from the flesh-tone detector 101 is input, 142 is a vertical synchronizing signal input terminal, 143 is a flip-flop that gates the video signal, 144 is a switch, 145 and 146 are flip-flops, and 147 is an output terminal.

The operation of the above configured data selector 28 will now be described. The window pulses input at the input terminal 140 and the flesh-tone detection signal input at the input terminal 141 are both supplied to the switch 144. Since in the flip-flop 145, the input signal is always set for "High", the flip-flop 145 outputs a "High" signal when receiving a flesh-tone detection signal in a "High" state. The "High" signal output is fed to the flip-flop 146. The flip-flop 145 is reset by a vertical synchronizing signal for each field, and the flip-flop 146 outputs a signal to the switch 144 each time the vertical synchronizing signal is supplied. With this arrangement, when a flesh-tone area is detected during one field period, a "High" signal is output from the flip-flop 146. The switch 144 selects the flesh-tone detection signal when the signal input from the flip-flop 146 is "High", and selects the window pulses when the signal is "Low". The signal selected by the switch 144 is supplied to the flip-flop 143 as an enable signal. Therefore, when a flesh-tone area is detected, the flip-flop 143 gates the video signal fed from the input terminal 139 with the flesh-tone detection signal.

An output signal from the BPF 29 is fed through the integrator 30 to the microcomputer 31 as a focus evaluation value. The microcomputer 31 drives the focus lens 21 so that the evaluation value becomes the greatest, thus bringing the focus onto the flesh-tone area.

(Embodiment 22)

Figure 36:
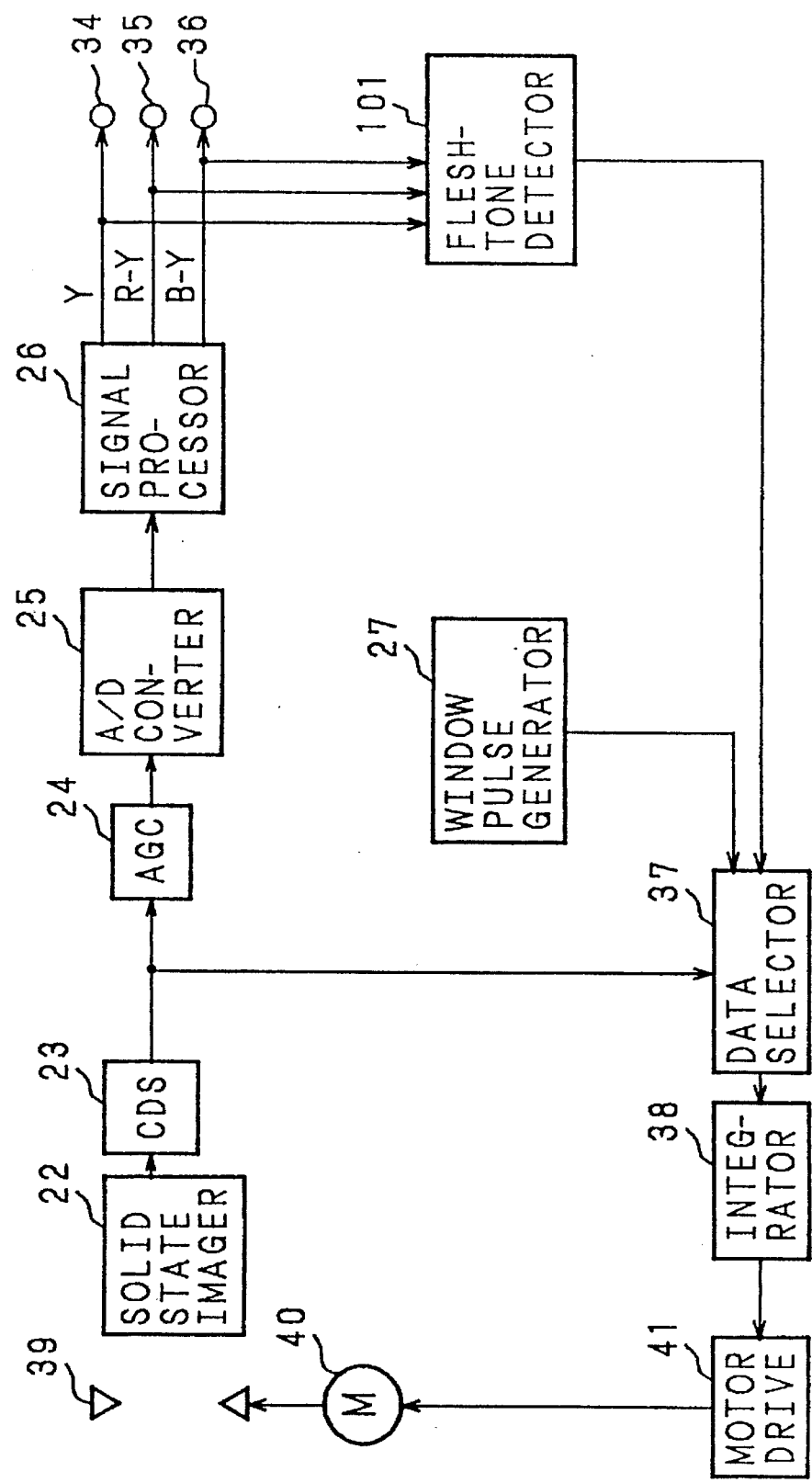
FIG. 36 is a block diagram showing the configuration of a video signal processor according to a further embodiment of the invention.

FIG. 36 is a block diagram showing the configuration of a video signal processor for a color video camera (a 22nd embodiment). In FIG. 36, the same reference numerals as those in FIG. 33 designate the same or corresponding parts Further in FIG. 36, the reference numeral 37 designates a data selector, 38 is an integrator, 39 is an iris, 40 is a motor for moving the iris 40, and 41 is a motor drive circuit for driving the motor 40.

Next, the operation in this embodiment will be described below. An optical image focused on the solid state imager 22 is converted by the solid state imager 22 into an electrical signal which is fed to the CDS circuit 23. The CDS circuit 23 extracts only video signal components from the output signal of the solid state imager 22 and transfers them to the data selector 37 as well as to the AGC 24. The operations of the AGC 24, A/D converter 25, and signal processor 26 are the same as those of the 21st embodiment.

Of the signal transferred from the CDS circuit 23 to the data selector 37, only the part of the signal which lies inside the picture frame c in FIG. 34 defined by the window pulses input from the window pulse generator 27 to be passed through the data selector 37 and fed to the integrator 38. The iris 39 adjusts the amount of light to enter the solid state imager 22 in accordance with the integrated value obtained at the integrator 38 by integration for the photometric area.

The flesh-tone detector 101, as in the second embodiment, detects a flesh-tone area from the video signal and supplies the detected flesh-tone detection signal to the data selector 37. Upon input of the flesh-tone detection signal from the flesh-tone detector 101, the data selector 37 stops receiving the window pulses output from the window pulse generator 27, and instead, accepts the flesh-tone detection signal as window pulse, so that, of the signal input from the CDS circuit 23, only the part that lies inside the flesh-tone area is passed through and fed to the integrator circuit 38. The detailed configuration of the data selector 37 is the same as that of the 21st embodiment (FIG. 35). Thus, when a flesh-tone area is detected from the video signal, the flesh-tone area is set as the photometric area so that the iris 39 controls the amount of light according to the brightness of the flesh-tone area.

(Embodiment 23)

Figure 37:
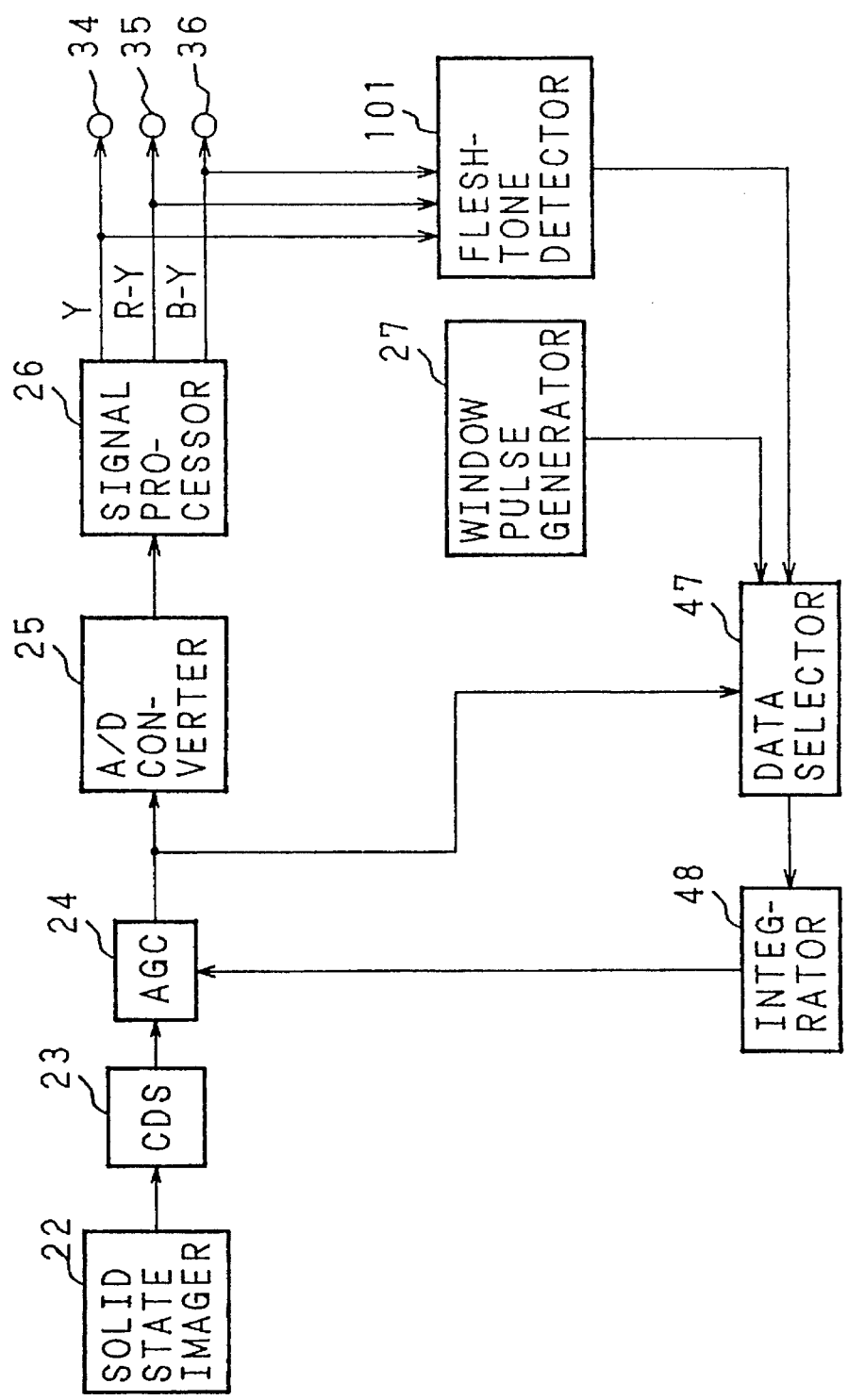
FIG. 37 is a block diagram showing the configuration of a video signal processor according to a further embodiment of the invention.

FIG. 37 is a block diagram showing the configuration of a video signal processor for a color video camera (a 23rd embodiment). In FIG. 37, the same reference numerals as those in FIG. 33 designate the same or corresponding parts. Further in FIG. 37, the reference numeral 47 designates a data selector, and 48 denotes an integrator.

Next, the operation in this embodiment will be described below. An optical image focused on the solid state imager 22 is converted by the solid state imager 22 into an electrical signal which is fed to the CDS circuit 23. The CDS circuit 23 extracts only video signal components from the output signal of the solid state imager 22 and supplies them to the AGC 24. The AGC 24 controls the gain of the video signal so that the video signal is maintained at a constant level. The output signal of the AGC 24 is transferred to the data selector 47 as well as to the A/D converter 25. Of the video signal transferred to the data selector 47, only the part of the signal which lies inside the picture frame c in FIG. 34 defined by the window pulses input from the window pulse generator 27 is passed through the data selector 47 and fed to the integrator 48. The detailed configuration of the data selector 47 is the same as that in the 21st embodiment (FIG. 35). The integrator circuit 48 integrates the signal fed from the data selector 47 for one field and supplies the result to the AGC 24 as a gain control signal for the video signal. Based on the gain control signal, the AGC 24 controls the gain of the video signal, thus performing feedback control to maintain the video signal at a constant level. The operations of the A/D converter 25 and video signal processor 26 are the same as those in the 21st embodiment.

The flesh-tone detector 101, in accordance with the second embodiment, detects a flesh-tone area from the video signal and supplies the detected flesh-tone detection signal to the data selector 47. Upon input of the flesh-tone detection signal from the flesh-tone detector 101, the data selector 47 stops receiving the window pulses being output from the window pulse generator 27, and instead, accepts the flesh-tone detection signal as window pulse, so that, of the signal input from the AGC 24, only the part that lies inside the flesh-tone area is passed through and fed to the integrator 48. Thus, the flesh-tone area is set as the photometric area so that the AGC 24 performs gain control in accordance with the luminance level of the flesh-tone area.

(Embodiment 24)

Figure 38:
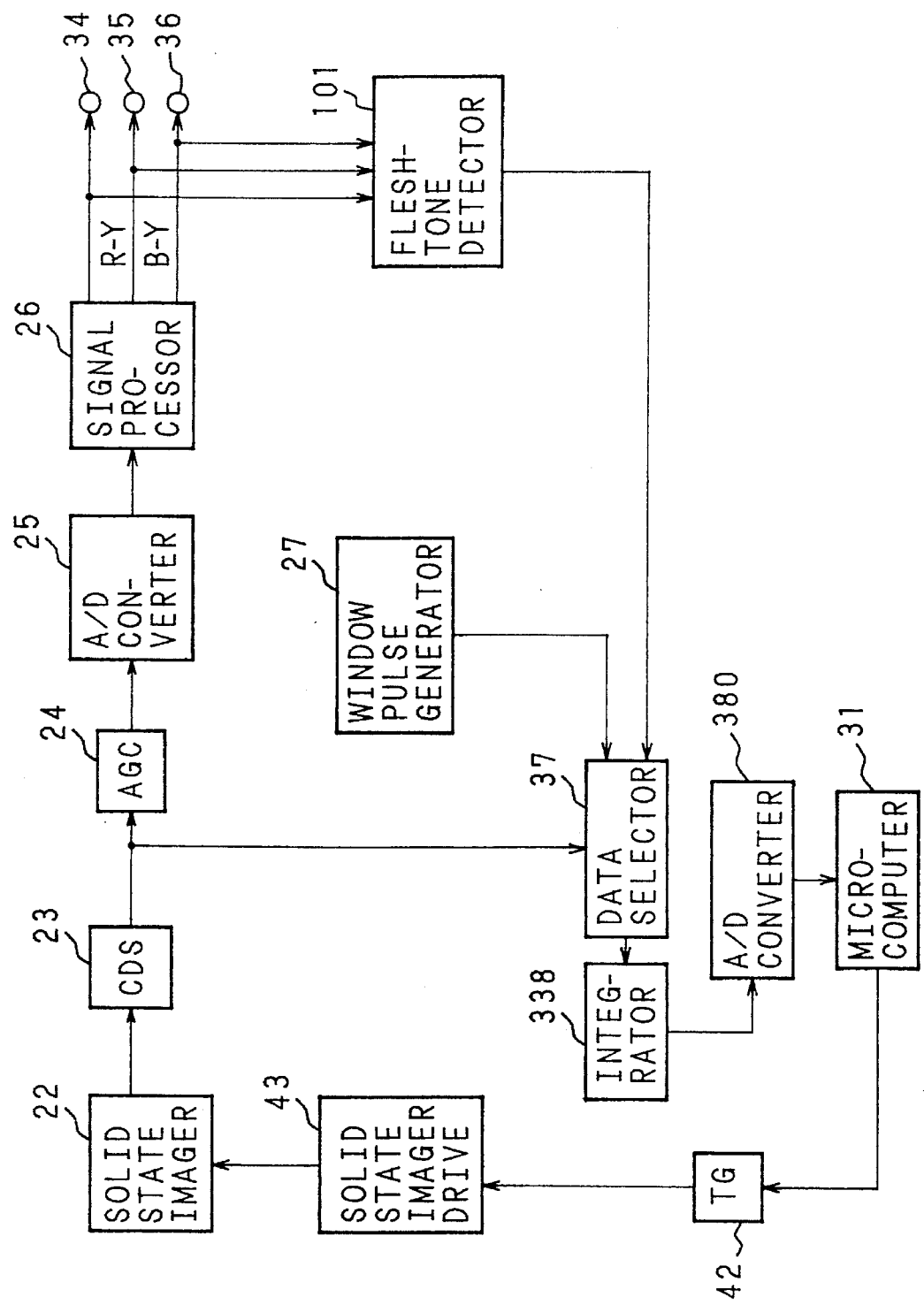
FIG. 38 is a block diagram showing the configuration of a video signal processor according to a further embodiment of the invention.

FIG. 38 is a block diagram showing the configuration of a video signal processor for a color video camera (a 24th embodiment). In FIG. 38, the same reference numerals as those in FIG. 33 designate the same or corresponding parts. Further in FIG. 38, the reference numeral 37 designates the same data selector as that of the 22nd embodiment, 338 is an integrator, 380 is an A/D converter, 42 is a timing generator (TG) for driving the solid state imager, and 43 is a solid state imager drive circuit.

Next, the operation in this embodiment will be described below. The TG 42 generates pulses necessary for driving the solid state imager 22. The pulses generated by the TG 42 are fed to the solid state imager drive circuit for driving the solid state imager 22. The solid state imager 22 converts an optical image focused thereon into an electrical signal and supplies it to the CDS circuit The CDS circuit 23 extracts only video signal components from the output signal of the solid state imager 22 and transfers them to the data selector 37 as well as to the AGC 24. The operations of the AGC 24, A/D converter 25, and signal processor 26 are the same as those in the 21st embodiment.

Of the video signal transferred to the data selector 37, only the part of the signal which lies inside the picture frame c in FIG. 34 defined by the window pulses input from the window pulse generator 27 is passed through the data selector 37 and fed to the integrator 338. The integrator 338 integrates the signal fed From the data selector 37 for one field and supplies the result to the A/D converter 380 as a light amount value. Based on the digital result of integration, the microcomputer 31 outputs a control signal to the TG 42, instructing it to change the shutter speed. In response to the control signal received from the microcomputer 31, the TG 42 changes its sensor reading pulse rate to change the shutter speed, thereby maintaining the output signal of the CDS circuit 23 always at a constant level.

The flesh-tone detector 101, as in the second embodiment, detects a flesh-tone area from the video signal and supplies the detected flesh-tone detection signal to the data selector 37. Upon input of the flesh-tone detection signal from the flesh-tone detector 101, the data selector 37 stops receiving the window pulses being output from the window pulse generator 27, and instead, accepts the flesh-tone detection signal as window pulse so that only the part of the video signal which lies inside the flesh-tone area is passed through and fed to the integrator 338. Thus, the flesh-tone area is set as the photometric area so that the electronic shutter speed is adjusted in accordance with the brightness of the flesh-tone area.

(Embodiment 25)

Figure 39:
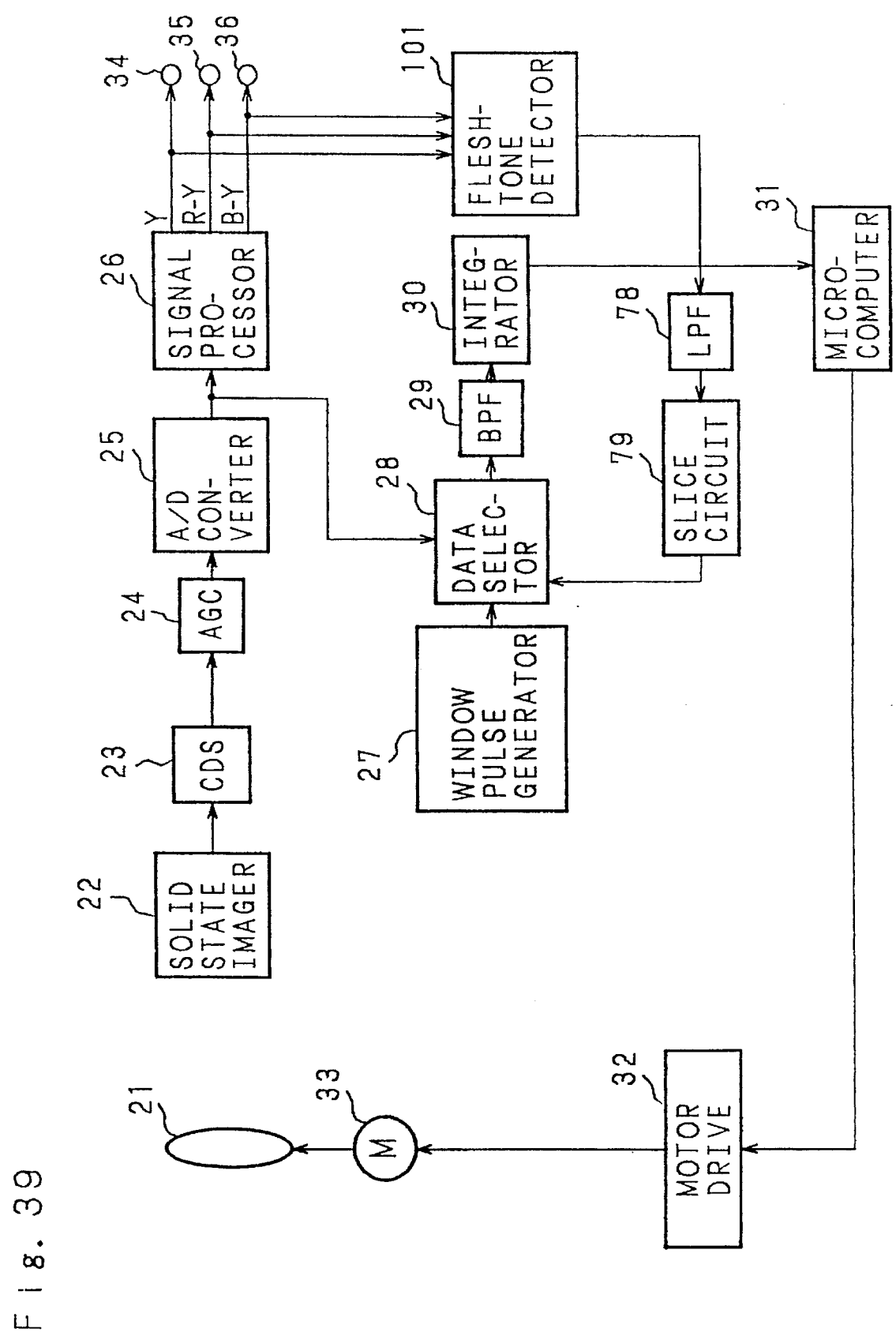
FIG. 39 is a block diagram showing the configuration of a video signal processor according to a further embodiment of the invention.

FIG. 39 is a block diagram showing the configuration of a video signal processor for a color video camera (a 25th embodiment). In FIG. 39, the same reference numerals as those in FIG. 33 designate the same or corresponding parts. Further in FIG. 39, the reference 78 designates a low-pass filter (LPF), and 79 denotes a slice circuit. The slice circuit 79 has the same internal configuration as that of the slice circuit 109 shown in FIG. 20. FIG. 20 showed a specific example for scanning in the horizontal direction, but the LPF 78 and the slice circuit 79 are designed to provide the same effect also in the vertical direction.

Figure 40A:
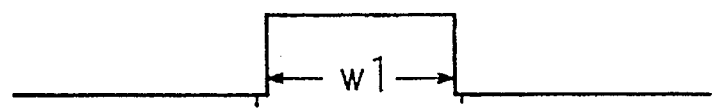
FIGS. 40(a)–(b) is a diagram illustrating the process of shaping a flesh-tone detection signal through a low-pass filter and slice circuit.
Figure 40B:
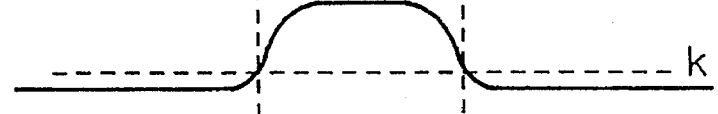
Figure 40C:
Figure 40D:
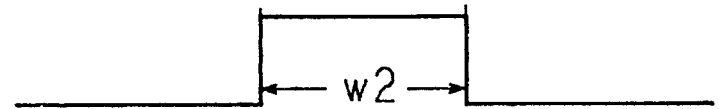

Next, the operation in this embodiment will be described below. The operation is fundamentally the same as that in the 21st embodiment, and described only about the differences. The flesh-tone detector 101 detects only flesh-tone areas from the video signal and supplies the resulting flesh-tone detection signal to the LPF 78. When a human figure, such as shown in FIG. 16, is recorded, the flesh-tone detection signal will represent the areas shown in FIG. 17(a), and the flesh-tone detection signal in the horizontal scanning direction along the line C-D in FIG. 17(a) will be like the one shown in FIG. 17(b). The signal shown in FIG. 40(a) is input into the LPF 78 which then outputs the signal shown in FIG. 40(b) to the slice circuit 79. The slice circuit 79 slices the signal of FIG. 40(b) by the value of the predetermined constant k, and shapes the resulting signal of FIG. 40(c) into the signal shown in FIG. 40(d). The detailed operation of the slice circuit 79 will now be described. The flesh-tone detection signal of FIG. 40(b) supplied via the input terminal 202 is reduced in the adder 203 by the value of the constant k. The comparator 205 compares the signal of FIG. 40(b) with the constant and when the signal of FIG. 40(b) is larger than the constant k, outputs a select signal to the switch 204 to select the output signal of the adder 203. The switch 204 selects a "Low" when the signal of FIG. 40(b) is smaller than the constant k. The output signal of the switch 204 is shown in FIG. 40(c). When any one bit is "High" in the output signal of the switch 204, the decoder 207 outputs a signal in which all bits are "High". As a result, the output signal of the decoder 207 has the waveform shown in FIG. 40(d). The width, w2, of the signal of FIG. 40(d) is made wider than the width, w1, of the signal of FIG. 40(a). By adjusting the delay from the video signals output from the signal processor 26, the signal of FIG. 40(d) is made to represent an area circled by a solid line (e) in FIG. 41. The area, d, in FIG. 40 corresponds to the area represented by the flesh-tone detection signal output from the flesh-tone detector 101.

Figure 41:
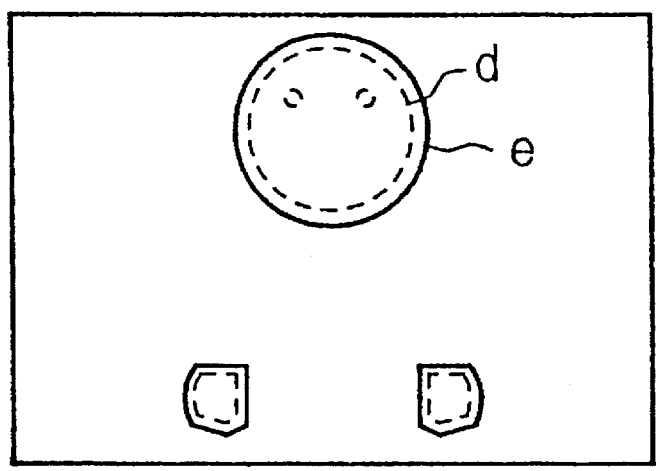
FIG. 41 is a diagram showing a focus area.

Upon input of the signal from the slice circuit 79, the data selector 28 stops receiving the window pulses being output from the window pulse generator 27, and instead, accepts the output signal of the slice circuit 79 as window pulse so that, of the signal supplied from the A/D converter 25, only the part that lies inside the area, e, in FIG. 41 is passed through and fed to the BPF 29. Thus, the area, e, shown in FIG. 41 is set as the focus area. The output signal of the BPF 29 is fed through the integrator circuit 30 to the microcomputer 31 as a focus evaluation value. The microcomputer 31 drives the focus lens 21 so that the focus evaluation value becomes the greatest, thus bringing the focus onto the flesh-tone area.

(Embodiment 26)

Figure 42:
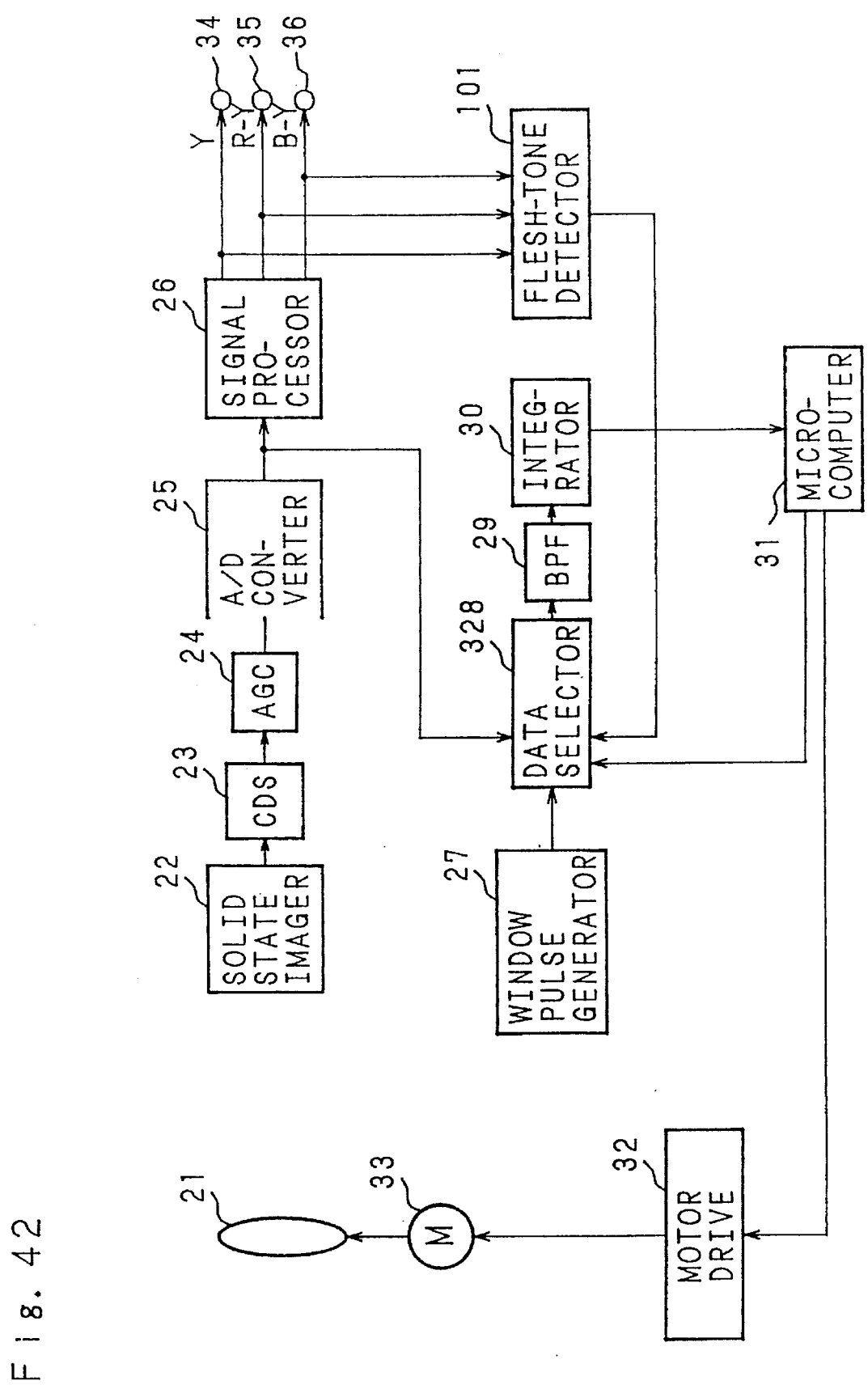
FIG. 42 is a block diagram showing the configuration of a video signal processor according to a further embodiment of the invention.
Figure 43:
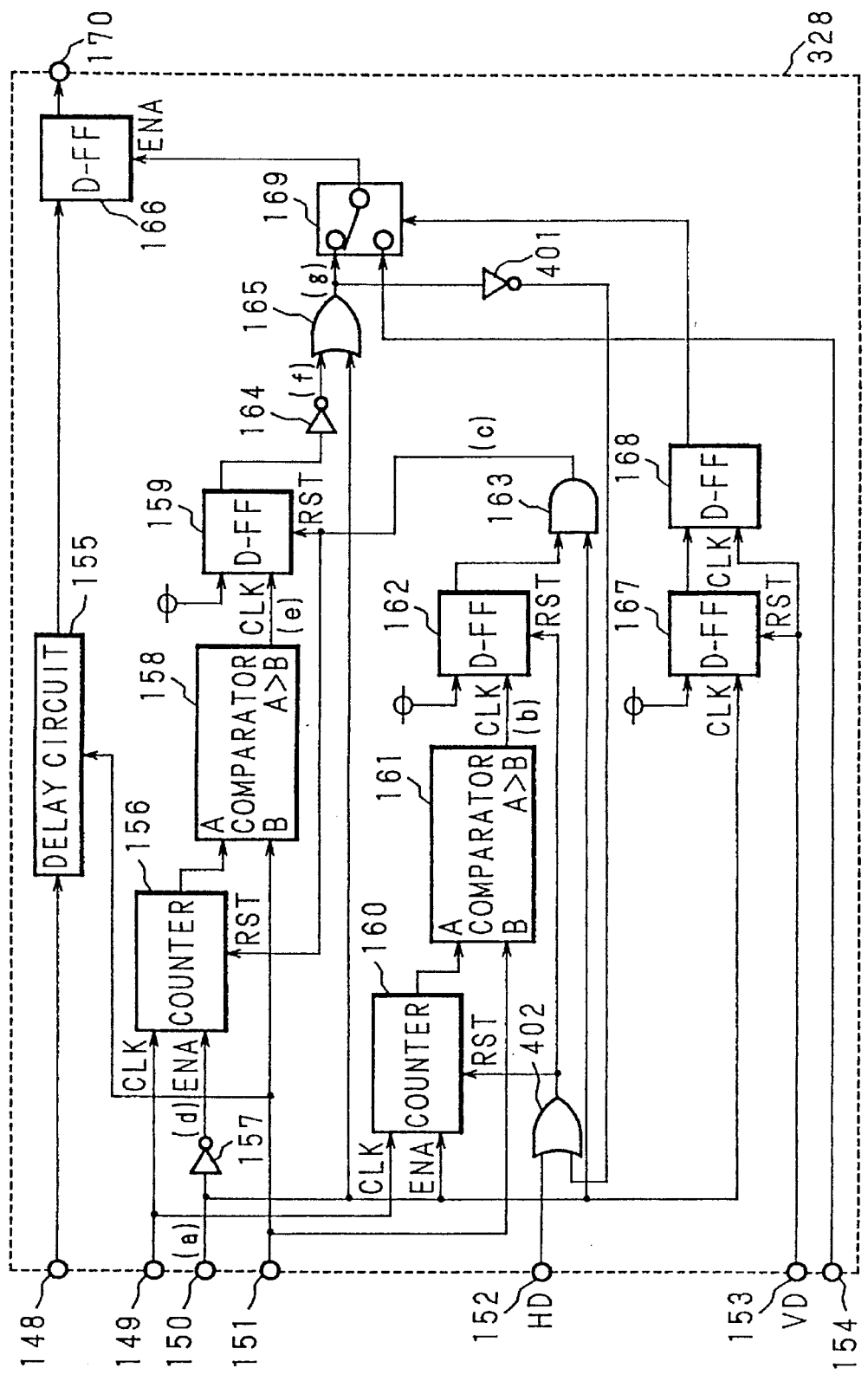
FIG. 43 is a diagram showing the configuration of a data selector.

FIG. 42 is a block diagram showing a video signal processor For a color video camera (a 26th embodiment). In FIG. 42, the same reference numerals as those in FIG. 39 designate the same or corresponding parts. The numeral 328 designates a data selector. The 26th embodiment concerns an example wherein, as in the above 25th embodiment, the focus area is set larger than the detected flesh-tone area. This setting operation is performed in the data selector 328. FIG. 43 is a block diagram showing the configuration of the data selector 328 in the 26th embodiment. In FIG. 43, the reference numeral 148 is a video signal input terminal, 149 is a circuit drive clock input terminal, 150 is an input terminal to which a flesh-tone detection signal output from the flesh-tone detector 101 is applied, 151 is an input terminal to which an output signal (prescribed value k) from the microcomputer 31 is applied, 152 is an input terminal to which a horizontal synchronization signal (HD) is applied, 153 is an input terminal at which a vertical synchronization signal (VD) is applied, 154 is an input terminal to which window pulses generated by the window pulse generator 27 are applied, 155 is a delay circuit, 156 is a counter, 157 is an inverter, 158 is a comparator, 159 is a flip-flop, 160 is a counter, 161 is a comparator, 162 is a flip-flop, 163 is an AND gate, 164 is an inverter, 165 is an OR gate, 166, 167 and 168 are flip-flops, 169 is a switch, 170 is an output terminal, 401 is an inverter, and 420 is an OR gate.

Next, the operation in this embodiment will be described below. Since the basic operation is the same as that in the embodiments 21 and 25, only the operation of the data selector 328 is described below. Window pulses applied to the input terminal 154 are input into the switch 169. A flesh-tone detection signal, shown in FIG. 44(a) and output from the flesh-tone detector 101, is applied to the input terminal 150 as an enable signal for the counter 160. That is, the counter 160 is incremented only when the flesh-tone detection signal is "High". The output signal of the counter 160 is fed to the comparator 161. The comparator 161 compares the output signal of the counter 160 with the constant k supplied via the input terminal 151. The comparator 161 outputs a "High" signal when the output signal of the counter 160 becomes larger than the constant k. The output signal of the comparator 161 is shown in FIG. 44(b). The output signal of the comparator 161 is supplied as a clock signal to drive the flip-flop 162. Since in the flip-flop 162 the input signal is set for "High", the flip-flop 162 outputs a "High" signal at the leading edge of drive clock pulse. Both the flip-flop 162 and the counter 160 are reset by an HD applied to the input terminal 152. Therefore, the signal shown in FIG. 44(b) is output for each horizontal scanning period. The output signal of the flip-flop 162 is fed to the AND gate 163 where it is ANDed with the flesh-tone detection signal (FIG. 44(a)) supplied from the flesh-tone detector 101. The output of the AND gate 163 is supplied as a reset signal for the counter 156 and flip-flop 159. The output signal of the AND gate 163 is shown in FIG. 44(c).

The flesh-tone detection signal (FIG. 44(a)) is also fed to the counter 156 through the inverter 157. The output signal of the inverter 157 is shown in FIG. 44(d). The counter 156 is incremented only when the output signal of the inverter 157 is "High". The output signal of the counter 156 is fed to the comparator 158, and when it becomes larger than the constant k supplied from the microcomputer 31, the comparator 158 outputs a "High" signal. The output signal of the comparator 158 is shown in FIG. 44(e). The output signal of the comparator 158 is supplied as a clock signal to drive the flip-flop 159. Since the other input signal to the flip-flop 159 is set for "High", the flip-flop flop 159 outputs a "High" signal at the leading edge of each drive clock pulse. The output signal of the flip-flop 159 is fed to the OR gate 165 through the inverter 164. The OR gate 165 ORs the output signal (FIG. 44(f)) of the inverter 164 with the flesh-tone detection signal (FIG. 44(a)). The output signal of the OR gate 165 is shown in FIG. 44(g). The signal of FIG. 44(g) is transferred through the inverter 401 to the OR gate 402 for ORing with the HD; therefore, the signal (b) from the next line is transformed to (b').

The flip-flop 167 outputs a "High" signal when the flesh-tone detection signal is "High", and is reset by a VD for every field. Each time the VD is input, the flip-flop 168 outputs the signal received from the flip-flop 167. The switch 169 selects the flesh-tone detection signal when the output signal of the flip-flop 168 is "High", and selects the window pulses when it is "Low". Therefore, when a flesh-tone area is detected during a field period, the switch 169 does not select the window pulses being output from the window pulse generator 27, but selects the signal of FIG. 44(g) as a gate signal. The signal selected by the switch 169 is fed to the flip-flop 166 as an enable signal. The video signal output from the A/D converter 25 is fed through the input terminal 148 and delayed through the delay circuit 155 by T1/2 shown in FIG. 44. The video signal delayed by T1/2 is transferred to the flip-flop 166 which gates the video signal with the signal of FIG. 44(g). The circuit is so configured that the signal of FIG. 44(g) is also generated in the vertical scanning direction. With the above circuit configuration, the video signal can be gated to match the area, e, which is larger than the flesh-tone area, d, detected by the flesh-tone circuit 101 (See FIG. 41).

The operation thereafter is the same as that in the 25th embodiment, and therefore, is not described here. FIG. 43 shows a specific example of the configuration of the data selector 328, and any circuit configuration, other than the one shown in FIG. 43, may be employed as long as the circuit is designed to form the signal of FIG. 44(g) from the flesh-tone detection signal.

(Embodiment 27)

Figure 45:
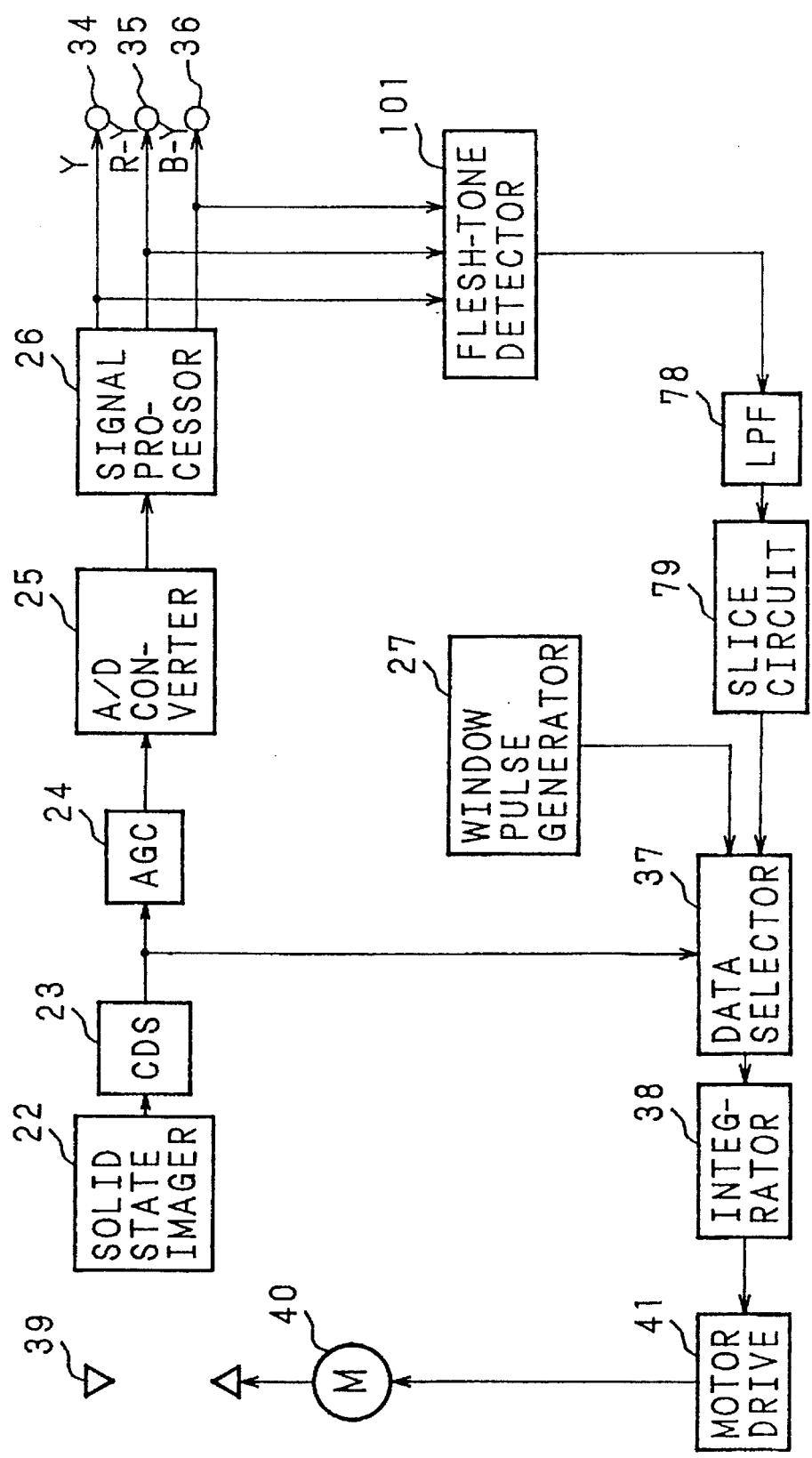
FIG. 45 is a block diagram showing the configuration of a video signal processor according to a further embodiment of the invention.

FIG. 45 is a block diagram showing the configuration of a video signal processor for a color video camera (a 27th embodiment) In FIG. 45, the same reference numerals as those in FIG. 36 designate the same or corresponding parts Further in FIG. 45, the reference numeral 78 designates a low-pass filter (LPF), and 79 denotes a slice circuit. The slice circuit 79 has the same internal configuration as that of the slice circuit 109 shown in FIG. 20. FIG. 20 shows a specific example for scanning in the horizontal direction, but the LPF 78 and the slice circuit 79 are designed to provide the same effect also in the vertical direction.

Figure 46A:
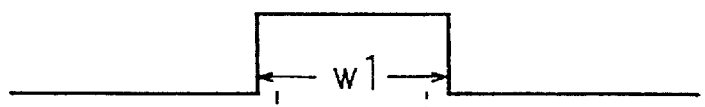
FIGS. 46(a)–(d) is a diagram illustrating the process of shaping a flesh-tone detection signal through a low-pass filter and slice circuit.
Figure 46B:
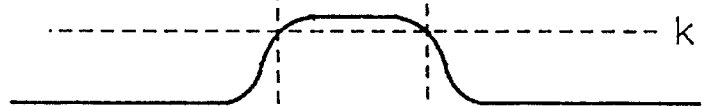
Figure 46C:
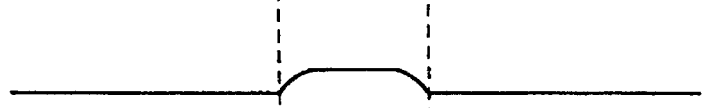
Figure 46D:
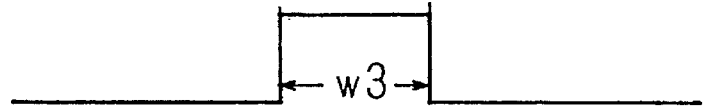

Next, the operation in this embodiment will be described below. The operation is fundamentally the same as that of the 22nd embodiment, and is described only about the differences. The flesh-tone detector 101 detects only flesh-tone areas from the video signal and supplies the resulting flesh-tone detection signal to the LPF 78. When a human figure, such as shown in FIG. 16, is recorded, the flesh-tone detection signal will represent the areas shown in FIG. 17(a), and the flesh-tone detection signal in the horizontal scanning direction along the line C-D in FIG. 17(a) will be like the one shown in FIG. 17(b). The signal shown in FIG. 46(a) is input into the LPF 78 which then outputs the signal shown in FIG. 46(b) onto the slice circuit 79. The slice circuit 79 slices the signal of FIG. 46(b) by the value of the predetermined constant k, and shapes the resulting signal of FIG. 46(c) into the signal shown in FIG. 46(d). The detailed operation of the slice circuit 79 is the same as described in the 25th embodiment. The width, w3, of the signal of FIG. 46(d) is made smaller than the width, w1, of the signal of FIG. 46(a). The signal of FIG. 46(d) corresponds to an area circled by a solid line (f) in FIG. 47. The area, d, in FIG. 47 corresponds to the area represented by the flesh-tone detection signal output from the flesh-tone detector 101.

Figure 47:
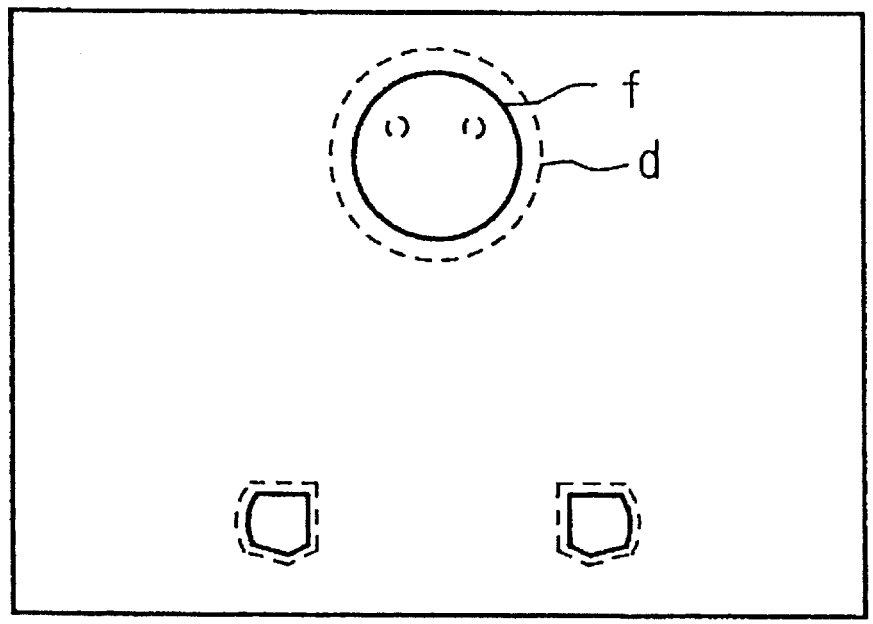
FIG. 47 is a diagram showing a photometric area.

Upon input of the flesh-tone detection signal from the slice circuit 79, the data selector 37 stops receiving the window pulses output from the window pulse generator 27, and instead, accepts the output signal of the slice circuit 79 as window pulse so that, of the signal supplied from the CDS circuit 23, only the part that lies inside the area, f, in FIG. 47 is passed through and fed to the integrator circuit 38. The detailed configuration of the data selector 37 is the same as that shown in FIG. 35. Thus, the area, f, shown in FIG. 47 is set as the photometric area. The output signal of the data selector 37 is fed through the integrator 38 to the motor drive circuit 41 as a light amount value so that the iris 39 controls the light amount according to the brightness of the flesh-tone area.

(Embodiment 28)

Figure 48:
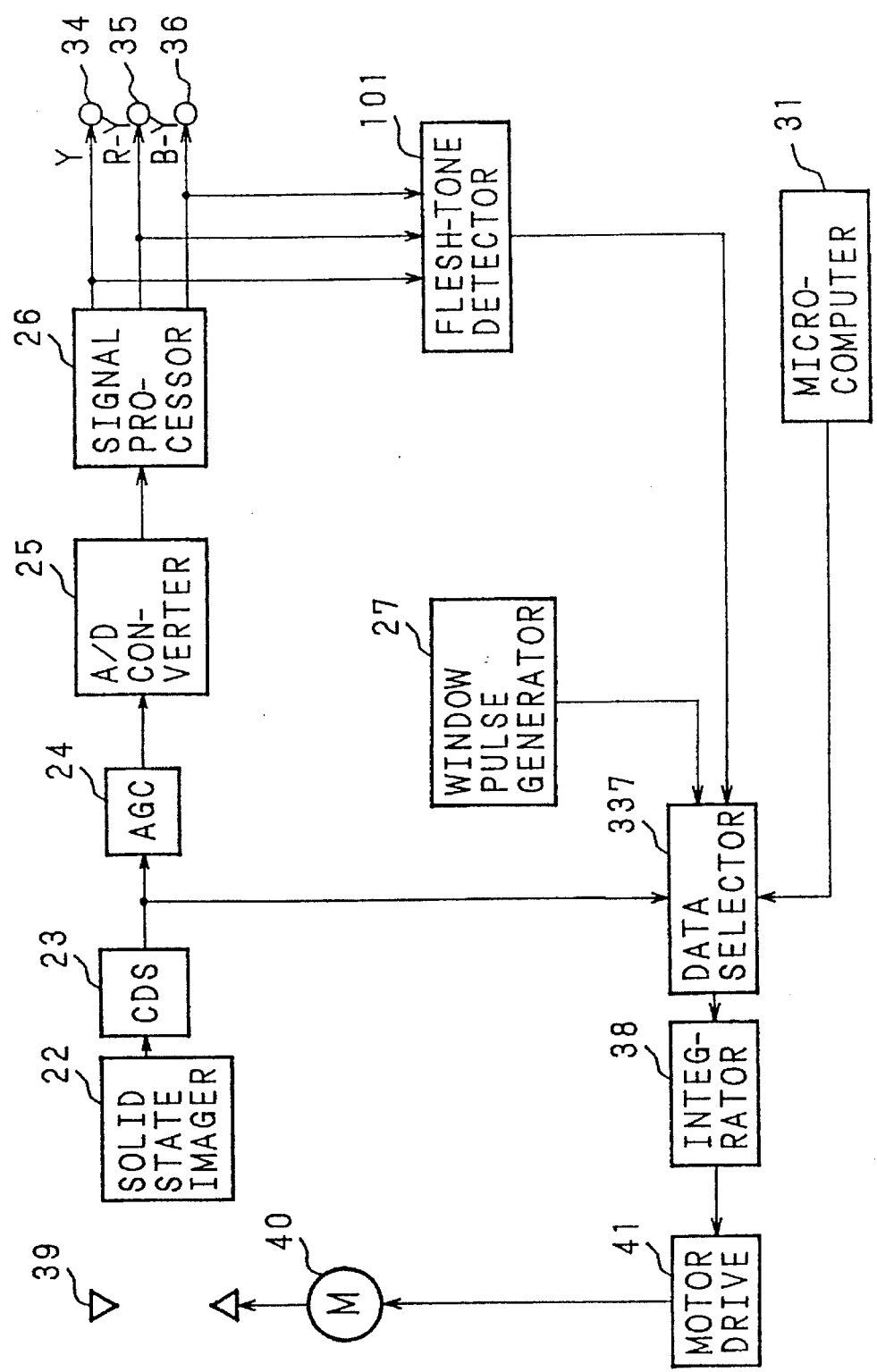
FIG. 48 is a block diagram showing the configuration of a video signal processor according to a further embodiment of the invention.
Figure 49:
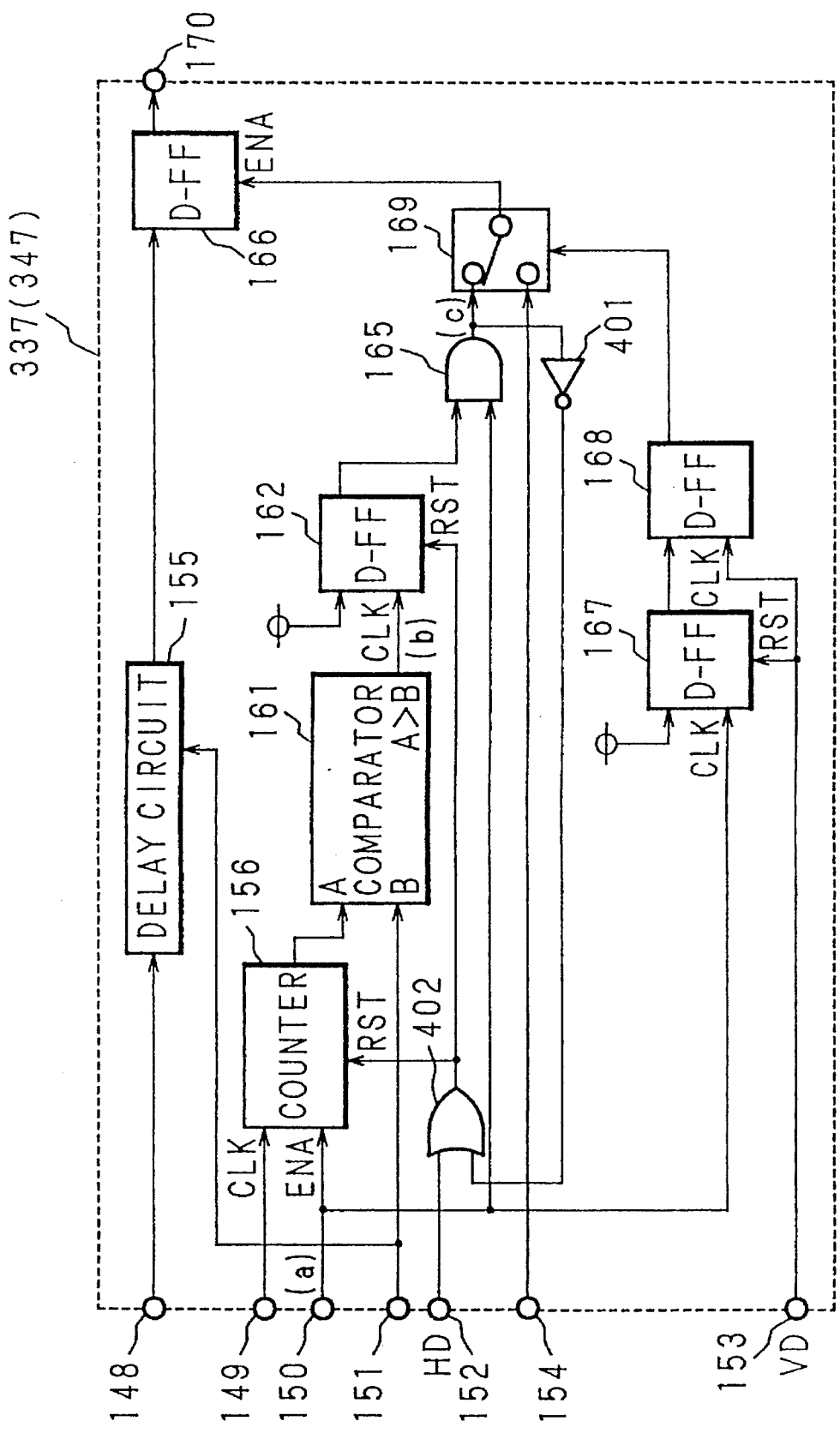
FIG. 49 is a diagram showing the configuration of a data selector.

FIG. 48 is a block diagram showing the configuration of a video signal processor for a color video camera (a 28th embodiment). In FIG. 48, the same reference numerals as those in FIG. 45 designate the same or corresponding parts. The reference numeral 337 designates a data selector. The 28th embodiment concerns an example wherein, as in the above 27th embodiment, the photometric area is set smaller than the detected flesh-tone area. This setting operation is performed in the data selector 337. FIG. 49 is a block diagram showing the configuration of the data selector 337 in the 28th embodiment. In FIG. 49, the same reference numerals as those in FIG. 43 designate the same or corresponding parts.

Next, the operation in this embodiment will be described below. Since the basic operation is the same as that of the embodiments 22 and 27, only the operation of the data selector 337 is described here. The microcomputer 31 supplies a predetermined value of k to the data selector 337. Window pulses entering through the input terminal 154 are transferred to the switch 169. A flesh-tone detection signal, shown in FIG. 44(a), which is output from the flesh-tone detector 101, is applied to the input terminal 150 as an enable signal for the counter 156. That is, the counter 161 is incremented only when the flesh-tone detection signal is "High". The output signal of the counter 156 is fed to the comparator 161. The comparator 161 compares the output signal of the counter 156 with the constant k supplied via the input terminal 181. The comparator 161 outputs a "High" signal when the output signal of the counter 156 becomes larger than the constant k. The output signal of the comparator 161 is shown in FIG. 44(b). The output signal of the comparator 161 is supplied as a clock signal to drive the flip-flop 162. Since in the flip-flop 162, the input signal is set for "High", the flip-flop 162 outputs a "High" signal at the leading edge of each drive clock pulse. Both the flip-flop 162 and the counter 156 are reset by an HD applied to the input terminal 152. Therefore, the signal shown in FIG. 44 (b) is output for every horizontal scanning period. The output signal of the flip-flop 162 is fed to the AND gate 163 where it is ANDed with the Flesh-tone detection signal (FIG. 44(a)) supplied from the flesh-tone detector 101. The output signal of the AND gate 163 is shown in FIG. 44(c).

The flip-flop 167 outputs a "High" signal when the flesh-tone detection signal is "High", and is reset by an VD for every field. Each time the VD is input, the flip-flop 168 outputs the signal received from the flip-flop 167. The switch 169 selects the flesh-tone detection signal when the output signal of the flip-flop 168 is "High", and selects the window pulses when it is "Low". Therefore, when a flesh-tone area is detected during a field period, the switch 169 does not select the window pulses being output from the window pulse generator 27, but selects the signal of FIG. 44 (c) as a gate signal. The signal selected by the switch 169 is fed to the flip-flop 166 as an enable signal. The video signal output from the A/D converter 25 is fed through the input terminal 148 and delayed through the delay circuit 155 by T1/2. The video signal delayed by T1/2 is transferred to the flip-flop 166 which gates the video signal with the signal of FIG. 44(c). With the above circuit configuration, the video signal can be gated to match the area, f, which is smaller than the flesh-tone area, d, detected by the flesh-tone circuit 101 (See FIG. 47).

The operation thereafter is the same as that in the 27th embodiment, and therefore, is not described here. The configuration shown in FIG. 49 shows a specific example of the configuration of the data selector 337, any circuit configuration, other than the one shown in FIG. 49, may be employed as long as the circuit is designed to form the signal of FIG. 44(c) from the flesh-tone detection signal.

(Embodiment 29)

Figure 50:
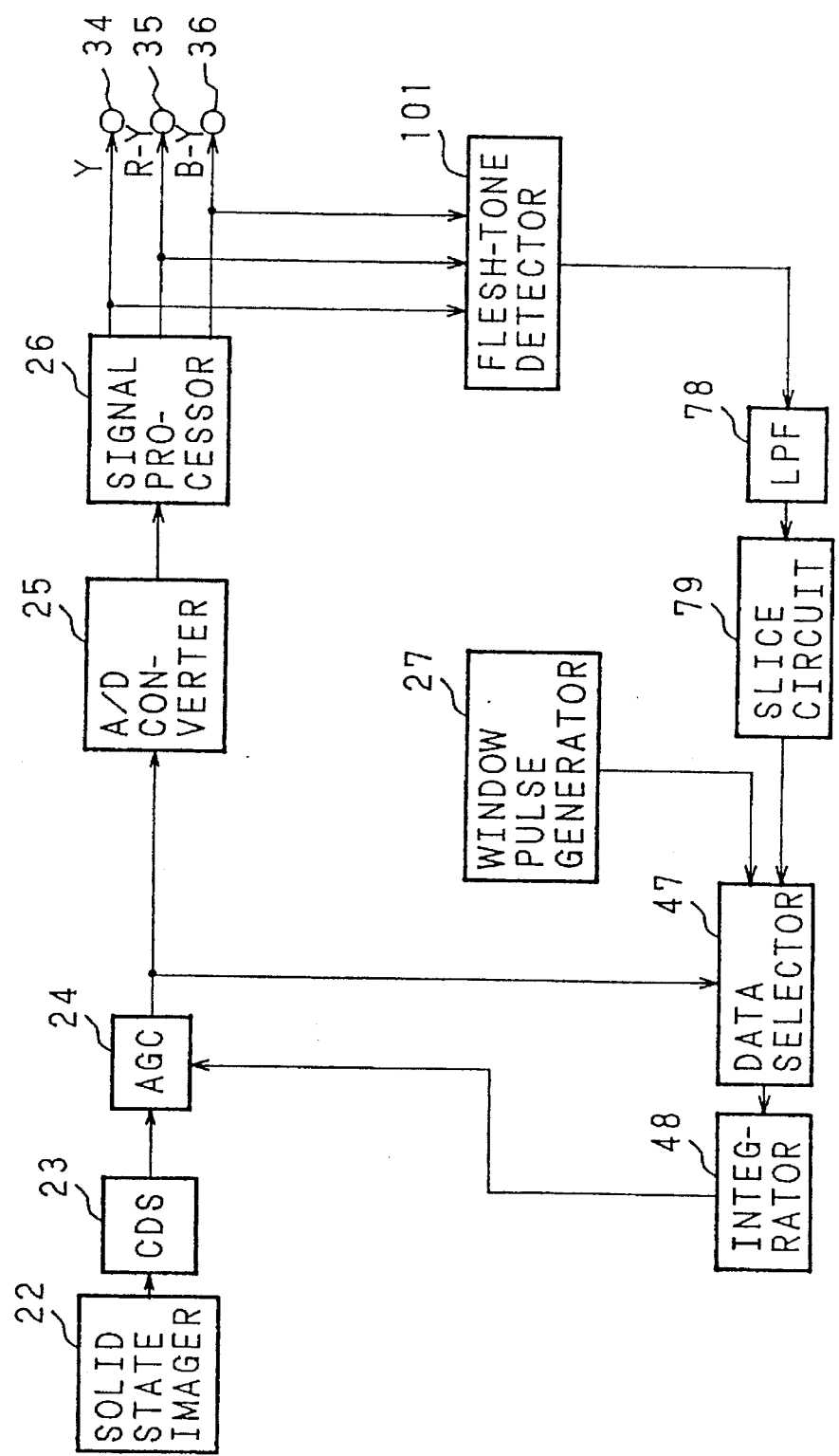
FIG. 50 is a block diagram showing the configuration of a video signal processor according to a further embodiment of the invention.

FIG. 50 is a block diagram showing the configuration of a video signal processor for a color video camera (a 29th embodiment) In FIG. 50, the same reference numerals as those in FIG. 37 designate the same or corresponding parts. Further in FIG. 50, the reference numeral 78 designates a low-pass filter (LPF), and 79 denotes a slice circuit. The slice circuit 79 has the same internal configuration as that of the slice circuit 109 shown in FIG. 20. FIG. 20 shows a specific example for scanning in the horizontal direction, but the LPF 78 and the slice circuit 79 are designed to provide the same effect also in the vertical direction.

Next, the operation in this embodiment will be described below. The operation is fundamentally the same as that in the 23rd embodiment, and is described only bout the differences. As in the 27th embodiment, the slice circuit 79 outputs the signal shown in FIG. 46(d) of which width, w3, is smaller than the width, w1, of the flesh-tone detection signal (FIG. 46(a)). The signal of FIG. 46(d) corresponds to an area circled by a solid line (f) in FIG. 47.

Upon input of the flesh-tone detection signal from the slice circuit 79, the data selector 47 stops receiving the window pulses output from the window pulse generator 27, and instead, accepts the output signal of the slice circuit 79 as window pulse so that, of the signal supplied from the AGC 24, only the part that lies inside the area, f, in FIG. 47 is passed through and fed to the integrator 48. The detailed configuration of the data selector 47 is the same as that shown in FIG. 35. Thus, the area, f, shown in FIG. 47 is set as the photometric area. The output signal of the data selector 47 is fed through the integrator 48 to the AGC 24 as a light amount value so that the AGC 24 performs gain control that matches the brightness of the area, f, in FIG. 47.

(Embodiment 30)

Figure 51:
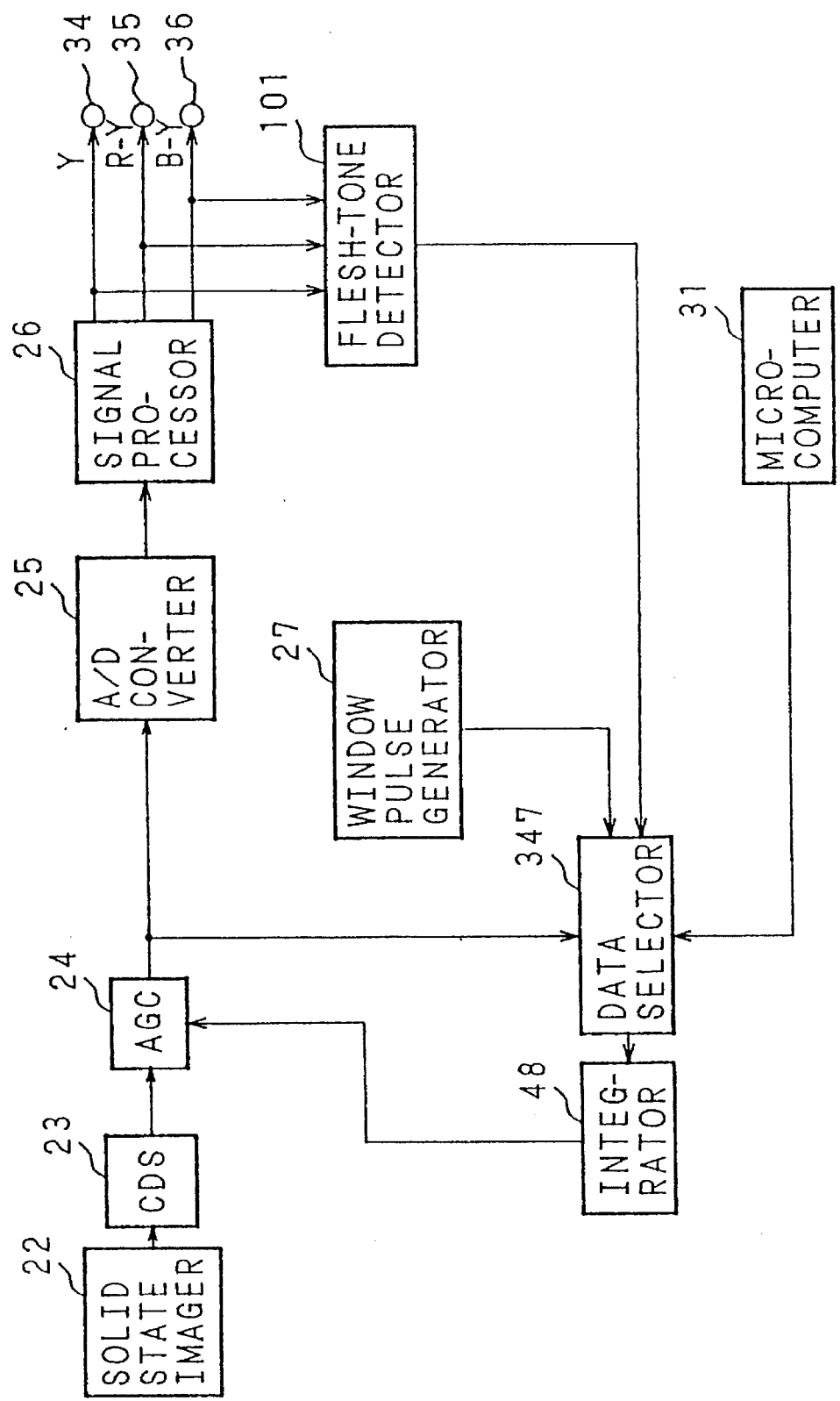
FIG. 51 is a block diagram showing the configuration of a video signal processor according to a further embodiment of the invention.

FIG. 51 is a block diagram showing the configuration of a video signal processor for a color video camera (a 30th embodiment). In FIG. 51, the same reference numerals as those in FIG. 50 designate the same or corresponding parts. The 30th embodiment concerns an example wherein, as in the above 29th embodiment, the photometric area is set smaller than the detected flesh-tone area. This setting operation is performed in the data selector 347. The configuration of the data selector 347 is the same as that of the data selector 337 shown in FIG. 49.

The operation in this embodiment is fundamentally the same as that in the 23rd or 29th embodiment, and the operation to be performed in the data selector 347 is the same as that performed in the data selector 337. Therefore, description of their operations is omitted herein.

As a result, as in the 30th embodiment, the photometric area is set as the area f shown in FIG.47, which is smaller than the area d shown in FIG. 47.

(Embodiment 31)

Figure 52:
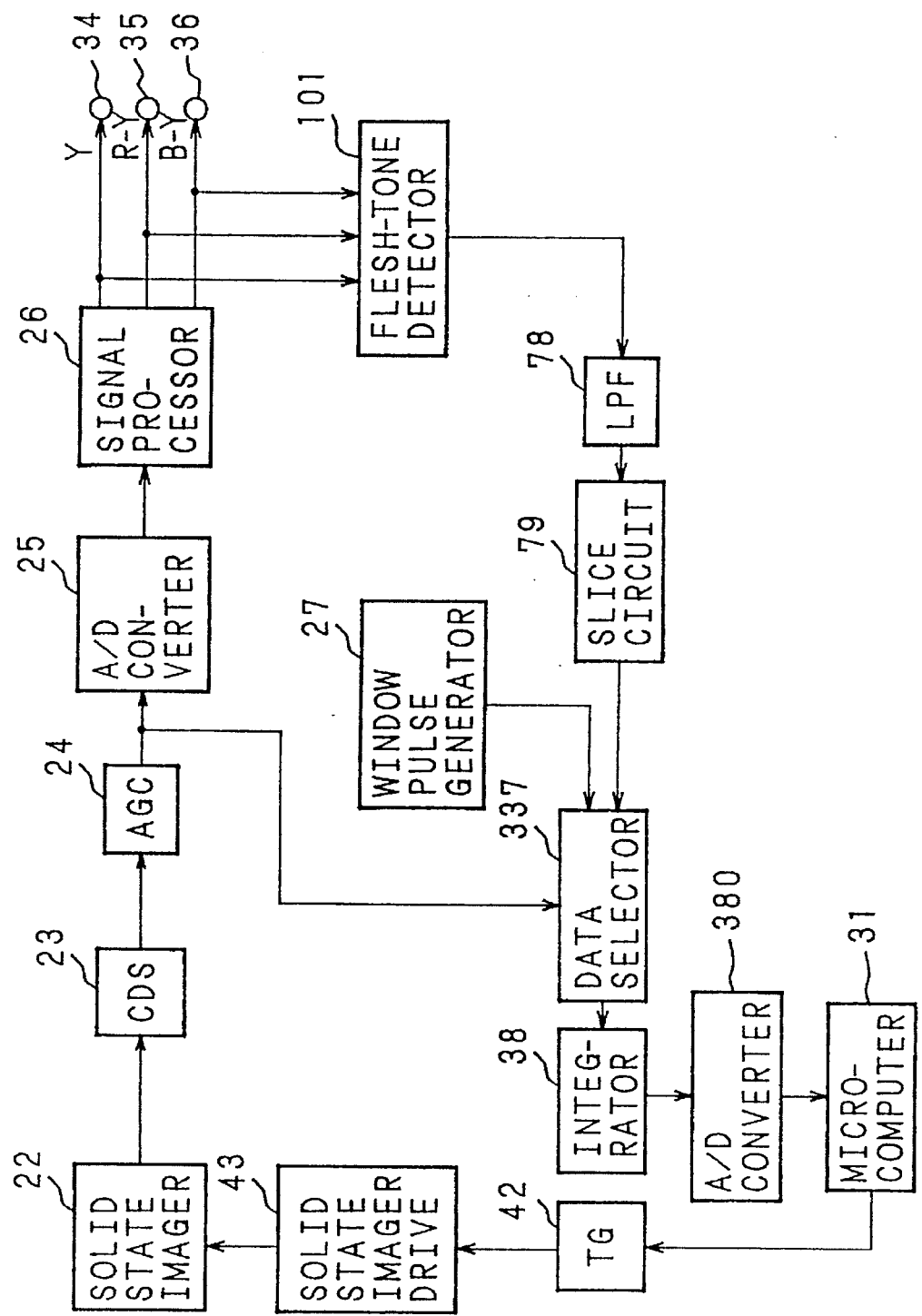
FIG. 52 is a block diagram showing the configuration of a video signal processor according to a further embodiment of the invention.

FIG. 52 is a block diagram showing the configuration of a video signal processor for a color video camera (a 31st embodiment). In FIG. 52, the same reference numerals as those in FIGS. 38 and 45 designate the same or corresponding parts. The 31st embodiment concerns an example wherein the 24th embodiment (in which the shutter speed is adjusted according to the brightness of the flesh-tone area) is adapted so that the photometric area is set smaller than the detected flesh-tone area, as in the embodiments 27 and 29. Since the operation in this embodiment is easily understood by referring to the embodiments 24, 27, 29, is not described here.

As a result, as in the 30th embodiment, the photometric area is set as the are f shown in FIG. 47, which is smaller than the area d shown in FIG. 47.

(Embodiment 32)

Figure 53:
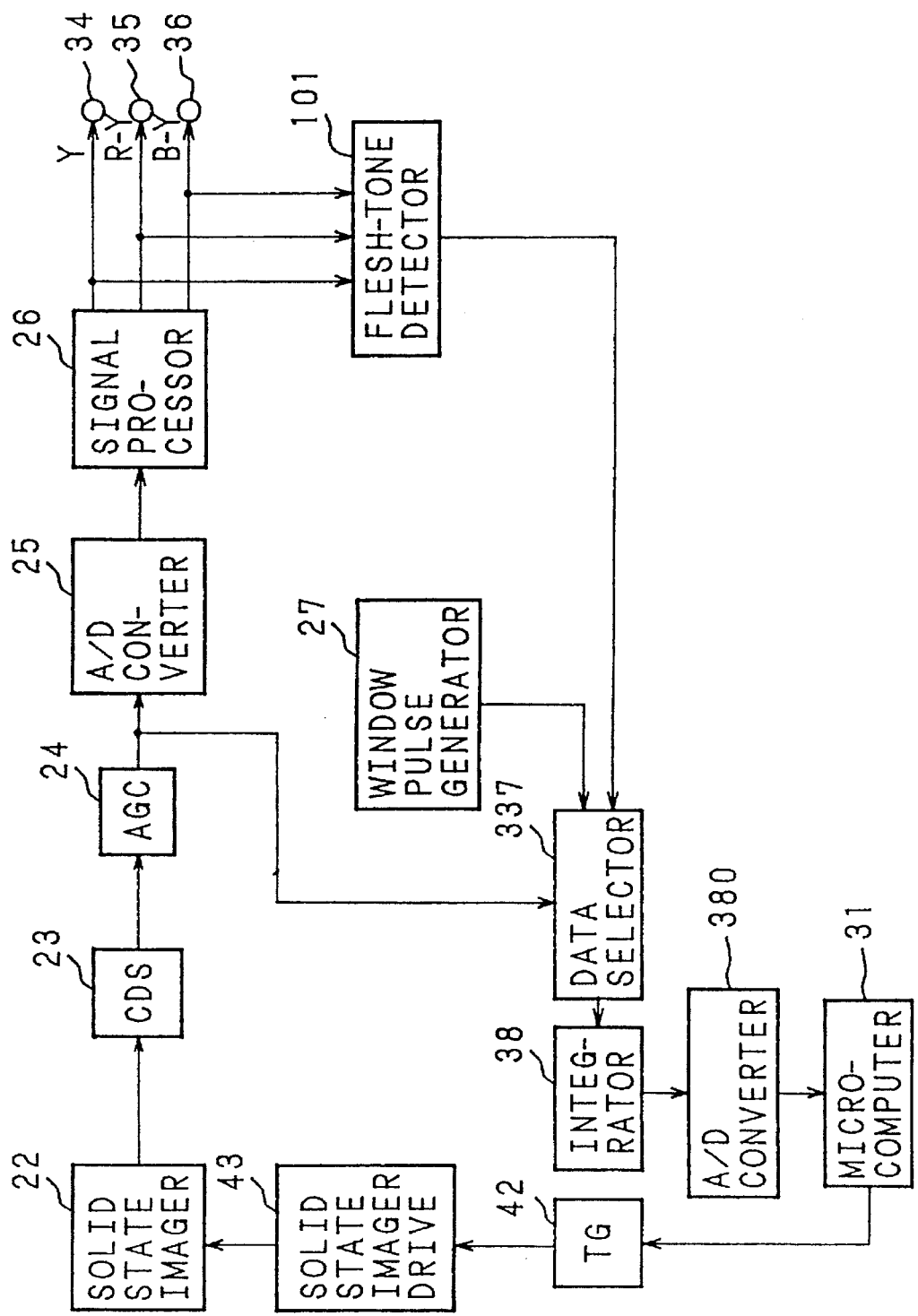
FIG. 53 is a block diagram showing the configuration of a video signal processor according to a further embodiment of the invention.

FIG. 53 is a block diagram showing the configuration of a video signal processor for a color video camera (a 32nd embodiment). In FIG. 53, the same reference numerals as those in FIG. 52 designate the same or corresponding parts. The 32nd embodiment concerns an example wherein, as in the above 31st embodiment, the photometric area is set smaller than the detected flesh-tone area. This setting operation is performed in the data selector 337, as in the 28th embodiment. The operation in this embodiment is fundamentally the same as that in the 24th embodiment, and the operation to be performed in the data selector 337 is the same as described in the 28th embodiment.

(Embodiment 33)

Figure 54:
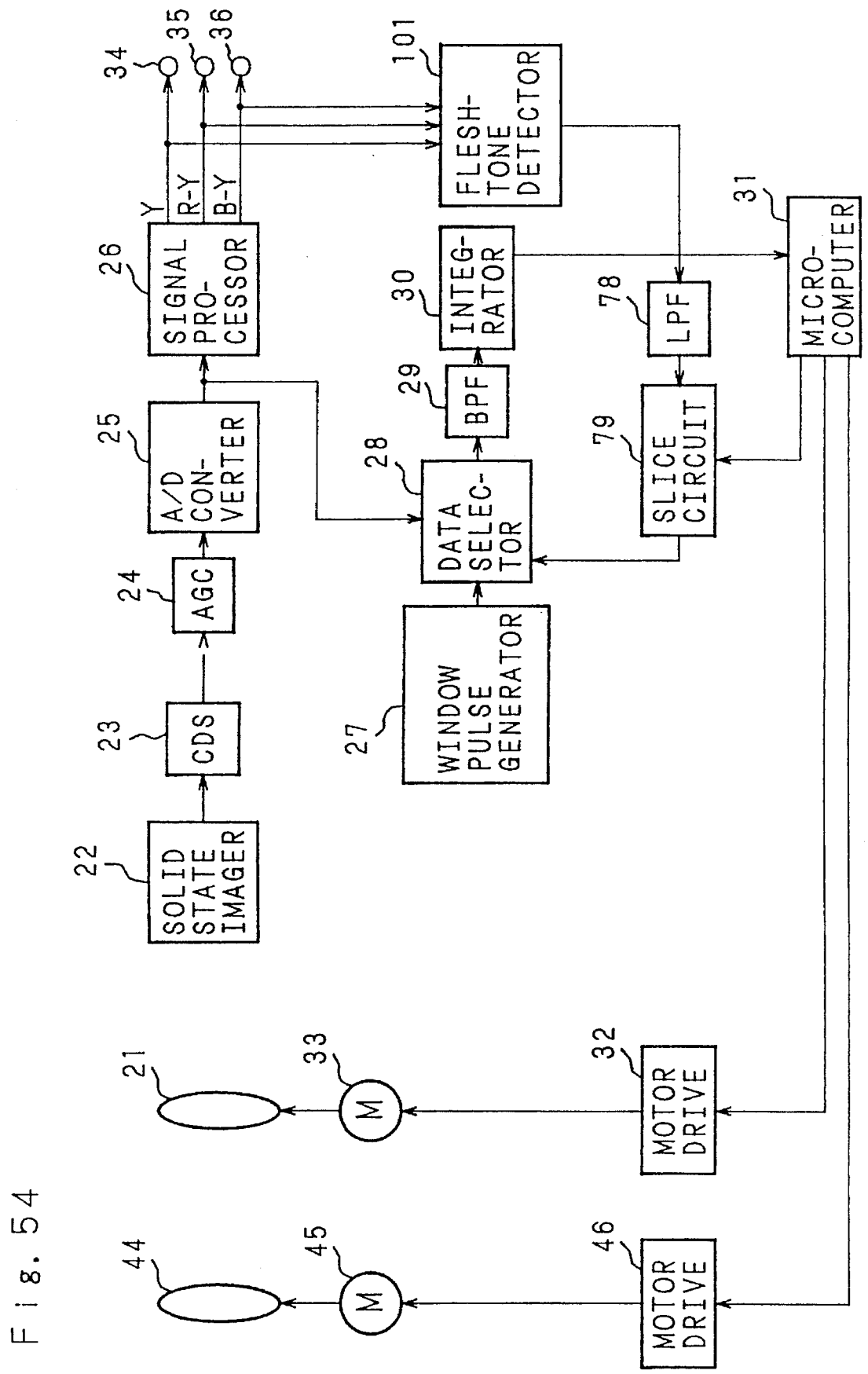
FIG. 54 is a block diagram showing the configuration of a video signal processor according to a further embodiment of the invention.

FIG. 54 is a block diagram showing the configuration of a video signal processor For a color video camera (a 33rd embodiment). In FIG. 54, the same reference numerals as those in FIG. 39 designate the same or corresponding parts. Further in FIG. 54, the reference numeral 44 designate a zoom lens, 45 refers to a motor for moving the zoom lens 44, and 46 denotes a motor drive circuit for driving the motor 45 in accordance with control signals from the microcomputer 31.

The operation in this embodiment is fundamentally the same as that in the 25th embodiment. In this embodiment, the microcomputer 31 computes from the positions of the focus lens 21 and zoom lens 44 a distance, L, to the object and a magnifying ratio, Z, for the object, and using the distance L and magnifying ratio Z, obtains k by Expression 5 shown below. The thus determined k is fed to the slice circuit 79 as a slice level.

$$k = a \cdot Z/L \quad a: \text{Constant} \hspace{2cm} \text{(Expression 5)}$$

Figure 55:
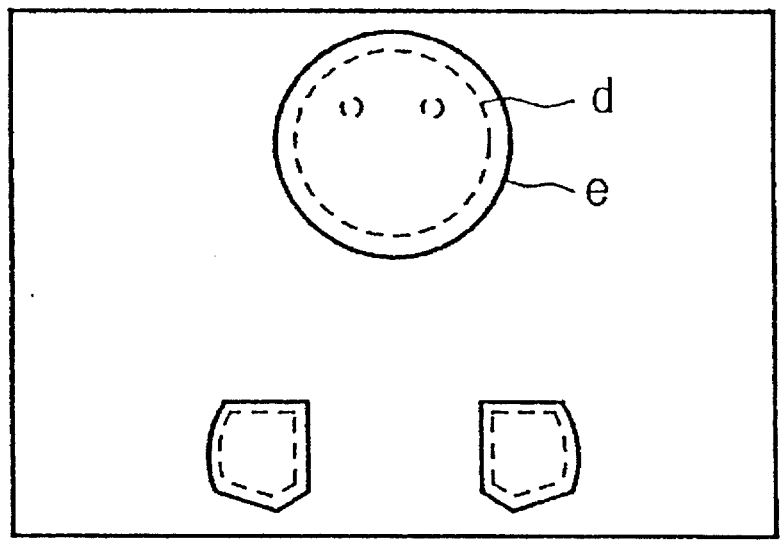
FIG. 55 is a diagram showing a focus area.
Figure 56:
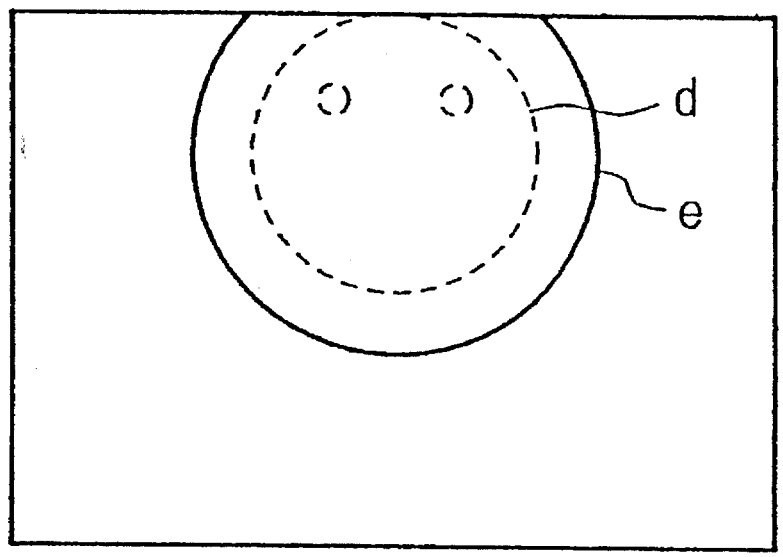
FIG. 56 is a diagram showing a focus area.

As the value k being determined in this way, the focus area (e) in FIG. 41 varies, for example, as shown in FIG. 55 and 56, in accordance with the distance to the object and the magnifying ratio for the object.

(Embodiment 34)

Figure 57:
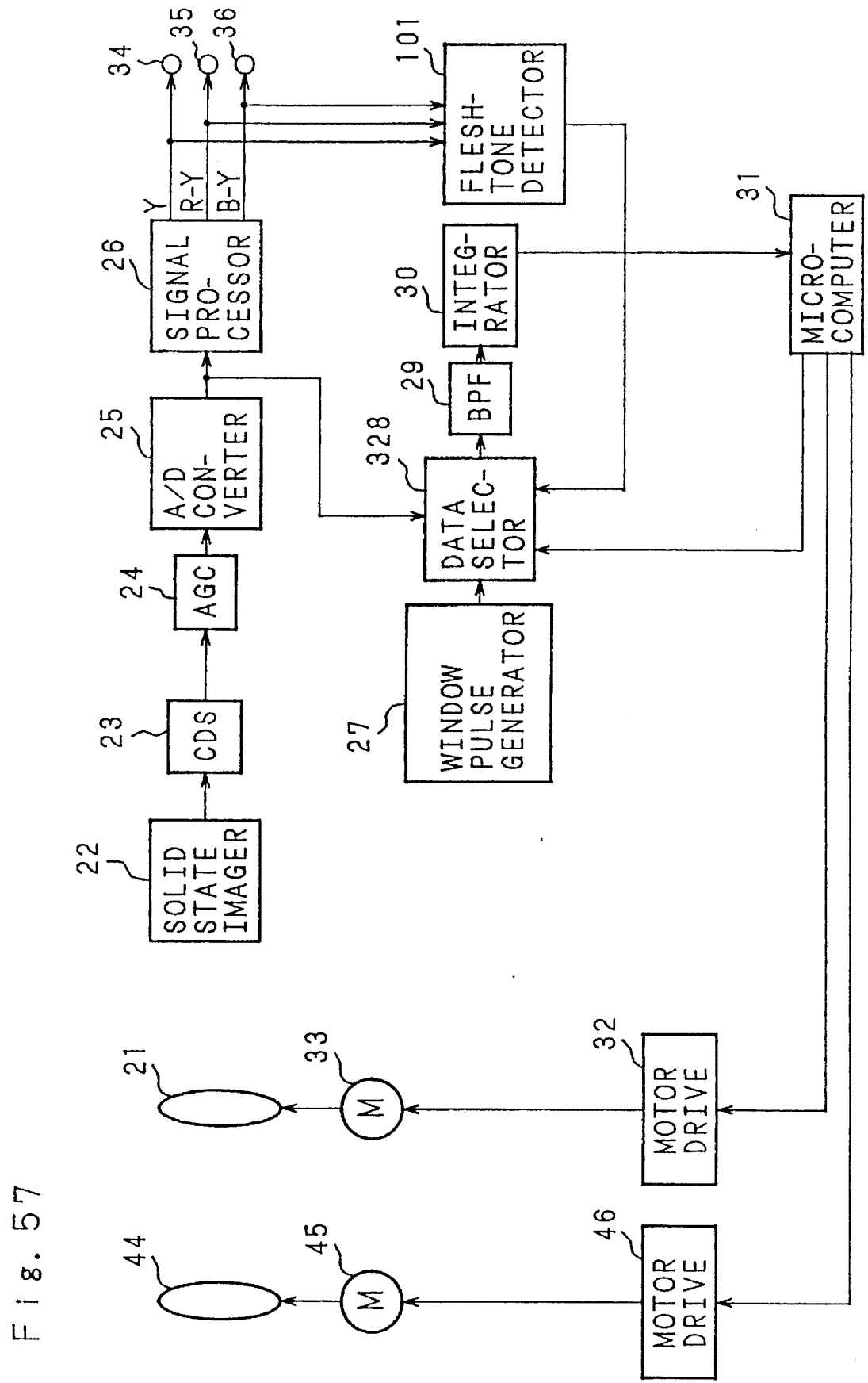
FIG. 57 is a block diagram showing the configuration of a video signal processor according to a further embodiment of the invention.

FIG. 57 is a block diagram showing the configuration of a video signal processor for a color video camera (a 34th embodiment). In FIG. 57, the same reference numerals as those in FIGS. 42 and 54 designate the same or corresponding parts. This embodiment concerns an example wherein the 26th embodiment is adapted so that the value k calculated by Expression 5 as in the 33rd embodiment is supplied to the data selector 28.

(Embodiment 35)

Figure 58:
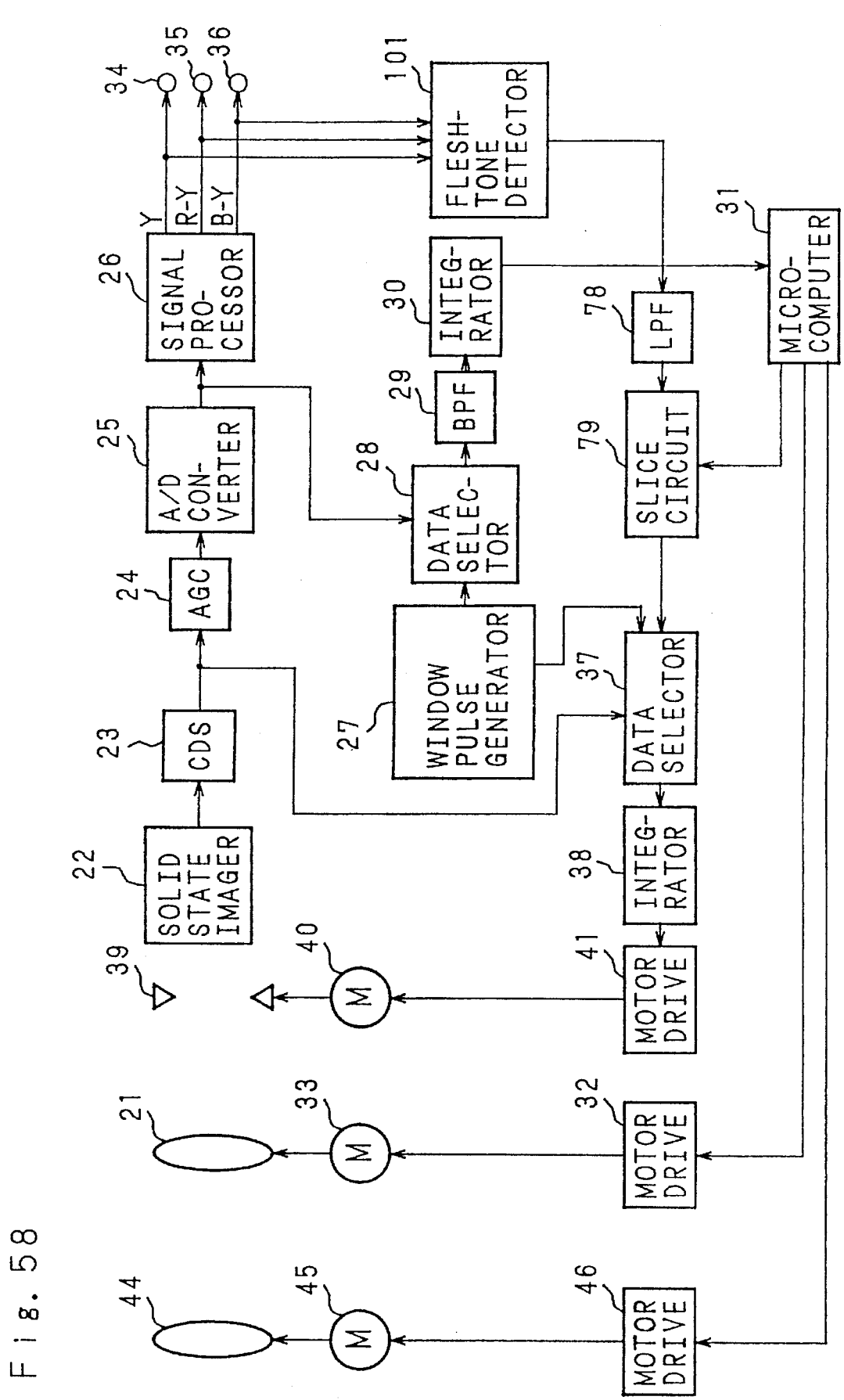
FIG. 58 is a block diagram showing the configuration of a video signal processor according to a further embodiment of the invention.

FIG. 58 is a block diagram showing the configuration of a video signal processor for a color video camera (a 35th embodiment). In FIG. 58, the same reference numerals as those in FIGS. 45 and 54 designate the same or corresponding parts.

Figure 59:
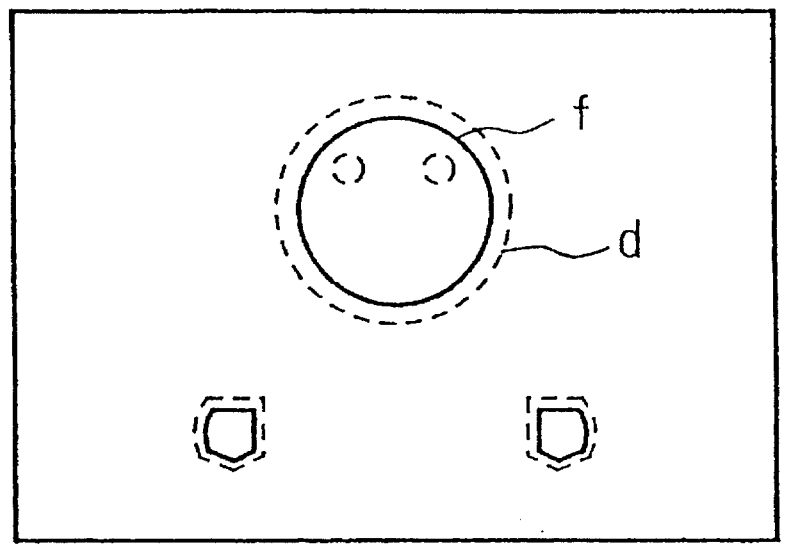
FIG. 59 is a diagram showing a photometric area.
Figure 60:
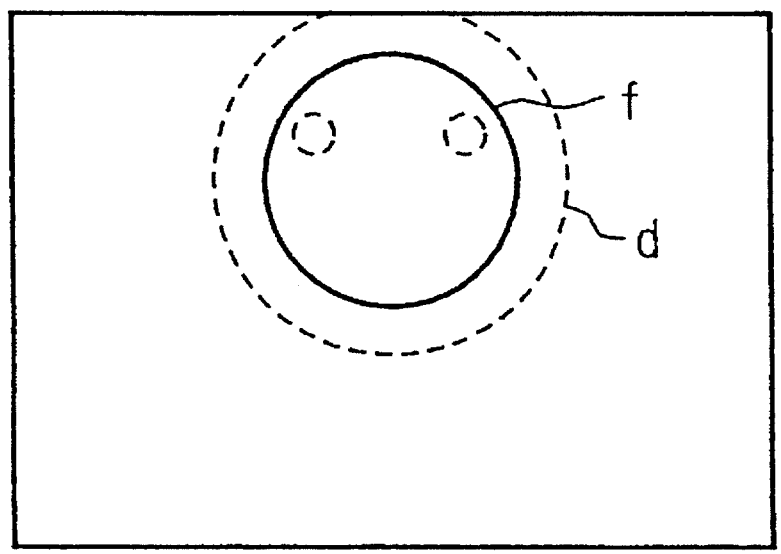
FIG. 60 is a diagram showing a photometric area.

The operation in this embodiment is fundamentally the same as that in the 27th embodiment. In this embodiment, the microcomputer 31 computes from the positions of the focus lens 21 and zoom lens 44 a distance, L, to the object and a magnifying ratio, Z, for the object, obtains the value k by Expression 5, as described above, and supplies the determined value k to the slice circuit 79 as a slice level. As the value k being determined in this way, the photometric area (f) in FIG. 47 varies, for example, as shown in FIGS. 59 and 60, in accordance with the distance to the object and the magnifying ratio for the object.

(Embodiment 36)

Figure 61:
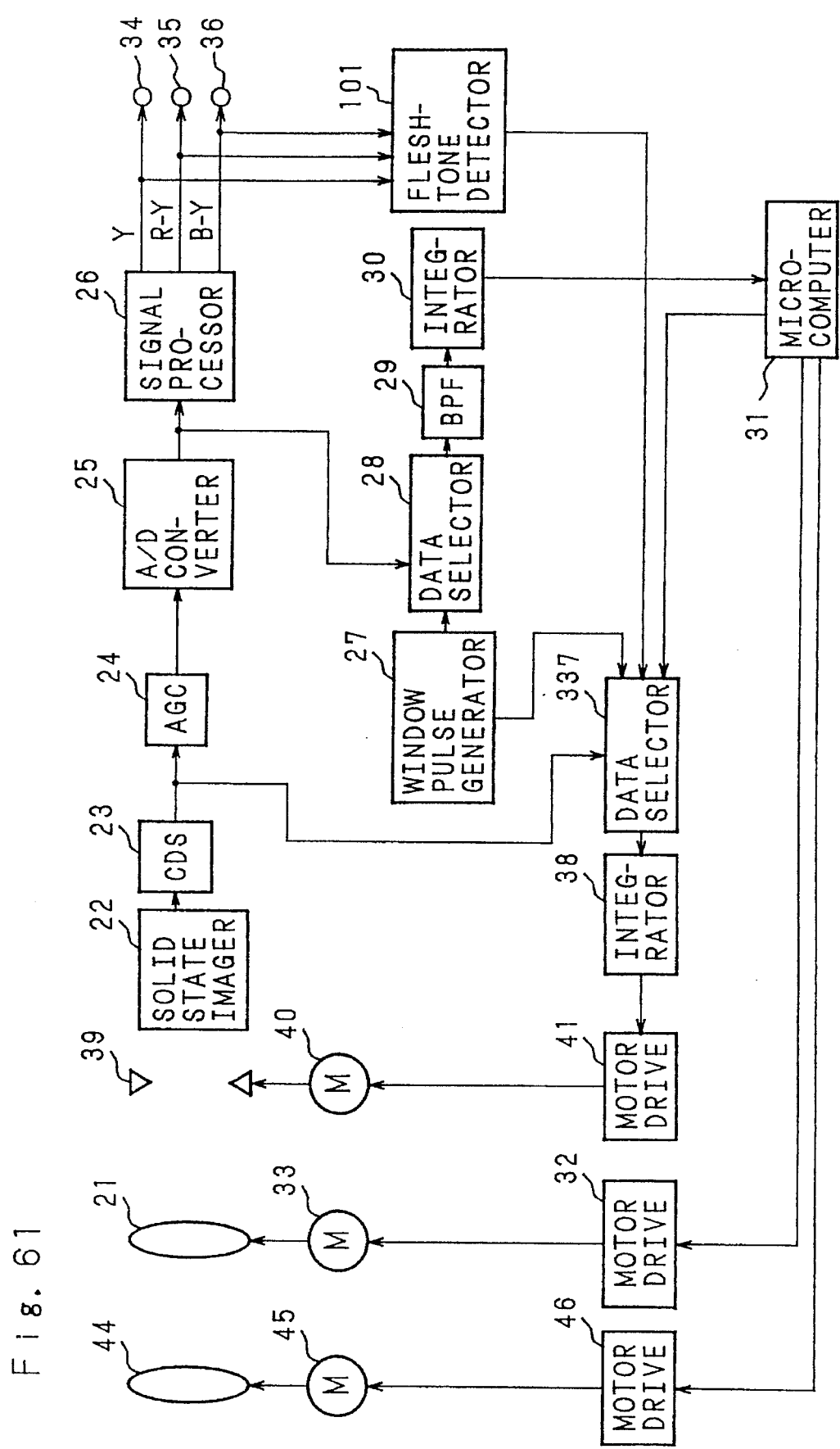
FIG. 61 is a block diagram showing the configuration of a video signal processor according to a further embodiment of the invention.

FIG. 61 is a block diagram showing the configuration of a video signal processor for a color video camera (a 36th embodiment). In FIG. 61, the same reference numerals as those in FIG. 48 and 58 designate the same or corresponding parts. This embodiment concerns an example wherein the 28th embodiment is adapted so that the value k calculated by Expression 5 as in the 35th embodiment is supplied to the data selector 37.

(Embodiment 37)

Figure 62:
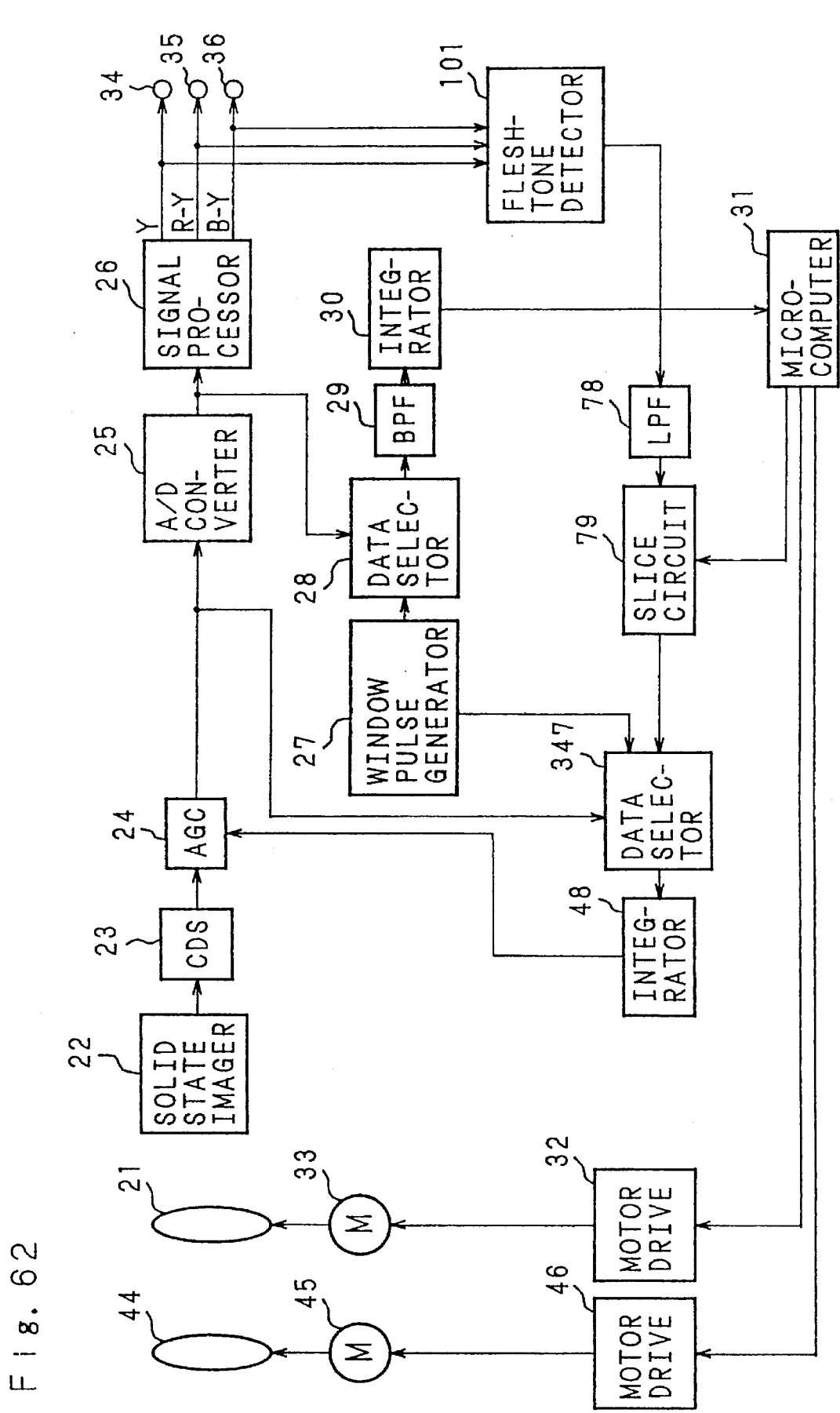
FIG. 62 is a block diagram showing the configuration of a video signal processor according to a further embodiment of the invention.

FIG. 62 is a block diagram showing the configuration of a video signal processor for a color video camera (a 37th embodiment). In FIG. 62, the same reference numerals as those in FIGS. 50 and 54 designate the same or corresponding parts.

The operation in this embodiment is fundamentally the same as that in the 29th embodiment. In this embodiment, the microcomputer 31 computes from the positions of the focus lens 21 and zoom lens 44 a distance, L, to the object and a magnifying ratio, Z, for the object, obtains the value k by Expression 5, as described above, and supplies the determined value k to the slice circuit 79 as a slice level. As the value k being determined in this way, the photometric area (f) in FIG. 47 varies, for example, as shown in FIGS. 59 and 60, in accordance with the distance to the object and the magnifying ratio for the object.

(Embodiment 38)

Figure 63:
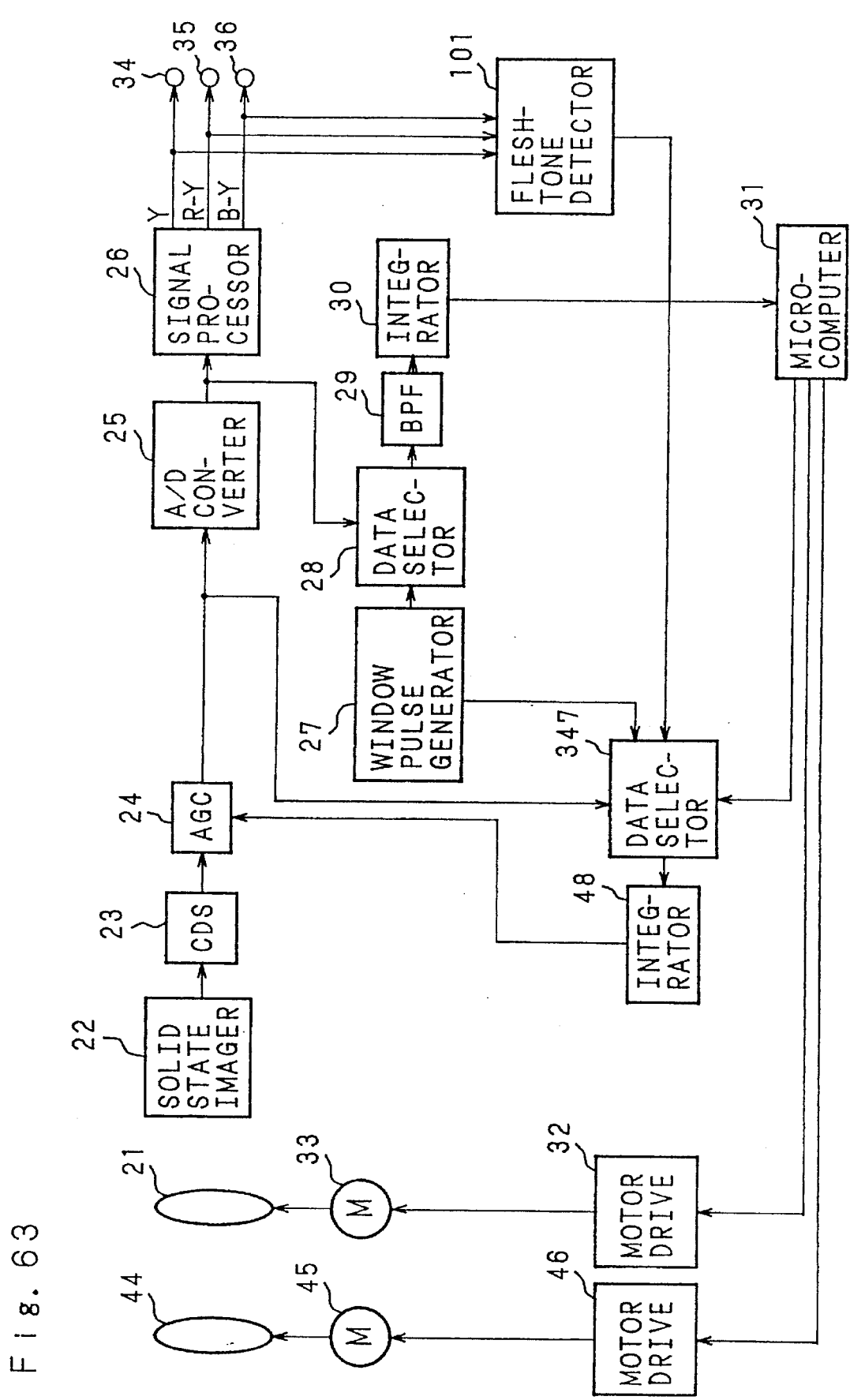
FIG. 63 is a block diagram showing the configuration of a video signal processor according to a further embodiment of the invention.

FIG. 63 is a block diagram showing the configuration of a video signal processor for a color video camera (a 38th embodiment). In FIG. 63, the same reference numerals as those in FIGS. 51 and 62 designate the same or corresponding parts. This embodiment concerns an example wherein the 30th embodiment is adapted so that the value k calculated by Expression 5 as in the 37th embodiment is supplied to the data selector 47.

(Embodiment 39)

Figure 64:
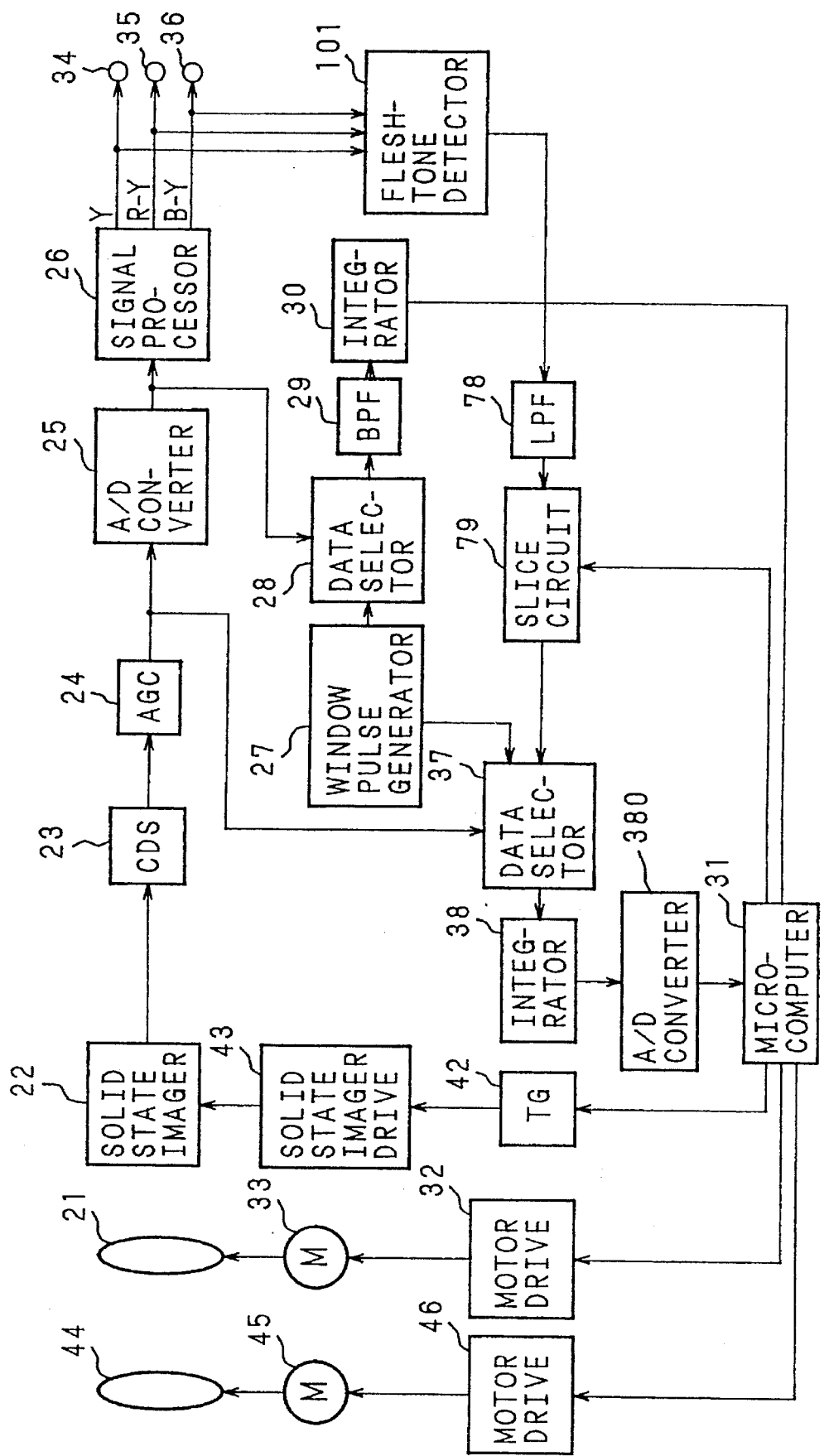
FIG. 64 is a block diagram showing the configuration off a video signal processor according to a further embodiment of the invention.

FIG. 64 is a block diagram showing the configuration of a video signal processor for a color video camera (a 39th embodiment). In FIG. 64, the same reference numerals as those in FIGS. 52 and 54 designate the same or corresponding parts.

The operation in this embodiment is fundamentally the same as that in the 31st embodiment. In this embodiment, the microcomputer 31 computes from the positions of the focus lens 21 and zoom lens 44 a distance, L, to the object and a magnifying ratio, Z, for the object, obtains the value k by Expression 5, as described above, and supplies the thus determined value k to the slice circuit 79 as a slice level. As the value k being determined in this way, the photometric area (f) in FIG. 47 varies, for example, as shown in FIGS. 59 and 60, in accordance with the distance to the object and the magnifying ratio for the object.

(Embodiment 40)

Figure 65:
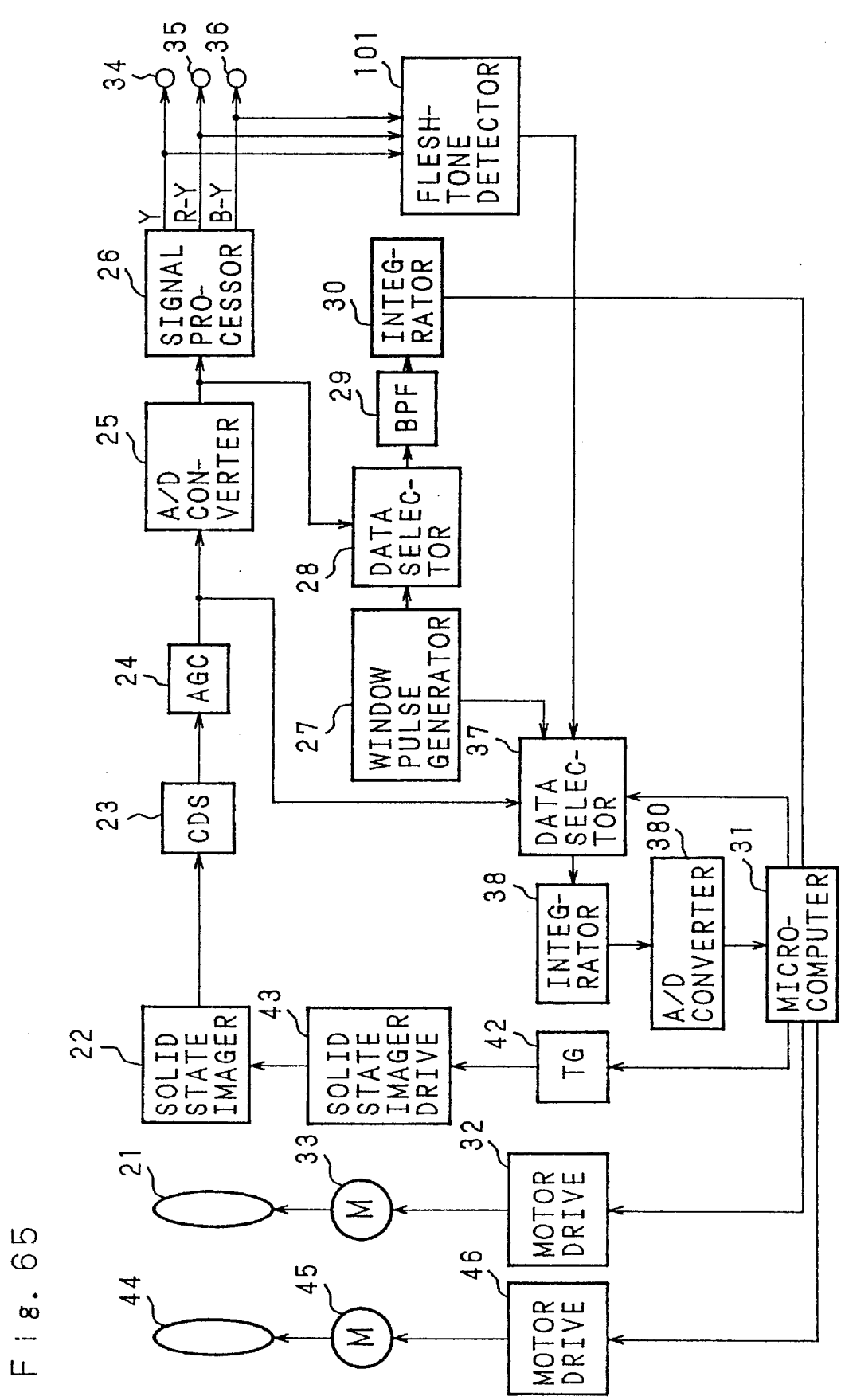
FIG. 65 is a block diagram showing the configuration of a video signal processor according to a further embodiment, of the invention.

FIG. 65 is a block diagram showing the configuration of a video signal processor for a color video camera (a 40th embodiment). In FIG. 65, the same reference numerals as those in FIGS. 53 and 64 designate the same or corresponding parts. This embodiment concerns an example wherein the 32nd embodiment is adapted so that the value k calculated by Expression 5 as in the 39th embodiment is supplied to the data selector 87.

(Embodiment 41)

A 41st embodiment shows an example wherein the 33rd embodiment is adapted so that the value k to be calculated is limited to within predetermined. The configuration of this embodiment is the same as that of the 33rd embodiment The microcomputer 31 computes from the positions of the focus lens 21 and zoom lens 44 a distance, L, to the object and a magnifying ratio, Z, for the object, and using L and Z, obtains the value k by Expression 5. However, in this embodiment, the value k calculated by Expression 5 is limited by predetermined values s1 and s2 as shown in Expression 6 below.

$$s1 \geq a \cdot Z/L \geq s2 \qquad \text{(Expression 6)}$$

Figure 66:
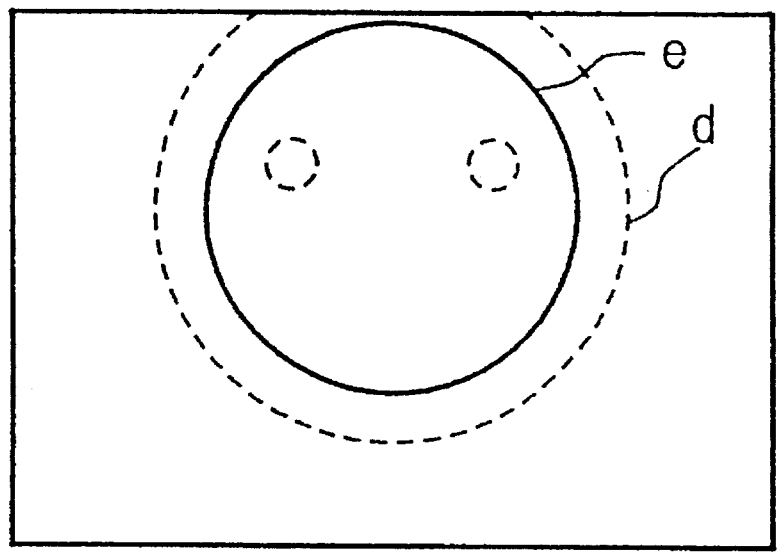
FIG. 66 is a diagram showing a focus area.

In this embodiment also, the focus area varies with L and Z, as shown in FIGS. 55 and 56, but since the value k is limited by s1, k becomes fixed to a boundary value, s1, when the product of object magnifying ratio Z and constant a, multiplied by the reciprocal of object distance (1/L), exceeds s1. Therefore, when the flesh-tone area becomes larger than the picture angle determined by the above value s1, the focus area is set as a smaller area (e) than the flesh-tone area (d) as shown in FIG. 66.

It will be recognized that the above method can also be applied to the 34th embodiment (the configuration of FIG. 57).

(Embodiment 42)

The 42nd embodiment shows an example wherein the 35th embodiment is adapted so that the value k to be calculated is limited to within predetermined bounds. The configuration of this embodiment is the same as that of the 35th embodiment (FIG. 58 ).

Figure 67:
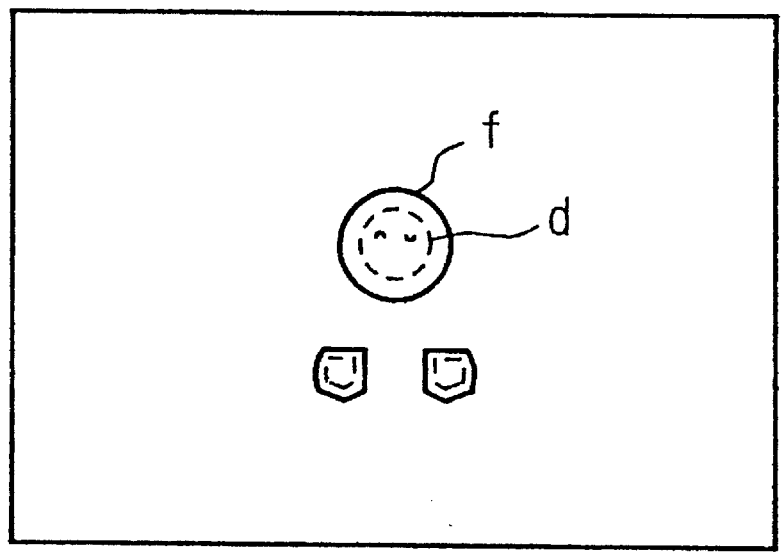
FIG. 67 is a diagram showing a photometric area.

The microcomputer 31 obtains the value k by Expression 5 using the object distance L and the object magnifying ratio Z, but, in this embodiment, the value k calculated by Expression 5 is limited by the predetermined values s1 and s2 as shown in the above Expression 6. In this embodiment also, the focus area varies with L and Z, as shown in FIGS. 59 and 60, but since the value k is limited by s2, k becomes fixed to a boundary value, s2, when the product of object magnifying ratio Z and constant a, multiplied by the reciprocal of object distance (1/L), becomes smaller than s2. Therefore, when the flesh-tone area becomes smaller than the picture angle determined by the above value s2, the photometric area is set as a larger area (f) than the flesh-tone area (d), as shown in FIG. 67.

It will be recognized that the above method can also be applied to the 36th embodiment (the configuration of FIG. 61).

(Embodiment 43)

The 43rd embodiment shows an example wherein the 37th embodiment is adapted so that the value k to be calculated is limited to within predetermined bounds. The configuration of this embodiment is the same as that of the 37th embodiment (FIG. 62).

The microcomputer 31 obtains the value k by Expression 5 using the object distance L and the object magnifying ratio Z, but, in this embodiment, the value k calculated by Expression 5 is limited by the predetermined values s1 and s2 as shown in the above Expression 6. In this embodiment also, the focus area varies with L and Z, as shown in FIGS. 59 and 60, but since the value k is limited by s2, k becomes fixed to a boundary value, s2, when the product of object magnifying ratio Z and constant a, multiplied by the reciprocal of object distance (1/L), becomes smaller than 32. Therefore, when the flesh-tone area becomes smaller than the picture angle determined by the above value s2, the photometric area is set as a larger area than the flesh-tone area, as shown in FIG. 67.

It will be recognized that the above method can also be applied to the 38th embodiment (the configuration of FIG. 63).

(Embodiment 44)

The 44th embodiment shows an example wherein the 39th embodiment is adapted so that the value k to be calculated is limited to within predetermined bounds. The configuration of this embodiment is the same as that of the 39th embodiment (FIG. 64).

The microcomputer 31 obtains the value k by Expression 5 using the object distance L and the object magnifying ratio Z, but, in this embodiment, the value k calculated by Expression 5 is limited by the predetermined values s1 and s2 as shown in the above Expression 6. In this embodiment also, the focus area varies with L and Z, as shown in FIGS. 59 and 60, but since the value k is limited by s2, k becomes fixed to a boundary value, s2, when the product of object magnifying ratio Z and constant a, multiplied by the reciprocal of object distance (1/L), becomes smaller than s2. Therefore, when the flesh-tone area becomes smaller than the picture angle determined by the above value s2, the photometric area is set as a larger area than the flesh-tone area, as shown in FIG. 67.

It will be recognized that the above method can also be applied to the 40th embodiment (the configuration of FIG. 65).

As described above, in the embodiments 21, 25, 26, 33, 34, and 41, a main object (person) can always be brought into focus by an auto focusing process with a simple circuit configuration. Furthermore, according to the embodiments, 22, 23, 24, 27, 28, 29, 30, 31, 32, 35, 36, 37, 38, 39, 40, 42, 43, and 44, the photometric area can be controlled so that an optimum image can be obtained without causing black compression or white saturation whether main object (person) is positioned against backlight or with front lighting.

(Embodiment 45)

Figure 68:
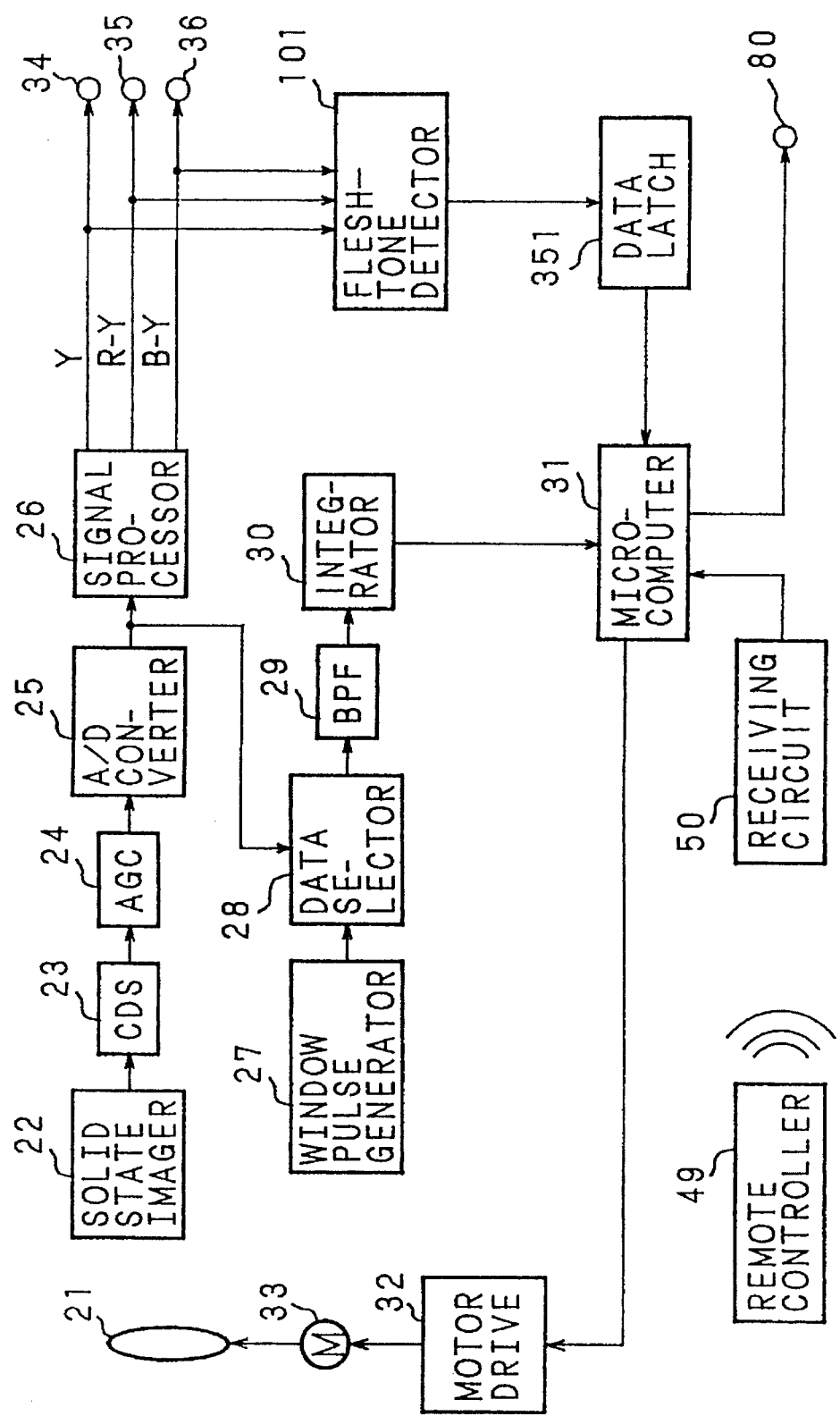
FIG. 68 is a block diagram showing the configuration of a color video camera according to the present invention.
Figure 69:
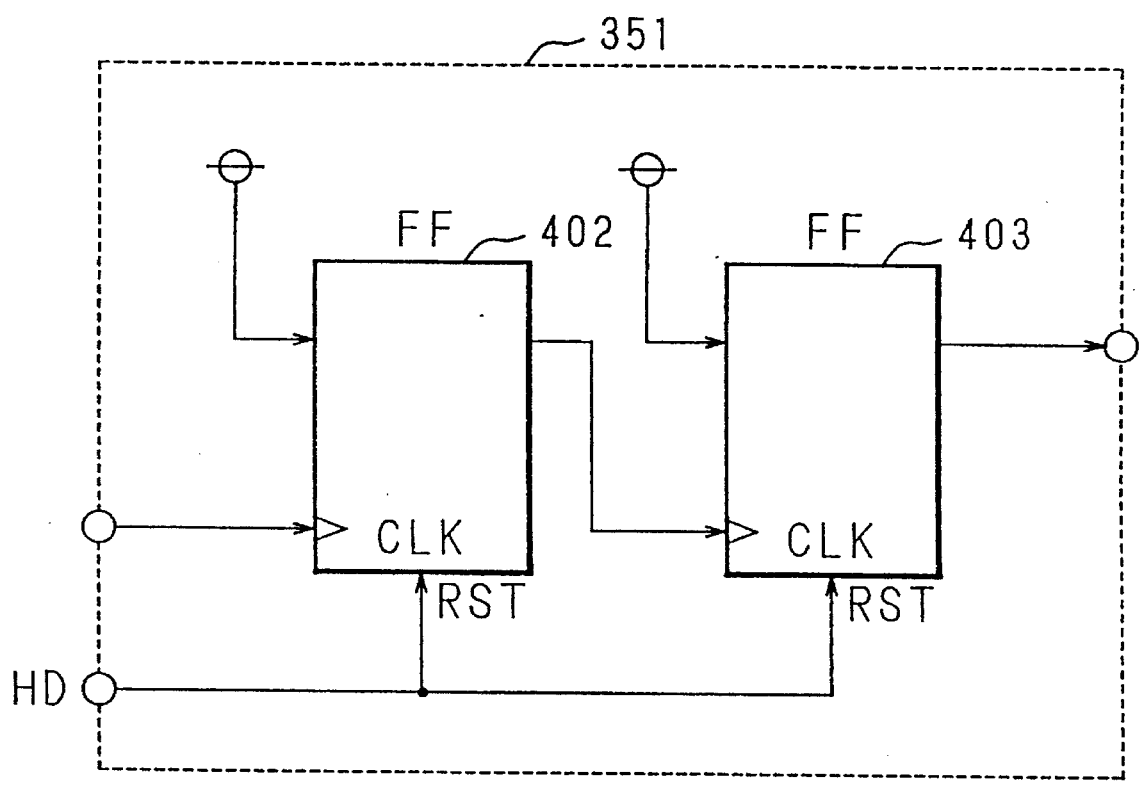
FIG. 69 is a diagram showing the configuration of a data latch circuit.

FIG. 68 is a block diagram showing the configuration of a color video camera (a 45th embodiment). In FIG. 68, the same reference numerals as those in FIG. 33 designate the same or corresponding parts. Further in FIG. 68, the reference numeral 49 designates a remote controller, 50 is a receiving circuit, 80 is an output terminal, and 351 denotes a data latch circuit. FIG. 69 shows the internal configuration of the data latch circuit 351, wherein the reference numerals 402 and 403 designate flip-flops.

The operation of this embodiment will now be described. The operation for focus area setting and the operation of the flesh-tone detector 101 for flesh-tone area detection are the same as described in the 21st embodiment, and therefore, are not described here. The flesh-tone detection signal detected by the flesh-tone detector 101 is fed to the data latch circuit 351. The flesh-tone detection signal serves as a clock signal to drive the flip-flop 402. Since the other signal input terminal on the flip-flop 402 is fixed to "High", the flip-flop 402 outputs a "High" signal when a flesh-tone detection signal in a "High" state is applied. The output signal of the flip-flop 402 serves as a clock signal to drive the flip-flop 403 which operates in the same way as the flip-flop 402. When a VD pulse is applied to a reset terminal, both the flip-flops 402 and 403 are reset. Thus, when a flesh-tone area is detected during one vertical scanning period, the data latch circuit 351 outputs a "High" signal for the duration of the next horizontal scanning period. It is therefore possible to determine the presence or absence of a flesh-tone area during one horizontal scanning period by examining the output signal of the data latch circuit 351.

Figure 70:
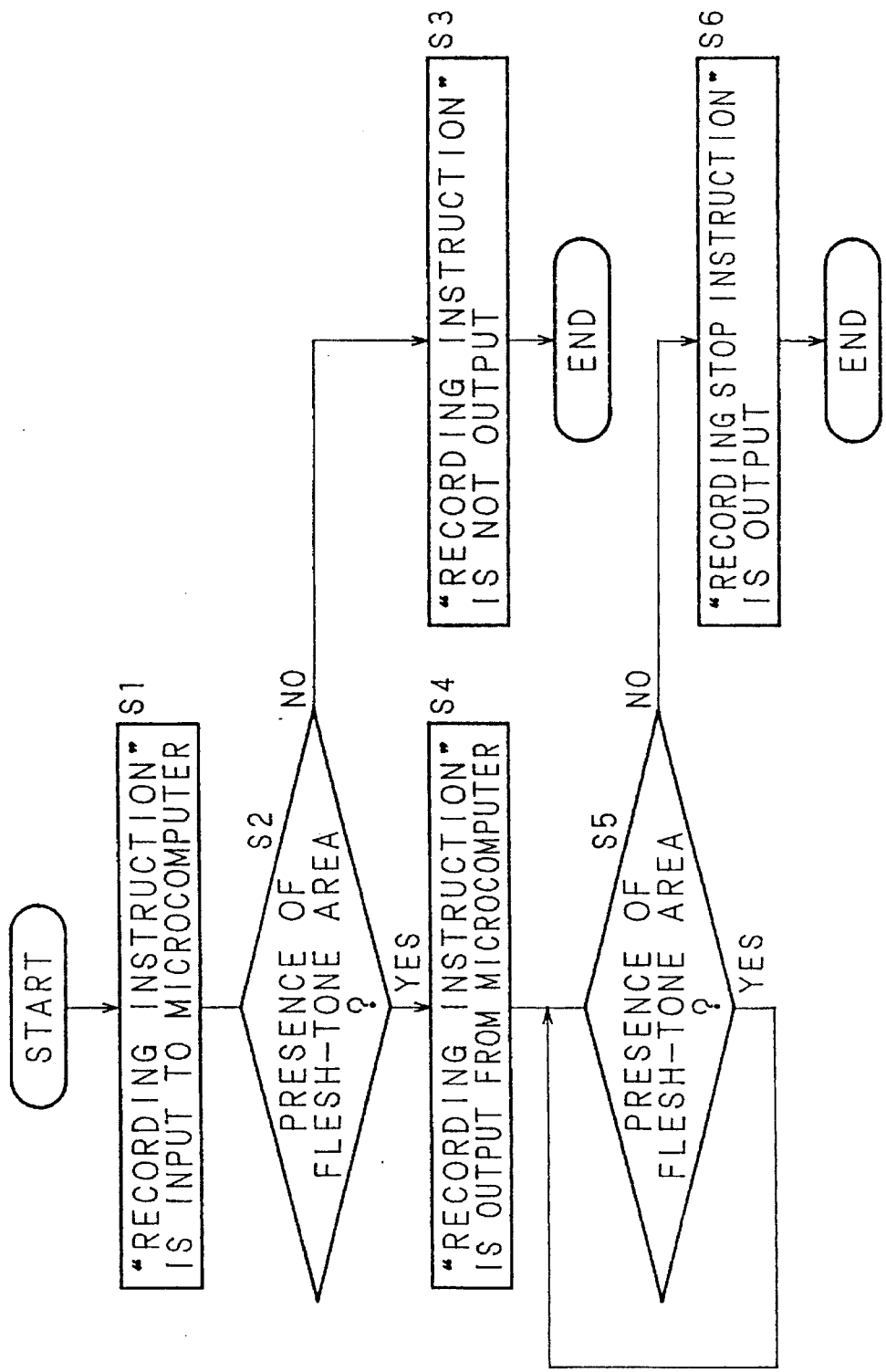
FIG. 70 is a flowchart illustrating the algorithm of a microcomputer.

FIG 70 is a flowchart illustrating the algorithm of the microcomputer 31. The following description is based on the flowchart of FIG. 70. First, receiving a "recording instruction" from the remote controller 49, the receiving circuit 50 transfers the "recording instruction" to the microcomputer 31 When the "recording instruction" is input into the microcomputer 31 (step S1), the microcomputer 31 examines the output signal of the flesh-tone detector 101 to determine the presence or absence of a flesh-tone area in the video signals being produced (step S2). If no flesh-tone area is detected in the video signals, the microcomputer 31 does not transfer the "recording instruction" to the output terminal 80 (step S3). As a result, recording will not be started even if a "recording instruction" is sent from the remote controller 49.

On the other hand, when a flesh-tone area is detected in the video signals by examining the output signal of the data latch circuit 351, the microcomputer 31 transfers the "recording instruction" to the output terminal 80. In response to the "recording instruction" transferred from the microcomputer 31, the video camera starts recording the video signals being produced (step S4). After the recording is started, the output signal is constantly examined to determine whether the flesh-tone area is being detected in the video signals (step S5), and if no flesh-tone area is detected in the video signals, the microcomputer 31 outputs a "recording stop instruction" (step S6), in response to which the video camera stops recording.

(Embodiment 46)

Figure 71:
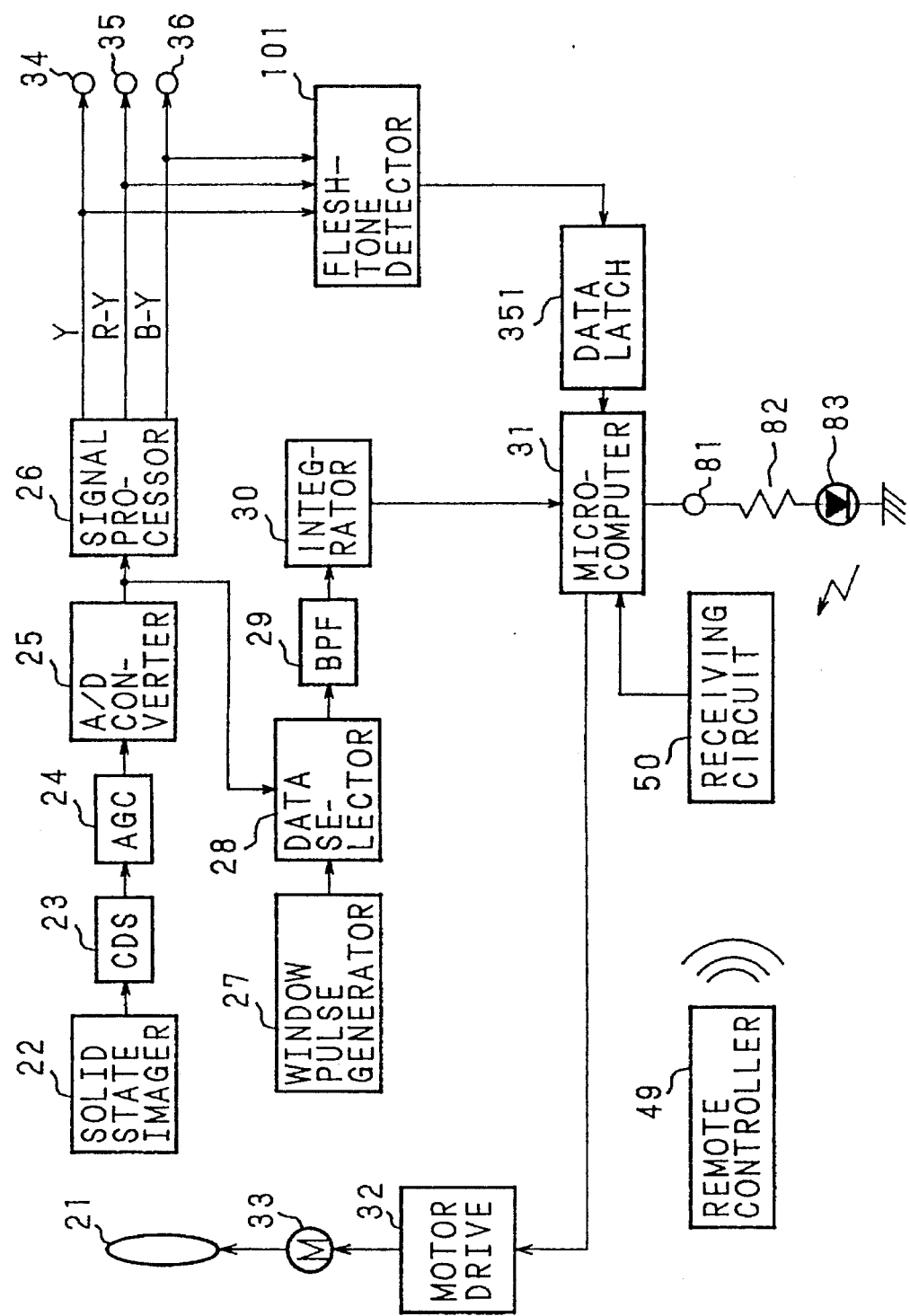
FIG. 71 is a block diagram showing the configuration of a color video camera according to another embodiment of the invention.

FIG 71 is a block diagram showing the configuration of a color video camera (a 46th embodiment). In FIG. 71, the same reference numerals as those in FIG. 68 designate the same or corresponding parts. Further in FIG. 71, the reference numeral 81 designates an output terminal, 82 refers to a resistor, and 83 denotes a light-emitting diode.

Figure 72:
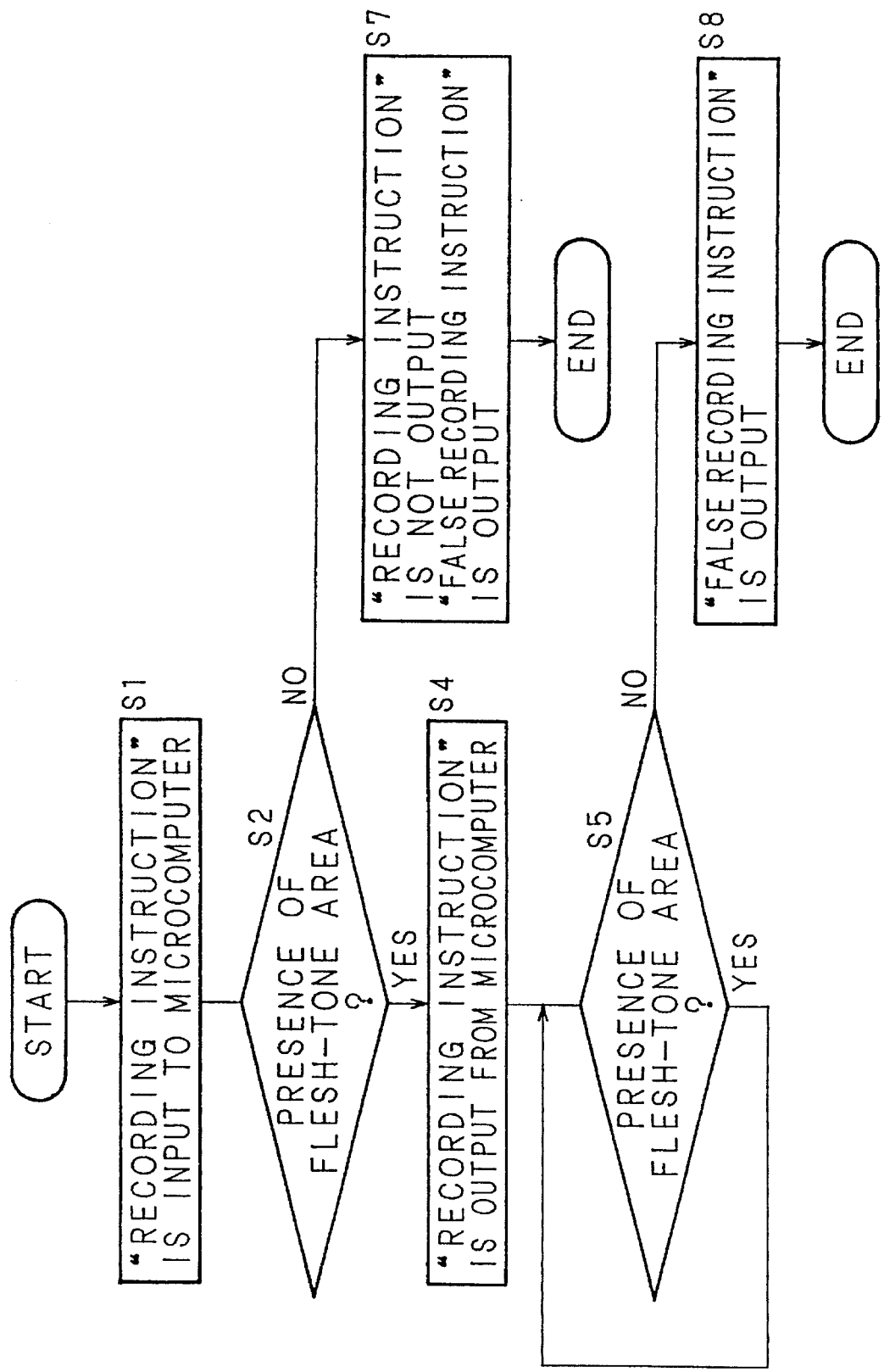
FIG. 72 is a flowchart illustrating the algorithm of a microcomputer.

FIG. 72 is a flowchart illustrating the algorithm of the microcomputer 31 according to the present embodiment. The same step numbers as those in FIG. 70 designate the steps with the same contents. Prior to the start of recording, if there are no flesh-tone areas detected in the video signals being produced (step 2: NO), a "false recording instruction" is sent to the output terminal 81 (step 7). As a result, recording will not be started even if a "recording instruction" is sent from the remote controller 49. Furthermore, after starting the recording, if no flesh-tone area is detected in the video signals (step 5: NO), the microcomputer 31 also sends a "false recording instruction" to the output terminal 81 (step 8).

It is assumed here that the microcomputer 31 outputs a 5 V "High" signal as the "false recording instruction" to the output terminal 81. The signal is input into the light-emitting diode 83 through the resistor 82, thereby causing the light-emitting diode 83 to emit light. The 5 V "High" voltage is only an example of the "false recording instruction", and other voltage or other data signal can serve the same purpose.

(Embodiment 47)

Figure 73:
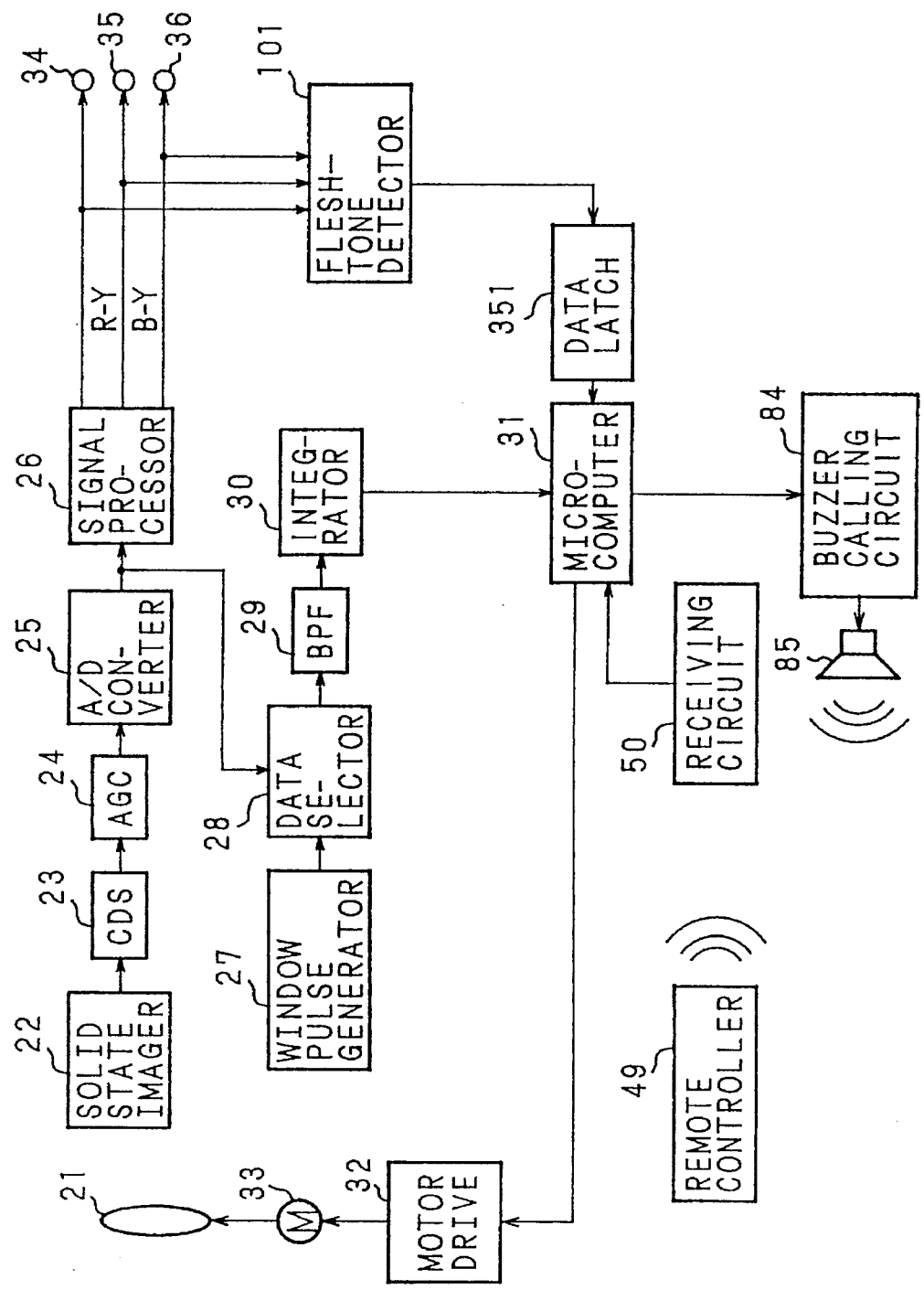
FIG. 73 is a block diagram showing the configuration of a color video camera according to a further embodiment of the invention.

FIG. 73 is a block diagram showing the configuration of a color video camera (a 47th embodiment). In FIG. 73, the same reference numerals as those in FIG. 68 designate the same or corresponding parts. Further in FIG. 73, the reference numeral 84 designates a buzzer calling circuit and 85 indicates a buzzer.

In operation, when no flesh-tone area is detected in the video signals, a "false recording instruction" is sent to the buzzer calling circuit 84 in accordance with the flowchart of FIG. 72. When the "false recording instruction" is input, the buzzer calling circuit 84 activates the buzzer 85. Instead of issuing a buzzer sound, the buzzer calling circuit 84 and buzzer 85 may be designed to generate an electronic sound.
(Embodiment 48)

Figure 74:
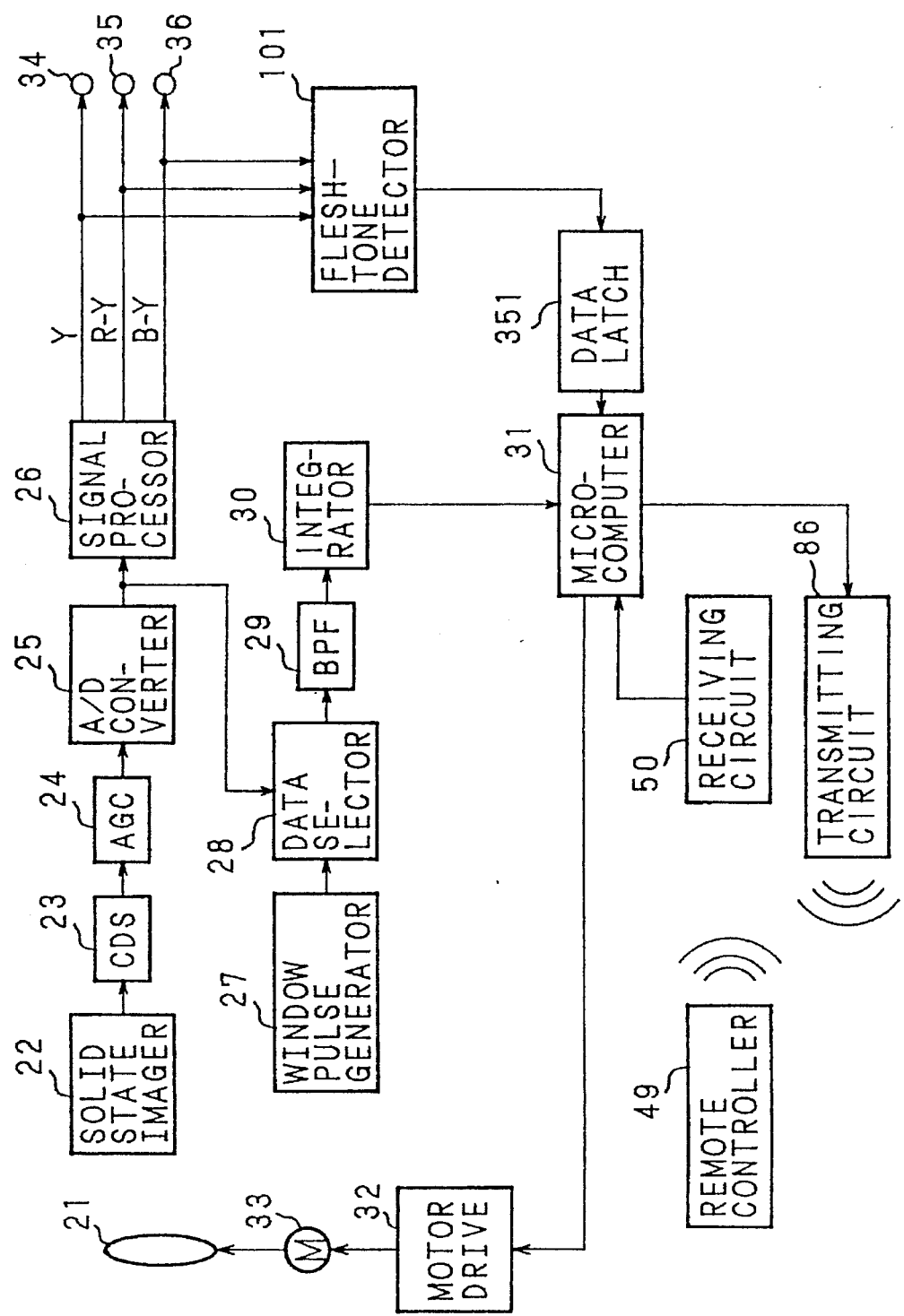
FIG. 74 is a block diagram showing the configuration of a color video camera according to a further embodiment of the invention.

FIG. 74 is a block diagram showing the construction of a color video camera (a 48th embodiment). In FIG. 74, the same reference numerals as those in FIG. 68 designate the same or corresponding parts. Further in FIG. 74, the reference numeral 86 designates a transmitting circuit which transmits a signal, fed from the microcomputer 31, in the form of an infrared light pattern, like the remote controller 49.

Figure 75:
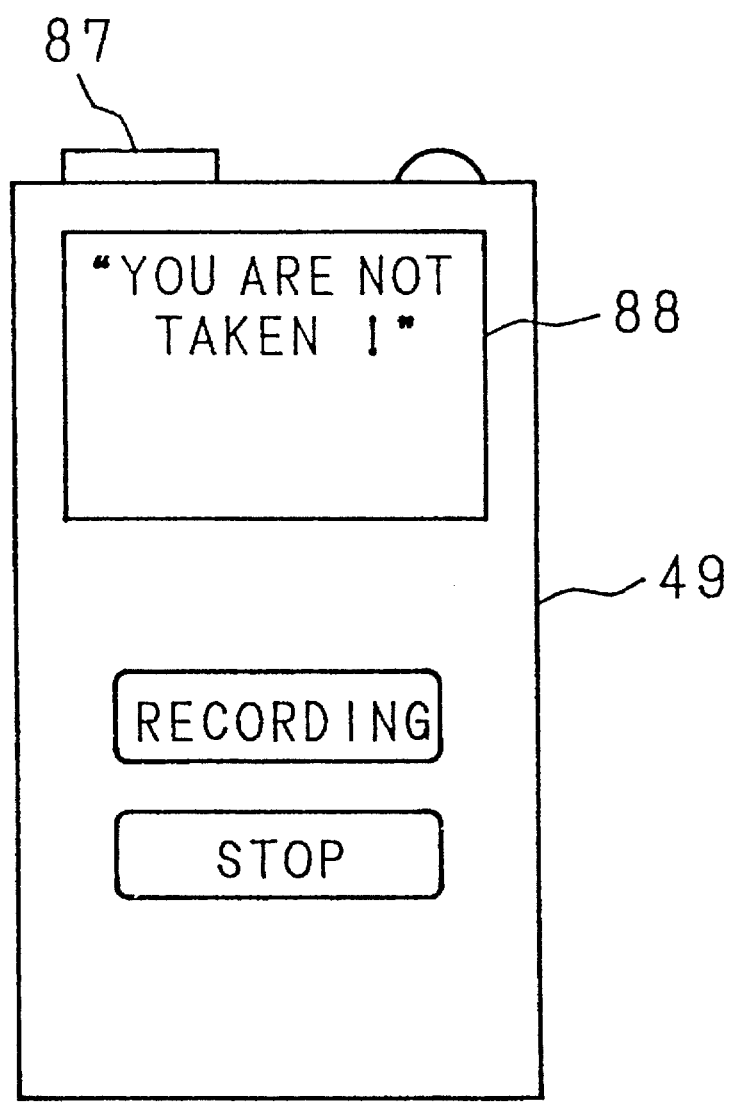
FIG. 75 is a schematic diagram showing an example of the construction of a remote controller.

The operation in this embodiment will now be described. When no flesh-tone area is detected in the video signals, a "false recording instruction" is sent to the transmitting circuit 85 in accordance with the flowchart of FIG. 72. The remote controller, 49 contains, as shown in FIG. 75, a receiving circuit 87 for receiving infrared light from the transmitting circuit 86, and a liquid-crystal display 88 for displaying characters, etc. When a "false recording instruction" is received from the transmitting circuit 86, the remote controller 49 displays a "false recording" message on the liquid-crystal display 88. A CRT or other appropriate display device may be used instead of the liquid-crystal display 88.

Figure 76:
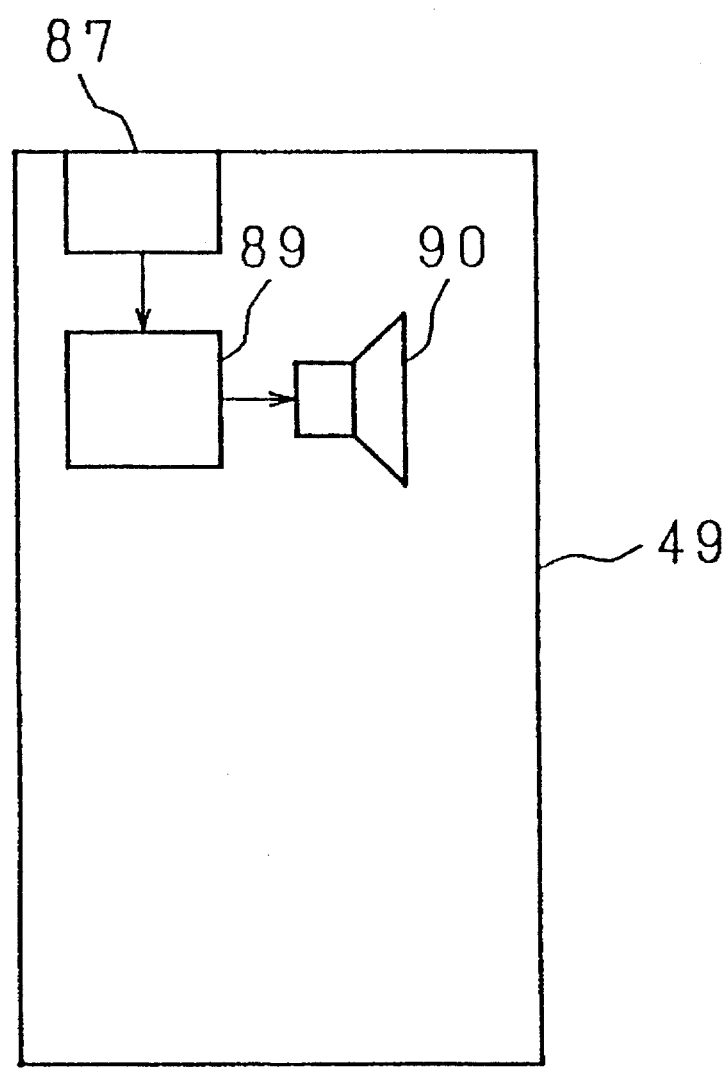
FIG. 76 is a schematic diagram showing another example of the construction of the remote controller.

Instead of using the above display, the remote controller 49 may be constructed with a buzzer calling circuit 89 and a buzzer 90 in FIG. 76 so that when receiving a "false recording instruction", the receiving circuit 87 issues a signal signifying the reception of this instruction, for example, a "High" signal, to the buzzer calling circuit 89 which in response activates the buzzer 90. This also accomplishes the same effect described above. Instead of issuing a buzzer sound, the buzzer 90 and the buzzer calling circuit 89 may be designed to generate an electronic sound.
(Embodiment 49)

Figure 77A:
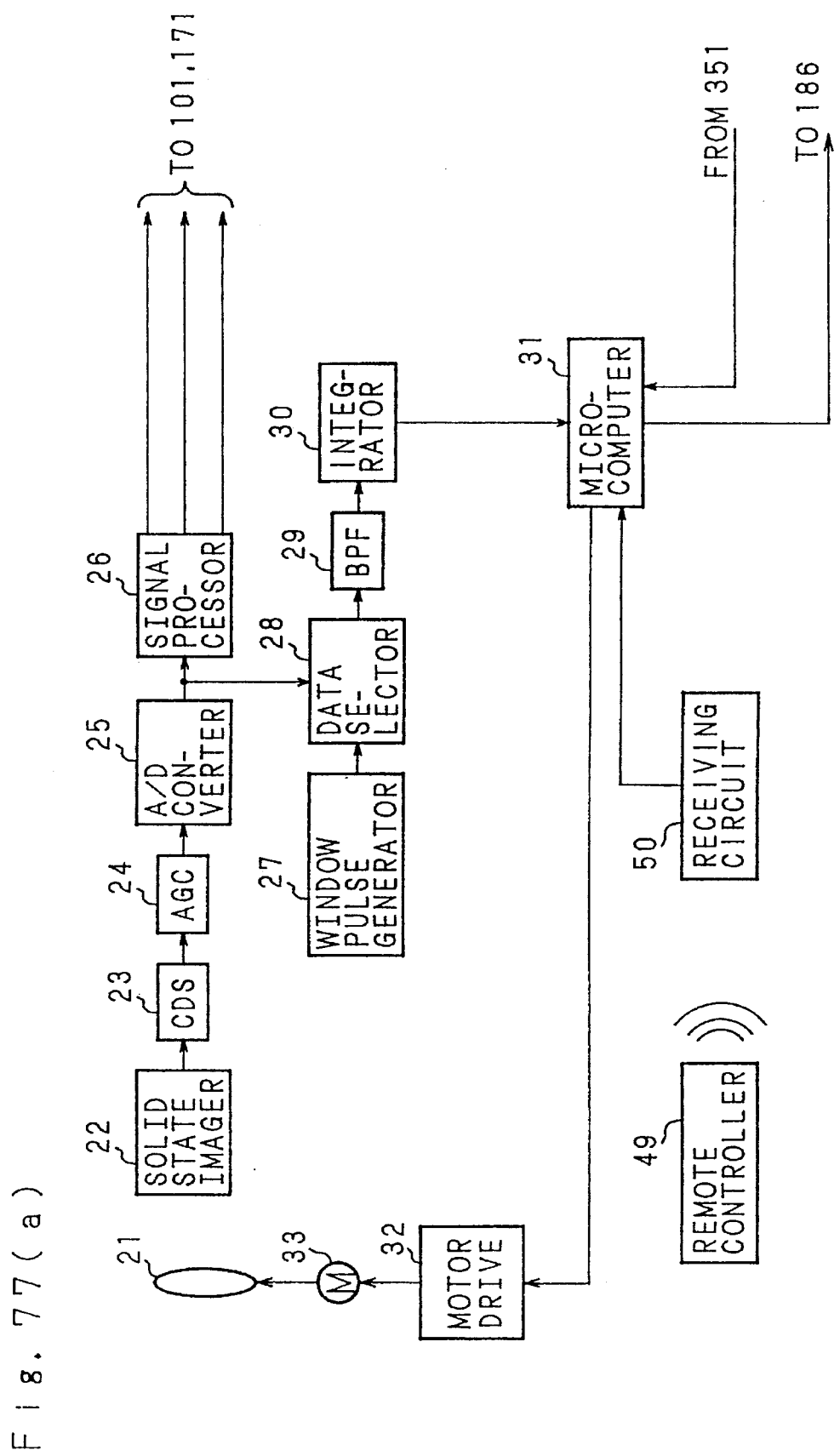
FIGS. 77(a)–(b) is a block diagram showing the configuration of a color video camera according to a further embodiment of the invention.
Figure 77B:
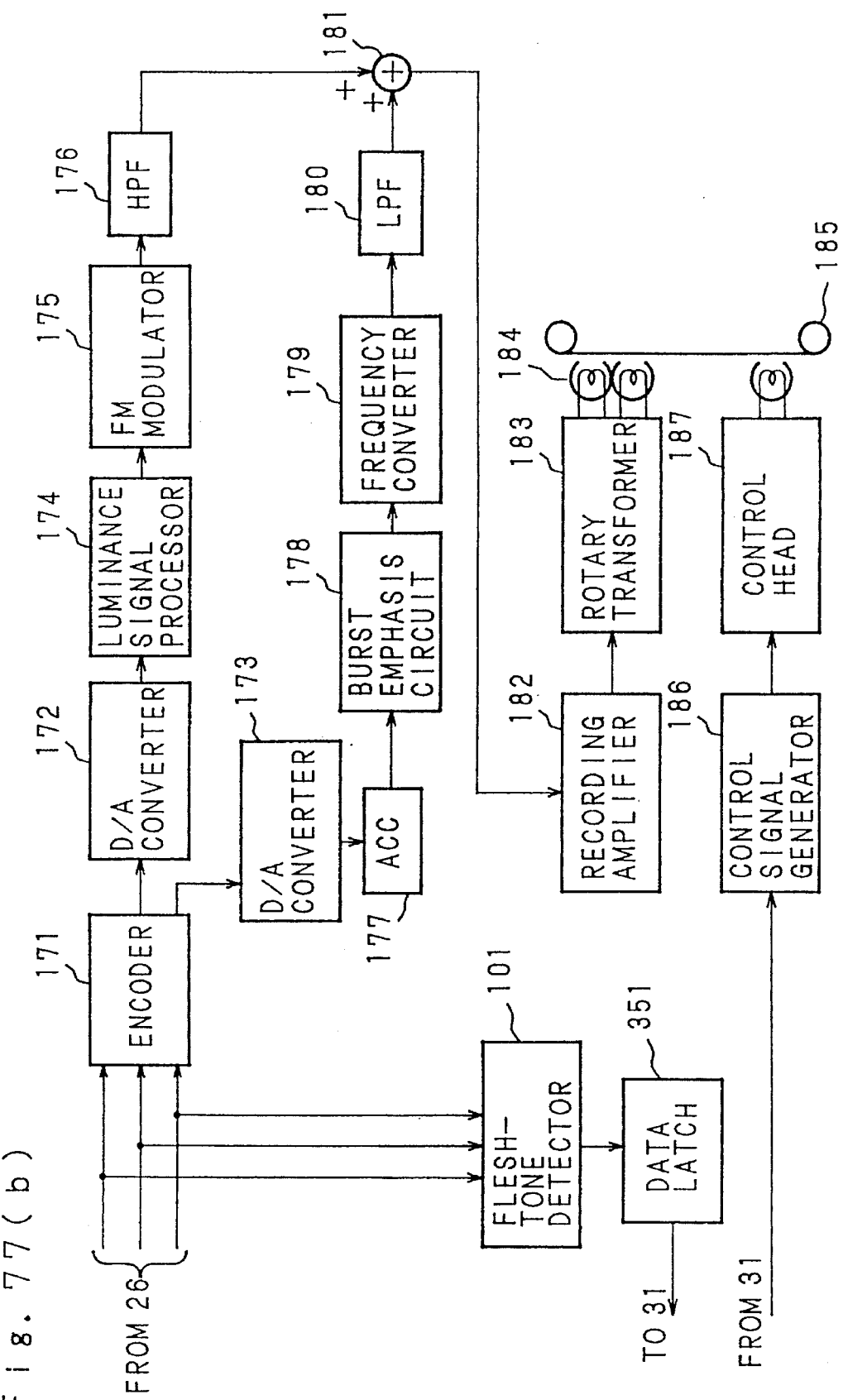

FIG. 77 is a block diagram showing the configuration of a color video camera (a 49th embodiment). In FIG. 77, the same reference numerals as those in FIG. 68 designate the same or corresponding parts. Further in FIG. 77, the reference numeral 171 is an encoder, 172 and 173 are D/A converters, 174 is a luminance signal processor, 175 is an FM modulator, 176 is a high-pass filter (HPF), 177 is an automatic chroma level controller (ACC), 178 is a burst emphasis circuit, 179 is a frequency converter, 180 is a low-pass filler (LPF), 181 is an adder, 182 is a recording amplifier, 183 is a rotary transformer, 184 is a recording/playback head, 185 is a tape, 186 is a control signal generator, and 187 is a control head.

The operation in this embodiment will now be described. The operation for focus area setting and the operation of the flesh-tone circuit 101 for flesh-tone area detection are the same as described in the 21st embodiment, and therefore, are not described here.

The luminance signal, R-Y color-difference signal, B-Y color-difference signal, output from the signal processor 25, are fed to the encoder 171 where synchronization signals are added to the luminance signal while the color-difference signals are balanced-modulated and appended with a burst signal before outputting. The luminance signal output from the encoder 171 is converted by the D/A converter 172 into analog form and then fed to the luminance signal processor 174 where signal processing, such as frequency deviation adjustment, clamping, preemphasis, etc., is carried out. The frequency of the luminance signal is then modulated in the FM modulator 175 and delivered to the adder 181 via the HPF 176. On the other hand, the color-difference signals output from the encoder 171 are converted by the D/A converter 173 into analog form and then fed to the ACC 177 where the gains of the color-difference signals are controlled to maintain the magnitude of the burst signal at a constant level. The burst emphasis circuit 178 raises the gain of the burst. The frequencies of color-difference signals output from the burst emphasis circuit 178 are converted by the frequency converter 179 to lower frequencies and are then transferred via the LPF 180 to the adder 181. The adder 181 combines the luminance signal with the color-difference signals. The video signal output from the adder 181 is coupled, through the recording amplifier 182 and the rotary transformer 183, to the recording/playback head for recording on the tape 185.

Figure 78:
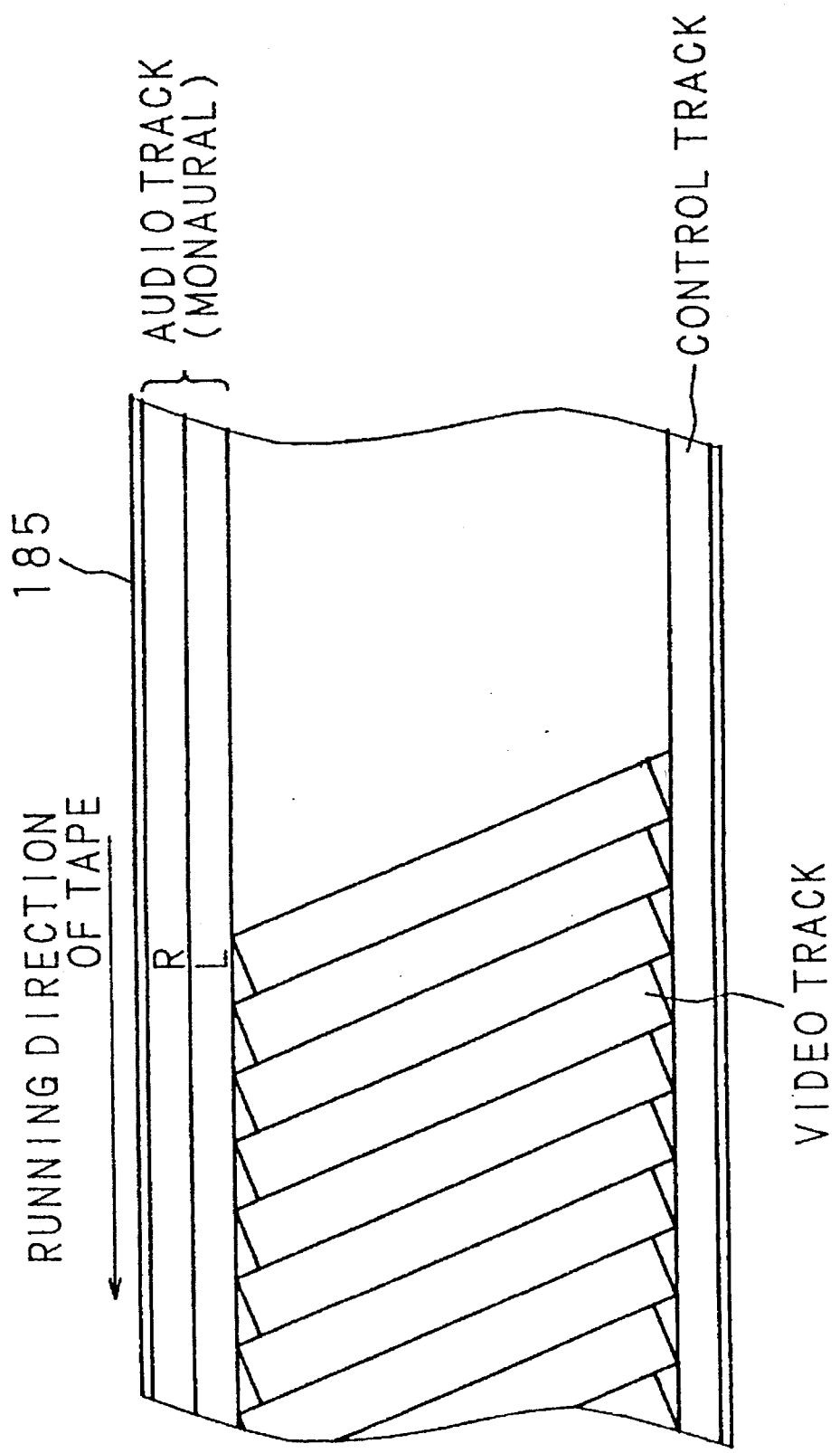
FIG. 78 is a diagram showing a tape format for recording and replaying video signals.

The control signal generator 186 generates control signals which are recorded by the control head 187 on a control track extending along the lower edge of the tape 185 (see FIG. 78). The control signals are used to ensure that the recording/playback head 184 which records and replays the video signals traces precisely the video tracks on the tape 185.

The algorithm of the microcomputer 31 in this embodiment is the same as that illustrated in the flowchart of FIG. 72. That is, when no flesh-tone area is detected in the video signals, a "false recording instruction" is given to the control signal generator 186 in accordance with the flowchart of FIG. 72. Then, the control signal generator 186 outputs a so-called VISS signal, a detection signal having the same signal rise as an ordinary control signal but different in duty ratio. The VISS signal is recorded by the control head 187 onto the control track on the tape 185.
(Embodiment 50)

Figure 79:
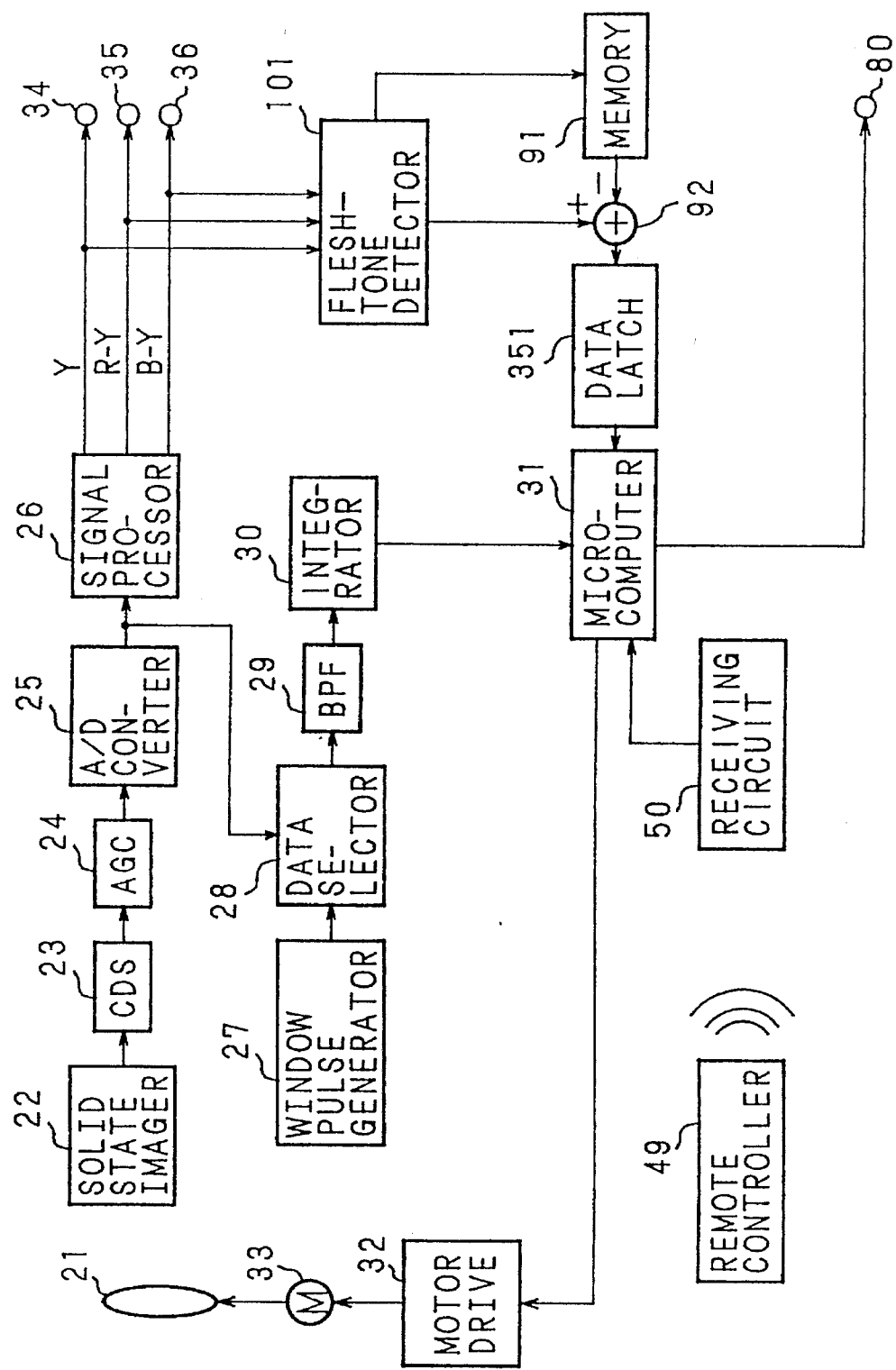
FIG. 79 is a block diagram showing the configuration of a color video camera according to a further embodiment of the invention.

FIG. 79 is a block diagram showing the configuration of a color video camera (a 50th embodiment). In FIG. 79, the same reference numerals as those in FIG. 68 designate the same or corresponding parts. Further in FIG. 79, the reference numeral 91 designate a memory, and 92 denotes an adder.

Figure 1:
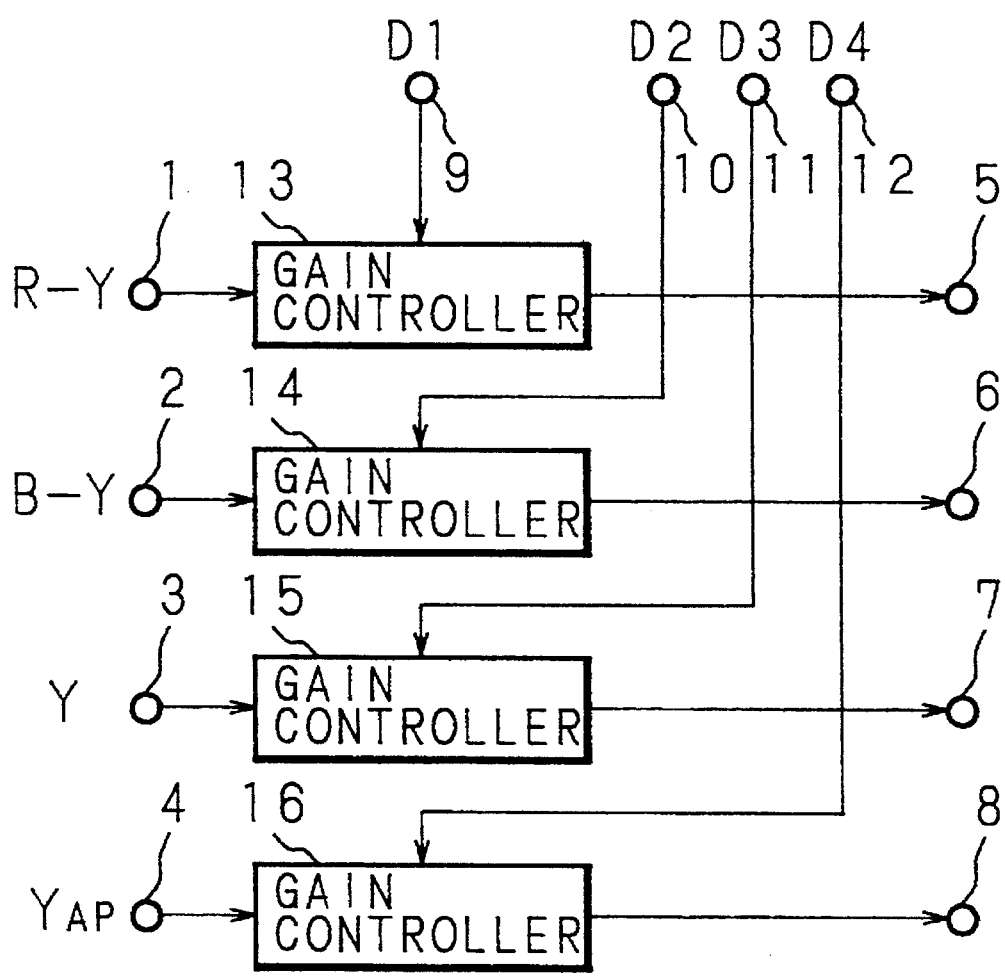
FIG. 1 is a block diagram of a prior art video signal processor.
Figure 2:
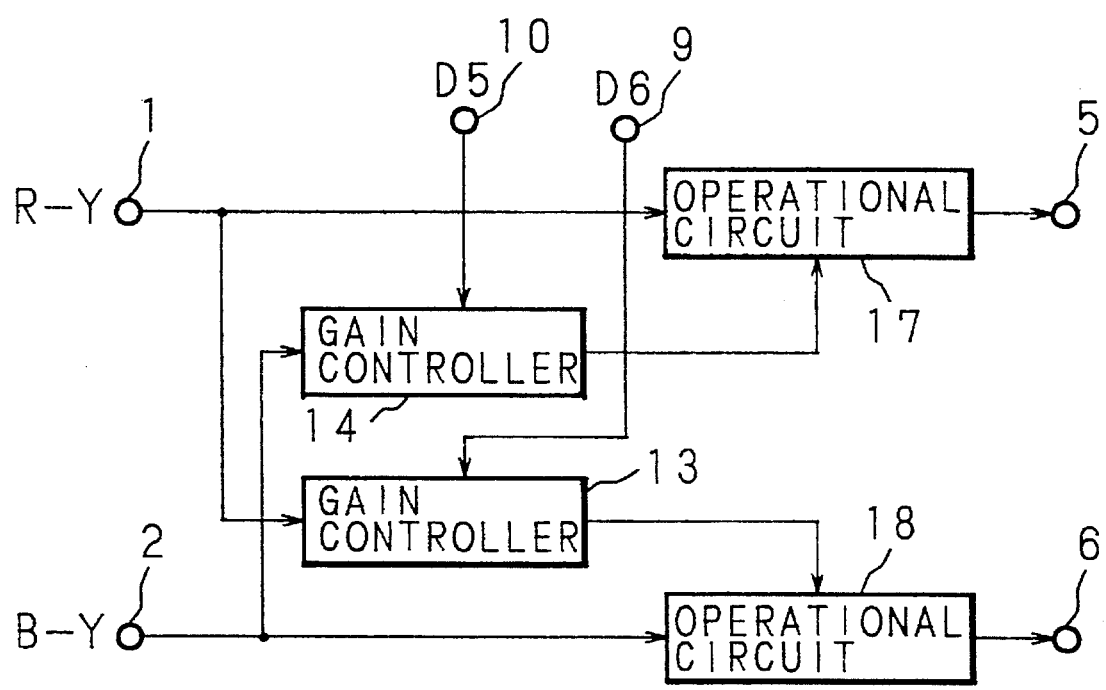
FIG. 2 is a block diagram of another prior art video signal processor.
Figure 3:
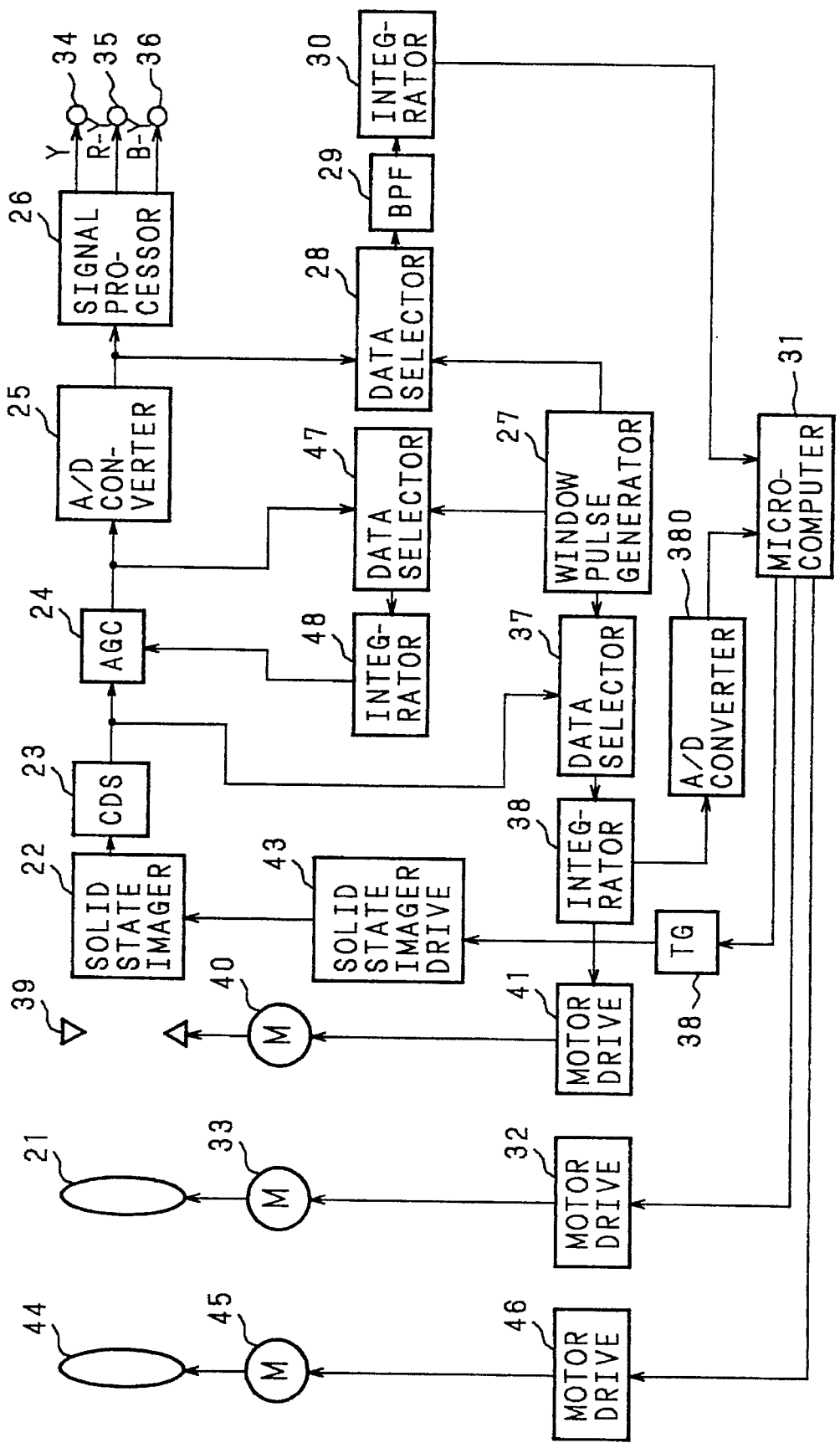
FIG. 3 is a block diagram of still another prior art video signal processor.
Figure 4:
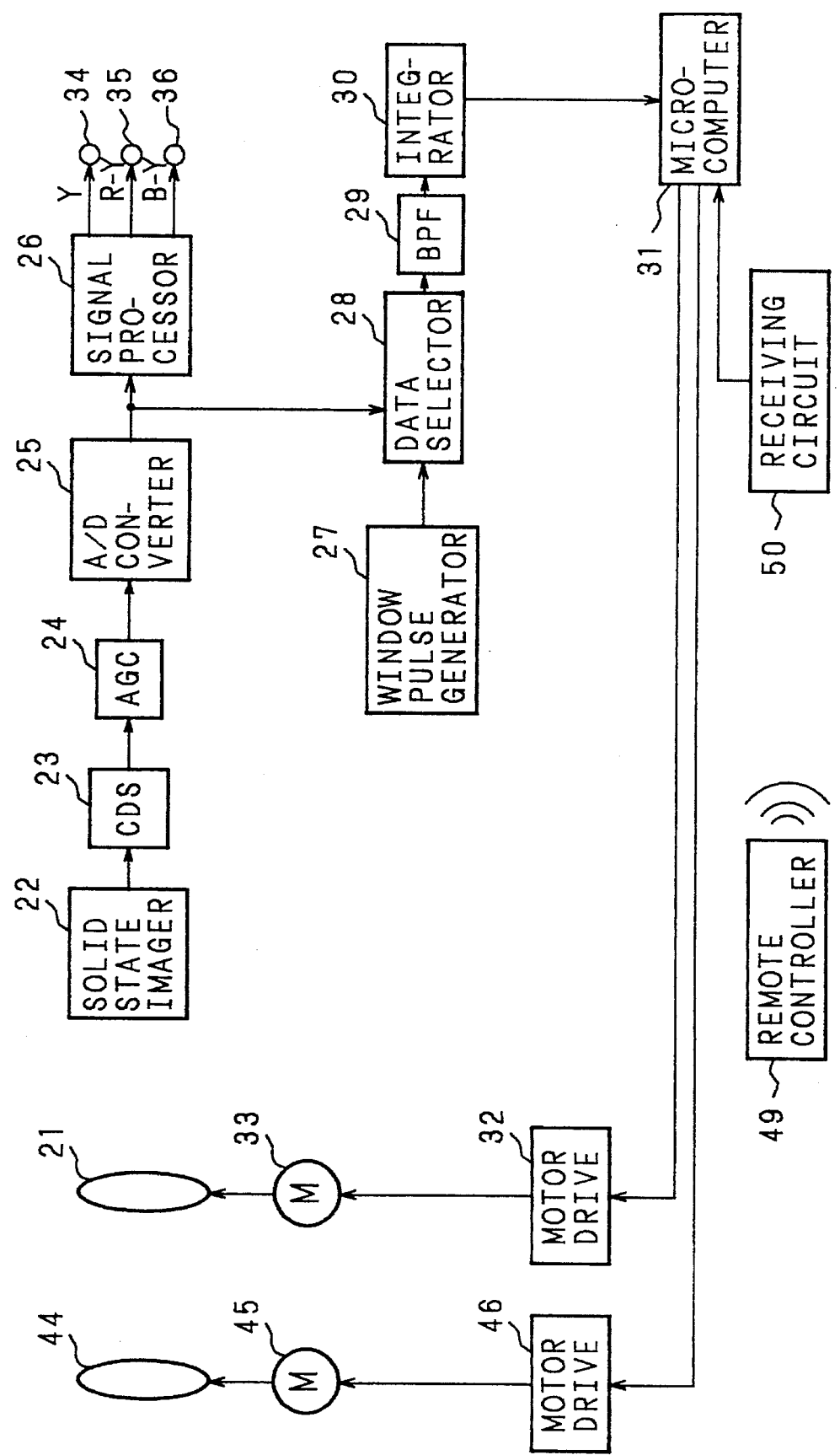
FIG. 4 is a block diagram of a prior art color video camera.
Figure 5:
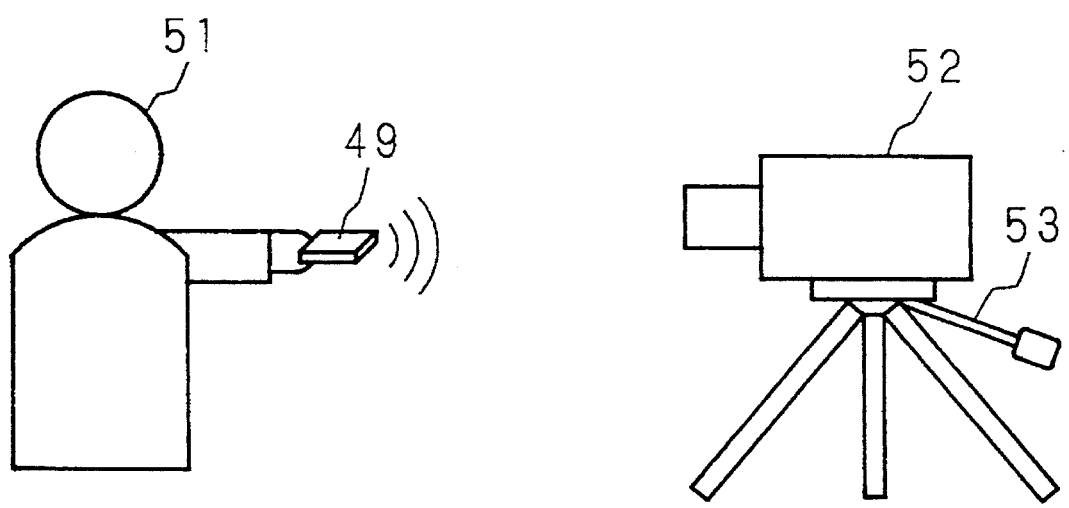
FIG. 5 is a schematic diagram showing a camera operator videotaping himself by remote control.
Figure 6:
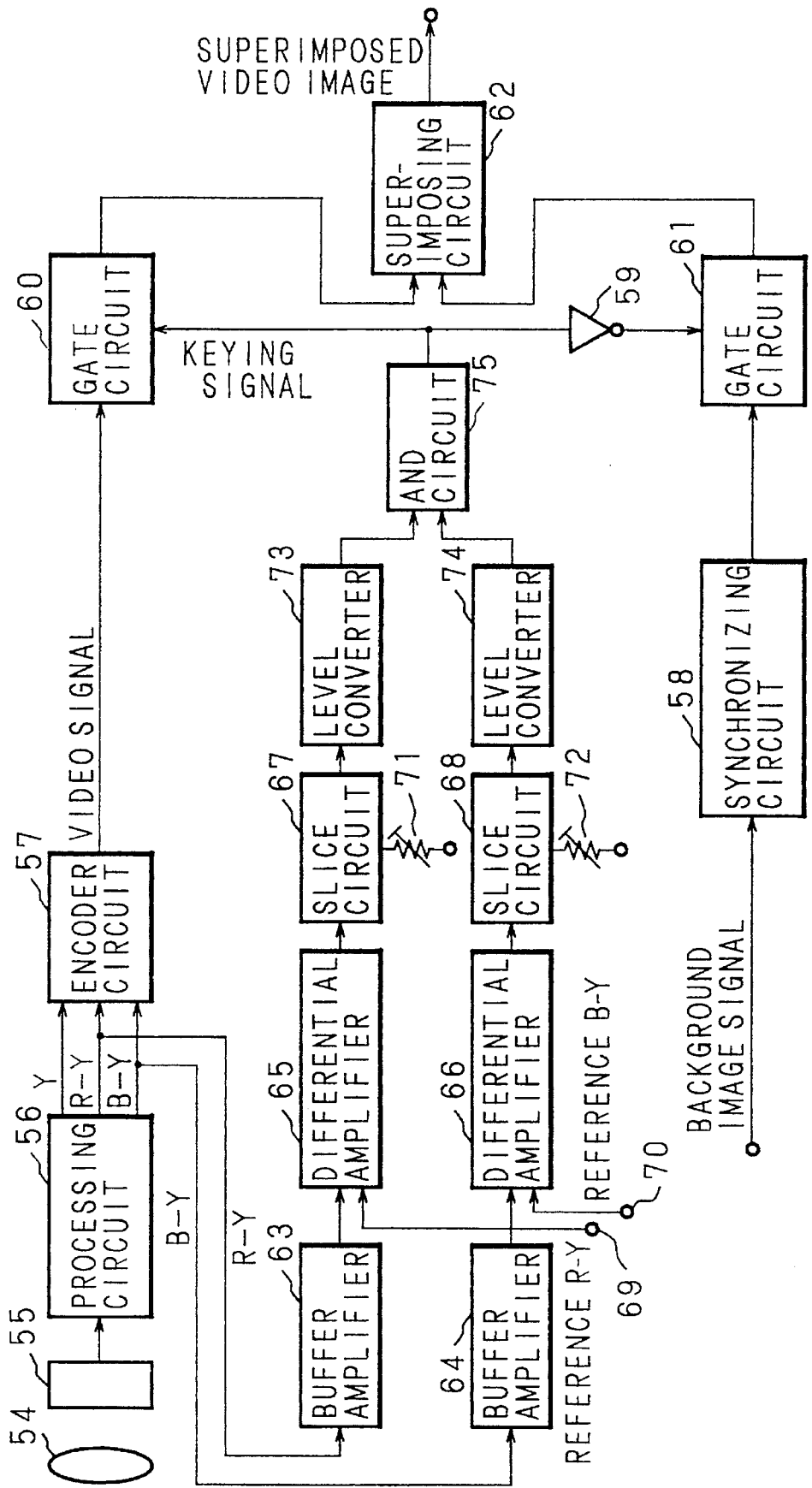
FIG. 6 is a block diagram of a prior art image superimposing device for a color video camera.
Figure 80A:
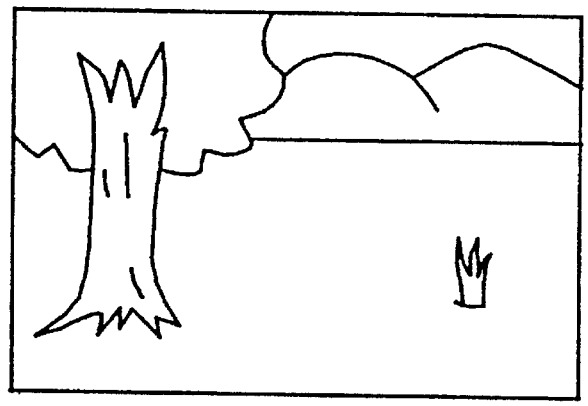
FIG. 80(a)–(c) is a set of diagrams showing images reproduced from a video signal from a color video camera, an output signal of a flesh-tone detector, and an output signal of an adder, respectively.
Figure 80B:
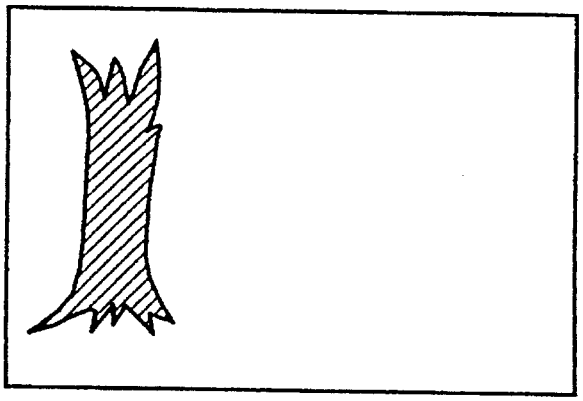

The operation in this embodiment will now be described. The basic operation in this embodiment is the same as that in the 45th embodiment, and therefore, is not explained here. The output signal of the flesh-tone detector 101 is supplied to the memory 91 as well as to the adder 92. As receiving the output signal of the flesh-tone detector 101, the memory 91 stores flesh-tone areas for one field, and once flesh-tone areas for one field are stored, the memory 91 will not accept further output signals from the flesh-tone detector 101. The output signal of the flesh-tone detector 101, stored in the memory 91, is fed to the adder 92 where the output signal of the memory 91 is subtracted from the output signal of the flesh-tone detector 101. Suppose, for example, that a scene in FIG. 80(a) has been recorded before the operator 51 starts videotaping himself by the remote controller 49 with the video camera 52 fixed on the tripod 53, as shown in FIG. 5. FIG. 80(b) is a diagram showing an image corresponding to the output signal of the flesh-tone detector 101 for the scene in FIG. 80(a). As shown, the "tree" in the scene has been detected as a flesh-tone area since the brown color of the "tree" has a high luminance level and the resulting video signal values satisfies the flesh-tone area shown in FIG. 11. However, the flesh-tone area detected as shown in FIG. 80(b) is not the type of flesh-tone area by which to distinguish the operator 51 who is the main object that the present embodiment intends to detect. The signal shown in FIG.

Figure 80C:
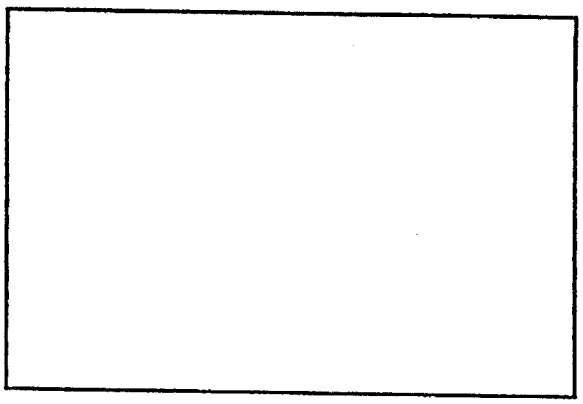

80(b) is stored in the memory 91. The memory 91 outputs the signal representing the image shown in FIG. 80(b). Therefore, as shown in FIG. 80(c), unless there occurs a change in the video signal representing the scene in FIG. 80(a), no flesh-tone area will be detected in the output signal of the adder 92 supplied through the data latch circuit 351 before starting the recording by remote control.

FIG. 81 is a flowchart illustrating the algorithm of the microcomputer according to this embodiment. The operation will now be described according to the flowchart.

When a "recording instruction" is input into the microcomputer 31 (step S11), it is determined whether there is a flesh-tone area in the output signal of the adder 92 that represents the output signal of the flesh-tone detector 101 minus the output signal of the memory 91 (step S12). If no flesh-tone area is detected in the output signal of the adder 92, the microcomputer 31 does not transfer the "recording instruction" to the output terminal 80 (step S13). As a result, recording will not be started even if a "recording instruction" is sent from the remote controller 49. When a flesh-tone area is detected in the video signals by examining the output signal of the adder 92, the microcomputer 31 transfers the "recording instruction" to the output terminal 80. In response to the "recording instruction" supplied from the microcomputer 31, the video camera starts recording the video signals being produced (step S14). Furthermore, after starting the recording, if no flesh-tone area is detected in the output signal of the adder 92 (step S15: NO), the microcomputer 31 issues a "recording stop instruction" (step S16), in response to which the video camera stops recording.
(Embodiment 51)

Figure 82:
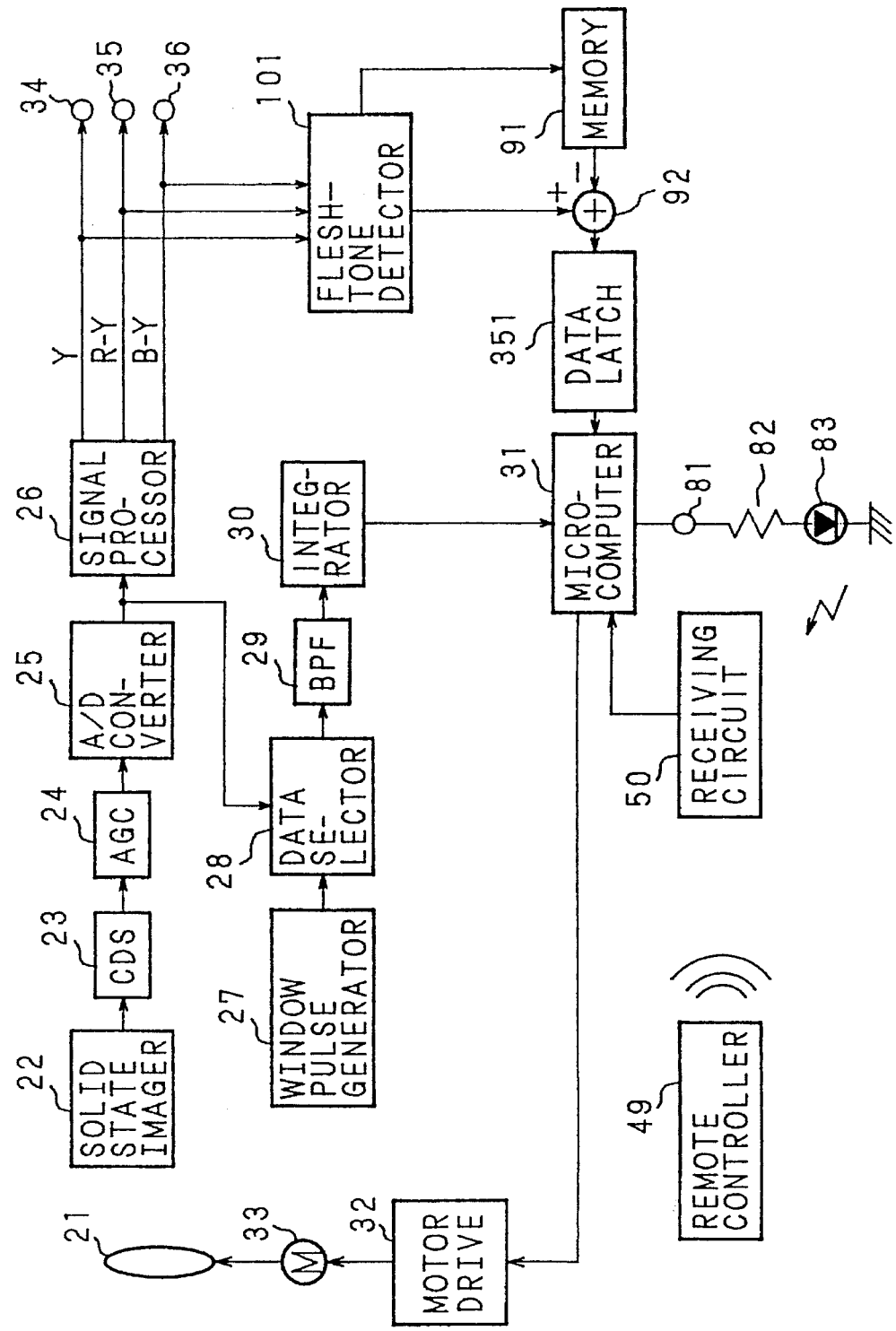
FIG. 82 is a block diagram showing the configuration of a color video camera according to a further embodiment of the invention.

FIG. 82 is a block diagram showing the configuration of a color video camera (a 51st embodiment). In FIG. 82, the same reference numerals as those in FIGS. 71 and 79 designate the same or corresponding parts.

Figure 83:
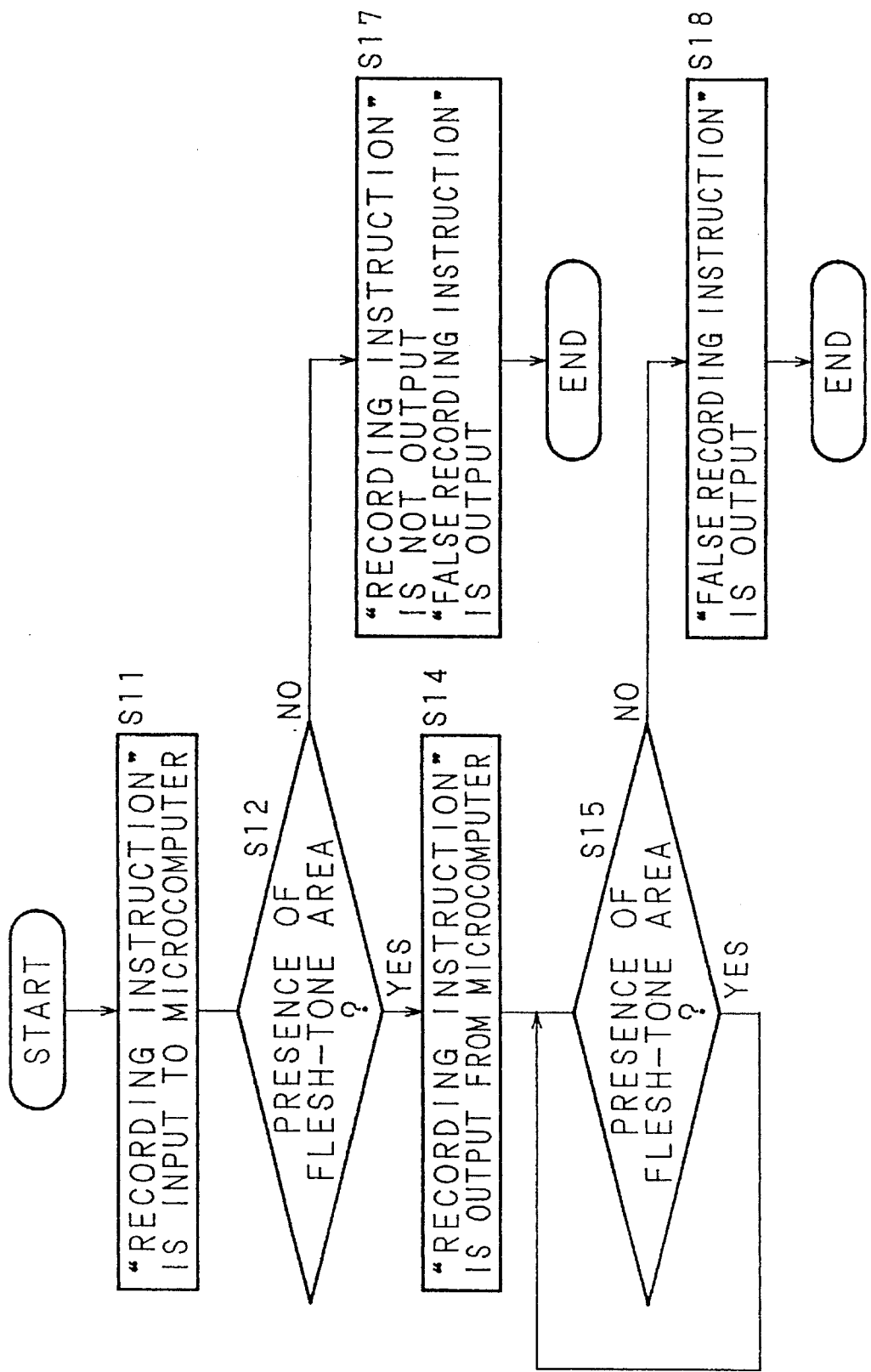
FIG. 83 is a flowchart illustrating the algorithm of a microcomputer.

FIG. 83 is a flowchart illustrating the algorithm of the microcomputer according to this embodiment. The steps of the same contents as those in the flowchart of FIG. 81 are designated by the same step numbers. Prior to the start of recording, if no flesh-tone area is detected in the output signal of the adder 92 (step 12: NO), a "false recording instruction" is sent to the output terminal 81 (step 17). As a result, recording will not be started even if a "recording instruction" is sent from the remote controller 49. Furthermore, after starting the recording, if no flesh-tone area is detected in the output signal of the adder 92 (step 15: NO), the microcomputer 31 sends a "false recording instruction" to the output terminal 81 (step 18).

It is assumed here that the microcomputer 31 outputs a 5 V "High" signal as the "false recording instruction" to the output terminal 81. The signal is input into the light-emitting diode 83 through the resistor 82, thereby causing the light-emitting diode 83 to emit light. The 5 V "High" voltage is only an example of the "false recording instruction", and other voltage or other data signal may be used to accomplish the same purpose.
(Embodiment 52)

Figure 84:
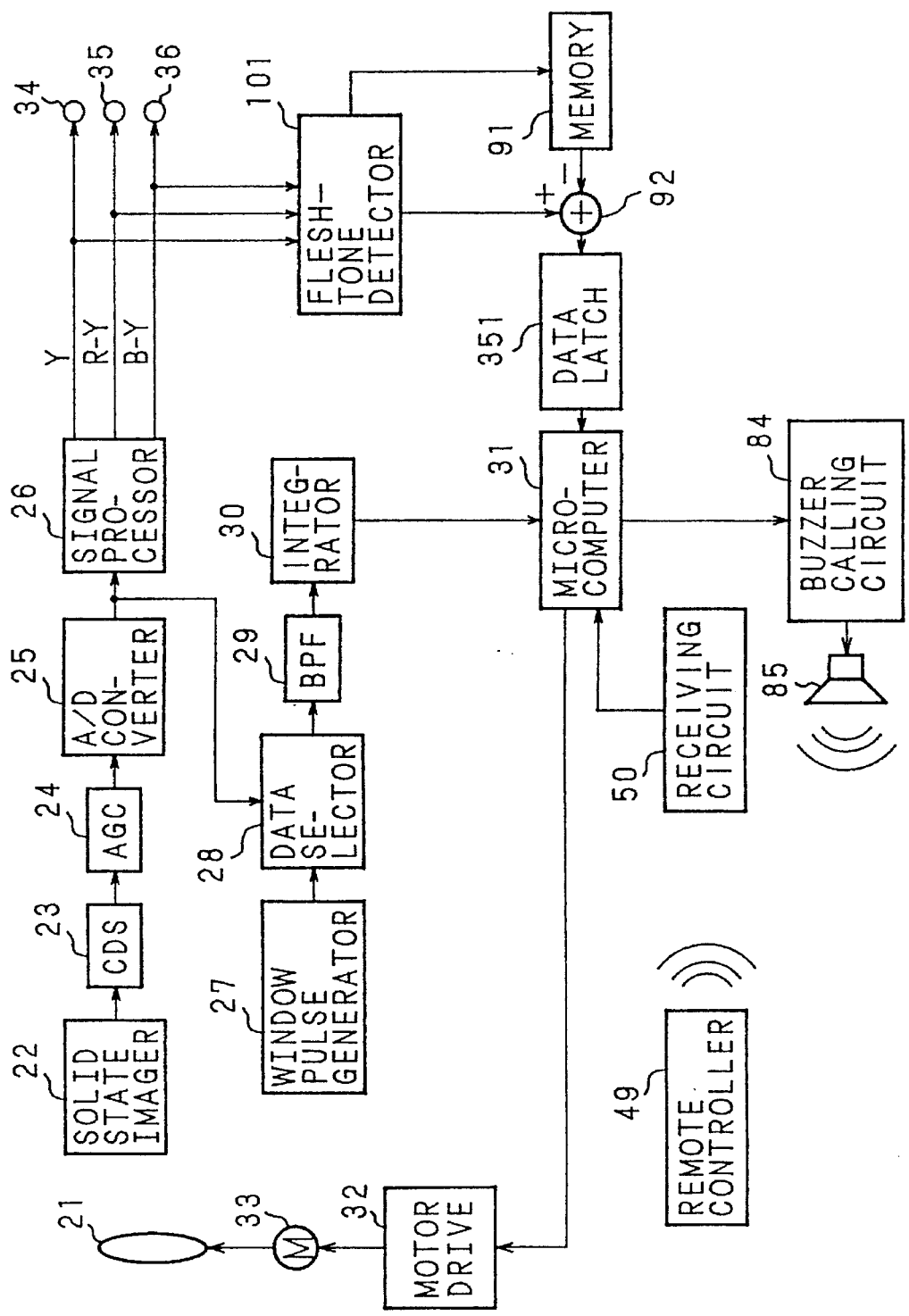
FIG. 84 is a block diagram showing the configuration of a color video camera according to a further embodiment of the invention.

FIG. 84 is a block diagram showing the configuration of a color video camera (a 82nd embodiment). In FIG. 84, the same reference numerals as those in FIGS. 73 and 79 designate the same or corresponding parts.

In operation, when no flesh-tone area is detected in the output signal of the adder 92, a "false recording instruction" is sent to the buzzer calling circuit 84 in accordance with the flowchart of FIG. 83. When receiving the "false recording instruction", the buzzer calling circuit 84 activates the buzzer 85. Instead of issuing a buzzer sound, the buzzer calling circuit 84 and buzzer 85 may be so designed to generate an electronic sound.
(Embodiment 53)

Figure 85:
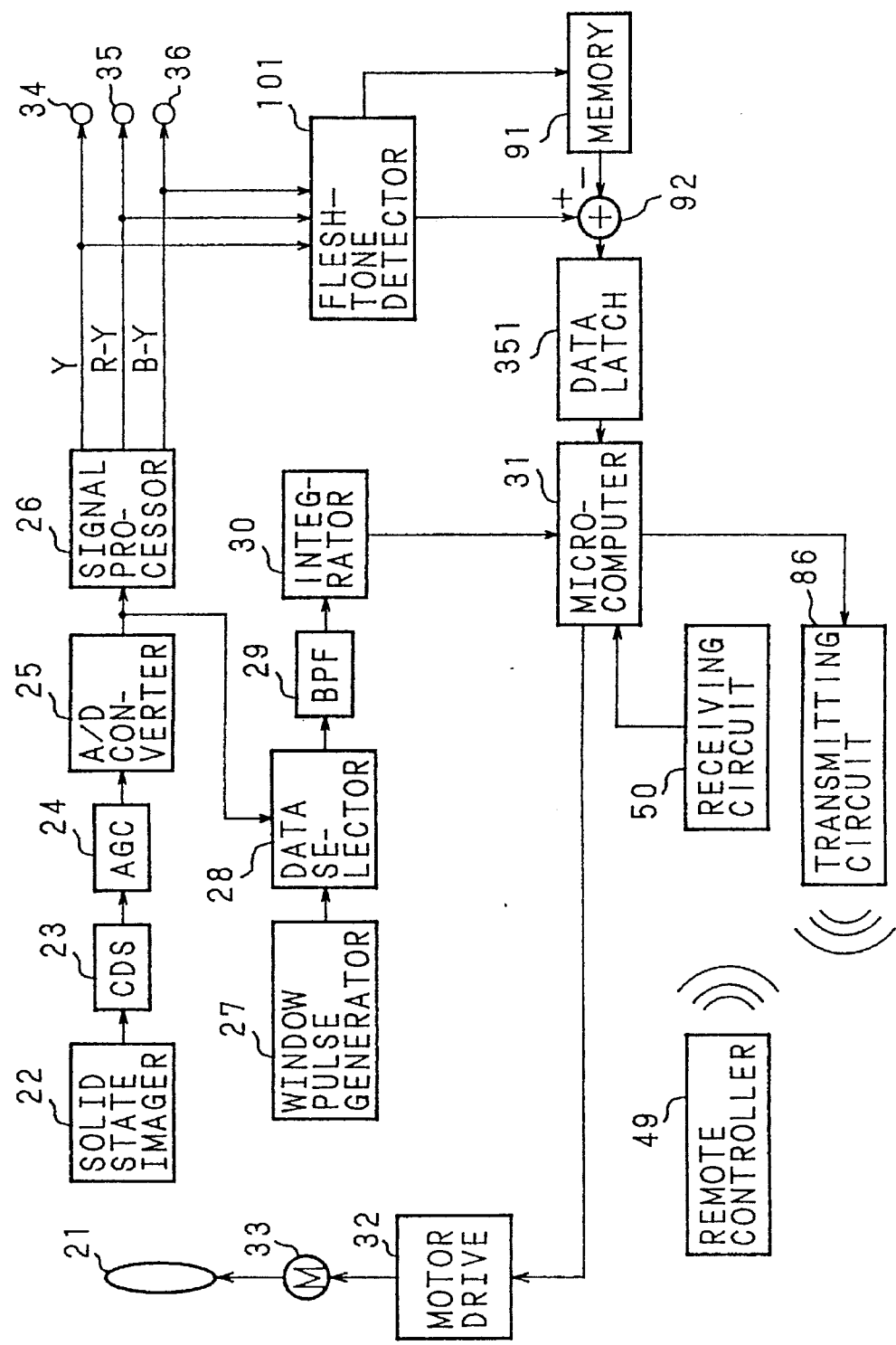
FIG. 85 is a block diagram showing the configuration of a color video camera according to a further embodiment of the invention.

FIG. 85 is a block diagram showing the configuration of a color video camera (a 53rd embodiment). In FIG. 85, the same reference numerals as those in FIGS. 74 and 79 designate the same or corresponding parts.

In operation, when no flesh-tone area is detected in the output signal of the adder 92, a "false recording instruction" is sent to the transmitting circuit 86 in accordance with the flowchart of FIG. 83. The operation thereafter is the same as that in the 48th embodiment, and therefore, is not explained here.
(Embodiment 54)

Figure 86A:
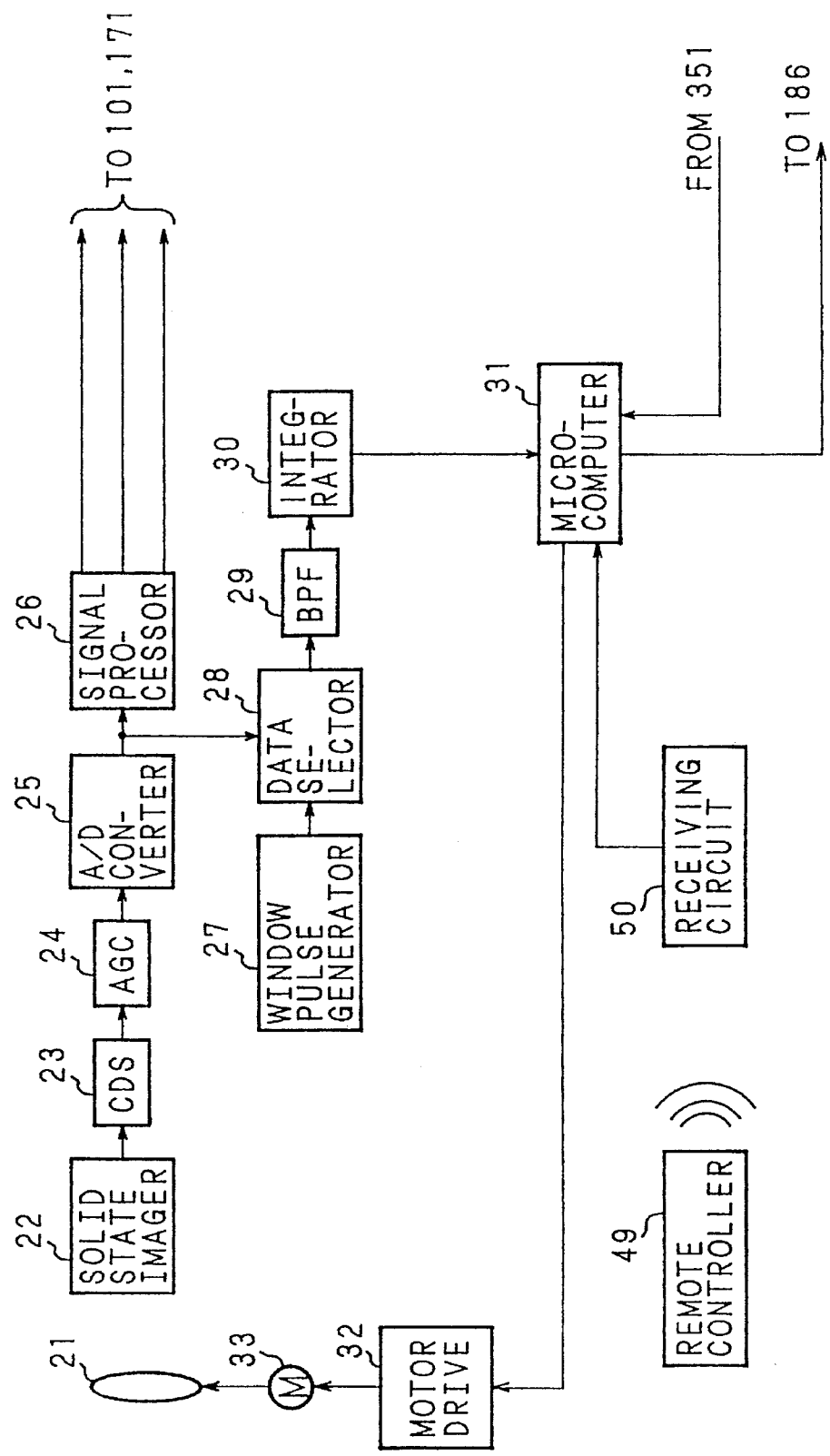
FIG. 86(a)–(b) is a block diagram showing the configuration of a color video camera according to a further embodiment of the invention.
Figure 86B:
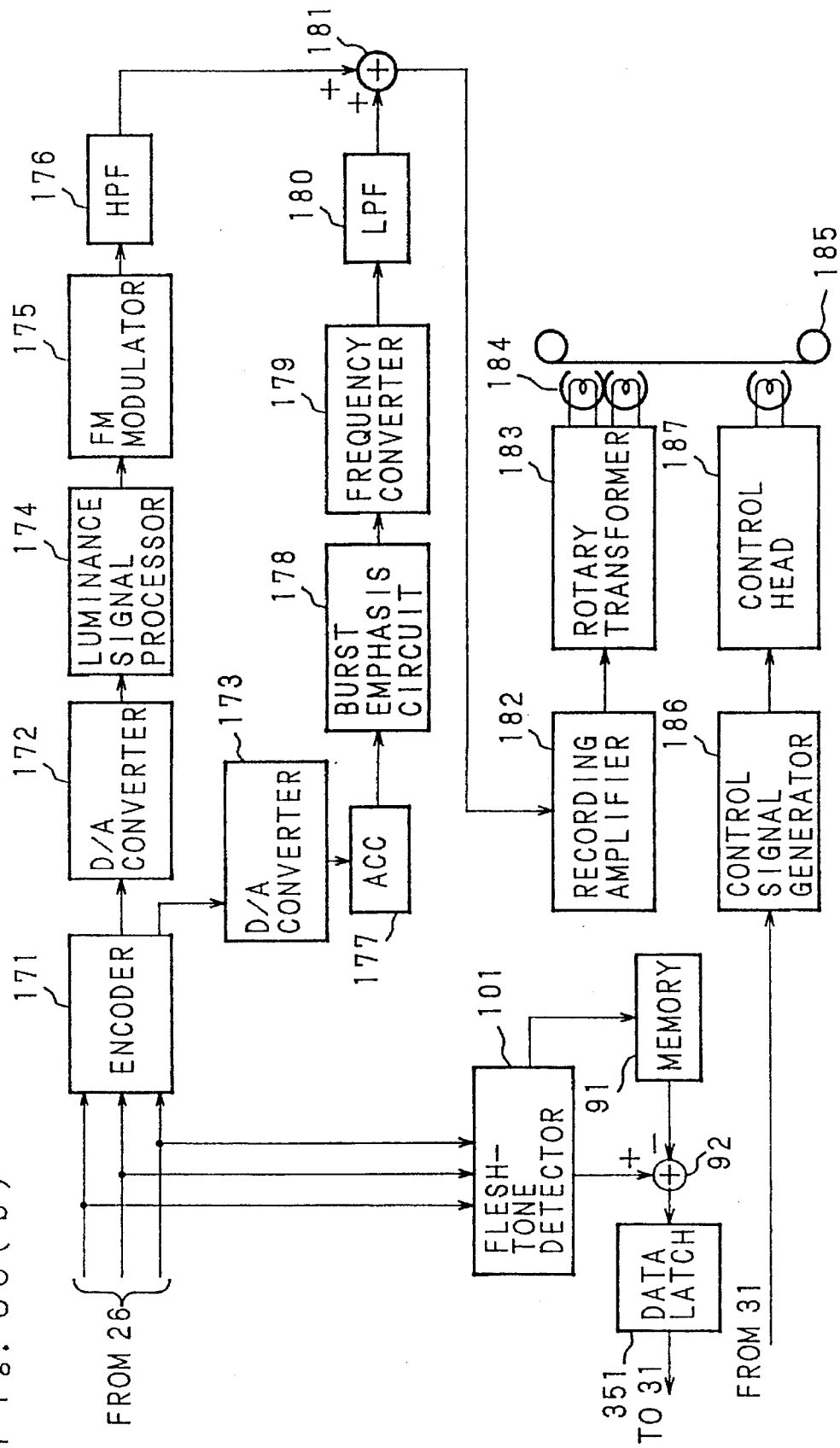

FIG. 86 is a block diagram showing the configuration of a color video camera (a 54th embodiment). In FIG. 86, the same reference numerals as those in FIGS. 77 and 79 designate the same or corresponding parts.

In operation, when no flesh-tone area is detected in the output signal of the adder 92, the microcomputer 31 issues a "false recording instruction" to the control signal generator 186 in accordance with the flowchart of FIG. 83. The operation thereafter is the same as that in the 49th embodiment, and therefore, is not explained here.

Any of the embodiments 50 through 54 may be so constructed that the video signal to be stored in the memory 91 can be selected by using an external input signal. For example, it is possible to provide an external terminal by which the operator can select the video signal to be stored. That is, when the operator presses this external terminal, an external input signal is applied to the memory 91 which then in response to this stores the output signal of the flesh-tone detector 101 occurring.
(Embodiment 55)

Figure 87:
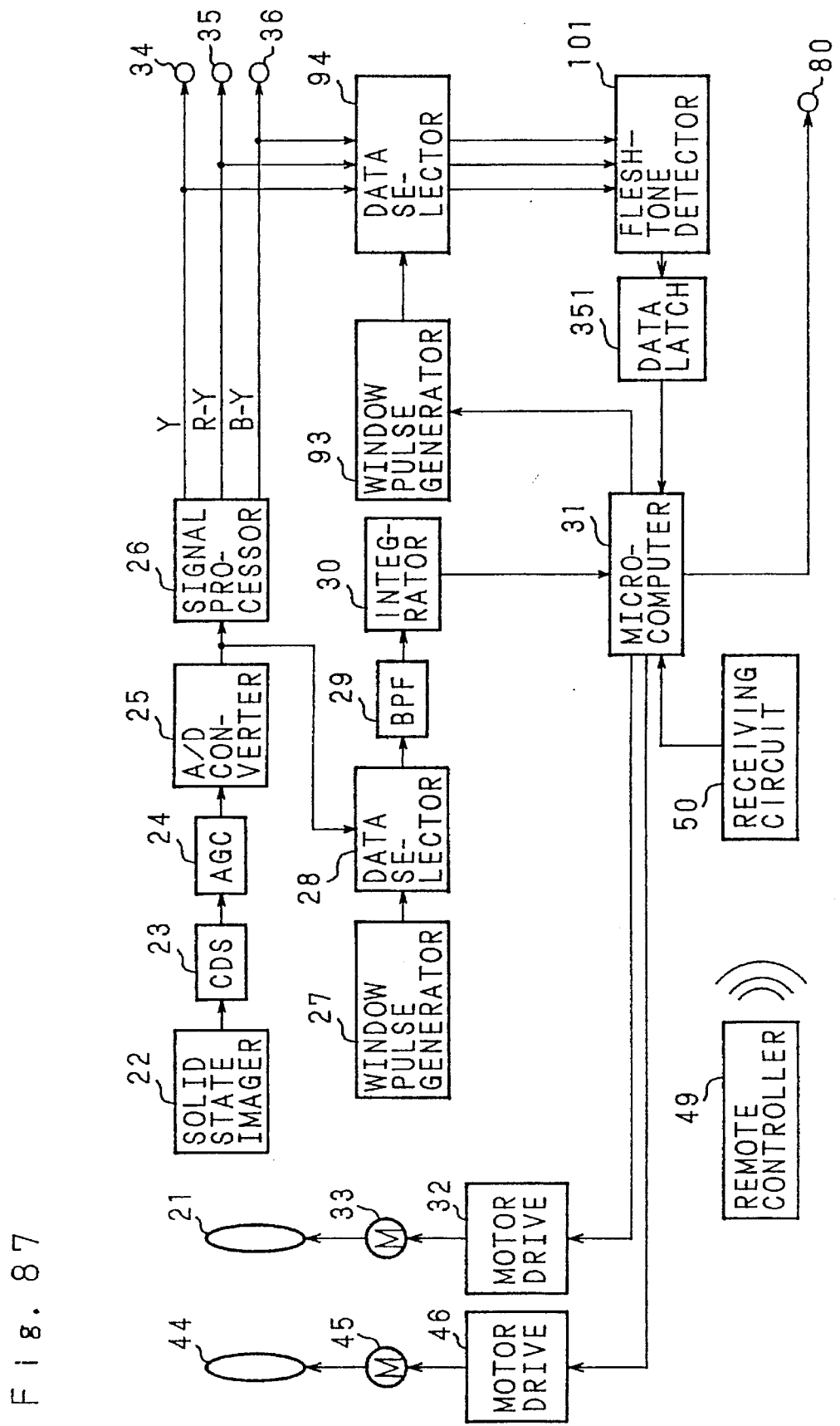
FIG. 87 is a block diagram showing the configuration of a color video camera according to a further embodiment of the invention.

FIG 87 is a block diagram showing the configuration of a color video camera (a 55th embodiment). In FIG. 87, the same reference numerals as those in FIGS. 54 and 68 designate the same or corresponding parts. Further in FIG. 87, the reference numeral 93 designates a window pulse generator, and 94 denotes a data selector.

Figure 88:
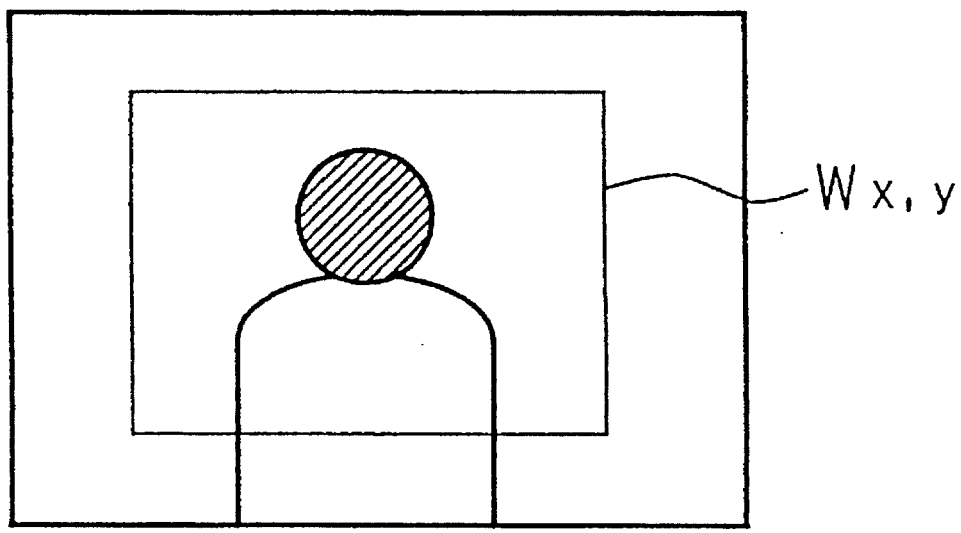
FIG. 88 is a diagram showing how an image reproduced from an output signal of a flesh-tone detector is related to a picture frame set by a window pulse generator when a human figure is picked up.

The operation in this embodiment will now be described. The basic operation is the same as that in the embodiments 33 and 45, and therefore, is not explained here. The microcomputer 31 computes a distance, L, to the object and a magnifying ratio, Z, for the object. Based on the computed distance L and magnifying ratio Z, the microcomputer 31 supplies control signals to the window pulse generator 93 which, in response to this, generates window pulses for setting a picture frame Wx,y, shown in FIG. 88, and supplies them to the data selector 94. The size of the picture frame set by the window pulses from the window pulse generator 93 varies with the distance L and magnifying ratio Z as can be seen from Expression 6. The data selector 94 selects only that part of the video signal which lies inside the picture frame determined by the following Expression 7.

$Wx,y = W0 \cdot Z/L + tm$ *(Expression 7)*

Figure 89:
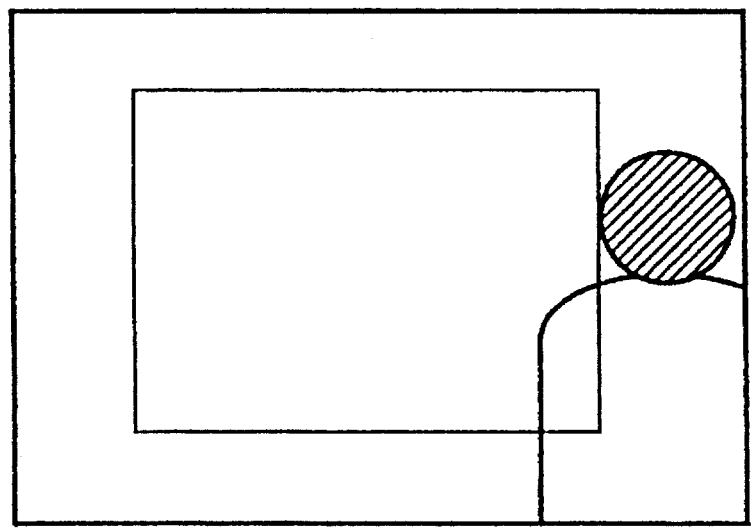
FIG. 89 is a diagram showing how an image reproduced from an output signal of the flesh-tone detection is related to the picture frame set by the window pulse generator when a human figure is picked up.

W0: Initial set value
The flesh-tone detector 101 detects flesh-tone areas only within the picture frame set by the window pulse generator 93. Therefore, if the object is positioned outside the picture frame Wx,y, as shown in FIG. 89, no flesh-tone area will be detected.

The algorithm of the microcomputer 31 in this embodiment is shown in the flowchart of FIG. 70, which is the same as that in the 45th embodiment and therefore, is not described here. When no flesh-tone area is detected within the picture frame Wx,y shown in FIG. 88, the microcomputer 31 sends a "recording stop instruction" to the output terminal 80 to stop the recording.

(Embodiment 56)

Figure 90:
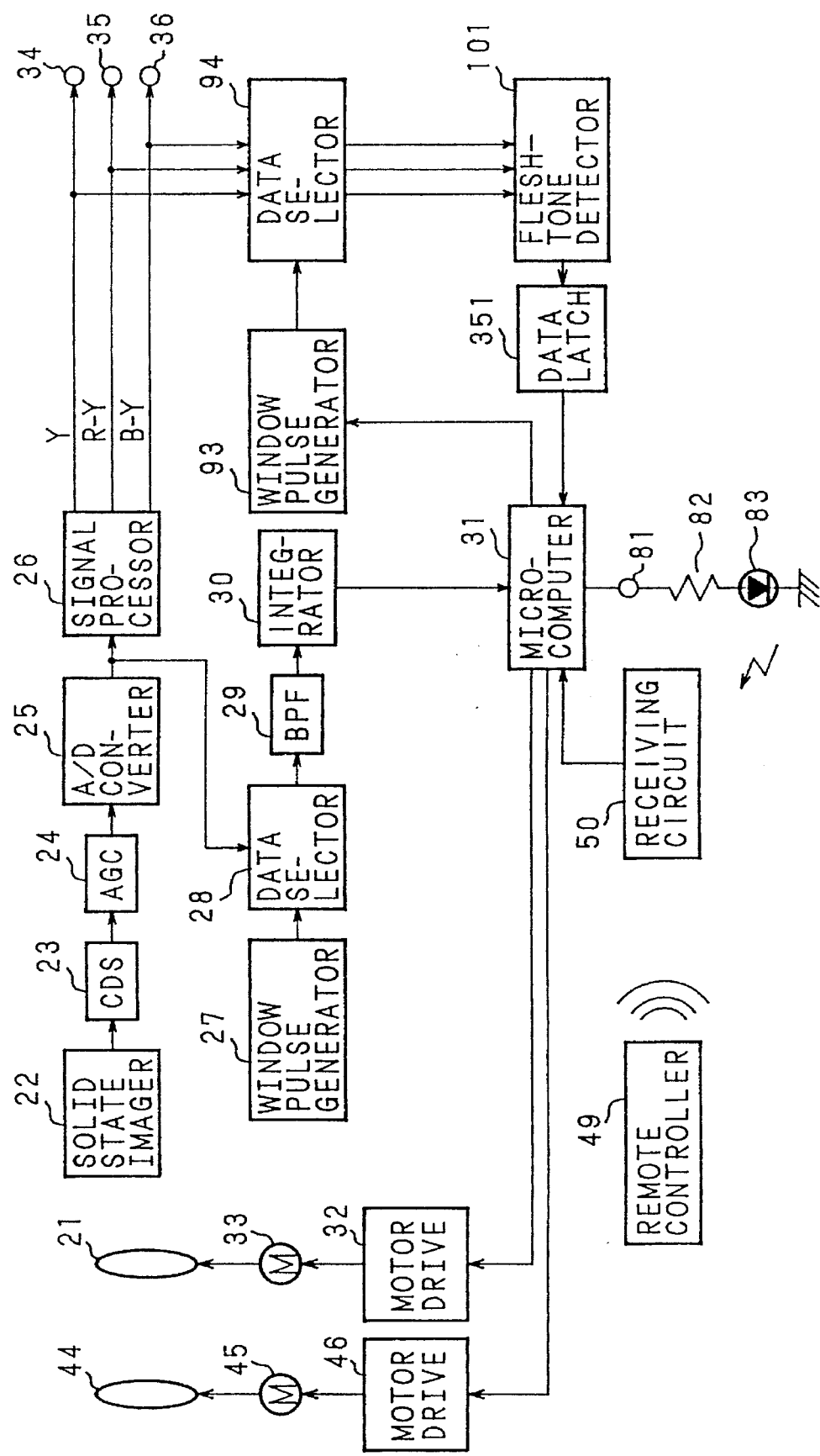
FIG. 90 is a block diagram showing the configuration of a color video camera according to a further embodiment of the invention.

FIG. 90 is a block diagram showing the configuration of a color video camera (a 56th embodiment). In FIG. 90, the same reference numerals as those in FIGS. 71 and 87 designate the same or corresponding parts.

In operation, the flesh-tone detector 101 detects the presence or absence of a flesh-tone area within the picture frame Wx,y, as in the 55th embodiment. Then, in accordance with the flowchart of FIG. 72, when no flesh-tone area is detected in the video signal within the picture frame Wx,y, a "false recording instruction" is output at the output terminal 81. The operation thereafter is the same as that in the 46th embodiment.

(Embodiment 57)

Figure 91:
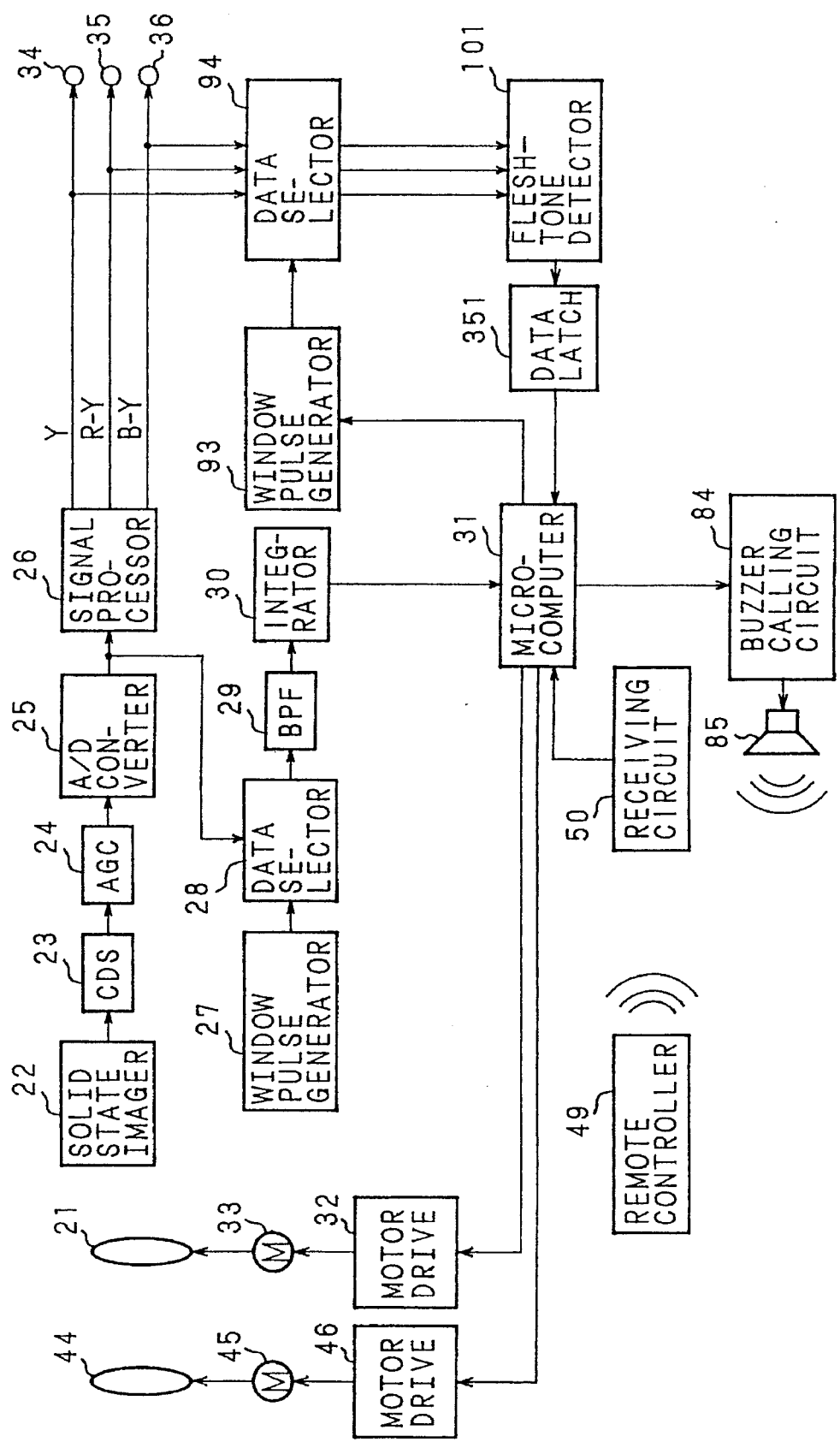
FIG. 91 is a block diagram showing the configuration of a color video camera according to a further embodiment of the invention.

FIG. 91 is a block diagram showing the configuration of a color video camera (a 57th embodiment). In FIG. 91, the same reference numerals as those in FIGS. 73 and 87 designate the same or corresponding parts.

In operation, the flesh-tone detector 101 detects the presence or absence of a flesh-tone area within the picture frame Wx,y, as in the 55th embodiment. Then, in accordance with the flowchart of FIG. 72, when no flesh-tone area is detected in the video signal within the picture frame Wx,y, a "false recording instruction" is given to the buzzer calling circuit 84. The operation thereafter is the same as that in the 47th embodiment.

(Embodiment 58)

Figure 92:
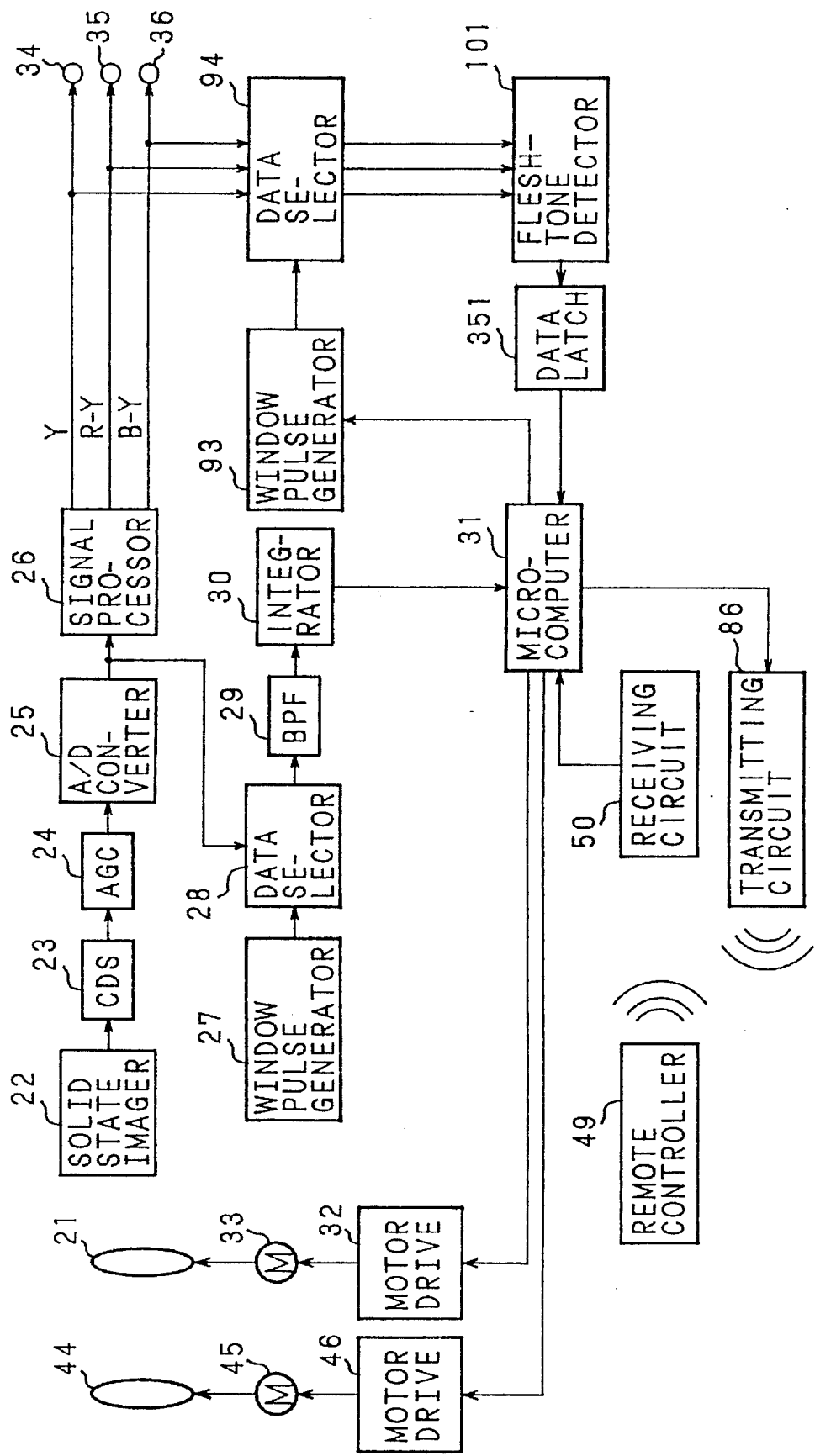
FIG. 92 is a block diagram showing the configuration of a color video camera according to a further embodiment of the invention.

FIG. 92 is a block diagram showing the configuration of a color video camera (a 58th embodiment). In FIG. 92, the same reference numerals as those in FIGS. 74 and 87 designate the same or corresponding parts.

In operation, the flesh-tone detector 101 detects the presence or absence of a flesh-tone area within the picture frame Wx,y, as in the 55th embodiment. Then, in accordance with the flowchart of FIG. 72, when no flesh-tone area is detected in the video signal within the picture frame Wx,y, a "false recording instruction" is given to the transmitting circuit 86. The operation thereafter is the same as that in the 48th embodiment.

(Embodiment 59)

Figure 93A:
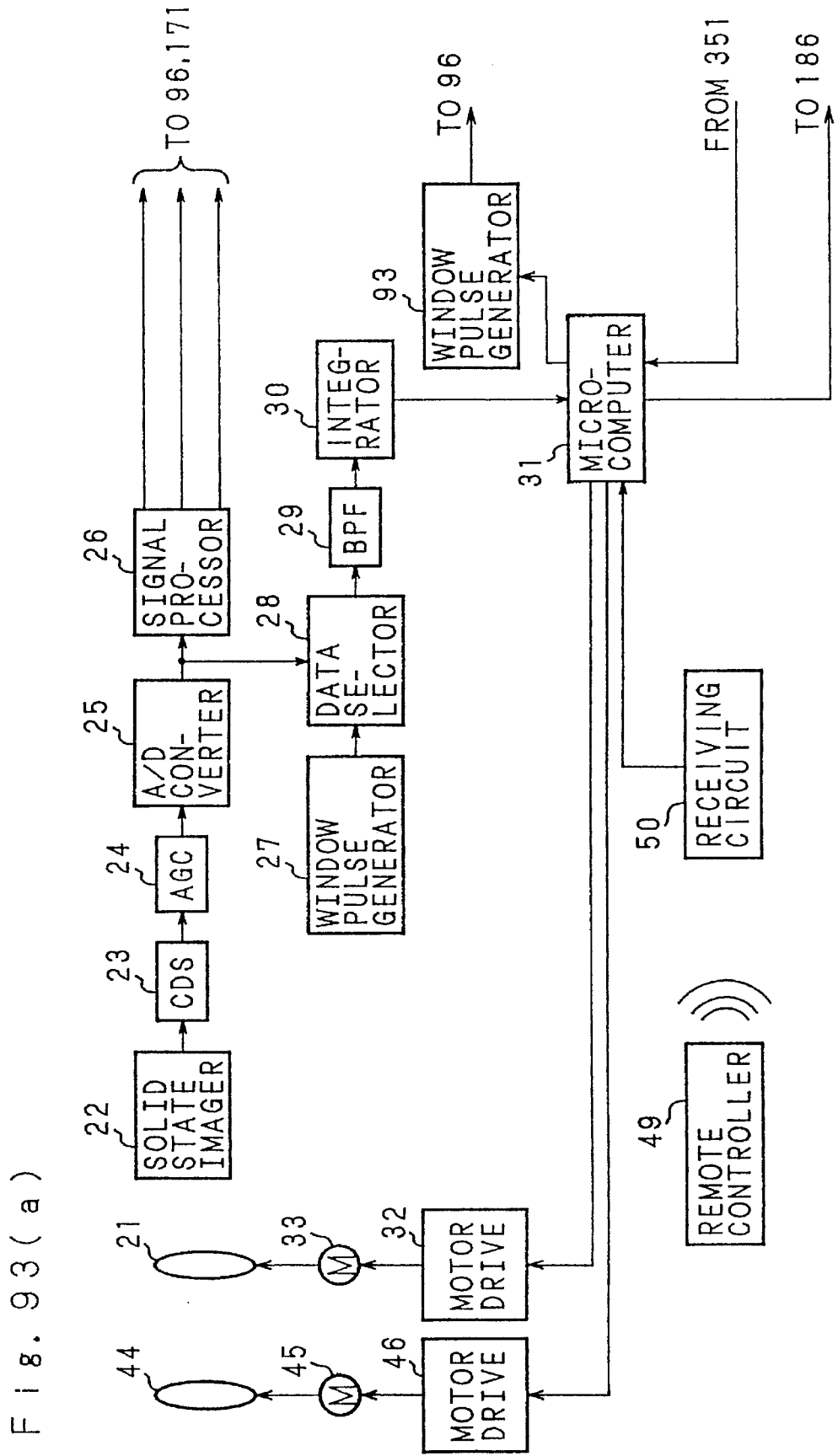
FIGS. 93(a)–(b) is a block diagram showing the configuration of a color video camera according to a further embodiment of the invention.
Figure 93B:
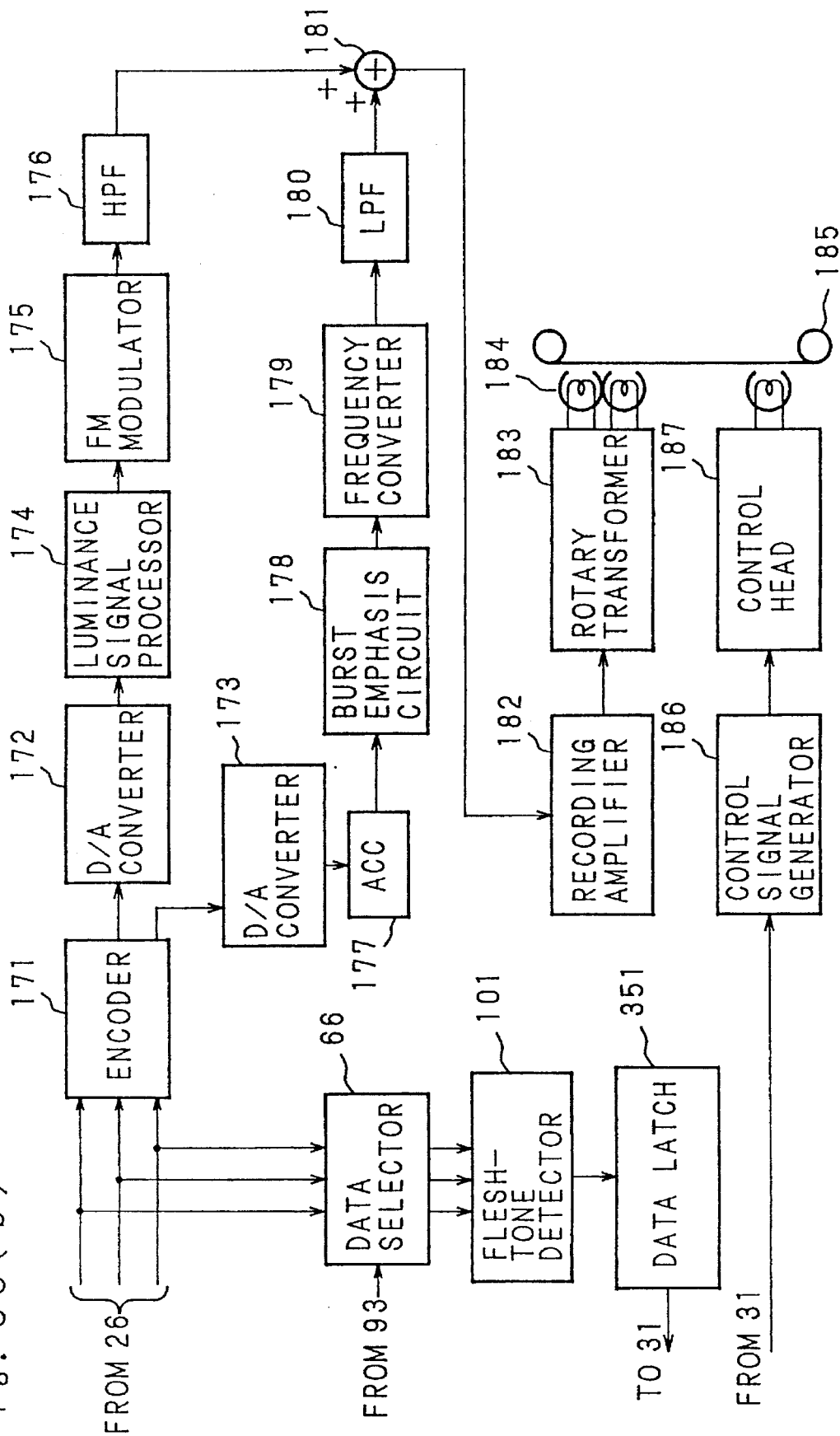

FIG. 93 is a block diagram showing the configuration of a color video camera (a 59th embodiment). In FIG. 93, the same reference numerals as those in FIGS. 74 and 87 designate the same or corresponding parts.

In operation, the flesh-tone detector 101 detects the presence or absence of a flesh-tone area within the picture frame Wx,y, as in the 55th embodiment. Then, in accordance with the flowchart of FIG. 72, when no flesh-tone area is detected in the video signal within the picture frame Wx,y, a "false recording instruction" is given to the control signal generator 186. The operation thereafter is the same as that in the 49th embodiment.

In the embodiments 49, 54, and 59, the output signals of the encoder 171 are supplied to the luminance signal processor 174 and then to the HPF 176 for processing of the luminance signal, and sent to the ACC 177 and then to the LPF 180 for processing of the color-difference signals, but this signal processing circuitry may be designed to have other configurations. Furthermore, in these embodiments, an example has been shown in which a VISS signal is used as the detection signal, but it will be recognized that the same effect can be accomplished if a VASS signal or an index signal of double-component multiple recording is used as the detection signal.

Also, in the embodiments 45 through 59, the flesh-tone detector 101 of the second embodiment is used as the means for detecting flesh-tone areas, but the flesh-tone detector of the third or fourth embodiment may be used instead of the flesh-tone detector 101 of the second embodiment. Furthermore, instead of detection by the memory as described above, a plurality of comparators may be used to define a flesh-tone area in the color-difference signals for detection of the flesh-tone area.

We will now proceed to embodiments 60 through 67 each of which deals with an example of identifying a human face area from flesh-tone areas detected.

(Embodiment 60)

Figure 94:
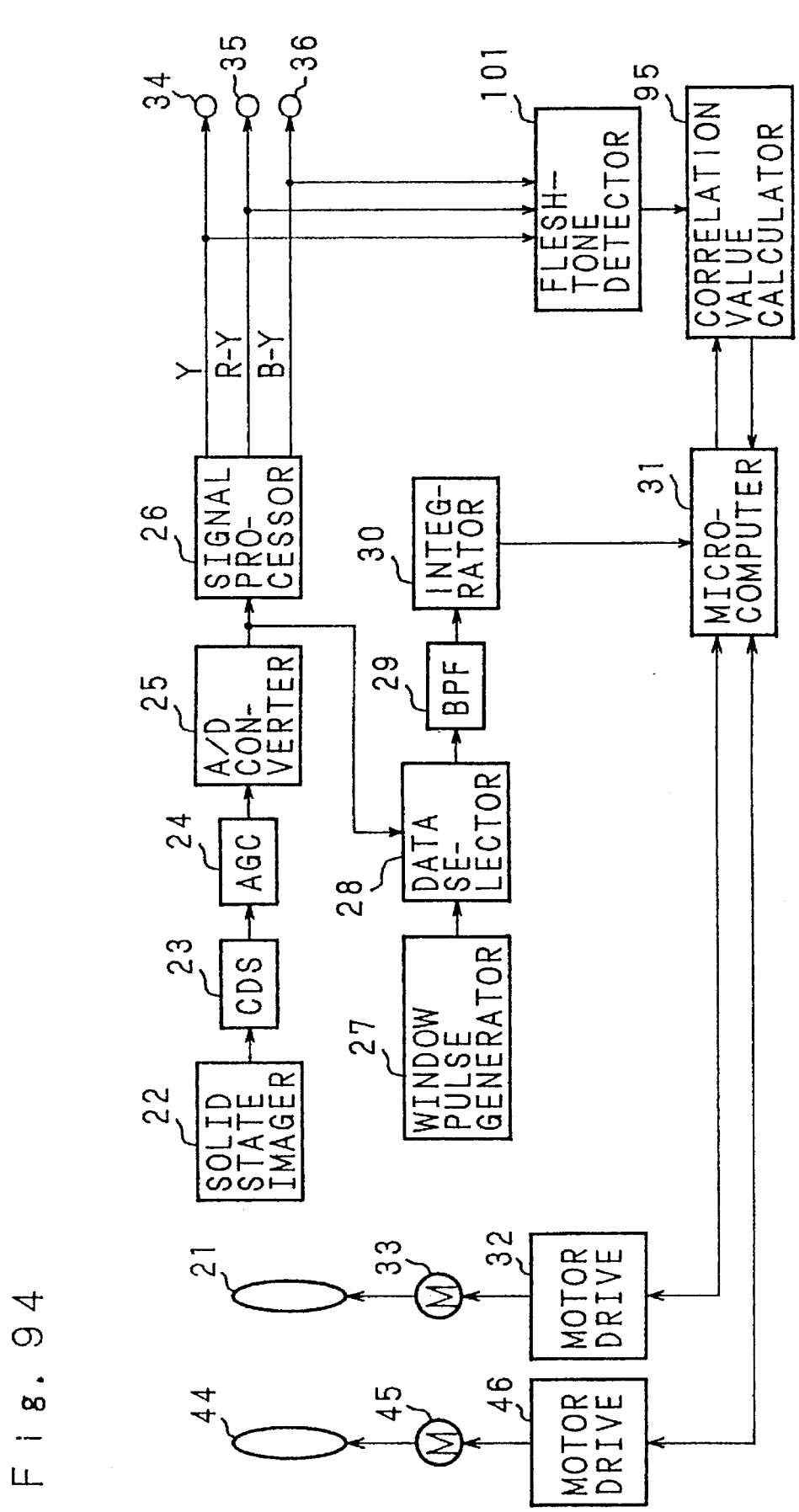
FIG. 94 is a block diagram showing the configuration of a video signal processor according to a further embodiment of the invention.

FIG. 94 is a block diagram showing the configuration of a video signal processor according to the present invention (a 60th embodiment). In FIG. 94, the same reference numerals as those in FIG. 54 designate the same or corresponding parts. Further in FIG. 94, the reference numeral 95 designates a correlation value calculator.

Figure 95:
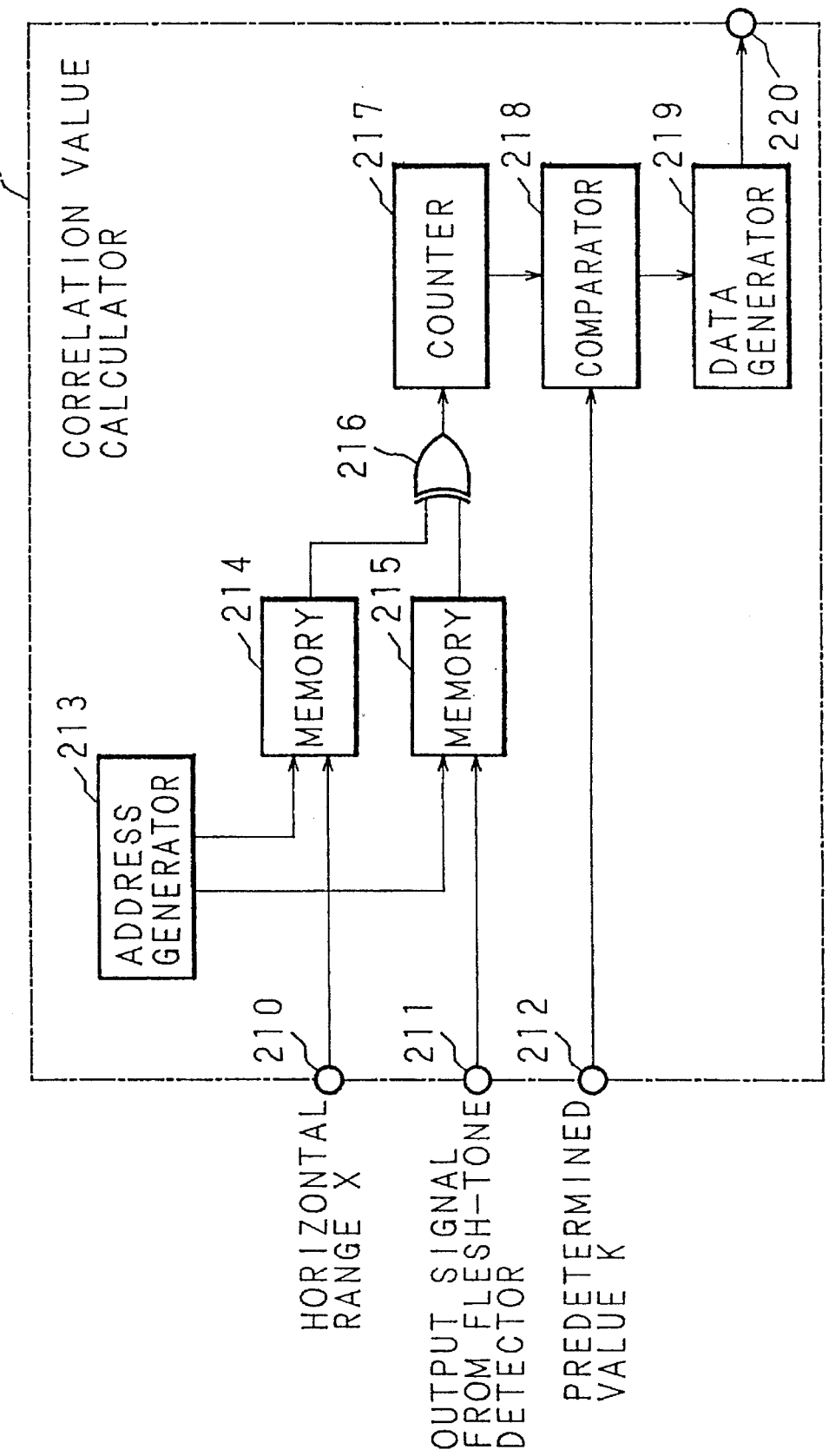
FIG. 95 is a block diagram showing the configuration of a correlation value calculator.

A specific example of the configuration of the correlation value calculator 95 is shown in FIG. 95, wherein the reference numeral 210 is an input terminal into which a horizontal range X is input from the microcomputer 31, 211 is an input terminal to which an output signal from the flesh-tone detector 101 is applied, 212 is an input terminal into which a predetermined value K is input from the microcomputer 31, 213 is an address generator, 214 and 215 are memories, 216 is an EXOR gate, 217 is a counter, 218 is a comparator, 219 is a data generator, and 220 is an output terminal through which a signal output from the data generator 219 is supplied to the microcomputer 31.

Figure 96:
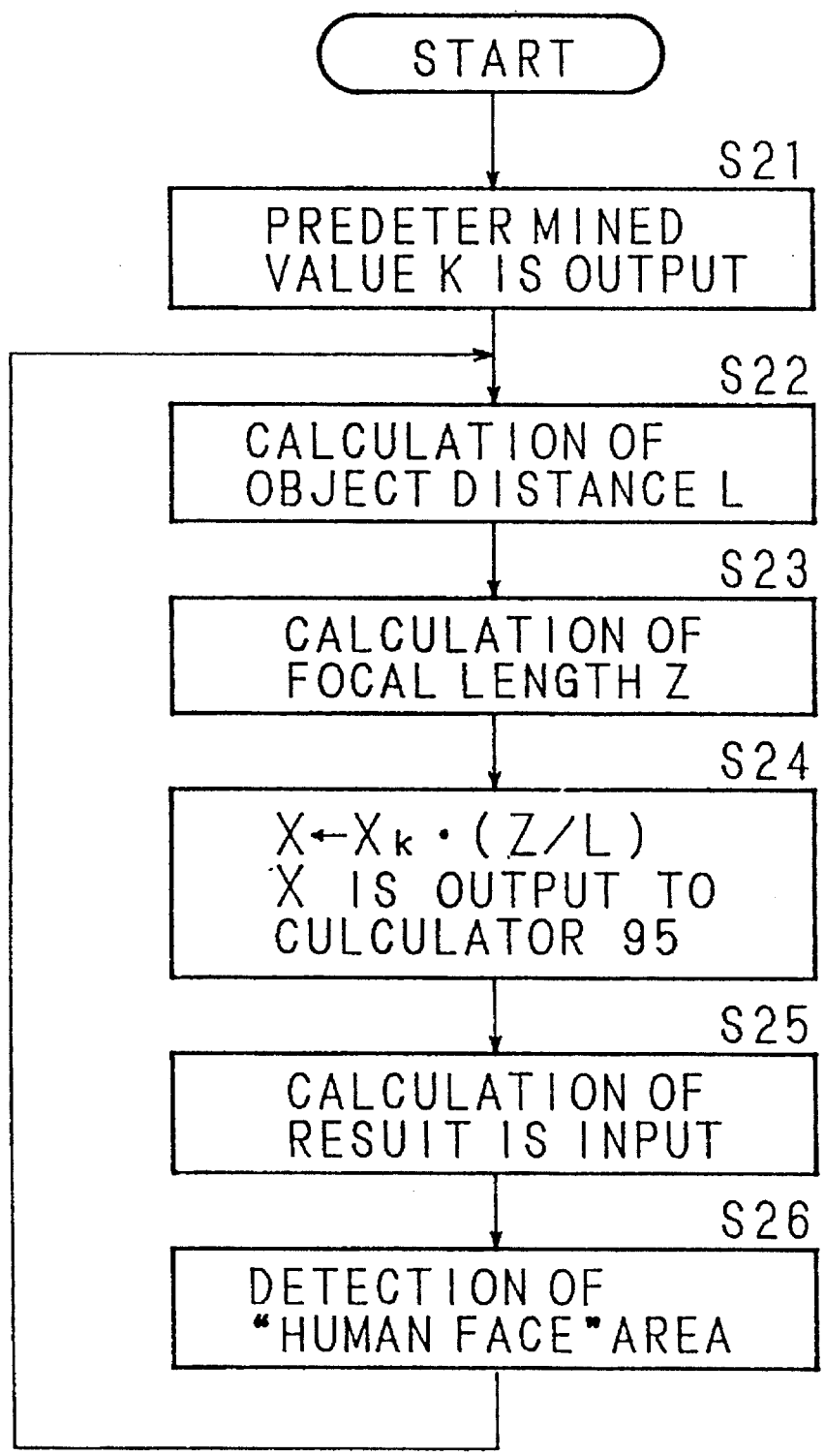
FIG. 96 is a flowchart illustrating the algorithm of a microcomputer.

The operation in this embodiment will now be described. The basic operation, such as focus area setting, flesh-tone area detection by the flesh-tone detector 101, etc., is the same as described in the previously described embodiments, and therefore, is not explained here. The following description deals with the operation of human face area detection. FIG. 96 is a flowchart explaining the algorithm of the microcomputer 31 for identifying a human face area from video signals. The procedure will now be explained according to the flowchart of FIG. 96.

Figure 97:
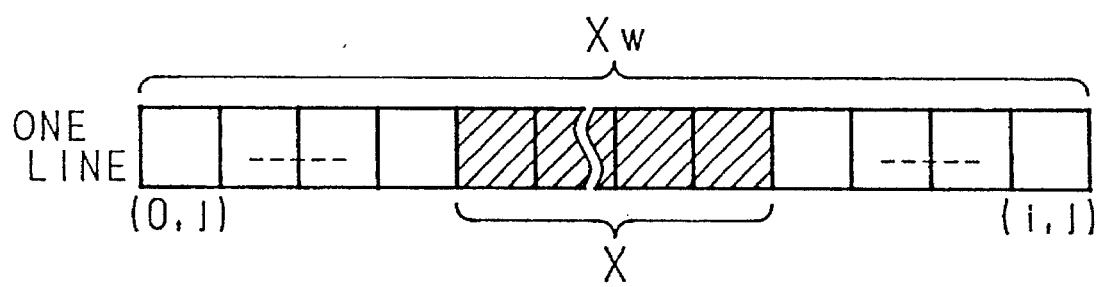
FIG. 97 is a diagram showing a range determined in accordance with a distance to an object and a focal length.

First, the microcomputer 31 supplies the predetermined value K to the correlation value calculator 95 (step S21). Next, using the control signals output for the zoom lens 44 and focus lens 21, the microcomputer 31 computes the positions of the zoom lens 44 and focus lens 21 and obtains the object distance L and the focal length Z (steps S22, S23). Based on the object distance L and focal length Z, and using the following Expression 8, the microcomputer 31 determines the horizontal range X, as shown in FIG. 97, to detect the width of a human face (step S24 ). Here, when the shortest focal length is denoted by ZW and the longest focal length by ZT, Z satisfies ZW≧Z≧ZT and is proportional to the magnifying ratio to an image at ZW. Xk denotes a standard size of a human face measured in horizontal direction when the zoom lens 44 is at the shortest focal length and when the object distance L is set at a predetermined reference distance.

$$X = Xk \cdot (Z/L) \qquad \text{(Expression 8)}$$

The horizontal range X determined by the microcomputer 31 is supplied to the correlation value calculator 95 (step S24) from the microcomputer 31.

The horizontal range X output from the microcomputer 31 is input into the memory 214 via the input terminal 210. The memory 214 contains data as shown in FIG. 97 as a data table. Here, XW denotes a predetermined range, and each block represents one pixel; the blocks indicated by oblique hatching are 0s and the other blocks are 1s. Based on the horizontal range X supplied, the memory 214 outputs data as shown in FIG. 97 using a LUT (look-up table) method.

Figure 98:
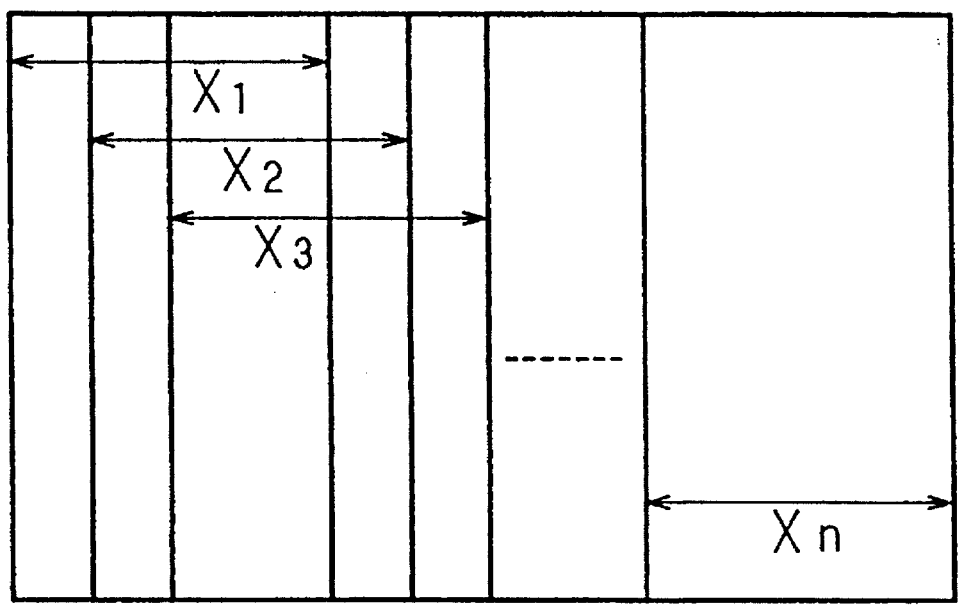
FIG. 98 is a diagram showing predetermined detection positions for correlating video signals.

Signals output from the flesh-tone detector 101 are supplied to the memory 215 where flesh-tone areas for one field are stored. The output signals of the flesh-tone detector 101 consist of 1s representing flesh-tone areas (oblique hatching) detected as shown in FIG. 17(*a*) and 0s representing other areas. The address generator 213 supplies addresses to the memory 215 so that the memory 215 outputs the stored output signals of the flesh-tone detector 101 corresponding to predetermined detection positions X1 through Xn as shown in FIG. 98.

Figure 99:
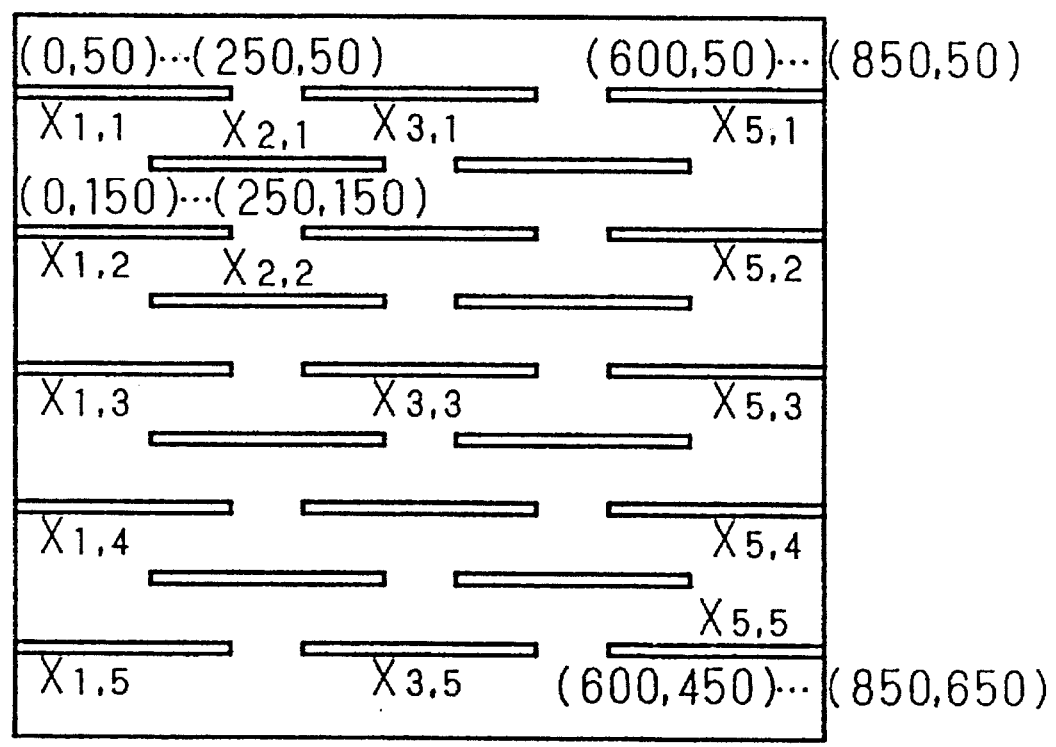
FIG. 99 is a diagram showing predetermined detection positions for correlating video signals.
Figure 100:
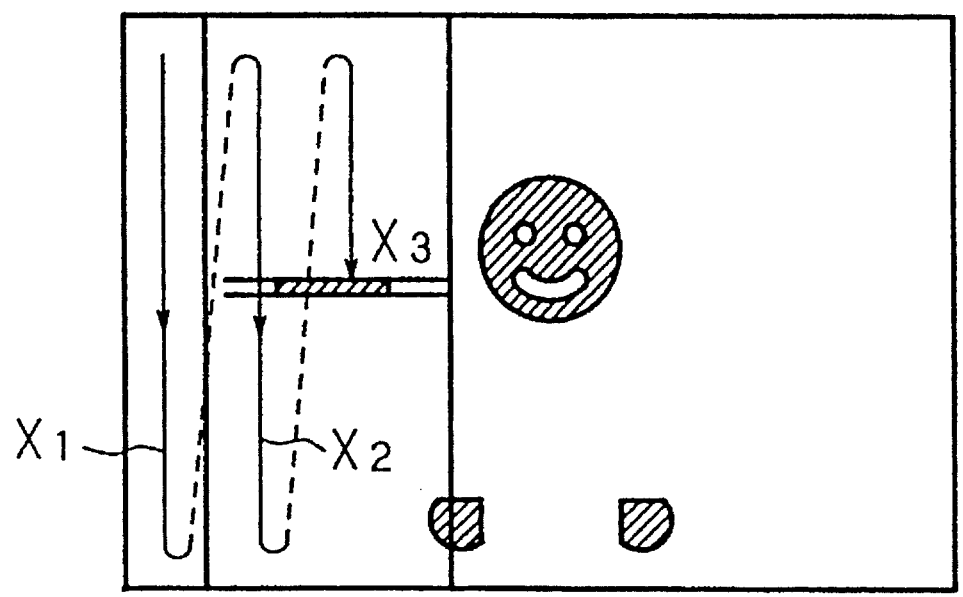
FIG. 100 is a diagram showing the sequence in which the detection positions are worked through for obtaining correlations.

FIG. 99 shows specific detection positions for calculating correlation values. The memory 215 sequentially outputs the stored output signals of the flesh-tone detector 101 corresponding to the detection positions X1,1 through X5,5. The address generator 213 also supplies addresses to the memory 214 so that the memory 214 repeatedly outputs the range XW for human face area detection in synchronism with the signals sequentially output from the memory 215 at the detection positions. In accordance with the supplied addresses, the memory 214 repeatedly outputs the horizontally determined range data shown in FIG. 97, one for each detection range (Xi,j). Xw=250 for the detection positions shown in FIG. 99. The output signals of the memories 214 and 215 are EXORed through the EXOR gate 216 and fed to the counter 217 which performs the integration for the width of Xw, to obtain a correlation value S. The correlation equation is shown in Expression 9 below. The exclusive-OR operation is performed at all the detection positions shown in FIG. 99, in sequence from the top to the bottom and then from the left to the right (X1,1, X1,2 . . . X1,5, X2,1, X2,2 . . . X5,4, X5,5) as shown in FIG. 100. As the correlation increases between the predetermined horizontal range shown in FIG. 97 and the horizontal range of the flesh-tone area, the correlation value S expressed by Expression 9 increases. The correlation value S calculated by the counter 217 for each detection position is sequentially fed to the comparator 218.

$$S = \Sigma EXOR\ (i, j) \quad \text{(Expression 9)}$$

EXOR: Exclusive-OR sum

Figure 101:
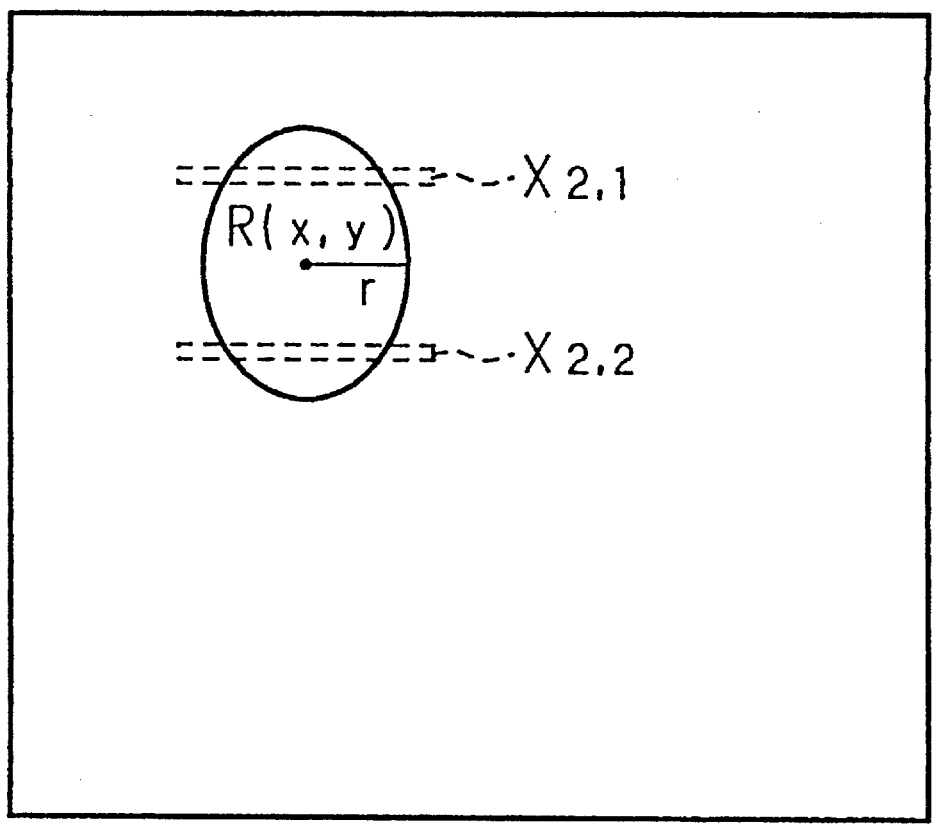
FIG. 101 is a diagram showing the size and the center of a human face area.

The comparator 218 compares the output signal S of the counter 217 with the predetermined value K supplied from the microcomputer 31, and outputs a "High" signal to the data generator 219 when the correlation value S is greater than the predetermined value K. Based on the output signal of the comparator 218, the data generator 219 supplies data on the size and center position of the human face to the microcomputer 31. Suppose, for example, that the input signal shown in FIG. 17(*b*) is supplied to the correlation value calculator 95 and that the output signal of the comparator 218 is "High" only for the detection positions X2,1 and X2,2 shown in FIG. 99 and "Low" for other detection positions. In this case, the data generator 219 outputs data R (x, y) designating the center of the human face and r designating the size of the human face, as shown in FIG. 101. The output signal of the correlation value calculator 95 is supplied to the microcomputer 31 (step S25), and the microcomputer 31 determines the video signal area designated by the supplied data as representing the human face area (step S26).

The above signal processing loop (S22 to S26) is repeated for every one field or for every few fields.

Figure 102:
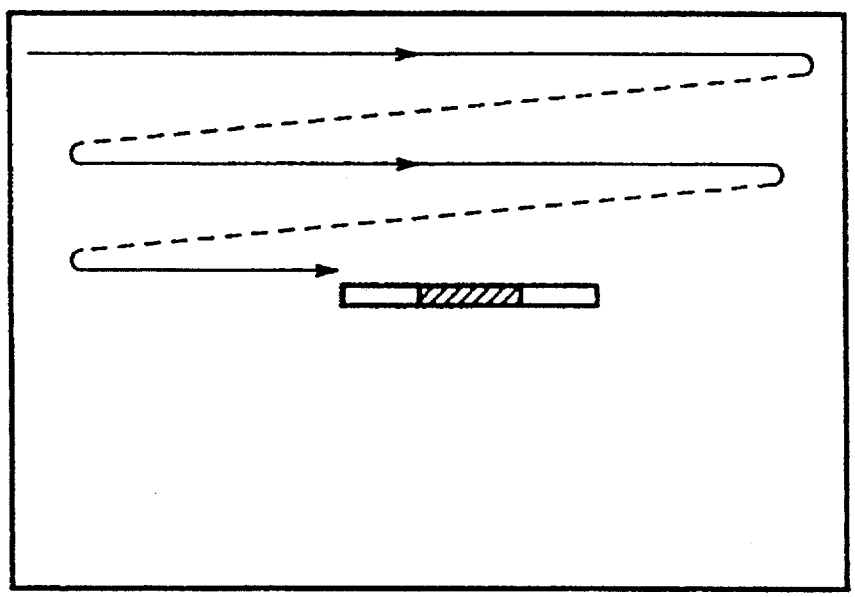
FIG. 102 is a diagram showing the sequence in which the detection positions are worked through for obtaining correlation.

The memory 214 used in the correlation value calculator 95 can also be employed in using such circuit configuration that, for the horizontal range of FIG. 97 determined by the object distance L and focus length Z, 1s are output for the blocks of oblique hatching and 0s are output for the other blocks. It will also be recognized that the calculation of correlation values may be performed at the predetermined detection positions from the left to the right and then from the top to the bottom as shown in FIG. 102. FIG. 99 shows a specific example of detection positions for calculation of correlation values, but the detection positions are not restricted to those illustrated.

(Embodiment 61)

In the above 60th embodiment, a human face area is identified based on the correlation values in a horizontal range, but alternatively, it is also possible to identify a human face area based on the correlation values in a vertical range. The 61st embodiment hereinafter described concerns such an example. The circuit configuration, including the correlation value calculator 95, of the 61st embodiment is identical to that of the 60th embodiment.

Figure 103:
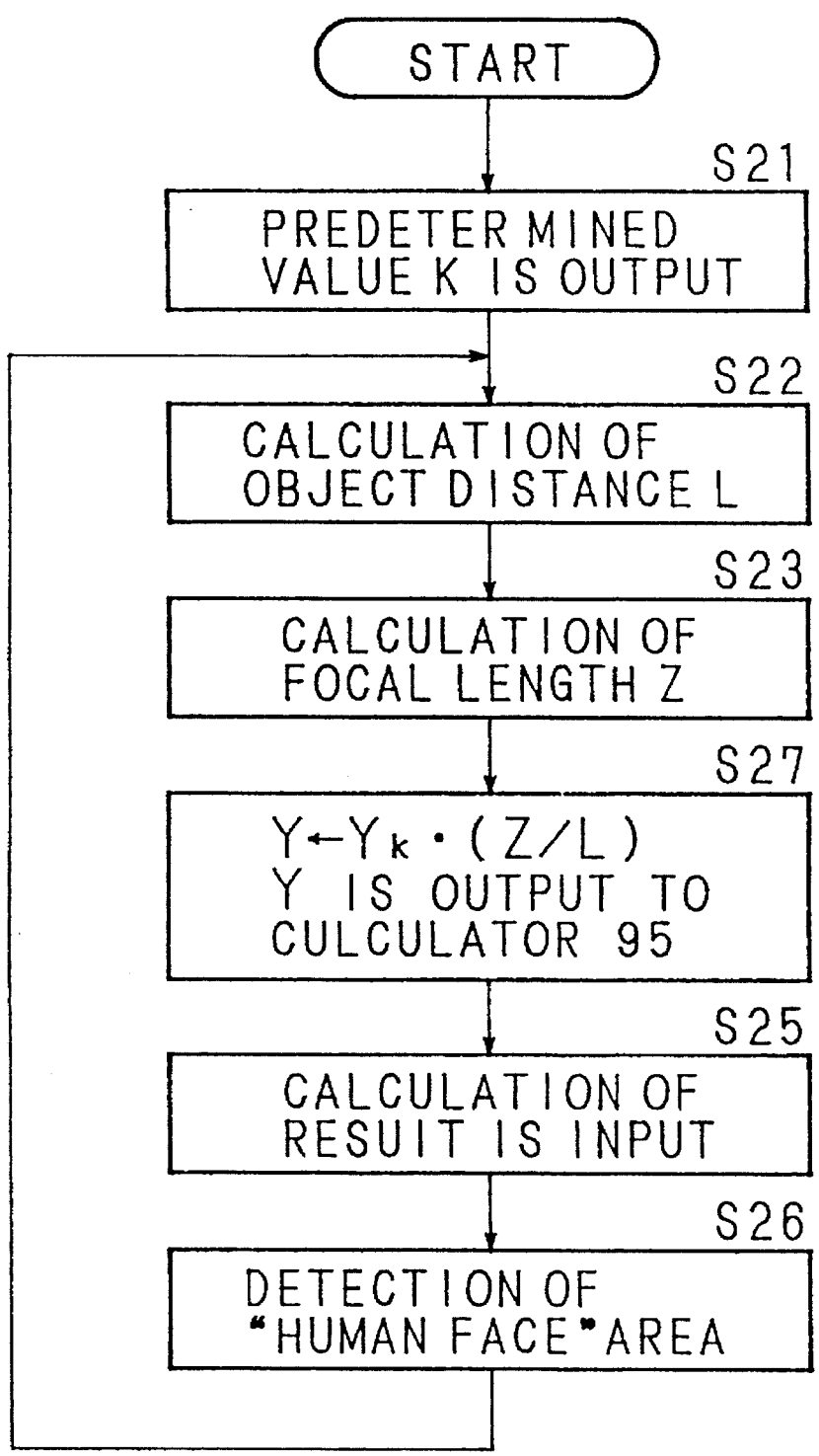
FIG. 103 is a flowchart illustrating the algorithm of a microcomputer.

The operation in the 61st embodiment can be explained in a similar way to that of to explain the 60th embodiment. In the flowchart of FIG. 103 illustrating the operation in the 61st embodiment, a vertical range Y for detecting the width of a human face is obtained by Expression 10 below (step S27). Yk denotes a standard size of a human face measured in vertical direction when the zoom lens 44 is at the shortest focal length and when the object distance L is set at a predetermined reference distance.

$$Y = Yk \cdot (Z/L) \quad \text{(Expression 10)}$$

Figure 104:
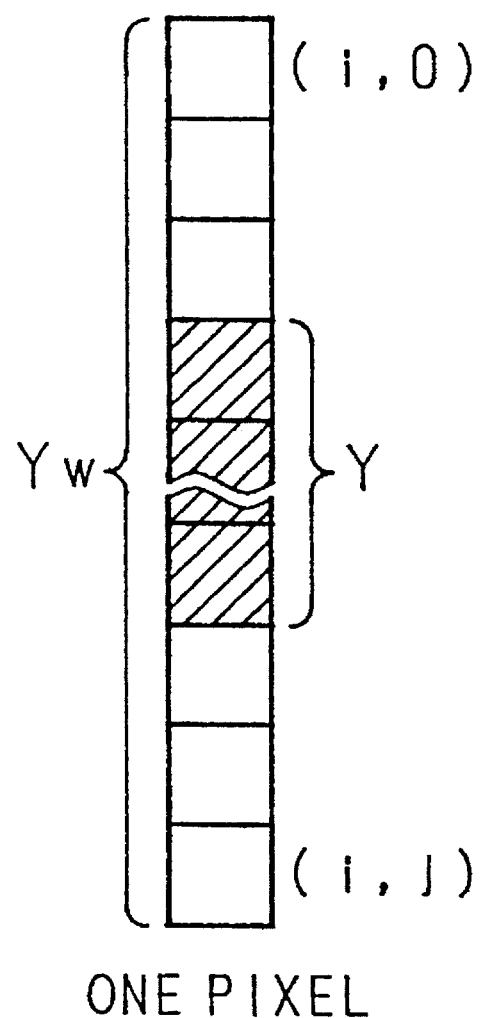
FIG. 104 is a diagram showing a range determined in accordance with a distance to an object and a focal length.
Figure 105:
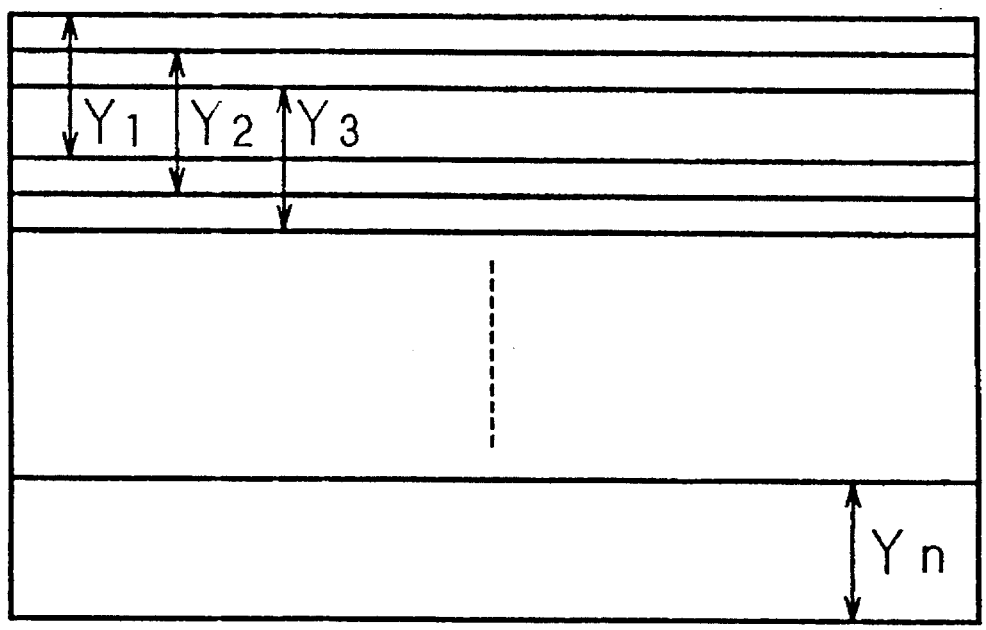
FIG. 105 is a diagram showing predetermined detection positions for correlating video signals.
Figure 106:
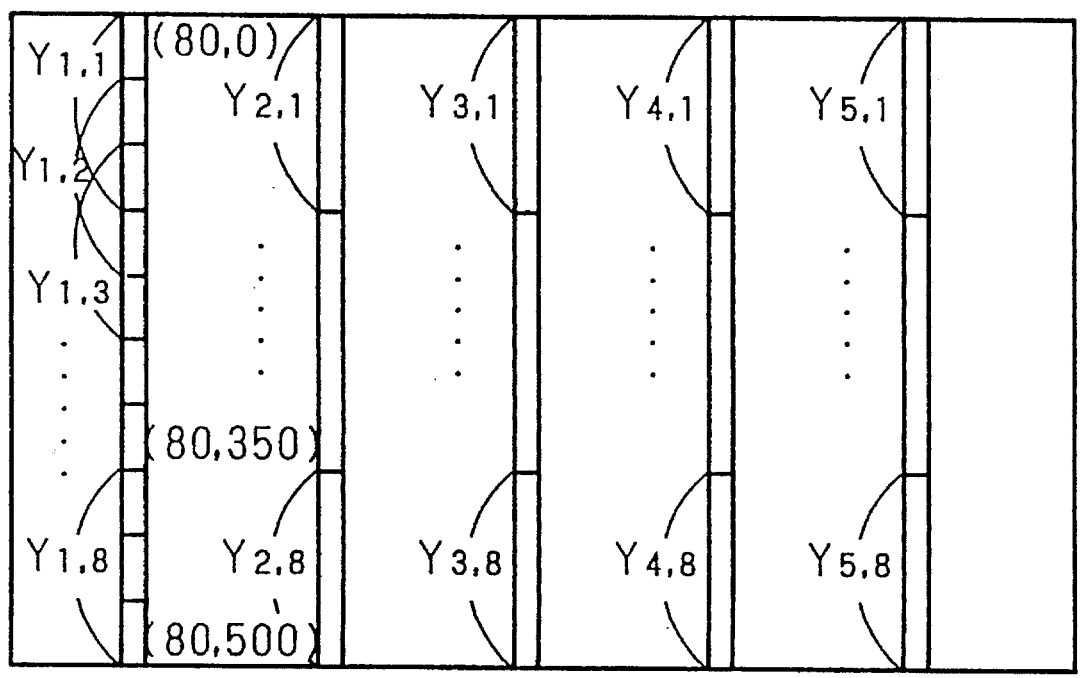
FIG. 106 is a diagram showing predetermined detection positions for correlating video signals.
Figure 107:
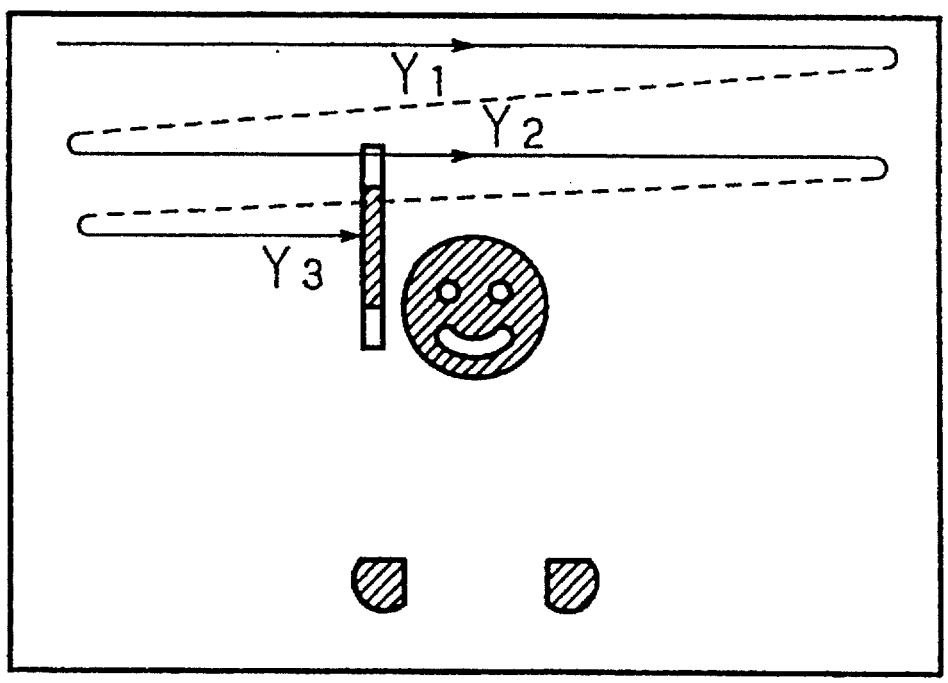
FIG. 107 is a diagram showing the sequence in which the detection positions are worked through for obtaining correlations.
Figure 108:
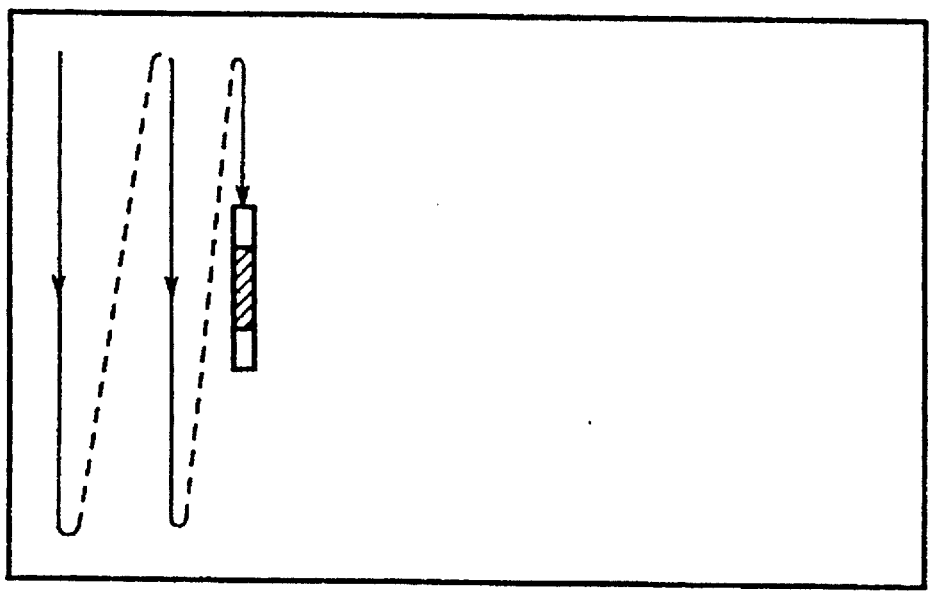
FIG. 108 is a diagram showing the sequence in which the detection positions are worked through for obtaining correlations.

The vertical range Y output from the microcomputer 31 enter to the memory 214 via the input terminal 210. The memory 214 contains data as shown in FIG. 104 as a data table. The address generator 213 supplies addresses to the memory 215 so that the memory 215 outputs the stored output signals of the flesh-tone detector 101 obtained at redetermined detection positions Y1 through Yn as shown in FIG. 105. For detection positions as shown in FIG. 106, a correlation value S is calculated by Expression 9. Yw=100 for the detection positions shown in FIG. 106. The exclusive-OR operation is performed at all the detection positions shown in FIG. 106, in sequence from the top to the bottom and from the left to the right (Y1,1, Y1,2 . . . Y1,8,Y2,1, Y2,2 . . . Y5,7, Y5,8) as shown in FIG. 107. Where the correlation value S is larger than the predetermined value K, the area is determined as the human face area. It would also be possible to obtain the correlation value at the detection positions from the top to the bottom and from the left to the right as shown in FIG. 108.

(Embodiment 62)

The circuit configuration, including the correlation value calculator 95, in the 62nd embodiment is identical to that in the 60th embodiment.

Figure 109:
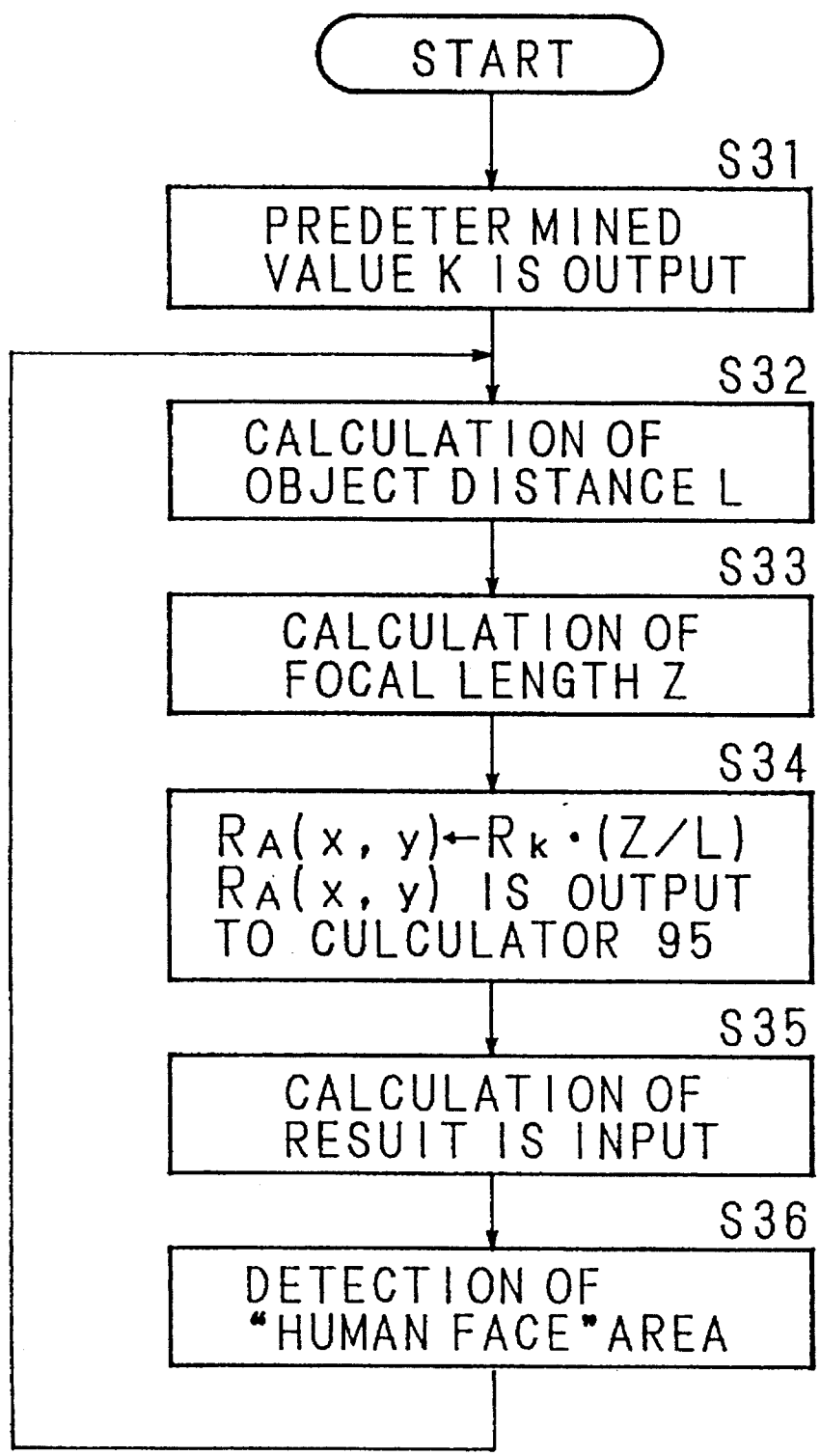
FIG. 109 is a flowchart illustrating the algorithm of a microcomputer.

FIG. 109 is a flowchart explaining the algorithm of the microcomputer 31 of this embodiment for identifying a human face area from video signals. The procedure will be described below according to the flowchart of FIG. 109.

Figure 110:
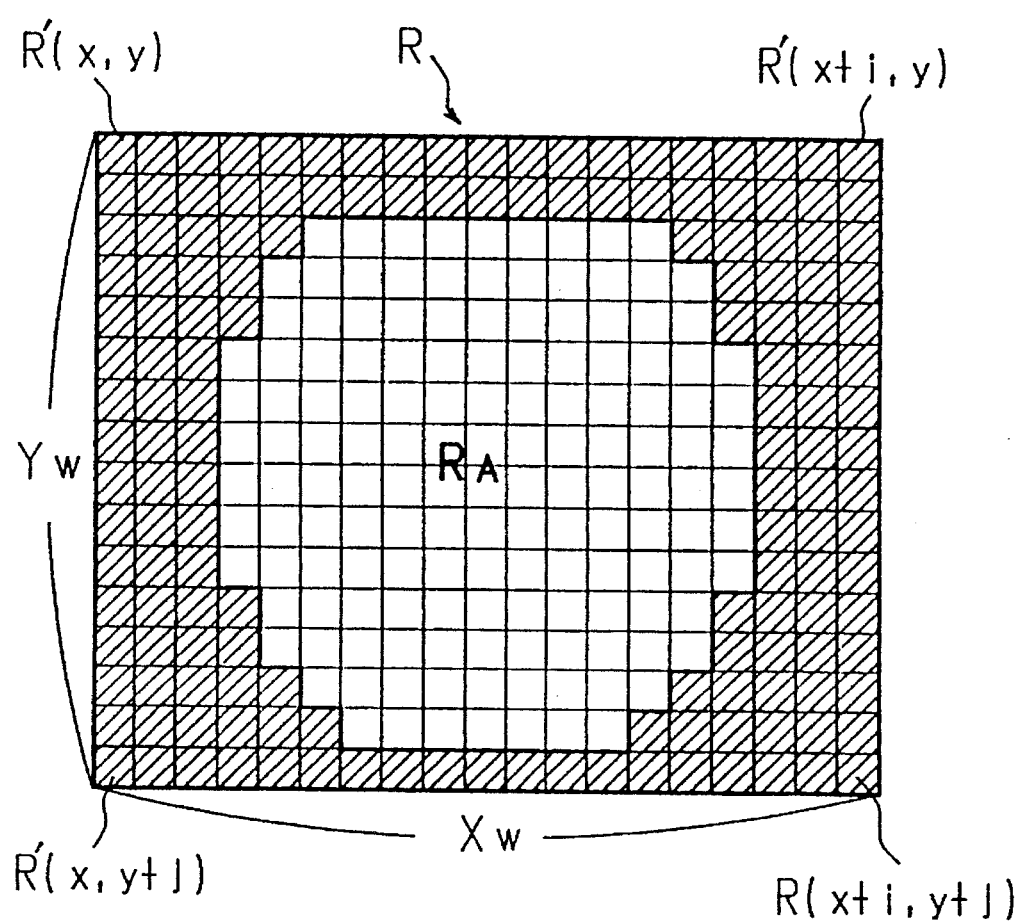
FIG. 110 is a diagram showing a range determined in accordance with a distance to an object and a focal length.

First, the microcomputer 31 supplies the predetermined value K to the correlation value calculator 95 (step S31). Next, the microcomputer 31 computes the object distance L and focal length Z (steps S32, S33). Based on the object distance L and focal length Z, and using the following Expression 11, the microcomputer 31 determines a range RA, as shown in FIG. 110, with which to detect the width of a human face (step S34). Rk denotes a standard size of a human face with the zoom lens 44 at its shortest focal length and the object distance L set at a predetermined reference distance.

$$RA=Rk\cdot(Z/L) \quad \text{(Expression 11)}$$

The range RA determined by the microcomputer 31 is supplied to the correlation value calculator 95 (step S34).

The range R output from the microcomputer 31 enters the memory 214 via the input terminal 210. The memory 214 contains ranges R and RA as shogun in FIG. 110 as a data table. Based on the data stored in the memory 214, RA range varies in response to the data supplied from the input terminal 210. Here, XW and YW denote predetermined values, and each block represents one pixel; the blocks indicated by oblique hatching are 1s and the other blocks are 0s. Based on the range RA supplied, the memory 214 outputs data as shown in FIG. 110 using a LUT (look-up table) method.

Figure 111:
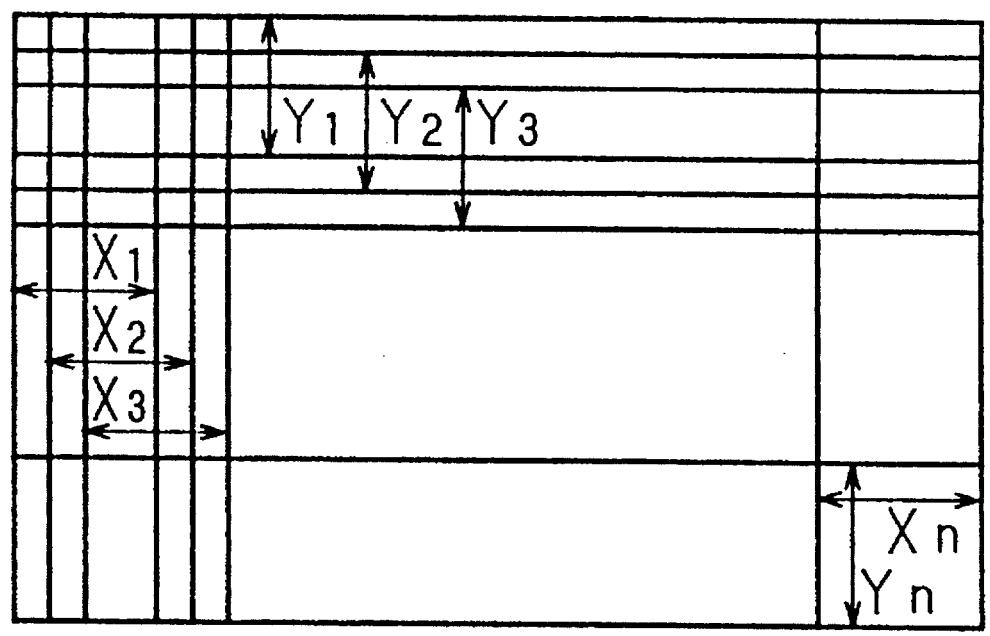
FIG. 111 is a diagram showing predetermined detection positions for correlating video signals.
Figure 112:
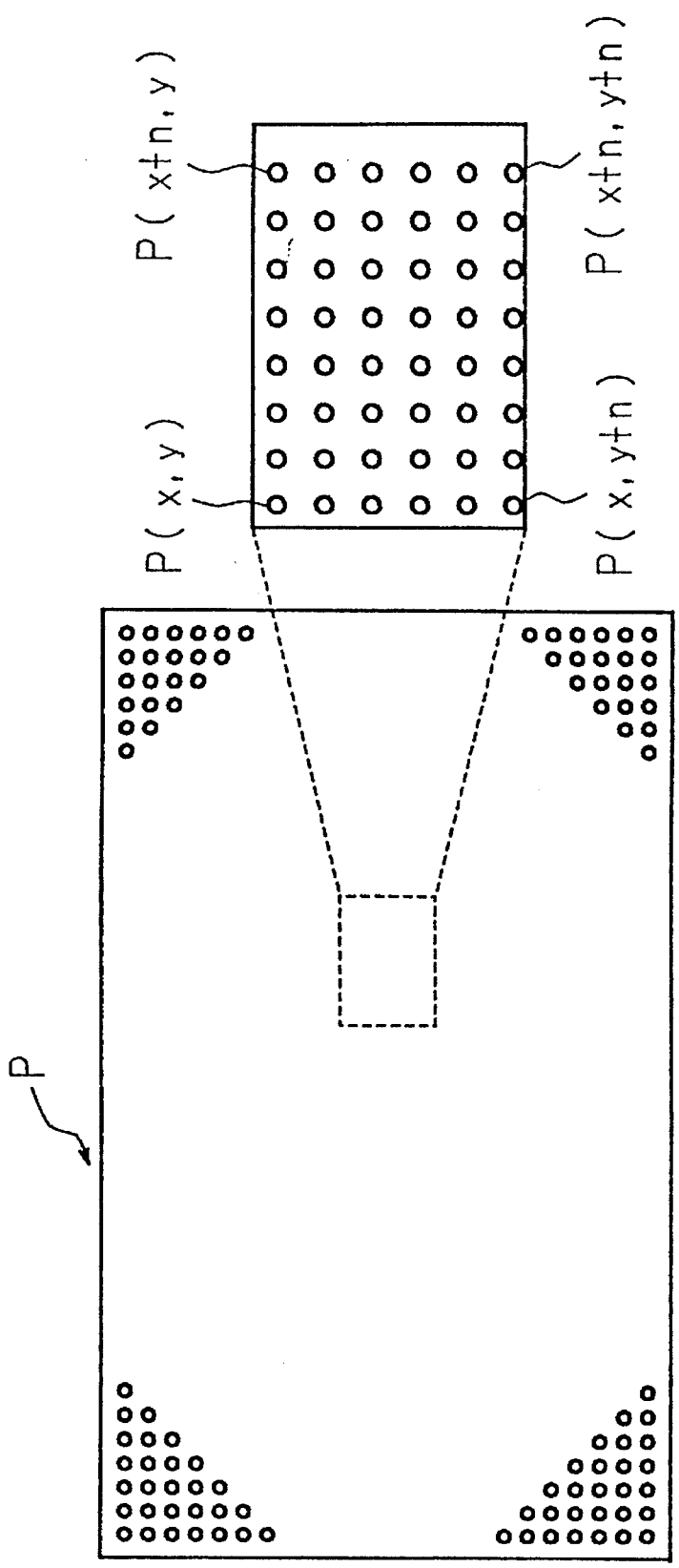
FIG. 112 is a diagram showing predetermined detection positions for correlating video signals.
Figure 113:
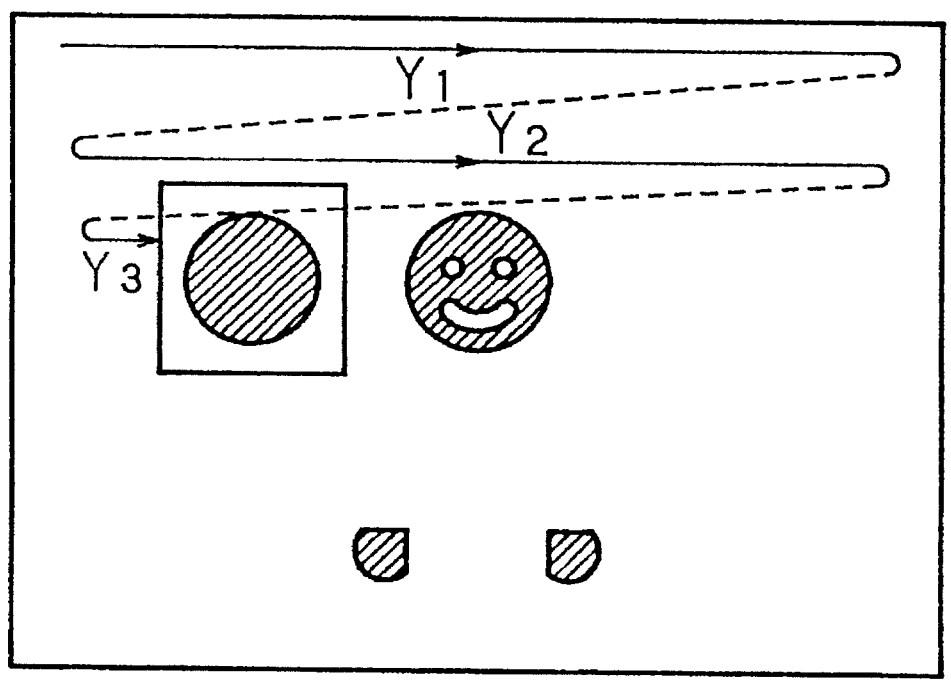
FIG. 113 is a diagram showing the sequence in which the detection positions are worked through for obtaining correlations.
Figure 114:
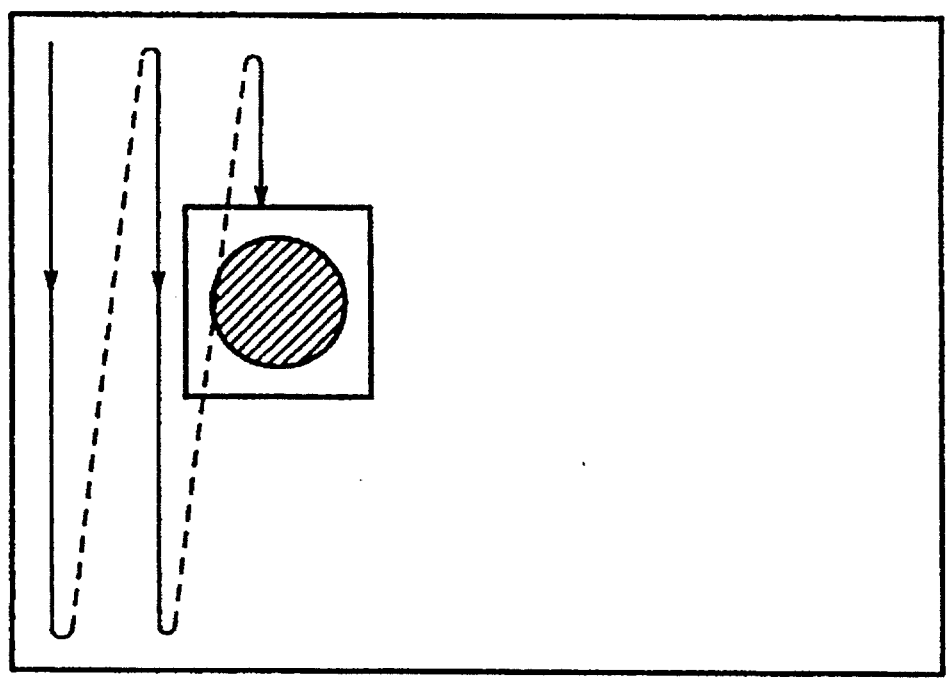
FIG. 114 is a diagram showing the sequence in which the detection positions are worked through for obtaining correlations.

FIGS. 111 and 112 show specific detection positions for calculating correlation values. Area P indicates detection positions for one field. Signals output from the flesh-tone detector 101 are supplied to the memory 215 where flesh-tone areas for one field, such as shown in FIG. 17(a), are stored. The address generator 213 supplies addresses to the memory 215 so that the memory 215 outputs the stored output signals of the flesh-tone detector 101 obtained at the predetermined detection positions P (x+i, y+i) shown in FIG. 110. The address generator 213 also supplies addresses to the memory 214 so that the memory 214 repeatedly outputs the range R for human face area detection in synchronism with the signals sequentially output from the memory 215 for the detection positions. In accordance with the supplied addresses, the memory 214 repeatedly outputs data in the predetermined range shown in FIG. 110 for every detection range from R (R' (x, y) to R' (x+i, y+i)). The output signals of the memories 214 and 215 are EXORed through the EXOR gate 216 and fed to the counter 217 which performs the integration for every detection range from (R' (x, y) to R' (x+i, y+i)), to obtain a correlation value S. The correlation equation is shown as Expression 12 below. The exclusive-OR operation is performed at all the detection positions shown in FIGS. 111 and 112, in sequence from the top to the bottom and then from the left to the right as shown in FIG. 113, or in sequence from the left to the right and then from the top to the bottom as shown in FIG. 114. As the correlation increases between the predetermined range shown in FIG. 110 and each detection position R, the correlation value S expressed by Expression 12 increases. The correlation value S calculated by the counter 217 for each detection position is sequentially fed to the comparator 218.

$$S=\Sigma EXOR\ (P\ (i, j), R\ (i, j)) \quad \text{(Expression 12)}$$

EXOR: Exclusive-OR sum

The comparator 218 compares the output signal S of the counter 217 with the predetermined value K supplied from the microcomputer 31, and outputs a "High" signal to the data generator 219 when the correlation value S is larger than the predetermined value K supplied from the microcomputer 31. Based on the output signal of the comparator 218, the data generator 219 supplies data on the size and center position of the human face to the microcomputer 31.

The output signal of the correlation value calculator 95 is supplied to the microcomputer 31 (step S35), and the microcomputer 31 determines the video signal area indicated by the supplied data as representing the human face area (step S36).

The above signal processing loop (S32 to S36) is repeated for every one field or for every few fields.

(Embodiment 63)

Figure 115:
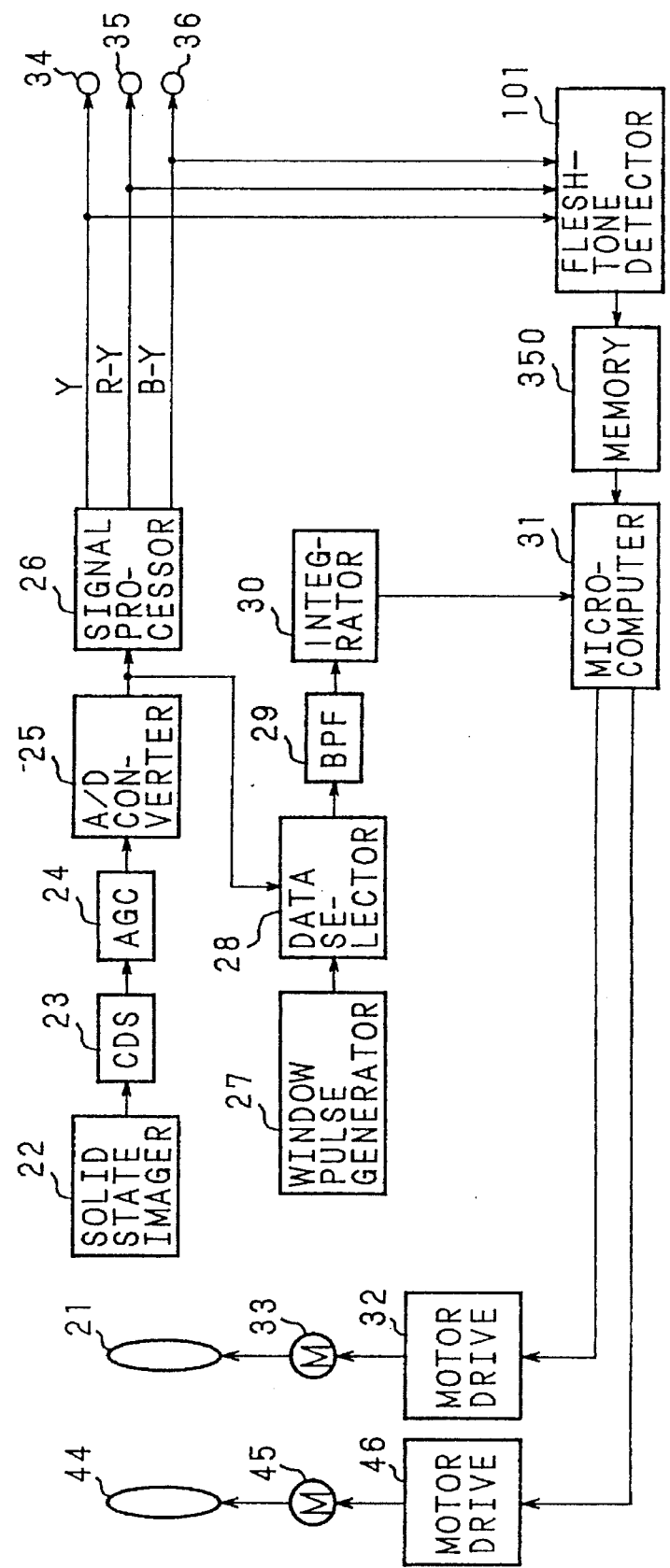
FIG. 115 is a block diagram showing the configuration of a video signal processor according to a further embodiment of the invention.

FIG. 115 is a block diagram showing the configuration of a video signal processor according to the present invention (a 63rd embodiment). In FIG. 115, the same reference numerals as those in FIG. 94 designate the same or corresponding parts. Further in FIG. 115, the reference numeral 350 designates a memory. The flesh-tone detection signal of one-field output from the flesh-tone detection 101 is stored in the memory 350. The memory 350 which stores the flesh-tone area for one-field outputs the stored data of flesh-tone area to the microcomputer 31 finder the control thereof. In this embodiment, a figure, range, and length to be used to detect a human face in a flesh-tone area are predetermined by the microcomputer 31, and when the flesh-tone area detected by the flesh-tone detector 101 matches the shape of the figure or when the two-dimensional size or the horizontal and vertical lengths of the flesh-tone area satisfy prescribed values, the flesh-tone area is determined as a human face area. The figure, range, and length vary in size with the object length L and focal length Z.

In the above embodiments 60, 61, and 62, the correlation value calculator 95 is used to determine whether the flesh-tone area matches the shape of a prescribed figure; that is, the correlation between the flesh-tone area and the prescribed figure is measured to calculate a correlation value, and when the obtained correlation value is larger than the prescribed value, the flesh-tone area is determined as a human face area.

The above method, however, is not the only method for distinguishing a human Face area from other flesh-tone areas. For example, if any of the flesh-tone areas R1, and R3 shown in FIG. 17(a), has the size to fit into the shaded area, shown in FIG. 117, which is predetermined by the microcomputer 31, that area is determined as a human face area. In case that the flesh-tone areas shown in FIG. 17(a) is detected, the flesh-tone area R1 is determined as a human face area. This method is realized by this embodiment, which will be described below with reference to the flowchart of FIG. 116.

Figure 116:
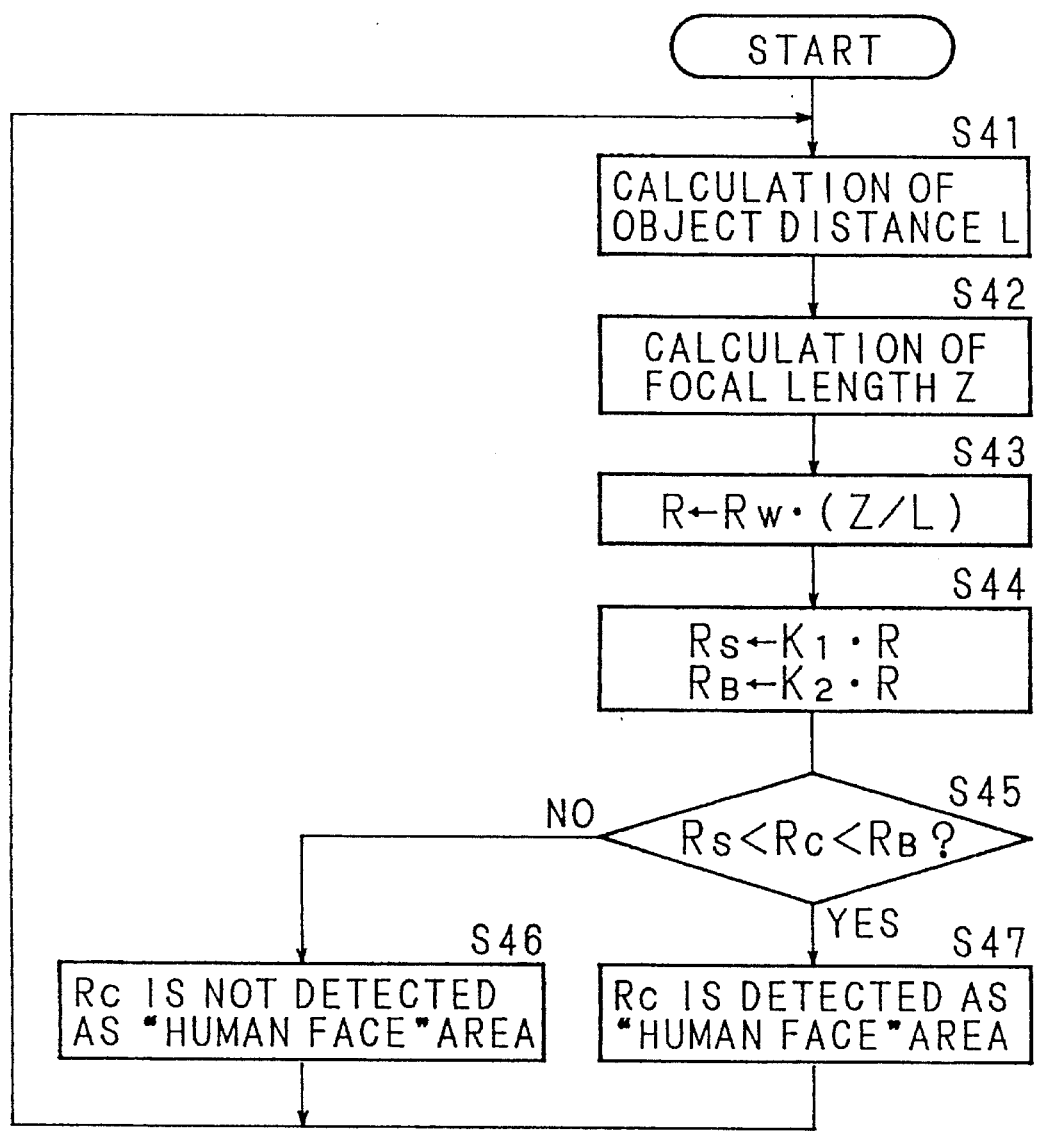
FIG. 116 is a flowchart illustrating the algorithm of a microcomputer.

Referring to the flowchart of FIG. 116, first the microcomputer 31 computes the object distance L and focal length Z (steps S41, S42). Based on the obtained results, a coefficient R that satisfies Expression 13 is determined (step S43). RW denotes a standard size of a human face with the zoom lens 44 at its shortest focal length ZW and the object distance L set at a prescribed reference distance.

$$R=RW\cdot(Z/L) \quad \text{(Expression 13)}$$

Figure 117:
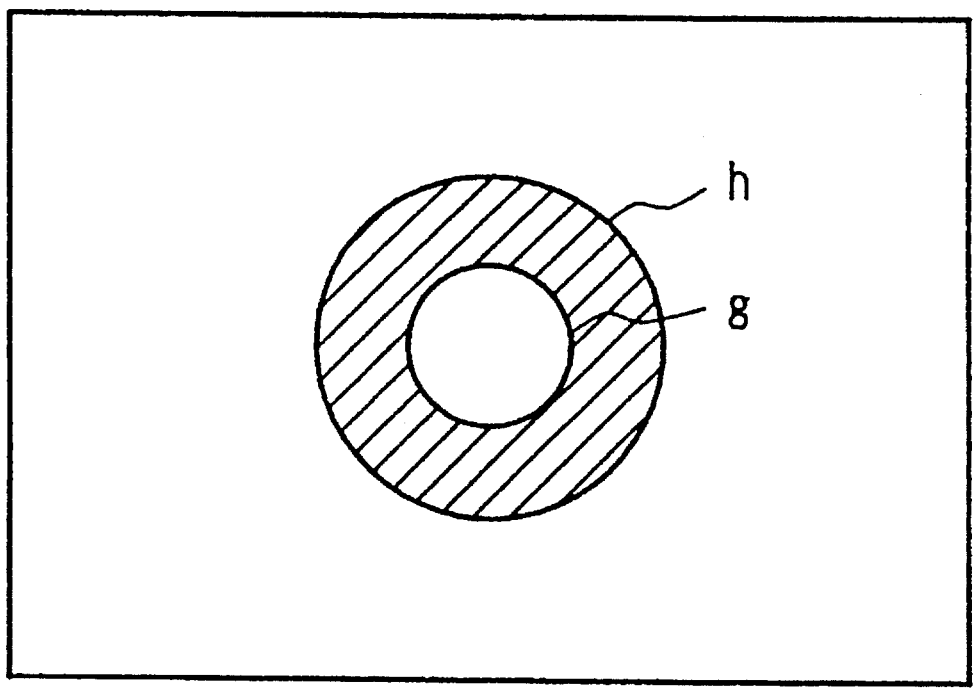
FIG. 117 is a diagram showing a range determined in accordance with a distance to an object and a magnifying ratio.

Next, using the coefficient R, a small area RS and a large area RB are determined corresponding to g and h shown in FIG. 117. RS and RB are obtained by Expressions 14 and 15 below (step S44).

$$RS=k1\cdot R \text{ where } k1<1 \quad \text{(Expression 14)}$$

$$RB=k2\cdot R \text{ where } k2>1 \quad \text{(Expression 15)}$$

If the size of a flesh-tone area RC detected by the flesh-tone detector 101 satisfies Expression 16 below, the area RC is determined as a human face area (step S46). If it does not satisfy Expression 16, then it is determined that RC is not a human face area (step S47).

$$RS<RC<RB \quad \text{(Expression 16)}$$

Figure 118:
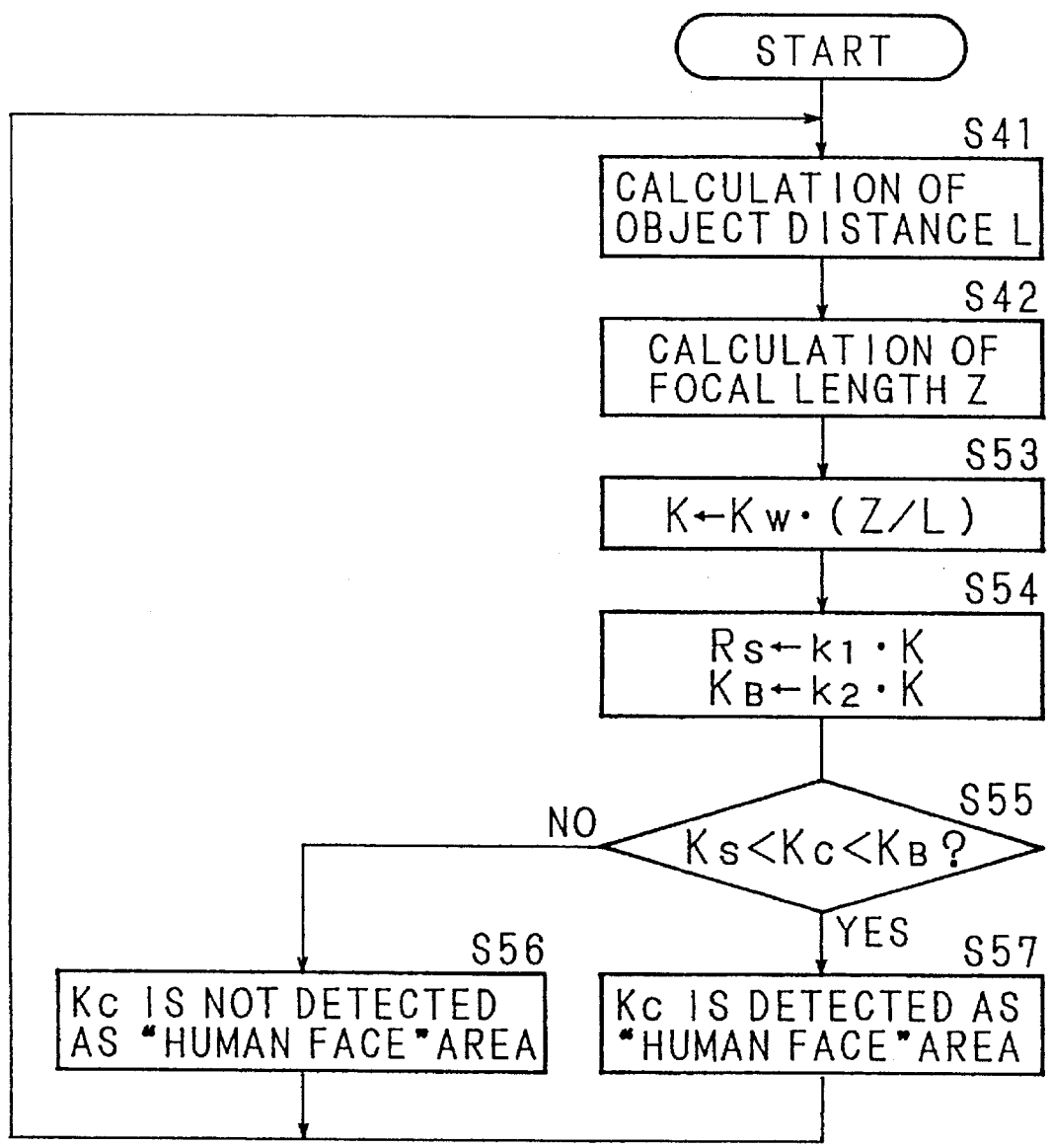
FIG. 118 is a flowchart illustrating the algorithm of a microcomputer.

FIG. 118 is a flowchart showing a procedure for detecting a human face based on the two-dimensional size or the horizontal and vertical size of a flesh-tone area. In FIG. 118, the same processing steps as those in FIG. 116 are designated by the same step numbers. Based on the obtained distance L and focal length Z, a coefficient K that satisfies Expression 17 is determined (step S53). KW is a constant denoting a standard size of a human face with the zoom lens 44 at its shortest focal length ZW and the object distance L set at a prescribed reference distance.

$$KS=KW\cdot(Z/L) \quad \text{(Expression 17)}$$

Next, KS and KB are obtained by Expressions 18 and 19 below (step S54).

$$KS=k1\cdot K \text{ where } k1<1 \quad \text{(Expression 18)}$$

$$KB=k2\cdot K \text{ where } k2>1 \quad \text{(Expression 19)}$$

Each of the flesh-tone areas R1, R2, and R3 shown in FIG. 17 is integrated to obtain the two-dimensional size KC of each flesh-tone area detected by the flesh-tone detector 101. If the resulting value satisfies Expression 20 below, KC is determined as a human face area (step S56). If it does not satisfy Expression 20, then it is determined that KC is not a human face area (step S57).

$$KS<KC<KB \quad \text{(Expression 20)}$$

(Embodiment 64)

The circuit configuration of the 64th embodiment is identical to that of the 63rd embodiment (FIG. 115).

Figure 119:
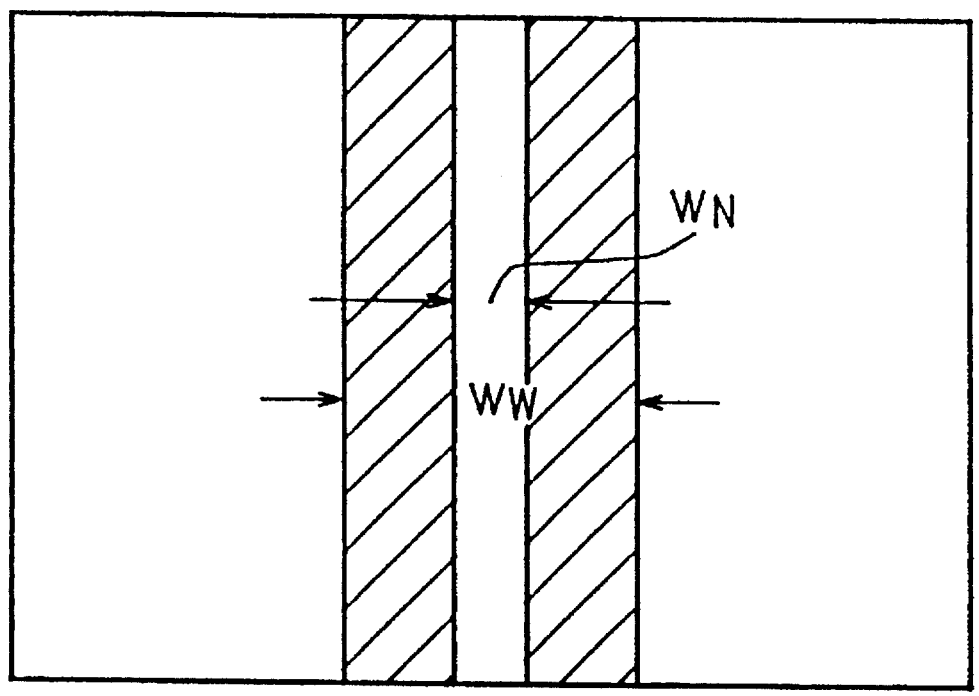
FIG. 119 is a diagram showing a range for detection of a human face.
Figure 120:
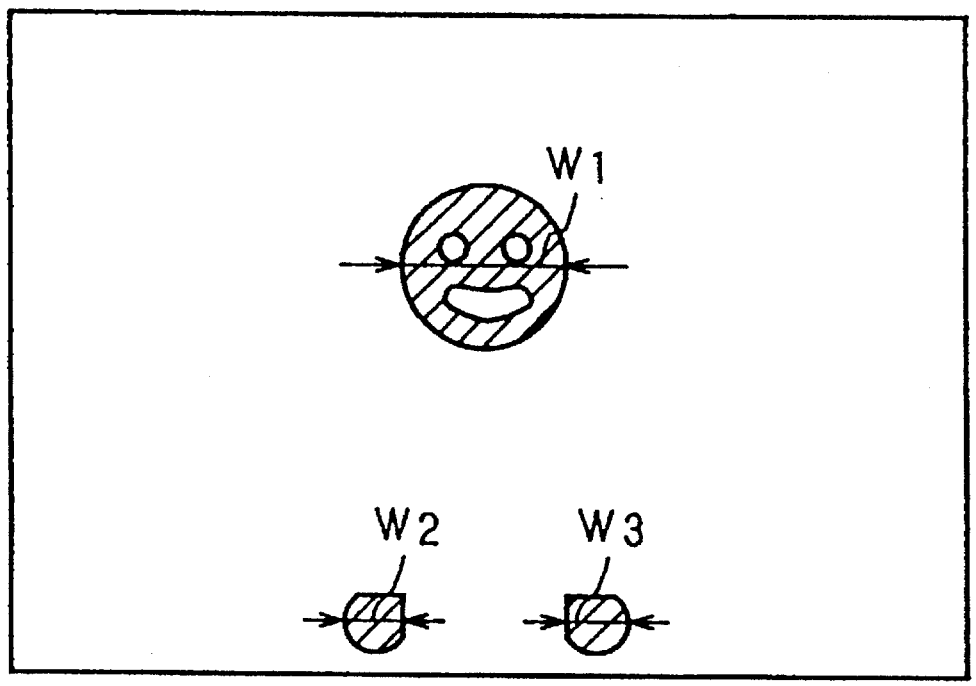

As shown in FIG. 119, values WN and Ww (WN<Ww) are set by the microcomputer 31 according to the object distance. The oblique hatching areas shown in FIG. 120 represent the output of the flesh-tone detector 101 when the object of FIG. 16 was picked up with a video camera; these areas correspond to the areas shown in FIG. 17(*a*). Of the flesh-tone areas detected by the flesh-tone detector 101, as shown in FIG. 120, if the horizontal value (size), W1, satisfies Ww>W1>WN, the microcomputer 31 determines the flesh-tone area represented by W1 as a human face area. On the other hand, W2 and W3 detected by the flesh-tone detector 101 as flesh-tone areas as well do not satisfy the above condition, and therefore, the microcomputer 31 determines that these areas are not human face areas.

WN and Ww are so set that their values increase as the object distance L decreases (the object comes closer to the camera) and decrease as the object distance increases (the object moves farther away from the camera), and also that the difference between Ww and WN, i.e. the range limited by the two values, increases as the magnifying ratio increases, and decreases as the ratio decreases.

(Embodiment 65)

The circuit configuration of the 65th embodiment is identical to that of the 63rd embodiment (FIG. 115).

Figure 121:
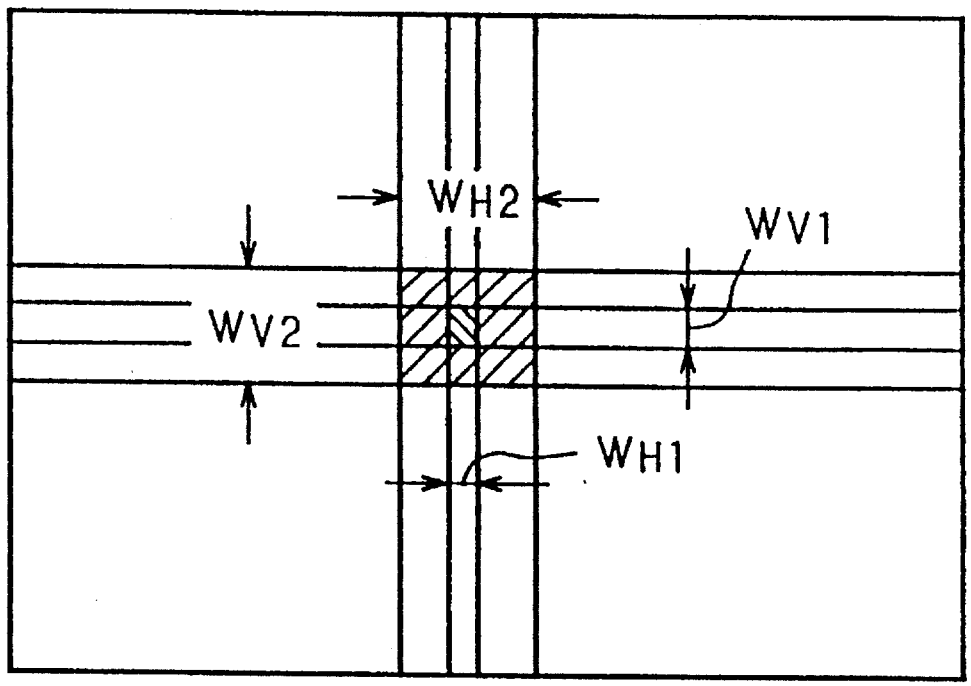
Figure 122:
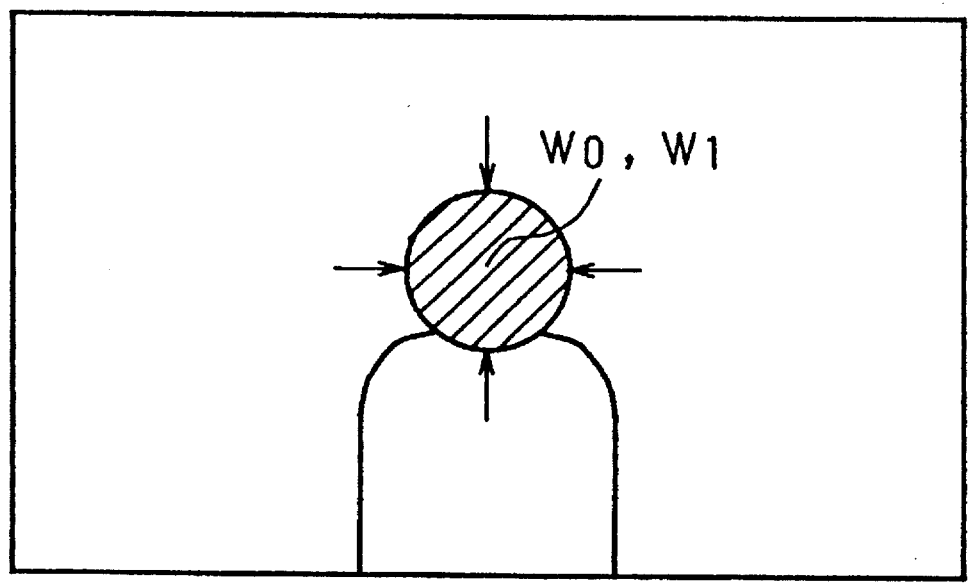

As shown in FIG. 121, values WH1 and WH2 (WH1<WH2) are set along the horizontal direction, and values Wv1 and Wv2 (Wv1<Wv2) set along the vertical direction, by the microcomputer 31 according to the object distance. Referring to FIG. 122, if the horizontal value (size) W0 and vertical value W1 of a flesh-tone area detected by the flesh-tone detector 101 satisfy WH2>W0>WH1 and Wv2>W1>Wv1 respectively, the microcomputer 31 determines the flesh-tone area detected by the flesh-tone detector 101 as a human face area.

W1, WH2 (W1<W2) and Wv1, Wv2 (Wv1<Wv2) are so set that their values increase as the object distance decreases and decrease as the object distance increases, and also that the difference between WH2 and WH1 and the difference between Wv2 and Wv1, i.e. the range defined by the two sets of values, increase as the magnifying ratio increases and decrease as the ratio decreases.

(Embodiment 66)

Figure 123:
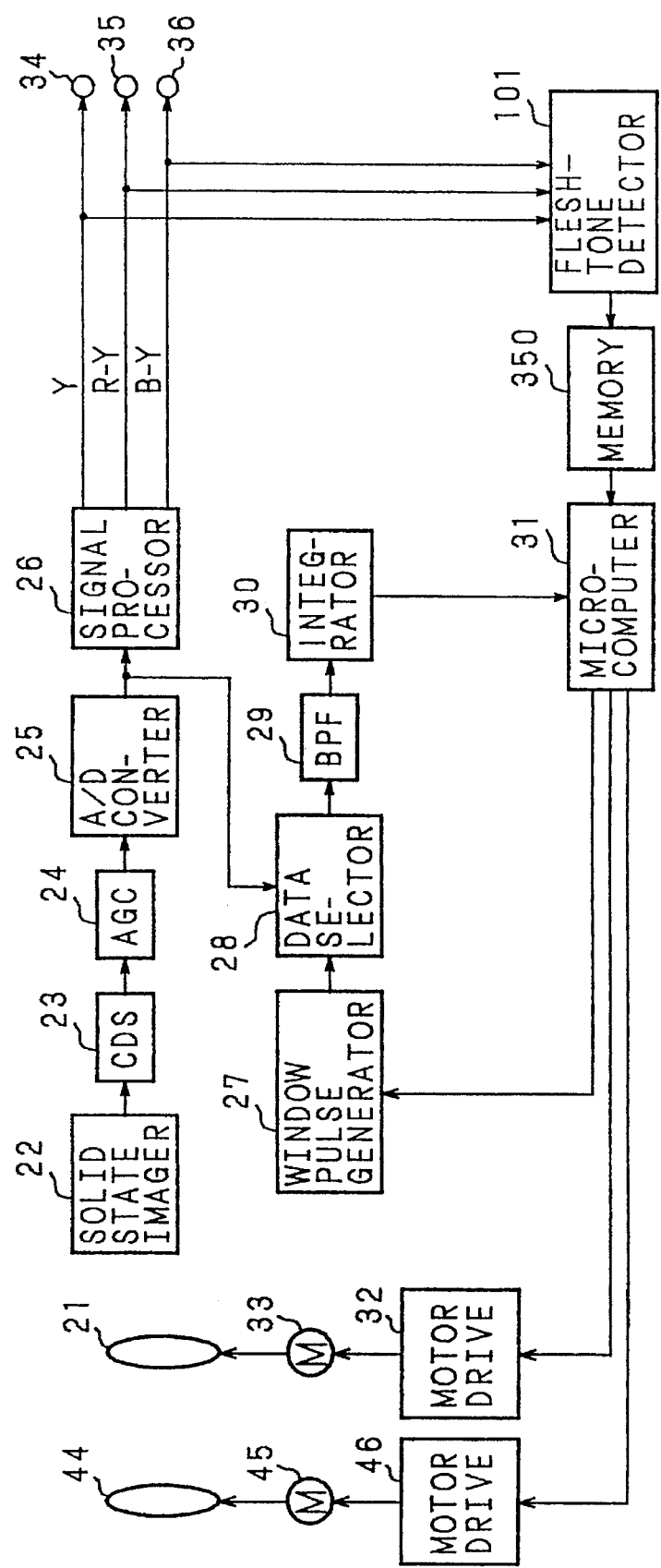

FIG. 123 is a block diagram showing the configuration of a video signal processor according to the present invention (a 66th embodiment). In FIG. 123, the same reference numerals as those in FIG. 115 designate the same or corresponding parts.

Figure 124:
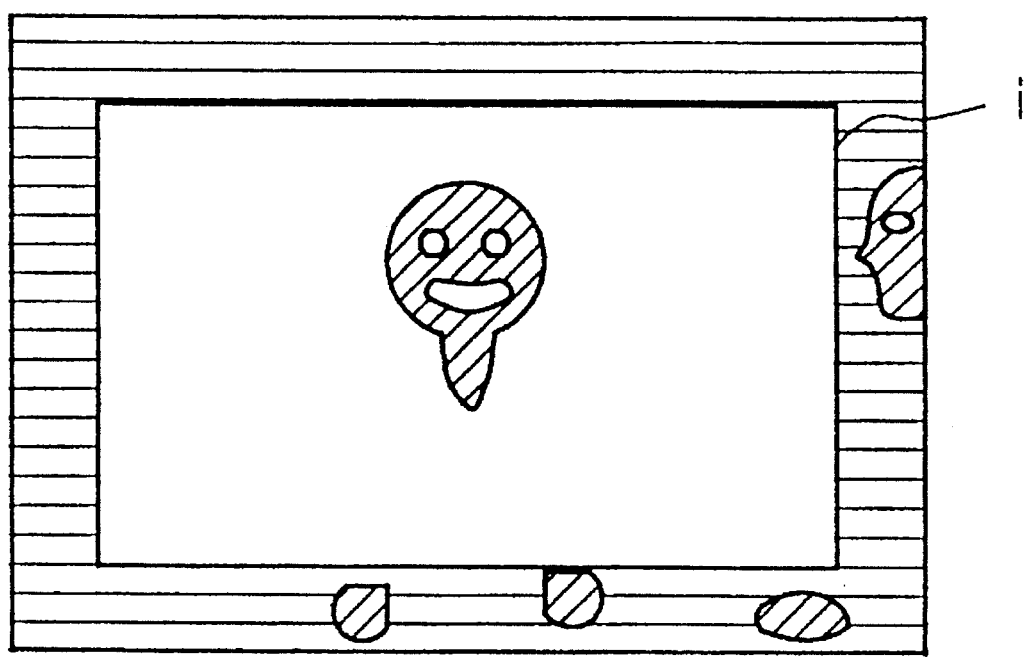

A detection range of a predetermined size, such as shown by oblique hatching in FIG. 117, is set according to the object distance computed by the microcomputer 31. Also, a picture frame of a predetermined size, as indicated by the reference sign i in FIG. 124, is set according to the object distance. In this situation, if a flesh-tone area detected by the flesh-tone detector 101 is positioned inside the picture frame i of FIG. 124, and if the flesh-tone area satisfies the relationship described in the 63rd embodiment with respect to the human face detection range indicated by oblique hatching in FIG. 117, then the microcomputer 31 determines the flesh-tone area as a human face area.

The picture frame i of FIG. 124 is so set that its size increases as the object distance decreases, and decreases as the object distance increases. Furthermore, the range indicated by oblique hatching in FIG. 117 is so set that its size increases as the magnifying ratio increases, and decreases as the ratio decreases.

(Embodiment 67)

The circuit configuration of the 67th embodiment is identical to that of the 63rd embodiment (FIG. 115).

A detection range of a predetermined size, such as shown by oblique hatching in FIG. 117, is set according to the object distance computed by the microcomputer 31. Then, the microcomputer 31 detects a human face area from a plurality of flesh-tone areas detected by the flesh-tone detector 101; that is, if a flesh-tone area satisfies the relationship described in the 63th embodiment with respect to the human face detection range indicated by oblique hatching in FIG. 117, and if there exists a high correlation between the size of the flesh-tone area and the human face detection range, then the microcomputer 31 determines the flesh-tone area as a human face area.

Figure 125:
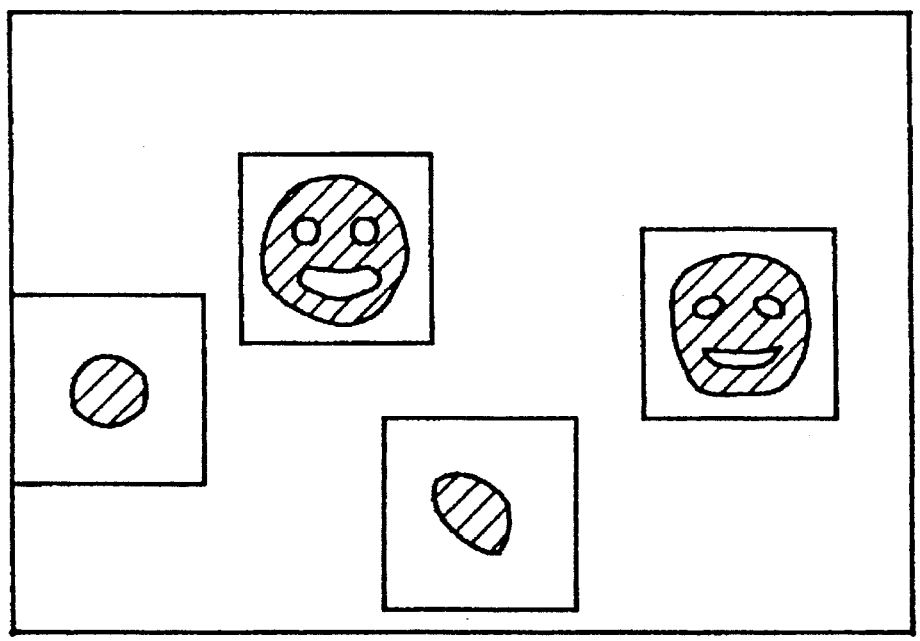

For example, suppose that values of flesh-tone areas detected by the flesh-tone detector 101 are 1 for the portions that lie inside the human face detection range and 0 for the portions that lie outside that range. In this situation, the microcomputer 31 obtains the value S as expressed by Expression 21 for each of a plurality of flesh-tone areas, such as shown in FIG. 125, and determines that the flesh-tone area that gives the largest value of S is a human face area.

$$S=\Sigma W_{x,y}\cdot WH,v \quad \text{(Expression 21)}$$

W$x,y$: Flesh-tone area WH,v: Human face detection range

The equation for calculation of the above correlation is not restricted to Expression 21, but other appropriate equations may be used. The human face detection range indicated by oblique hatching in FIG. 117 is so set that the range increases as the object distance decreases, and decreases as the distance increases, and also that the range increases as the magnifying ratio increases, and decreases as the ratio decreases.

As described above, according to the embodiments 60 through 67, a human face, the main object of interest, can be accurately identified from the detected flesh-tone areas by using a simple circuit configuration, independently of the size of the object and the distance to the object.

We will now describe the embodiments 68 through 72, each pertaining to an example wherein a human face is identified from the detected flesh-tone areas, as described above, and the gains of the luminance signal, color-difference signals, and aperture correction signal and the frequency characteristic of the aperture correction signal are varied selectively for the human face area.
(Embodiment 68)

FIG. 126 is a block diagram showing the configuration of a video signal processor according to the present invention (a 68th embodiment). In FIG. 126, the same reference numerals as those in FIG. 94 designate the same or corresponding parts. Further in FIG. 126, the reference numeral 96 designates a delay circuit, 97 indicates a data selector, and 111 and 112 denote gain controllers.

The operation in this embodiment will now be described. The operations of setting the focus area are the same as those in the previously described embodiments. The flesh-tone detector 101 detects flesh-tone areas from the video signals, and the correlation value calculator 95 and the microcomputer 31 are used to identify a human face area from the detected flesh-tone areas. The operation up to this step is the same as that in the 60th embodiment.

The microcomputer 31 transfers data indicating the center position of the detected human face area and the size of the human face on to the data selector 97. The data selector 97 gates the flesh-tone detection signals output from the flesh-tone detector 101 so that only the flesh-tone area identified as a human face area based on the data supplied from the microcomputer 31 is transferred to the gain controllers 111 and 112 The luminance signal, R-Y color-difference signal, and B-Y color-difference signal, output from the signal processor 26, are transferred to the delay circuit 96. The delay circuit 96 delays the luminance signal, R-Y color-difference signal, and B-Y color difference signal by the time that the correlation value calculator 95 and the microcomputer 31 take to identify the human face area.

The gain controller 111 raises the gain of the R-Y color-difference signal according to the human face detection signal supplied from the data selector 97, while the gain controller 112 lowers the gain of the B-Y color-difference signal according to the human face detection signal. By this method, the gains of the color-difference signals can be varied selectively for the human face area, thus achieving nonlinear conversion, from a to b as shown in FIG. 24, of the color-difference signals only for the human face flesh-tone area. Thus, the flesh-tone of the human face can be corrected to match the human sensation of the color without affecting colors in other areas.

In the above embodiments, the flesh-tone detector 101 of the second embodiment is used, but alternatively, the flesh-tone detector 201 in the third embodiment (FIG. 18) may be used. In the latter case, the circuit configuration should be arranged such that the output signal of the comparator 106 is fed to the correlation value calculator 95 as a human face detection signal and the output signal of the slice circuit 109 is given to the data selector 97 as a flesh-tone detection signal. This arrangement ensures smooth color correction along the boundaries between the flesh-tone area (human face area) and the other areas.
(Embodiment 69)

FIG. 127 is a block diagram showing the configuration of a video signal processor according to the present invention (a 69th embodiment). In FIG. 127, the same reference numerals as those in FIG. 126 designate the same or corresponding parts. Further in FIG. 127, the reference numeral 115 designates a gain controller.

In operation, as in the 68th embodiment, the data selector 97 gates the flesh-tone detection signals output from the flesh-tone detector 101 so that only the flesh-tone area identified as a human face area is transferred to the gain controller 115. The luminance signal, R-Y color-difference signal, and B-Y color-difference signal, output from the signal processor 26, are transferred to the delay circuit 96. The gain controller 115 raises the gain of the luminance signal, delayed through the delay circuit 96, according to the human face detection signal supplied from the data selector 97. Thus, the luminance can be raised selectively for the human face area.
(Embodiment 70)

FIG. 128 is a block diagram showing the configuration of a video signal processor according to the present invention (a 70th embodiment). In FIG. 128, the same reference numerals as those in FIG. 126 designate the same or corresponding parts. Further in FIG. 128, the reference numeral 190 designates an aperture correction signal producing circuit, 118 denotes a gain controller, and 98 refers to an adder. FIG. 129 shows the configuration of the aperture correction signal producing circuit 190. In FIG. 129, the reference numeral 310 is a luminance signal input terminal, 311 and 312 are one-line memories, 313 is an adder for adding the luminance signal transferred directly from the input terminal 310 and the luminance signal delayed by two lines through the one-line memories 311 and 312, 314 is a band-pass filter for determining the frequency characteristic of an aperture correction signal, 315 is a gain controller, 316 is an adder, and 317 is an aperture correction signal output terminal.

The operation in this embodiment will now be described. In the aperture correction signal producing circuit 190, the luminance signal transferred directly from the luminance signal input terminal 310 and the luminance signal delayed by two horizontal scanning periods are added together in the adder 313. The luminance signal output from the adder 313 is transferred to the adder 316 where the output signal of the adder 313 is subtracted from the luminance signal delayed by one horizontal scanning period, to produce an aperture correction signal in the vertical scanning direction. The output signal of the one-line memory 311 is also fed to the band-pass filter 314. The band-pass filter 314 passes designated frequency components in the horizontal direction to the gain controller 315 through which the gain is controlled to produce an aperture correction signal in the horizontal scanning direction. In the adder 318, the aperture correction signal for the horizontal scanning direction is added to the aperture correction signal in the vertical scanning direction, and the resulting signal is transferred via the aperture correction signal output terminal 317 to the delay circuit 96. The gain controller 118 controls the gain of the aperture correction signal output from the delay circuit 96. The adder 98 adds the gain-controlled aperture correction signal to the luminance signal. As in the 68th embodiment, the data selector 97 gates the flesh-tone detection signals output from the flesh-tone detector 101 so that only the flesh-tone area identified as a human face area is transferred to the gain controller 118. The gain controller 118 lowers the gain of the aperture correction signal, delayed through the delay circuit 96, according to the human face detection signal supplied from the data selector 97. Thus, by lowering the gain of the aperture correction signal selectively for the human face area, the human face will look free from wrinkles, eruptions, etc. which would otherwise be emphasized.
(Embodiment 71)

FIG. 130 is a block diagram showing the configuration of a video signal processor according to the present invention (a 71st embodiment). In FIG. 130, the same reference numerals as those in FIG. 126 designate the same or corresponding parts. Further in FIG. 130, the reference numeral 190 is an aperture correction signal producing circuit, 191 is an adder, 192 is a low-pass filter (LPF), and 193 is a mixer.

The operation in this embodiment will now be described. The aperture correction signal producing circuit 190 produces an aperture correction signal from the luminance signal and supplies it to the adder 191. The adder 191 adds the aperture correction signal and the luminance signal and supplies the resulting signal to the delay circuit 96. The LPF 192 removes high-frequency components from the luminance signal and supplies the resulting signal to the mixer 193 where the output of the LPF 192 and the output of the delay circuit 96 are mixed together, the mixing ratio being varied according to the output signal of the data selector 97. As in the 68th embodiment, the data selector 97 gates the flesh-tone detection signals output from the flesh-tone detector 101 so that only the flesh-tone area identified as a human face area is transferred to the mixer 193. When the flesh-tone detection signal representing the human face enters the mixer 193, the gain of the output signal of the LPF 192 is raised and the gain of the output signal of the delay circuit 96 is lowered, and the two gain-controlled signals are mixed together in the mixer 193. The gain of the luminance signal in the high frequency range can thus be lowered selectively for the human face area.

(Embodiment 72)

FIG. 131 is a block diagram showing the configuration of a video signal processor according to the present invention (a 72nd embodiment). In FIG. 131, the same reference numerals as those in FIG. 126 designate the same or corresponding parts. Further in FIG. 131, the reference numeral 120 designates an aperture correction circuit, and 194 denotes an adder. The internal configuration of the aperture correction circuit 120 is identical to that of the one shown in FIG. 28.

The operation in this embodiment will now be described. As in the 68th embodiment, the data selector 97 gates the flesh-tone detection signals output from the flesh-tone detector 101 so that only the flesh-tone area identified as a human face enters, the aperture correction signal 120. When the flesh-tone detection signal representing the human face enters, the aperture correction circuit 120 varies the frequency characteristic of the aperture correction signal. The frequency characteristic of the aperture correction signal can thus be varied selectively for the human face flesh-tone area. This has the effect of reproducing natural-looking wrinkles, not the wrinkles unnaturally emphasized by camera signal processing.

We will now described the embodiments 73 through 94, each pertaining to an example wherein a human face area is identified from the detected flesh-tone areas, and the setting of the auto focus area or the setting of the photometric area for iris control, automatic gain control, automatic shutter speed control is performed in accordance with the thus identified human face area.

(Embodiment 73)

FIG. 132 is a block diagram showing the configuration of a video signal processor according to the present invention (a 73rd embodiment). In FIG. 132, the same reference numerals as those in FIG. 94 designate the same or corresponding parts.

The operation in this embodiment will now be described. In accordance with the method of the 62nd embodiment, a human face area is identified based on the size of the flesh-tone area detected by the flesh-tone area detector 101. The microcomputer 31 issues a control signal to the window pulse generator 27 so that the flesh-tone area detected as a human face area serves as the detection area for auto focus control. Based on the control signal fed from the microcomputer 31, the window pulse generator 27 generates window pulses from the flesh-tone detection signals which are fed from the fresh-tone detector 101, and represents the human face area to transfer them to the data selector 28. By this processing, the human face, which is the main object, is set in the focus area for auto focus control; thus, the focus is always set onto the human face, assuring production of a good image.

(Embodiment 74)

FIG. 133 is a block diagram showing the configuration of a video signal processor according to the present invention (a 74th embodiment). In FIG. 133, the same reference numerals as those in FIGS. 38 and 94 designate the same or corresponding parts.

The operation of this embodiment will now be described. The basic control operation of the iris 39 is the same as that of the 22nd embodiment, and therefore, is not explained here. As in the 73rd embodiment, the microcomputer 31 identifies a human face area and issues a control signal to the window pulse generator 27 so that the flesh-tone area detected as a human face area serves as the photometric area for the iris 39. Based on the control signal fed from the microcomputer 31, the window pulse generator 27 generates window pulses from the flesh-tone detection signals which are fed from the flesh-tone detector 101, and represents the human face area to transfer them to the data selector 28. By this processing, the human face, which is the main object, is set in the photometric area for iris control; thus, the iris control is always set onto the human face, assuring production of a good image.

(Embodiment 75)

FIG. 134 is a block diagram showing the configuration of a video signal processor according to the present invention (a 75th embodiment). In FIG. 134, the same reference numerals as those in FIGS. 37 and 94 designate the same or corresponding parts.

The operation in this embodiment will now be described. The basic operation for automatic gain control of the video signals is the same as that in the 23rd embodiment, and therefore, is not described here. As in the 73rd embodiment, the microcomputer 31 identifies a human face area and issues a control signal to the window pulse generator 27 so that the flesh-tone area detected as a human face area serves as the photometric area for the AGC 24. By this processing, the human face, which is the main object, is set in the photometric area for automatic gain control; thus, optimum gain control is always performed with respect to the human face for production of an image.

(Embodiment 76)

FIG. 135 is a block diagram showing the configuration of a video signal processor according to the present invention (a 76th embodiment). In FIG. 135, the same reference numerals as those in FIGS. 38 and 115 designate the same or corresponding parts.

The operation in this embodiment will now be described. The basic operation for automatic shutter speed control is the same as that in the 24th embodiment, and therefore, is not explained here. As in the 73rd embodiment, the microcomputer 31 identifies a human face area and issues a control signal to the window pulse generator 27 so that the flesh-tone area detected as a human face area serves as the photometric area for automatic electronic shutter speed control. By this processing, the human face, which is the main object, is set in the photometric area for automatic electronic shutter speed control; thus, optimum exposure control is always performed with respect to the human face for production of an image.

(Embodiment 77)

FIG. 136 is a block diagram showing the configuration of a video signal processor according to the present invention (a 77th embodiment). In FIG. 136, the same reference numerals as those in FIG. 132 designate the same or corresponding parts. Further in FIG. 136, the reference numeral 195 designates a low-pass filter (LPF), and 352 denotes a slice circuit.

The operation in this embodiment will now be described. The flesh-tone detection signal output from the flesh-tone detector 101 is transferred to the correlation value calculator 95 and also to the LPF 195. In accordance with the method in the 62nd embodiment, a human face area is detected from the flesh-tone detection signal output onto the correlation value calculator 95. FIG. 137(a) is a waveform diagram showing the signal detected by the flesh-tone detector 101, and FIG. 137(b) is a waveform diagram showing the output signal obtained by passing the signal of FIG. 137(a) through the LPF 195. The signal of FIG. 137(b) output from the LPF 195 enters to the slice circuit 352. The slice circuit 352 slices the input signal by a threshold value THf supplied from the microcomputer 31. The LPF 195 and the slice circuit 352 carries out the same operation also in the vertical scanning direction. Referring to the signal shown by FIG. 137(b), the flesh-tone area represented by the part of the signal smaller than the threshold value THf serves as the detection area for auto focus control. The detection area for auto focus control that satisfies the above condition corresponds to the area within the frame e shown in FIG. 138. The area with oblique hatching shown in FIG. 138 represents the output result of the flesh-tone detection area 101. The threshold value THf varies with the object distance and magnifying ratio. The threshold value THf increases as the object distance increases, and decreases as the distance decreases; on the other hand, the threshold value THf increases as the magnifying ratio decreases, and decreases as the ratio increases. The areas indicated by reference sign e in FIGS. 139 and 140 designate the detection area for auto focus control. The areas indicated by reference sign e in FIG. 139 are focus areas when the object is at a long distance, while the area indicated by reference sign e in FIG. 140 is a focus area when the object is at a short distance. Such areas are used for auto focus control. The operation thereafter is the same as in the 73rd embodiment.

(Embodiment 78)

FIG. 141 is a block diagram showing the configuration of a video signal processor according to the present invention (a 78th embodiment). In FIG. 141, the same reference numerals as those in FIG. 133 designate the same or corresponding parts. Further in FIG. 141, the reference numeral 195 designates a low-pass filter (LPF), and 352 denotes a slice circuit.

The operation in this embodiment will now be described. Referring to the signal shown by FIG. 137 (b), the flesh-tone area represented by the part of the signal larger than the threshold value THe serves as the photometric area for the iris. This area corresponds to an area within the frame f in FIG. 138. The threshold value THe varies with the object distance and magnifying ratio. The threshold value THe decreases as the object distance increases, and increases as the distance decreases; on the other hand, the threshold value THe decreases as the magnifying ratio decreases, and increases as the ratio increases. The areas indicated by reference sign f in FIGS. 142 and 143 each designate the photometric area for the iris. The areas indicated by reference sign f in FIG. 142 are photometric areas when the object is at a long distance, while the area indicated by reference sign f in FIG. 143 is a photometric area when the object is at a short distance. The operation thereafter is the same as in the 74th embodiment.

(Embodiment 79)

FIG. 144 is a block diagram showing the configuration of a video signal processor according to the present invention (a 79th embodiment). In FIG. 144, the same reference numerals as those in FIG. 134 designate the same or corresponding parts. Further in FIG. 144, the reference numeral 195 designates a low-pass filter (LPF), and 352 denotes a slice circuit.

The operation in this embodiment will now be described. Referring to the signal shown by FIG. 137(b), the flesh-tone area represented by the part of the signal larger than the threshold value THe serves as the photometric area for automatic gain control. This area corresponds to the area within the frame f in FIG. 138. The threshold value THe decreases as the object distance increases or the magnifying ratio decreases, the resulting photometric area being such as shown in FIG. 142. The threshold value THe increases as the object distance decreases or the magnifying ratio increases, the resulting photometric area being such as shown in FIG. 143. The operation thereafter is the same as that in the 75th embodiment.

(Embodiment 80)

FIG. 145 is a block diagram showing the configuration of a video signal processor according to the present invention (an 80th embodiment). In FIG. 145, the same reference numerals as those in FIG. 135 designate the same or corresponding parts. Further in FIG. 145, the reference numeral 195 designates a low-pass filter (LPF), and 352 denotes a slice circuit.

The operation in this embodiment will now be described. Referring to the signal shown FIG. 137(b), the flesh-tone area represented by the part of the signal larger than the threshold value THe serves as the photometric area for automatic electronic shutter speed control. This area corresponds to the area within the frame f in FIG. 138. The threshold value THe decreases as the object distance increases or the magnifying ratio decreases, the resulting photometric area being such as shown in FIG. 142. The threshold value THe increases as the object distance decreases or the magnifying ratio increases, the resulting photometric area being such as shown in FIG. 143. The operation thereafter is the same as that in the 76th embodiment.

(Embodiment 81)

The configuration of an 81st embodiment hereinafter described is identical to that of the 73rd embodiment (FIG. 132).

The operation in this embodiment will be described below. FIG. 146(a) is a waveform diagram showing the signal detected by the flesh-tone detector 101. The microcomputer 31 supplies to the window pulse generator 27 a value w that is set according to the object distance and magnifying ratio. In this embodiment, the window pulse generator 27 contains a field memory in which flesh-tone detection signals fed from the flesh-tone detector 101 are stored for one field. The window pulse generator 27 adds the value w to the flesh-tone detection signals only for the human face area identified by the microcomputer 31, and outputs window pulses of waveform of FIG. 146(b) to the data selector 28. The area represented by the signal of FIG.

146(b) serves as the detection area for auto focus control. The area represented by the signal of FIG. 146(b) corresponds to the area within the frame e in FIG. 138. In FIG. 138, the area with oblique hatching represents the output result of the flesh-tone detector 101. It is also possible to vary the width w, to be added to the flesh-tone area, according to the object distance and focal length. That is, the width w to be added is decreased as the object distance increases and is increased as the distance decreases. Further, the width w to be added is decreased as the magnifying ratio decreases and is increased as the ratio increases. The area represented by the signal of FIG. 146(b), when the width w to be added to the flesh-tone area is made variable, is designated by reference sign e in FIGS. 139 and 140. The operation thereafter is the same as that in the 73rd embodiment.

(Embodiment 82)

The configuration of an 82nd embodiment hereinafter described is identical to that of the 74th embodiment (FIG. 133).

The operation in this embodiment will be described below. FIG. 147 (a) is a waveform diagram showing the signal detected by the flesh-tone detector 101. The microcomputer 31 supplies to the window pulse generator 27 a value w that is set according to the object distance and magnifying ratio. In this embodiment, the window pulse generator 27 contains a field memory in which flesh-tone detection signals fed from the flesh-tone detector 101 are stored for one field. The window pulse generator 27 subtracts the value w from the flesh-tone detection signals only for the human face area identified by the microcomputer 31, and outputs window pulses of waveform of FIG. 147(b) to the data selector 28. The area represented by the signal of FIG. 147(b) serves as the photometric area for the iris. The area represented by the signal of FIG. 147(b) corresponds to the area within the frame f in FIG. 137. It is also possible to vary the width w, to be subtracted from the flesh-tone area, according to the object distance and focal length. That is, the width w to be subtracted is decreased as the object distance increases and is increased as the distance decreases. Further, the width w to be subtracted is decreased as the magnifying ratio decreases and is increased as the ratio increases. The area represented by the signal of FIG. 147(b), when the width w to be subtracted from the flesh-tone area is made variable, is designated by reference sign f in FIGS. 142 and 143. The operation thereafter is the same as that in the 74th embodiment.

(Embodiment 83)

The configuration of an 83rd embodiment hereinafter described is identical to that of the 75th embodiment (FIG. 134).

In operation, the area represented by the signal of FIG. 147(b), as in the 82nd embodiment, serves as the photometric metric area for automatic gain control. The value w can also be made variable in the same manner as in the 82nd embodiment. The operation thereafter is the same as that in the 75th embodiment.

(Embodiment 84)

The configuration of an 84th embodiment hereinafter described is identical to that of the 76th embodiment (FIG. 135).

In operation, the area represented by the signal of FIG. 147(b), as in the 82nd embodiment, serves as the photometric area for automatic electronic shutter speed control. The value w can also be made variable in the same manner as in the 82nd embodiment. The operation thereafter is the same as that in the 76th embodiment.

(Embodiment 85)

FIG. 148 is a block diagram showing the configuration of a color video camera according to the present invention (an 85th embodiment). In FIG. 148, the same reference numerals as those in FIGS. 68 and 94 designate the same or corresponding parts.

The operation in this embodiment will now be described. The correlation value calculator 95 and the microcomputer 31 identify a human face area from the flesh-tone areas detected by the flesh-tone detector 101. The operation for human face area detection is the same as that of the 62nd embodiment, and therefore, is not explained here. If no human face area is detected, recording of video signals will not be performed.

FIG. 149 is a flowchart illustrating the algorithm in this embodiment. The same processing steps as those in FIG. 70 are designated by the same step numbers. When a "recording instruction" is input into the microcomputer 31 (step S1), it is determined whether or not the output signal of the correlation value calculator 95 is "High", i.e. whether or not a human face area exists in the video signals being produced (step S61). If no human face area is detected in the video signals, the "recording instruction" will not be output (step S3), and therefore, recording will not be started. On the other hand, once recording is started (step S4), the microcomputer 31 continues to examine the output signal of the correlation value calculator 95 to determine whether or not the human face area exists in the video signal being recorded (step S62), and if no human face area exists in the video signals, the microcomputer 31 outputs a "recording stop instruction" (step S6), to stop the recording of the video signals being produced. Other operations are fundamentally the same as those in the 45th embodiment, and therefore, are not explained here.

(Embodiment 86)

FIG. 150 is a block diagram showing the configuration of a color video camera according to the present invention (an 86th embodiment). In FIG. 150, the same reference numerals as those in FIGS. 71 and 94 designate the same or corresponding parts.

In operation, a human face area is identified from flesh-tone areas, as in the 85th embodiment. In the present embodiment, when no human face area is detected, a "false recording instruction" is output to notify the camera operator accordingly.

FIG. 151 is a flowchart illustrating the algorithm in this embodiment. The same processing steps as those in FIGS. 72 and 149 are designated by the same step numbers. It is determined whether a human face area is detected in the video signals before and after starting the recording (steps S61, S62), and if no human face area is detected, a "false recording instruction" is issued (steps S7, S8). Other operations, including the light emitting operation of the light-emitting diode 83, are fundamentally the same as those in the 46th embodiment, and therefore, are not detailed here.

(Embodiment 87)

FIG. 152 is block diagram showing the configuration of a color video camera according to the present invention (an 87th embodiment). In FIG. 152, the same reference numerals as those in FIGS. 73 and 94 designate the same or corresponding parts.

In operation, a "false recording instruction" which is issued according to the flowchart of FIG. 151 is transferred to the buzzer calling circuit 84 to activate the buzzer 85. This and other operations are fundamentally the same as those in the 47th embodiment, and therefore, are net detailed here.

(Embodiment 88)

FIG. 153 is block diagram showing the configuration of a color video camera according to the present invention (an 88th embodiment). In FIG. 153, the same reference numerals as those in FIGS. 74 and 94 represent the same or corresponding parts.

In operation, a "false recording instruction" which is issued according to the flowchart of FIG. 151 is transferred to the transmitting circuit 86. Other operations, including operations thereafter, are fundamentally the same as those in the 48th embodiment, and therefore, are not detailed here. The construction of the remote controller 49 is identical to that described in the 48th embodiment (FIG. 75 or 76).

(Embodiment 89)

FIG. 154 is block diagram showing the configuration of a color video camera according to the present invention (an 89th embodiment). In FIG. 154, the same reference numerals as those in FIGS. 77 and 94 designate the same or corresponding parts.

In operation, when a "false recording instruction" is issued according to the flowchart of FIG. 151, a detection signal such as a VISS signal is recorded on the control track on the tape 185 (FIG. 78), as in the 49th embodiment. Other operations are fundamentally the same as those in the 49th embodiment, and therefore, are not detailed here.

(Embodiment 90)

FIG. 155 is block diagram showing the configuration of a color video camera according to the present invention (a 90th embodiment). In FIG. 155, the same reference numerals as those in FIGS. 87 and 148 designate the game or corresponding parts.

In operation, the window pulse generator 93 generates window pulses for setting the picture frame Wx,y (FIG. 88) and supplies them to the data selector 94, as in the 55th embodiment; when the object is outside the picture frame Wx,y (as shown in FIG. 89), the human face is not detected. The algorithm in this embodiment is the same as that in the 84th embodiment (FIG. 149).

(Embodiment 91)

FIG. 156 is block diagram showing the configuration of a color video camera according to the present invention (a 91st embodiment). In FIG. 156, the same reference numerals as those in FIGS. 90 and 150 designate the same or corresponding parts.

In operation, as in the 90th embodiment, when the object is outside the predetermined picture frame Wx,y, the human face will not be detected. The operation thereafter is the same as that in the 86th embodiment.

(Embodiment 92)

FIG. 157 is block diagram showing the configuration of a color video camera according to the present invention (a 92nd embodiment). In FIG. 157 the same reference numerals as those in FIGS. 91 and 152 designate the same or corresponding parts.

In operation, as in the 90th embodiment, when the object is outside the predetermined picture frame Wx,y, the human face will not be detected. The operation thereafter is the same as that in the 87th embodiment.

(Embodiment 93)

FIG. 158 is block diagram showing the configuration of a color video camera according to the present invention 93rd embodiment). In FIG. 158, the same reference numerals as those in FIGS. 92 and 153 designate the same or corresponding parts.

In operation, as in the 90th embodiment, when the object is outside the predetermined picture frame Wx,y, the human face will not be detected. The operation thereafter is the same as that of the 88th embodiment.

(Embodiment 94)

FIG. 189 is block diagram showing the configuration of a color video camera according to the present invention (a 94th embodiment). In FIG. 159, the same reference numerals as those in FIGS. 93 and 154 designate the same or corresponding parts.

In operation, as in the 90th embodiment, when the object is outside the predetermined picture frame Wx,y, the human face will not be detected. The operation thereafter is the same as that in the 89th embodiment. In the above 73rd through 94th embodiments, the detection method for human face according to the 60th embodiment is used. However, the detection methods for human face according to the 55th through 59th and the 61st through 67th embodiments may be used.

(Embodiment 95)

FIG. 160 is a block diagram showing the configuration of an image superimposing apparatus for a color video camera according to the present invention (a 95th embodiment). In FIG. 160, the reference numeral 54 is a lens, 55 is an imager, 56 is a processing circuit, 57 is an encoder circuit, 58 is a synchronizing circuit, 59 is a NOT circuit, 60 and 61 are gate circuits, 62 is a superimposing circuit, 228 is a memory, 226 and 227 are multipliers, and 228 is a comparator.

The operation in this embodiment will now be described. When the optical image of an object is focused through the lens 54 onto the imager 55, electrical signals corresponding to the brightness of the image are produced. These signals are converted by the processing circuit 56 into a Y signal, an R-Y color-difference signal, and a B-Y color-difference signal which are then processed in the encoder circuit 57 into a video signal for recording. The operation up to this step is the same as that in the previously described prior art example. The R-Y color-difference signal and B-Y color-difference signal are also supplied to the memory 225 which generates addresses corresponding to these signals. The memory 225 contains a data table as shown in FIG. 161. In this data table, natural numbers are written in an area corresponding to a specific background color, and Os are written in other areas. The numbers designate the color density level. The area and the numbers are prewritten corresponding to the hues of the specific background color, and values which correspond to the addresses of the input color-difference signals are output.

The output of the memory 225 is fed to the comparator 228. On the other hand, the Y signal is supplied to the multipliers 226 and 227 which multiply the Y signal by coefficients M1 and M2, respectively, and the results are fed to the comparator 228. The comparator 228 compares the output of the memory 225 with the outputs of the multiplies 226 and 227 to determine whether the output of the LUT 225 lies inside the range limited by the two values, i.e. the values obtained by multiplying the Y signal by coefficients M1 and M2. The result is output as a keying signal. For example, when the coefficients M1 and M2 of the multipliers 226 and 227 are set as ½ and ⅛ respectively, if the output of the memory 225 is in the range of ½ to ⅛ the Y signal level, then the output is detected as representing the background color and a keying signal is output. When the Y signal level is 14, for example, the values that satisfy the above condition is in the range from 7 to 1, so that the range framed by the solid line in FIG. 161 serves as the background color area and a keying signal is output for inputs within this range.

Synchronized with the video signal, a background image signal is supplied to the gate circuit 61 from the synchronizing circuit 58. With the keying signal from the comparator 228, the gate circuit 60 gates the video signal supplied from the encoder circuit 57 so that the components corresponding to the background area are masked while allowing the components corresponding to the object area to be passed to the superimposing circuit 62. On the other hand, the keying signal is inverted through the NOT circuit 59, and with the inverted keying signal, the gate circuit 61 gates the background image signal supplied from the synchronizing circuit 62 so that the components corresponding to the object area are masked while allowing the components corresponding to the background area to be passed to the superimposing circuit 62. The superimposing circuit 62 combines the outputs of the gate circuits 60 and 61 to produce a combined video image.

(Embodiment 96)

FIG. 162 is a block diagram showing the configuration of an image superimposing apparatus for a color video camera according to the present invention (a 96th embodiment). In FIG. 162, the same reference numerals as those in FIG. 160 designate the same parts, and therefore, explanation of such parts is omitted herein. Further in FIG. 162, the reference numeral 234 designates a table data setting terminal for setting table data in the memory 225. In this embodiment, the table data in the memory 225 are rewritable from the outside.

The operation in this embodiment will now be described. In the memory 225 in this embodiment, the values and range written in the data table can be changed to match the background color to be set, based on the data input via the table data setting terminal 234, and the LUT 225 outputs values corresponding to the addresses of the input color-difference signals. The background color for the object can thus be changed. Other operations are the same as those in the 95th embodiment.

(Embodiment 97)

FIG. 163 is a block diagram showing the configuration of an image superimposing apparatus for a color video camera according to the present invention (a 97th embodiment). In FIG. 163, the same reference numerals as those in FIGS. 160 and 162 designate the same parts, and therefore, explanation of such parts is omitted herein. Further in FIG. 163, the reference numeral 235 designates an array of background color detection switches to which the Y signal, R-Y color-difference signal, and B-Y color-difference signal are supplied from the processing circuit 56. When a control signal is applied to a switch control terminal 259, the background color detection switches are closed so that the Y signal, R-Y signal, and B-Y signal are input into a background color memory 236. The background color memory 236 stores the input Y signal, R-Y color-difference signal, and B-Y color-difference signal. The signals stored in the background color memory 236 are supplied to the memory 225 via the table data setting terminal 234 when a write signal is applied to a write signal input terminal 237.

The operation in this embodiment will now be described. The Y signal, R-Y color-difference signal, and B-Y color-difference signal, output from the processing circuit 56, are applied to the background color detection switches 235, and only when a control signal is applied to the switch control terminal 259, these signals are input into the background color memory 236. This means that any desired specific hue can be stored in memory as a background color by applying the control signal while the background of the desired specific hue is being picked up with the video camera. Next, when a write signal is applied to the write signal input terminal 237, the Y signal, R-Y color-difference signal, and B-Y color-difference signal of the background color stored in the background color memory 236 are fed to the table data setting terminal 234. With these values, the values and range to be written in the data table in the memory 225 can be changed according to the background color to be set, and the memory 225 outputs values corresponding to the addresses of the input color-difference signals. Thus, the background color can be changed as desired. Other operations are the same as those in the 95th embodiment.

(Embodiment 98)

A 98th embodiment hereinafter described pertains to an adaptation of the 97th embodiment to facilitate the setting of the background color. FIG. 164 is a block diagram showing the configuration in the 98th embodiment, wherein the reference numerals 235 and 236 respectively designate the same background color detection switch array and background color memory as used in the 97th embodiment. Further, the reference numeral 238 denotes a control signal generator that generates a control signal in accordance with a horizontal synchronizing signal (HD) and vertical synchronizing signal (VD) applied to it. The control signal generated by the control signal generator 238 is supplied to a viewfinder drive circuit 239 as well as to the background color detection switches 235. The viewfinder drive circuit 239 combines the control signal with the video signal being produced and supplies the resulting output to a viewfinder 240.

The operation in this embodiment will flow be described. In the 97th embodiment, when storing the background color into the background color memory 236 by applying a control signal, it will be useful for the operation if the detection point at which the control signal is output is fixed on a certain point on the screen and if that point is made recognizable while recording. Thus, in the present embodiment, when the horizontal synchronizing signal (HD) and vertical synchronizing signal (VD) are applied, the control signal generator 238 generates a control signal which is output to form a detection point 242 in the center of a screen 241 as shown in FIG. 165. The control signal is supplied to the viewfinder drive circuit 239 as well as to the background color detection switches 235. The viewfinder drive circuit 239 is also supplied with the video signal being produced, and the video signal is combined with the control signal and fed to the viewfinder 240. In setting the background color, the operator first positions the detection point 242, which is in the center of the screen 241 in FIG. 165, within the background area while checking the target background through the viewfinder 240, and then proceed with the operator to store the background color in memory. In this way, the desired background color can be stored in memory without fail. In FIG. 164, the viewfinder 240 may be replaced with a color television monitor.

(Embodiment 99)

A 99th embodiment hereinafter described pertains to an adaptation of the 97th embodiment to facilitate the setting of the background color. FIG. 166 is a block diagram showing the configuration in the 99th embodiment, wherein the reference numerals 235 and 236 respectively designate the same background color detection switch array and background color memory as used in the 97th embodiment while the numerals 239 and 240 respectively designate the same viewfinder drive circuit and viewfinder as used in the 98th embodiment (FIG. 164). Further in FIG. 166, the reference numeral 243 designates a cursor generator that generates a cursor 245 on the screen 241, as shown in FIG. 167, in accordance with the externally applied horizontal synchronizing signal (HD) and vertical synchronizing signal (VD) and with a cursor control signal entered from a mouse 244. The cursor generator 248 supplies a control signal to the background color detection switches 235 as well as the viewfinder drive circuit 289.

The operation in this embodiment will now be described. In the 97th embodiment, when storing the background color into the background color memory 236 by applying a control signal, it will be useful for the operation if the detection point at which the control signal is output is made movable to any desired point on the screen and if that point is made recognizable while recording. In the present embodiment shown in FIG. 166, the mouse 244 that applies a cursor control signal to the cursor generator 243, to which the horizontal synchronizing signal (HD) and vertical synchronizing signal (VD) are also applied. Based on the cursor control signal, the cursor generator 243 outputs a control signal, with the cursor 245 being generated at a desired position on the screen 241 as shown in FIG. 167. The control signal is supplied to the viewfinder drive circuit 239 as well as to the background color detection switches 235. The viewfinder drive circuit 239 is also supplied with the video signal being produced, and the video signal is combined with the control signal and fed to the viewfinder 240. In setting the background color, the operator first positions the detection point 242 shown in FIG. 167 within the background area outside the area of an object 248 by operating the mouse 244 while checking the target background through the viewfinder 240, and then proceed with the operation to store the background color in memory. In this way, the desired background color can be stored in memory without fail. In FIG. 166, the viewfinder 240 may be replaced with a color television monitor, and the mouse 244 may be replaced with a switch, joy stick, keyboard, etc.

(Embodiment 100)

FIG. 168 is a block diagram showing the configuration of an image superimposing apparatus for a color video camera according to the present invention (a 100th embodiment). In FIG. 168, the same reference numerals as those in FIG. 160, 162, or 163 designate the same parts, and therefore, explanation of such parts is omitted herein. In FIG. 168, the reference numeral 247 designates a mean calculator for integrating, respectively, the Y signal, R-Y color-difference signal, and B-Y color-difference signal supplied from the processing circuit 56 and thereby obtaining the mean of each signal. The mean calculator 247 supplies the mean value of each signal to the background color memory 236. When a write signal is applied to the write signal input terminal 237, the mean values of the Y signal, R-Y color-difference signal, and B-Y color difference signal, which are stored in the background color memory 236, are supplied to the memory 225 via the table data setting terminal 234.

The operation in this embodiment will now be described. The Y signal, R-Y color-difference signal, and B-Y color-difference signal, output from the processing circuit 56, are input into the mean calculator 247 which performs the integration for the entire screen to obtain the mean value of each signal over the entire screen. These mean values are input into the background color memory 236 for storing therein. When a write signal is applied to the write signal input terminal 237, the mean values of the Y signal, R-Y color-difference signal, and B-Y color-difference signal of the background color, which are stored in the background color memory 236, are supplied to the table data setting terminal 234. With these mean values, the values and range written in the data table in the memory 225 can be changed according to the background color to be set, and the memory 225 outputs values corresponding to the addresses of the input color-difference signals. Thus, the background color can be changed as desired. Other operations are the same as those in the 95th embodiment.

(Embodiment 101)

A 101st embodiment hereinafter described pertains to an adaptation of the 100th embodiment to facilitate the setting of the background color. FIG. 169 is a block diagram showing the configuration in the 101st embodiment, wherein the reference numerals 247 and 236 respectively represent the same mean calculator and background color memory as used in the 100th embodiment (FIG. 188). Further, the reference numeral 248 designates an area signal generator which, in accordance with the horizontal synchronizing signal (HD) and vertical synchronizing signal (VD) supplied to it, generates an area signal for displaying the area 249 in the center of the screen 241 as shown in FIG. 170. The area signal generator 248 supplies the area signal to the mean calculator 247 as well as to the viewfinder drive circuit 239. The viewfinder drive circuit 239 combines the area signal with the video signal being produced and supplies the resulting output to the viewfinder 240.

The operation in this embodiment will now be described. In the 100th embodiment, when taking the average for the background color by the mean calculator 247, if a part of the screen is extracted for calculation of the average, it will not be necessary to pick up the background over the entire range of the screen, and if the area of the extracted part is checked while recording, it will make the camera operation easier. When the horizontal synchronizing signal (HD) and vertical synchronizing signal (VD) are applied, the area signal generator 248 generates an area signal in the central range of the screen 241 as shown in FIG. 170. The area signal is supplied to the viewfinder drive circuit 239 as well as to the mean calculator 247. The Y signal, R-Y color-difference signal, and B-Y color-difference signal are input into the mean calculator 247 where these signals within the range defined by the area signal are integrated separately to obtain the mean of each signal. The viewfinder drive circuit 239 is also supplied with the video signal being produced, and the video signal is combined with the area signal and is fed to the viewfinder 240. In the viewfinder 240, the area signal range is displayed along with the image reproduced from the video signal. In setting the background color, the operator first positions the area signal range (area 249) shown in FIG. 170 within the back-ground area while checking the target background through the viewfinder 240, and then proceed with the operation to store the background color in memory. In this way, the desired background color can be stored in memory without fail. In FIG. 169, the viewfinder 240 may be replaced with a color television monitor.

(Embodiment 102)

A 102nd embodiment hereinafter described pertains to an adaptation of the 100th embodiment to facilitate the setting of the background color. FIG. 171 is a block diagram showing the configuration in the 102nd embodiment, wherein the reference numerals 247 and 236 respectively designate the same mean calculator and background memory as used in the 100th embodiment (FIG. 168) while the numerals 248, 239, and 240 respectively designate the area signal generator, viewfinder drive circuit, and viewfinder same as those used in the 101st embodiment (FIG. 169). Further in FIG. 171, the numeral 250 denotes an area select terminal for inputting a select signal into the area signal generator 248. When a select signal is applied to the area select terminal 250, the area signal generator 248 generates an area signal for displaying the area in one of the split screens on the screen 241 as shown in FIG. 172.

The operation in this embodiment will now be described. In the 100th embodiment, when taking the average for the background color by the mean calculator 247, if a selected part of the screen is extracted, it will not be necessary to pick up the background over the entire range of the screen, and if the area of the extracted part is checked while recording, it will make the camera operation easier. Thus, in the present embodiment, when the horizontal synchronizing signal (HD) and vertical synchronizing signal (VD) are input and a select signal is input via the area select terminal 250, the area signal generator 248 generates an area signal For one of the split screens, as shown in FIG. 172, in accordance with the select signal. The area can thus be selected by the select signal. The area signal is supplied to the viewfinder drive circuit 239 as well as to the mean calculator 247. The Y signal, R-Y color-difference signal, and B-Y color-difference signal are input into the mean calculator 247 where these signals within the range defined by the area signal are integrated separately to obtain the mean of each signal. The viewfinder drive circuit 239 combines the video signal being produced with the area signal and supplies the resulting output to the viewfinder 240. In the viewfinder 240, the area signal range is displayed along with the image reproduced from the video signal. In setting the background color, the operator first positions the area signal range (area 249) shown in FIG. 172 within the background area outside the area of the object 246 while checking the target background through the viewfinder 240, and then proceed with the operation to store the background color in memory. In this way, the desired background color can be stored in memory without fall. In FIG. 171, the viewfinder 240 may be replaced with a color television monitor.

(Embodiment 103)

Generally, an image superimposing apparatus, such as a chromakey apparatus, requires the use of all external color video camera or a video tape recorder (VTR) for producing a background picture on which to superimpose an object image. Furthermore, in order to synchronize the external input with the object image, a synchronizer such as the synchronizing circuit 58 in the 95th embodiment (FIG. 160) has to be provided. A 103rd embodiment hereinafter described pertains to an image superimposing apparatus that does not require such an external color video camera or VTR nor a synchronizing circuit.

FIG. 173 is a block diagram showing the configuration of a 103rd embodiment. In FIG. 173, the same reference numerals as those in FIG. 160 designates the same parts, and therefore, explanation of such parts is omitted herein. A video signal representing an object image is input via a video signal input terminal 251 into the gate circuit 60, while a keying signal is input via a keying signal input terminal 252 into the gate circuit 60 as well as into the NOT circuit 59. The numeral 253 denotes a background image signal generator for generating a background image signal of any specific hue, the background image signal being fed to the gate circuit 61.

The operation in this embodiment will now be described. A video signal representing an object image is input through the video signal input terminal 251, and a keying signal is input through the keying signal input terminal 252. With the keying signal input via the keying signal input terminal 252, the gate circuit 60 gates the video signal supplied via the video signal input terminal 251 so that the components corresponding to the background area are masked while allowing the components corresponding to the object area to be passed to the superimposing circuit 62. On the other hand, the keying signal is inverted through the NOT circuit 59, and with the inverted keying signal, the gate circuit 61 gates the background image signal supplied from the background image signal generator 253 so that the components corresponding to the object area are masked while allowing the components corresponding to the background area to be passed to the superimposing circuit 62. The superimposing circuit 62 combines the outputs of the gate circuits 60 and 61 to produce a combined video image.

(Embodiment 104)

A 104th embodiment hereinafter described pertains to an image superimposing apparatus which, as in the above 103rd embodiment, does not require an external color video camera or VTR nor a synchronizing circuit.

FIG. 174 is a block diagram showing the configuration of the 104th embodiment. In FIG. 174, the same reference numerals as those in FIG. 160 designates the same parts, and therefore, explanation of such pares is omitted herein. A video signal representing an object image is input via a video signal input terminal 251 into the gate circuit 60, while a keying signal is input via a keying signal input terminal 252 into the gate circuit 60 as well as into the NOT circuit 59. The numeral 254 denotes an image memory for storing a desired background image in the form of a static image. The image memory 254 supplies the stored static image to the gate circuit 61. Interposed between the image memory 254 and the video signal input terminal 251 is an image memory switch 260. The image memory switch 260, which is normally open, is closed when storing a background image into the image memory 254.

The operation in this embodiment will now be described. A video signal representing an object image is input through the video signal input terminal 251, and a keying signal is input through the keying signal input terminal 252. With the keying signal input via the keying signal input terminal 252, the gate circuit 60 gates the video signal input via the video signal input terminal 251 so that the components corresponding to the background area are masked while allowing the components corresponding to the object area to be passed to the superimposing circuit 62. On the other hand, the keying signal is inverted through the NOT circuit 59, and with the inverted keying signal, the gate circuit 61 gates the static image (background image) fed from the image memory 254 so that the object area is masked while allowing the background area to be passed to the superimposing circuit 62. The superimposing circuit 62 combines the outputs of the gate circuits 60 and 61 to produce a combined video image.

(Embodiment 105)

The following description deals with a 105th embodiment wherein special processing (soft focus processing) is performed on an object image. FIG. 175 is a block diagram showing the configuration of the 105th embodiment. In FIG. 175, the same reference numerals as those in FIGS. 160, 162, and 163 designate the same or corresponding parts. According to the configuration of this embodiment, a video signal representing an object image is input via a video signal input terminal 251 into the gate circuit 60, a keying signal is input via a keying signal input terminal 252 into the gate circuit 60 as well as into the NOT circuit 59, and a background image signal is input via a background image signal input terminal 255 into the synchronizing circuit 58. Between the gate circuit 60 and the superimposing circuit 62, a low-pass filter (LPF) 256 is set to suppress high-frequency components and transmits only low-frequency components.

The operation in this embodiment will now be described. A video signal representing an object image is input through the video signal input terminal 251, and a keying signal is input through the keying signal input terminal 252. With the keying signal input via the keying signal input terminal 252, the gate circuit 60 gates the video signal input via the image signal input terminal 251 so that the components corresponding to the background area are masked while allowing the components corresponding to the object area to be passed to the LPF 256 where only low-frequency components are extracted to be input into the superimposing circuit 62. On the other hand, the background image signal input through the background image signal input terminal 255 is fed to the synchronizing circuit 58 for synchronization with the video signal. The synchronized background image signal is input into the gate circuit 61. With the keying signal inverted through the NOT circuit 59, the gate circuit 61 gates the background image signal supplied from the synchronizing circuit 58 so that the components corresponding to the object area are masked while allowing the components corresponding to the background area to be passed to the superimposing circuit 62. The superimposing circuit 62 combines the outputs of the LPF 256 and gate circuit 61 to produce a combined video image.

(Embodiment 106)

The following description deals with a 106th embodiment wherein special processing (mosaic processing) is performed on an object image. FIG. 176 is a block diagram showing the configuration of the 106th embodiment. In FIG. 176, the same reference numerals as those in FIGS. 160, 162, and 163 designate the same or corresponding parts. According to the configuration of this embodiment, a video signal representing an object image is input via a video signal input terminal 251 into the gate circuit 60, a keying signal is input via a keying signal input terminal 252 into the gate circuit 60 as well as into the NOT circuit 59, and a background image signal is input via a background image signal input terminal 255 into the synchronizing circuit 58. Between the gate circuit 60 and the superimposing circuit 62, a mosaic processing circuit 257 is set to perform mosaic processing on the video signal of the object image.

The operation in this embodiment will now be described. A video signal representing an object image is input through the video signal input terminal 251, and a keying signal is input through the keying signal input terminal 252. With the keying signal input via the keying signal input terminal 252, the gate circuit 60 gates the video signal input via the image signal input terminal 251 so that the components corresponding to the background area are masked while allowing the components corresponding to the object area to be passed to the mosaic processing circuit 257 where mosaic processing is performed on the object area to input it into the superimposing circuit 62. On the other hand, the background image signal input at the background image signal input terminal 255 is fed to the synchronizing circuit 58 for synchronization with the video signal. The synchronized background image signal is input into the gate circuit 61. With the keying signal inverted through the NOT circuit 59, the gate circuit 61 gates the background image signal supplied from the synchronizing circuit 58 so that the components corresponding to the object area are masked while allowing the components corresponding to the background area to be passed to the superimposing circuit 62. The superimposing circuit 62 combines the outputs of the mosaic processing circuit 257 and gate circuit 61 to produce a combined video image.

(Embodiment 107)

The following description deals with a 107th embodiment wherein special processing (defect processing) is performed on an object image. FIG. 177 is a block diagram showing the configuration of the 107th embodiment. In FIG. 177, the same reference numerals as those in FIGS. 160, 162, and 163 designate the same or corresponding parts. According to the configuration of this embodiment, a video signal representing an object image is input via a video signal input terminal 251 into the gate circuit 60, a keying signal is input via a keying signal input terminal 252 into the gate circuit 60 as well as into the NOT circuit 59, and a background image signal is input via a background image signal input terminal 255 into the synchronizing circuit 58. Between the gate circuit 60 and the superimposing circuit 62, a defect processing circuit 258 is set to perform the so-called defect processing whereby the luminance grayscales are reduced by dropping certain bits from the video signal of the object image.

The operation in this embodiment will now be described. A video signal representing an object image is input through the video signal input terminal 251, and a keying signal is input through the keying signal input terminal 252. With the keying signal input via the keying signal input terminal 252, the gate circuit 60 gates the video signal input via the image signal input terminal 251 so that the components corresponding to the background area are masked while allowing the components corresponding to the object area to be passed to the defect processing circuit 258 where defect processing is performed on the object area to input it into the superimposing circuit 62. On the other hand, the background image signal input through the background image signal input terminal 255 is fed to the synchronizing circuit 58 for synchronization with the video signal. The synchronized background image signal is input into the gate circuit 61. With the keying signal inverted through the NOT circuit 59, the gate circuit 61 gates the background image signal fed from the synchronizing circuit 58 so that the components corresponding to the object area are masked while allowing the components corresponding to the background area to be passed to the superimposing circuit 62. The superimposing circuit 62 combines the outputs of the defect processing circuit 258 and gate circuit 61 to produce a combined video image.

As this invention may be embodied in several forms without departing from the spirit of essential characteristics thereof, the present embodiments are therefore illustrative and not restrictive, since the scope of the invention is defined by the appended claims rather than by the description preceding them, and all changes that fail within metes and bounds of the claims, or equivalence of such metes and bounds thereof are therefore intended to be embraced by the claims.

What is claimed is:

1. A color video camera having a processing circuit for converting electrical signals obtained from an imager into a luminance signal and color-difference signals, comprising:

a memory, containing a table of values designating color saturation levels and corresponding to a specific hue of a prescribed background color, for outputting a color saturation level specified in accordance with the table using addresses associated with the color-difference signals input thereto, the color-difference signals being obtained by imaging an object on a background of the specific hue;

comparing means for comparing the color saturation level output of said memory with the luminance signal obtained by imaging the object on the background of the specific hue; and means for separating the luminance signal and color-difference signals into components corresponding to the background area and components corresponding to the object area on the basis of the output of said comparing means.

2. A color video camera having a processing circuit for converting electrical signals obtained from an imager into a luminance signal and color-difference signals, comprising:

a memory for creating a table of values designating color saturation levels in accordance with an arbitrarily set background color of a specific hue, and outputting a color saturation level specified in accordance with the table using addresses associated with the color-difference signals input thereto, the color-difference signals being obtained by imaging an object on a background of the specific hue;

comparing means for comparing the color saturation level output of said memory with the luminance signal obtained by imaging the object on the background of the specific hue; and means for separating the luminance signal and color-difference signals into components corresponding to the background area and components corresponding to the object area on the basis of the output of said comparing means.

3. A color video camera having a processing circuit for converting electrical signals obtained from an imager into a luminance signal and color-difference signals, comprising:

extracting means for extracting a portion of a background of a specific hue against which an object has been imaged;

storing means for storing the luminance and color-difference signals for the portion of the background extracted by said extracting means as a background color;

a look-up table, containing a table into which values designating color saturation levels specified in accordance with the output of said storing means are written, for outputting a color saturation level specified in accordance with the table using addresses associated with the color-difference signals input thereto, the color-difference signals being obtained by imaging the object on the background of the specific hue;

comparing means for comparing the color saturation level output of said look-up table with the luminance signal obtained by imaging the object on the background of the specific hue; and means for separating the luminance signal and color-difference signals into components corresponding to the background area and components corresponding to the object area on the basis of the output of said comparing means.

4. A color video camera as set forth in claim 3, wherein said extracting means extracts the center area of a screen as the portion of the background and said storing means stores the luminance and color-difference signals for the extracted portion as the background color.

5. A color video camera as set forth in claim 3, further comprising:

cursor generating means for generating a cursor on a screen; and cursor moving means for moving the cursor so as to detect a specific position on the screen, wherein said extracting means extracts the detected position as the portion of the background and said storing means stores the luminance and color-difference signals for the extracted portion as the background color.

6. A color video camera having a processing circuit for converting electrical signals obtained from an imager into a luminance signal and color-difference signals, comprising:

mean calculating means for calculating mean values of the luminance and color-difference signals obtained by imaging an object on a background of a specific hue;

storing means for storing the output of said mean calculating means as a background color;

a memory, containing a table into which values designating color saturation levels specified in accordance with the output of said storing means are written, for outputting a color saturation level specified in accordance with the table using addresses associated with the color-difference signals input thereto;

comparing means for comparing the color saturation level output of said memory with the luminance signal; and means for separating the luminance signal and color-difference signals into components corresponding to the background area and components corresponding to the object area on the basis of the output of said comparing means.

7. A color video camera as set forth in claim 6, wherein said mean calculating means calculates mean values of the luminanee and color-difference signals for a portion of a screen and said storing means stores the output of said mean calculating means as the background color.

8. A color video camera as set forth in claim 6, further comprising:

screen splitting means for splitting a screen, wherein said mean calculating means calculates mean values of the luminanee and color-difference signals for one of the split screens produced by said screen splitting means and said storing means stores the output of said mean calculating means as the background color.

* * * * *